United States Patent [19]
Fuyama

[11] Patent Number: 6,049,780
[45] Date of Patent: Apr. 11, 2000

[54] ELECTRONIC REGISTER

[75] Inventor: Seiji Fuyama, Yokohama, Japan

[73] Assignee: Matsushita Electric Industrial Co., Ltd., Osaka, Japan

[21] Appl. No.: 08/662,031

[22] Filed: Jun. 12, 1996

[30] Foreign Application Priority Data

Jul. 19, 1995 [JP] Japan .................................... 7-182406

[51] Int. Cl.⁷ ............................. G06F 15/24; H04Q 1/00; H04N 7/14; H04N 7/18
[52] U.S. Cl. ............................ 705/15; 348/150; 348/156; 235/7 R; 705/16; 705/21; 705/24; 345/962
[58] Field of Search .................................. 705/15, 16, 21, 705/24, 27; 345/962

[56] References Cited

U.S. PATENT DOCUMENTS

| | | | |
|---|---|---|---|
| 5,053,868 | 10/1991 | Higgins et al. | 348/150 |
| 5,168,354 | 12/1992 | Martinez et al. | 348/150 |
| 5,235,509 | 8/1993 | Mueller et al. | 705/15 |
| 5,377,097 | 12/1994 | Fuyama et al. | 705/15 |
| 5,579,000 | 11/1996 | Mulqueen | 348/150 X |
| 5,589,676 | 12/1996 | Iguchi | 235/7 R |
| 5,602,730 | 2/1997 | Coleman et al. | 705/15 |

FOREIGN PATENT DOCUMENTS 2303477  2/1997  United Kingdom .

OTHER PUBLICATIONS

"Top Hat Systems, Ltd., A Leading Supplier of Computer Software for the Restaurant Industry, Announces the Release of the TOPHAT–POS Computer Software System Designed to Meet all the Point–of–Sale and Floor Management Needs of Restaurants", News Release, Mar. 1988.

"VGA–Compatible LCD Technology with TV–Quality Picture Display Moves to New Markets", News Release, (Sep. 10, 1990), 1 pg.

"Interopera–Ble Egg Drop Soup", Varbusiness, No. 43, (Jun. 1990), 1 pg.

Kerven, Anne, "Technology Touches Fast Food", Colorado Business, Vol. 19, No. 3, S. 1, (Mar. 1992), p. 27.

". . . And Offers Touch–Screen Point–of–Sale Terminal for Fast Food Outlets: (NCR Corp.'s 7504 Point–of–Sale Equipment)", Computergram International, (May 26, 1992), 1 pg.

Sanders, Bob, "Technology is on the Menue at New Hampshire Restaurants", New Hampshire Business Review, vol. 18, No. 9, (Apr. 1996), pp. 21–(5 pgs).

"3Com: 3Com Announces Winners of the First Annual Retail Network Innovation Awards", M2 Presswire, (May 22, 1997), 4 pp.

*Primary Examiner*—Allen R. MacDonald
*Assistant Examiner*—Pedro R. Kanof
*Attorney, Agent, or Firm*—Pollock, Vande Sande & Amernick

[57] ABSTRACT

A register terminal is connected through a communications link to a kitchen video controller. The register terminal receives setting data for display control functions, and picture formats for the kitchen video controller display. The register terminal provides setting destination information related to the product item selected by a purchaser, and sets a display number on the kitchen video controller in response to the destination information. A customer's order is searched at the register terminal, for product items related to the destination information. Display data is forwarded to the kitchen video controller which displays the information to personnel servicing the order, following which the customer's orders can be erased. In one particular display mode, the controller can display the average sales numbers for specified product items, and for a given time range which includes a present time as well as immediately preceding and immediately time ranges for the day.

18 Claims, 122 Drawing Sheets

| PLU CODE 91 | ITEM NAME 92 | UNIT PRICE 93 | DESTINATION INFORMATION (STEER FLAG) 94 | | | |
|---|---|---|---|---|---|---|
| | | | 1 | 2 | 3 | 4 |
| PLU#10 | COFFEE | 150 | 1 | 1 | 0 | 0 |
| PLU#20 | JUICE | 200 | 1 | 1 | 0 | 0 |
| PLU#30 | HAMB | 250 | 1 | 0 | 0 | 0 |
| ⋮ | ⋮ | | | | | |

FIG. 11

```
*** PROGRAM MODE ***
   .
   .
   .
40 PLU ITEM
50 SYSTEM FLAG
60 KITCHEN VIDEO
   .
   .
```

FIG. 12

```
*** KITCHEN VIDEO PROG ***
 1 STEER# VS VIDEO#
 2 VIDEO MODE
```

FIG. 22
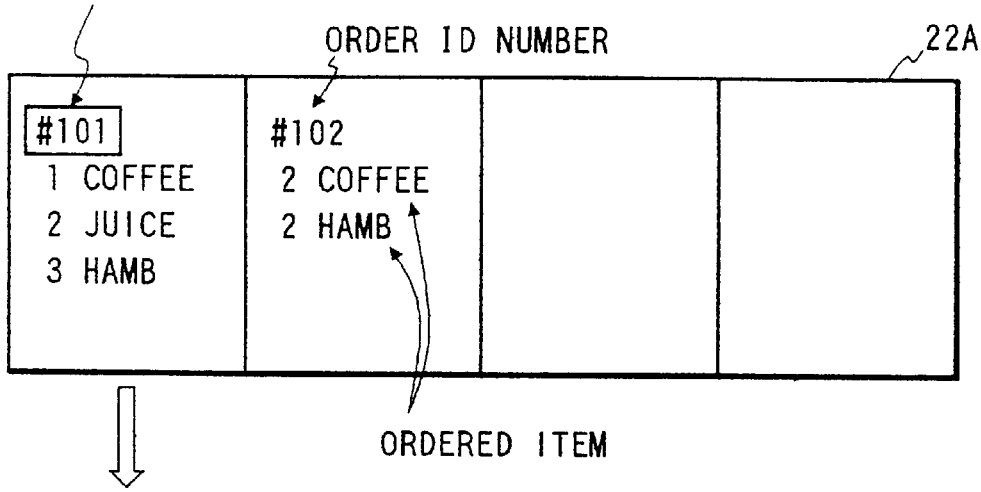
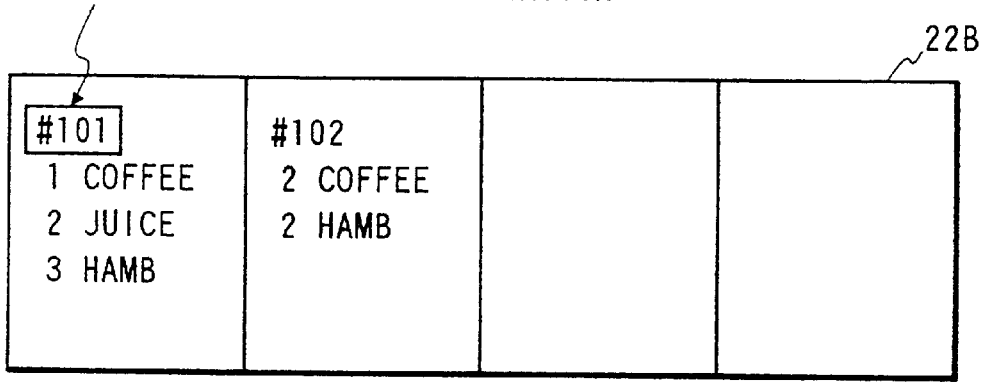
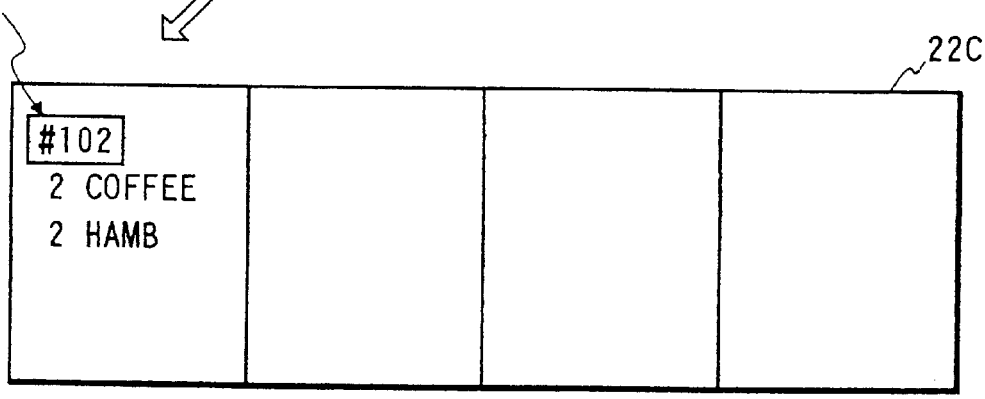

BLINKED INDICATION

| #101<br>1 COFFEE<br>2 JUICE | #102<br>2 COFFEE | | |

```
* KITCHEN VIDEO *

(VIDEO# & FIELD#) SBTL (MODE#) CASH
         FIELD1   FIELD2
VIDEO#   MODE     STATUS      <MODE>
   1      0        00         1 = 4 SEG
   2      0        00         2 = 8 SEG
```

FIG. 29(a)

| #101 | #102 | #103 | #104 |
|---|---|---|---|
| 3 HAMBURG<br>12 COFFEE<br>3 LG COKE<br>1 4PC CKN<br>2 3PC CKN<br>1 LG TEA<br>2 ORNG JCE | 2 COFFEE<br>3 RG TEA<br>1 LG TEA | 1 HAMBURG<br>1 COFFEE | 2 HAMBURG<br>1 COFFEE<br>1 LG TEA |

FIG. 29(b)

| #101 | #101 | #102 | #103 |
|---|---|---|---|
| 3 HAMBURG<br>12 COFFEE<br>3 LG TEA<br>1 4PC CKN<br>2 3PC CKN<br>CONT→ | 1 LG TEA<br>2 ORNG JCE | 2 COFFEE<br>3 RG TEA<br>1 LG TEA | 2 HAMBURG<br>1 COFFEE |

| #104 | #105 | #106 | #107 |
|---|---|---|---|
| 2 HAMBURG<br>1 COFFEE<br>1 LG TEA | 1 HAMBURG<br>1 SM FRIES<br>1 COFFEE | 2 COFFEE | 2 HAMBURG<br>5 COFFEE<br>3 LG TEA<br>2 ORNG JCE<br>2 3PC CKN<br>CONT→ |

FIG. 32

```
* KITCHEN VIDEO *

(VIDEO# & FIELD#) SBTL (MODE#) CASH
            FIELD1   FIELD2
VIDEO#      MODE     STATUS       <MODE>
   1          0        00         1 = 4 SEG
   2          0        00         2 = 8 SEG
                                  3 = CONDENSED
```

| # | | | | |
|---|---|---|---|---|
| 1 | #101       | 2 ORNG JCE | #105       | ------------- |
| 2 | 3 CH BURG  | ---------- | 2 HAMB     | #108       |
| 3 | 1 4PC CHIC | #103       | 2 LG FRIES | 3 COFFEE   |
| 4 | 3 LG TEA   | 3 COFFEE   | ---------- | 3 CH BURG  |
| 5 | 10 LG COKE | 10 LG COKE | #106       | 1 4PC CHIC |
| 6 | ---------- | 2 4PC CHIC | 5 HAMB     | ---------- |
| 7 | #102       | 5 HAMB     | 3 COFFEE   | #109       |
| 8 | 2 4PC CHIC | ---------- | 3 LG TEA   | 1 DBLBURG  |
| 9 | 3 LG TEA   | #104       | ---------- | 2 HAMB     |
| 0 | 10 LG COKE | 1 HAMB     | #107       | 3 COFFEE   |
| 1 | 5 HAMB     | 1 COFFEE   | 2 HAMB     | 3 CH BURG  |
| 2 | 3 COFFEE   | 2 MILK     | 1 COFFEE   | 1 4PC CHIC |
| 3 | 2 MILK     | ---------- | 2 LG FRIES | CON1->     |

| # | | | | |
|---|---|---|---|---|
| 1 | #102       | 5 HAMB     | 3 COFFEE   | #109       |
| 2 | 2 4PC CHIC | ---------- | 3 LG TEA   | 1 DBLBURG  |
| 3 | 3 LG TEA   | #104       | ---------- | 2 HAMB     |
| 4 | 10 LG COKE | 1 HAMB     | #107       | 3 COFFEE   |
| 5 | 5 HAMB     | 1 COFFEE   | 2 HAMB     | 3 CH BURG  |
| 6 | 3 COFFEE   | 2 MILK     | 1 COFFEE   | 1 4PC CHIC |
| 7 | 2 MILK     | ---------- | 2 LG FRIES | 2 MILK     |
| 8 | 2 ORNG JCE | #105       | ---------- | 2 LG FRIES |
| 9 | ---------- | 2 HAMB     | #108       | ---------- |
| 0 | #103       | 2 LG FRIES | 3 COFFEE   |            |
| 1 | 3 COFFEE   | ---------- | 3 CH BURG  |            |
| 2 | 10 LG COKE | #106       | 1 4PC CHIC |            |
| 3 | 2 4PC CHIC | 5 HAMB     | ---------- |            |

FIG. 39(a)

```
*** SYSTEM FLAG ***

(ADR) CSHR  —  (DATA) CASH
```

FIG. 39(b)

```
*** SYSTEM FLAG ***

(ADR) CSHR  —  (DATA) CASH

ADR   120        (DATA) - 3 2 1 0
DATA    0        EATIN   - U L U L
                 TAKEOUT - U U L L
                 U = UPPER,  L = LOWER
```

FIG. 44

```
   1234567890123456789012345678901234567890123456678
  ┌─────────────────┬──────────┬──────────┬──────────┐
 1│#101      IN     │          │          │          │
 2│  1 HAMB         │          │          │          │
 3│  2 JUICE        │          │          │          │  UPPER
 4│                 │          │          │          │  AREA
 5│                 │          │          │          │  ⌒441
 6│                 │          │          │          │
 7│                 │          │          │          │
  ├─────────────────┴──────────┴──────────┴──────────┤
 1│#102      OUT    │          │          │          │
 2│  2 HAMB         │          │          │          │
 3│  3 COFFEE       │          │          │          │  LOWER
 4│                 │          │          │          │  AREA
 5│                 │          │          │          │  ⌒442
 6│                 │          │          │          │
 7│                 │          │          │          │
  └─────────────────┴──────────┴──────────┴──────────┘
```

FIG. 47

```
*** SYSTEM FLAG ***

(ADR) CSHR  —  (DATA) CASH

ADR  100  :  (TERMINAL#)
 DATA   1
```

FIG. 48

```
*** SYSTEM FLAG ***

(ADR) CSHR  —  (DATA) CASH

ADR  130      (DATA) - 3 2 1 0
 DATA   0      TERM#1 - U L U L
                TERM#2 - U U L L
                 U = UPPER,  L = LOWER
```

FIG. 52

```
  12345678901234567890123456789012345678901 2345678
 1 #101
 2   1 HAMB
 3   2 JUICE                                          UPPER
 4                                                    AREA
 5                                                    ~521
 6
 7
 ─────────────────────────────────────────────
 1 #201
 2   2 HAMB
 3   3 COFFEE                                         LOWER
 4                                                    AREA
 5                                                    ~522
 6
 7
```

FIG. 53

| DISPLAY ID NUMBER | | | ~531 |
|---|---|---|---|
| ORDER ID NUMBER | | | ~532 |
| ORDERED ITEM | | | ~533 |
| F1 | F2 | CONTROL FLAG | ~534 |

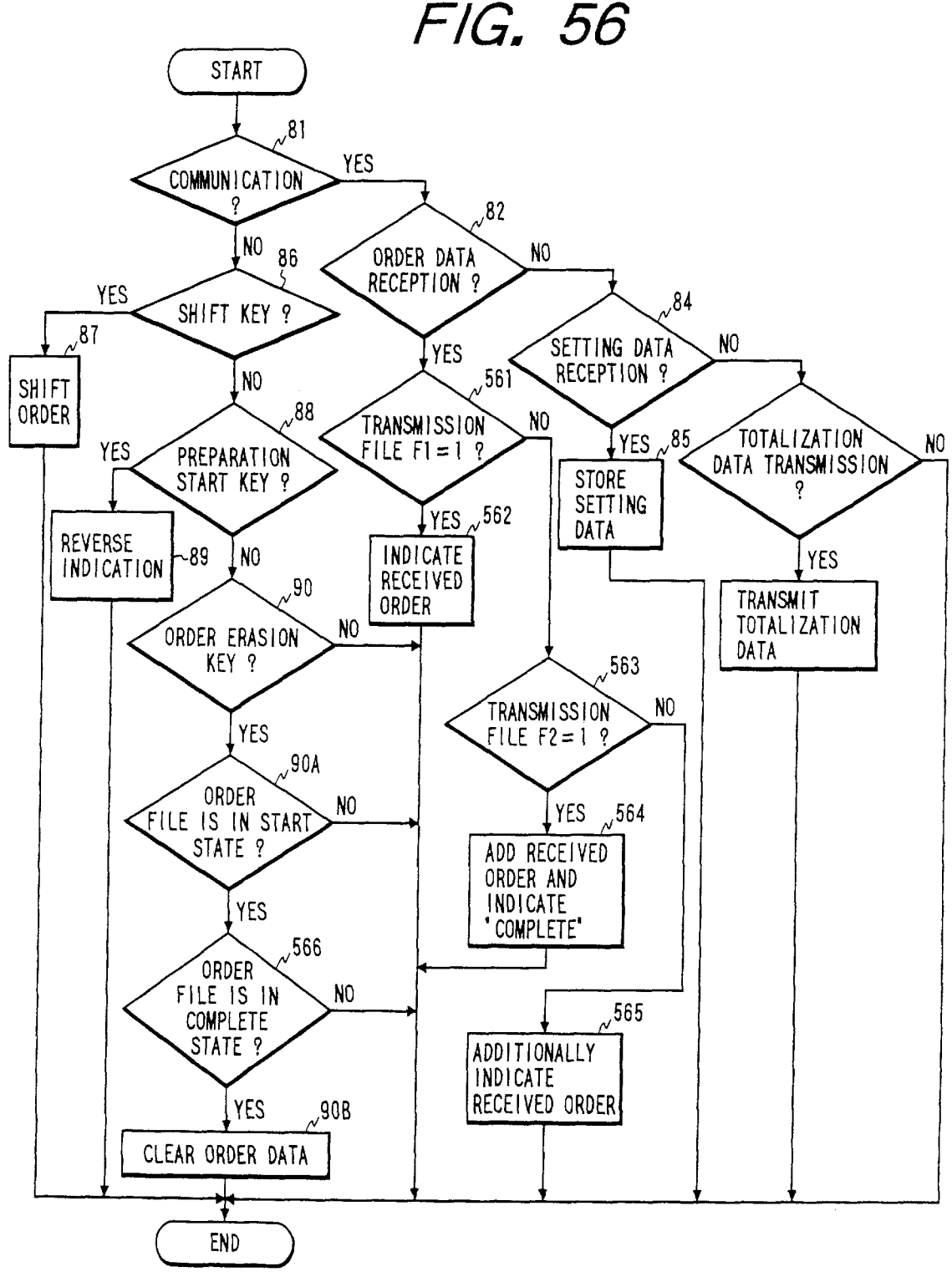

FIG. 57

```
  12345678901234567890123456789012345678901234567 8
 1|#101         |#102         |            |
 2|3 HAMB       |3 DBL-HAMB   |            |
 3|1 JUICE      |1 JUICE      |            |
 4|2 COFFEE     |2 COFFEE     |            |
 5|             |             |            |
 6|             |             |            |
 7|COMPLETE     |COMPLETE     |            |
   ----------------------------------------------
 1|             |             |            |
 2|             |             |            |
 3|             |             |            |
 4|             |             |            |
 5|             |             |            |
 6|             |             |            |
 7|             |             |            |
```

FIG. 58

```
* KITCHEN VIDEO *

(VIDEO# & FIELD#) SBTL (MODE#)   CASH

FIELD1  FIELD2
   VIDEO#  MODE    STATUS     <MODE>
      1     00      000       01/11 = 4 SEG/TANDEM 2     00      000       02/12 = 8 SEG/TANDEM
```

FIG. 59

| KVS mode | DISPLAY #1 | DISPLAY #2 |
|---|---|---|
| 591 — 4 SEG/TANDEM | 1 \| 2 \| 3 \| 4 | 5 \| 6 \| 7 \| 8 |
| 592 — 8 SEG/TANDEM | 1 \| 2 \| 3 \| 4 <br> 5 \| 6 \| 7 \| 8 | 9 \| 10 \| 11 \| 12 <br> 13 \| 14 \| 15 \| 16 |

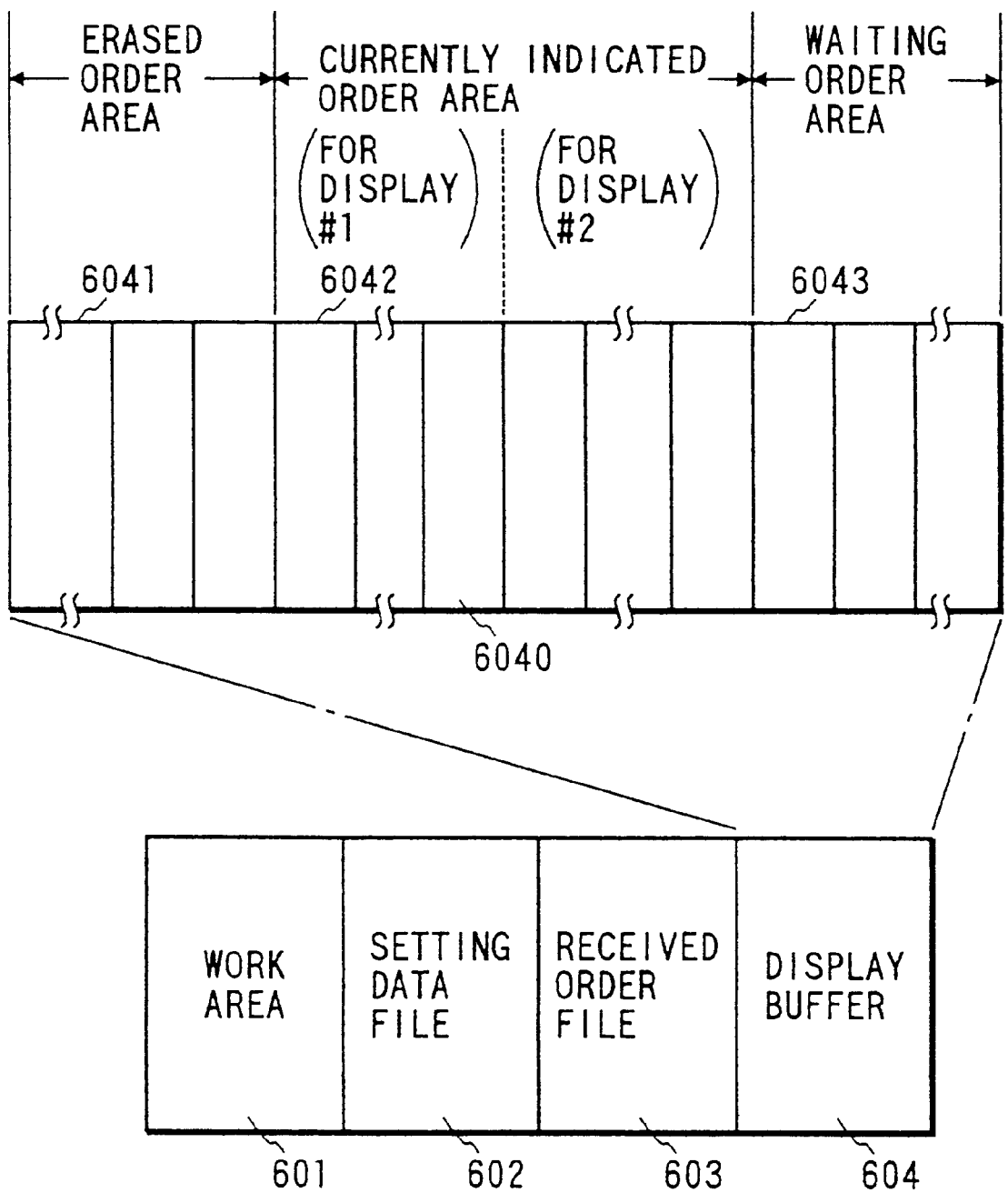

FIG. 61

| #101 | | #102 | #103 | | #104 | #105 | #106 |
|---|---|---|---|---|---|---|---|
| 1 HAMB | 3 FOODC | 1 HAMB | 2 HAMB | 2 FOODD | 1 HAMB | 2 ORANGE | 2 DBL-BG |
| 2 JUICE | 2 FOODD | 3 COFFEE | 2 JUICE | 1 FOODE | 2 COFFEE | 2 HAMB | 2 COFFEE |
| 5 COFFEE | | | 3 LG TEA | 5 FOODF | 1 TEA | | 3 LG TEA |
| 3 LG TEA | | | 2 FOODA | | | | 2 FOODA |
| 2 FOODA | | | 1 FOODB | | | | 1 FOODB |
| . | | | . | | | | . |
| . | | | . | | | | . |
| 1 FOODB | | | 1 FOODC | | | | 1 FOODC |
| CONT→ | | | CONT→ | | | | CONT→ |

⎳ DISPLAY #1  ⎳ DISPLAY #2

FIG. 62

| #102 | #103 | | #104 | #105 | #106 | | #107 |
|---|---|---|---|---|---|---|---|
| 1 HAMB | 2 HAMB | 2 FOODD | 1 HAMB | 2 ORANGE | 2 DBL-BG | 1 FOODD | 2 COFFEE |
| 3 COFFEE | 2 JUICE | 1 FOODE | 2 COFFEE | 2 HAMB | 2 COFFEE | 2 FOODE | 3 HAMB |
| | 3 LG TEA | 5 FOODF | 1 TEA | | 3 LG TEA | 1 FOODF | 1 ICETEA |
| | 2 FOODA | | | | 2 FOODA | 5 FOODG | |
| | 1 FOODB | | | | 1 FOODB | | |
| | . | | | | . | | |
| | . | | | | . | | |
| | 1 FOODC | | | | 1 FOODC | | |
| | CONT→ | | | | CONT→ | | |

⎳ DISPLAY #1  ⎳ DISPLAY #2

FIG. 64

\*\*\* KITCHEN VIDEO PROG \*\*\*

1 STEER# VS VIDEO#
2 VIDEO MODE
3 SUMMARY ITEM

FIG. 65

\*\*\* KITCHEN VIDEO \*\*\*

(VIDEO# & FIELD#) SBTL (MODE#) CASH
        FIELD1  FIELD2
VIDEO#  MODE   STATUS    <MODE>
  1      00      000     01 = 4 SEG
  2      00      000     02 = 4 SEG W/SAMMARY

FIG. 66

```
  123456789012345678901234567890123456789012345678
 1 #101    IN   #102    IN   #103    OUT
 2  3 HAMB       1 HAMB       2 HAMB                    ORDER
 3  2 LG COKE    2 3P-CHKN    3 CH BURG                 INDICATION
 4  2 CH BURG    2 COFFEE     1 3P-CHKN                 PICTURE
 5  3 COFFEE     1 SM MILK    2 COFFEE                  ~661
 6                            3 LG COKE
 7
 1  7 COFFEE    6 HAMB       5 CH BURG    3 3P-CHKN
 2  5 LG COKE   0 LG TEA     1 SM MILK                  SUMMARY
 3                                                      INDICATION
 4                                                      PICTURE
 5                                                      ~662
 6
 7
```

FIG. 68

```
  123456789012345678901234567890123456789012345678
 1 #101    IN   #102    IN   #103    OUT
 2  3 HAMB       1 HAMB       2 HAMB                    ORDER
 3  2 LG COKE    2 3P-CHKN    3 CH BURG                 INDICATION
 4  2 CH BURG    2 COFFEE     1 3P-CHKN                 PICTURE
 5  3 COFFEE     1 SM MILK    2 COFFEE                  ~681
 6                            3 LG COKE
 7
 1  3 3P-CHKN   5 CH BURG    7 COFFEE     6 HAMB
 2  5 LG COKE   0 LG TEA     1 SM MILK                  SUMMARY
 3                                                      INDICATION
 4                                                      PICTURE
 5                                                      ~682
 6
 7
```

FIG. 67

```
*** SUMMARY ITEM ***

(ADR) CASHIER ──────── (DISP MODE/PLU#) CASH

0: DISP MODE    0=PROG, 1=ALPHA (PLU# — ITEM)            (PLU# — ITEM)

1   10   COFFEE      15    ·      ·
   2   30   HANB        16    ·      ·
   3   40   CH BURG     17    ·      ·
   4  110   3P-CHKN     18    ·      ·
   5  200   LG COKE      ·    ·      ·
   6  210   LG TEA       ·    ·      ·
   7  220   SM MILK      ·    ·      ·
   ·    ·     ·          ·    ·      ·
  14    ·     ·         28    ·      ·
```

COUNTER AREA  
701  ITEM NAME AREA  
702

```
*** SUMMARY ITEM ***

(ADR)   CASHIER ——(DISP MODE/PLU#)   CASH

0: DISP MODE    0 = PROG.  1 = ALPHA (PLU# - ITEM)         (PLU# - ITEM)
 1   10   COFFEE      31    ·      ·
 2   30   HAMB        32    ·      ·
 3   40   CH BURG     33    ·      ·
 4  110   3PC CHKN    34    ·      ·
 4  110   3PC CHKN     ·    ·      ·
 5  200   LG COKE      ·    ·      ·
 6  210   LG TEA       ·    ·      ·
 7  220   SM MILK      ·    ·      ·
 ·    ·      ·         ·    ·      ·
30    ·      ·        60    ·      ·
```

MONITOR CONTROL SWITCH #1 OR #2

- 51 — ← LEFT SHIFT
- 52 — → RIGHT SHIFT
- 53 — PREPARATION START
- 54 — ORDER ERASION
- 55 — PICTURE CHANGE

```
   12345678901234567890123456789012345678901234567 8
1 |#101    IN   |#102    IN   |#103    OUT  |
2 |  3 HAMB     |  1 HAMB     |  2 HAMB     |
3 |  2 LG COKE  |  2 3PC CHKN |  3 CH BURG  |
4 |  2 CH BURG  |  2 COFFEE   |  1 3PC CHKN |
5 |  3 COFFEE   |  1 SM MILK  |  2 COFFEE   |
6 |             |             |  3 LG COKE  |
7 |             |             |             |
8 |             |             |             |
9 |             |             |             |
10|             |             |             |
11|             |             |             |
12|             |             |             |
13|             |             |             |
14|             |             |             |
15|             |             |             |
```

FIG. 74

```
         12345678901234567890123456789012345678901 2345678
      ┌─────────────────────────────────────────────────────┐
    1 │ 7 COFFEE    6 HAMB     5 CH BURG    3 3PC CHKN      │
    2 │ 5 LG COKE   0 LG TEA   1 SM MILK                    │
    3 │                                                     │
    4 │                                                     │
    5 │                                                     │
    6 │                                                     │
    7 │                                                     │
    8 │                                                     │
    9 │                                                     │
   10 │                                                     │
   11 │                                                     │
   12 │                                                     │
   13 │                                                     │
   14 │                                                     │
   15 │                                                     │
      └─────────────────────────────────────────────────────┘
```

FIG. 75

```
         12345678901234567890123456789012345678901 2345678
      ┌─────────────────────────────────────────────────────┐
    1 │ 3 3PC CHKN  5 CH BURG  7 COFFEE     6 HAMB          │
    2 │ 5 LG COKE   0 LG TEA   1 SM MILK                    │
    3 │                                                     │
    4 │                                                     │
    5 │                                                     │
    6 │                                                     │
    7 │                                                     │
    8 │                                                     │
    9 │                                                     │
   10 │                                                     │
   11 │                                                     │
   12 │                                                     │
   13 │                                                     │
   14 │                                                     │
   15 │                                                     │
      └─────────────────────────────────────────────────────┘
```

FIG. 77

DISPLAY #1

| #101 | #102 | #103 | #104 |
|---|---|---|---|
| 1 HAMB | 1 HAMB | 2 HAMB | 3 LG COKE |
| 2 CH BURG | 2 3P-CHKN | 3 CH BURG | |
| 3 COFFEE | 2 COFFEE | 1 3P-CHKN | |
| | 3 SM MILK | 2 COFFEE | |
| | | 2 LG COKE | |

DISPLAY #2

14 COFFEE  10 HAMB   7 CH BURG  3 3P-CHKN
6 LG COKE   0 LG TEA   3 SM MILK

FIG. 80

DISPLAY #1

| #102 | #103 | #104 | #105 |
|---|---|---|---|
| 1 HAMB | 2 HAMB | 3 LG COKE | 2 HAMB |
| 2 3P-CHKN | 3 CH BURG | | 1 LG COKE |
| 2 COFFEE | 1 3P-CHKN | | 1 COFFEE |
| 3 SM MILK | 2 COFFEE | | |
| | 2 LG COKE | | |

DISPLAY #2

11 COFFEE  9 HAMB  5 CH BURG  3 3P-CHKN
6 LG COKE  0 LG TEA  3 SM MILK

FIG. 83

COUNTER AREA 831  
ITEM NAME AREA 832

| 7 | COFFEE | 6 | HAMB | 0 | CH BURG | 3 | 3P-CHKN |
|---|--------|---|------|---|---------|---|---------|
| 5 | LG COKE | 2 | LG TEA | 1 | SM MILK | | |
| | | | | | | | |
| . | . | . | . | . | . | . | . |
| . | . | . | . | . | . | . | . |
| . | . | . | . | . | . | . | . |
| | | | | | | | |

|   | #101   IN | #102   IN | #103   OUT |            |
|---|-----------|-----------|------------|------------|
| 1 | 3 HAMB    | 1 HAMB    | 2 HAMB     |            |
| 2 | 2 LG COKE | 2 3P-CHKN | 3 3P-CHKN  |            |
| 3 | 3 COFFEE  | 2 COFFEE  | 2 COFFEE   |            |
| 4 |           | 1 SM MILK | 3 LG COKE  |            |
| 5 |           |           | 2 LG TEA   |            |
| 6 |           |           |            |            |
| 7 |           |           |            |            |

ORDER INDICATION PICTURE — 841

| 1 | 7 COFFEE  | 6 HAMB   |           | 3 3P-CHKN |
|---|-----------|----------|-----------|-----------|
| 2 | 5 LG COKE | 2 LG TEA | 1 SM MILK |           |
| 3 |           |          |           |           |
| 4 |           |          |           |           |
| 5 |           |          |           |           |
| 6 |           |          |           |           |
| 7 |           |          |           |           |

SUMMARY INDICATION PICTURE — 842

`0 CH BURG`
INHIBITED FROM BEING INDICATED

| | | | |
|---|---|---|---|
| 1 | #101    IN | #102    IN | #103    OUT |
| 2 | 3 HAMB | 1 HAMB | 2 HAMB |
| 3 | 2 LG COKE | 2 3P-CHKN | 3 3P-CHKN |
| 4 | 3 COFFEE | 2 COFFEE | 2 COFFEE |
| 5 | | 1 SM MILK | 3 LG COKE |
| 6 | | | 2 LG TEA |
| 7 | | | |

ORDER INDICATION PICTURE ~851

| | | | | |
|---|---|---|---|---|
| 1 | 3 3P-CHKN | | 7 COFFEE | 6 HAMB |
| 2 | 5 LG COKE | 2 LG TEA | 1 SM MILK | |
| 3 | | | | |
| 4 | | | | |
| 5 | | | | |
| 6 | | | | |
| 7 | | | | |

SUMMARY INDICATION PICTURE ~852

`0 CH BURG` INHIBITED FROM BEING INDICATED

FIG. 87(a)

COUNTER AREA 871  
ITEM NAME AREA 872

| 7 | COFFEE | 6 | HAMB | 0 | CH BURG | 3 | 3P-CHKN |
|---|--------|---|------|---|---------|---|---------|
| 5 | LG COKE | 2 | LG TEA | 1 | SM MILK | | |
| | | | | | | | |
| . | . | . | . | . | . | . | . |
| . | . | . | . | . | . | . | . |
| . | . | . | . | . | . | . | . |
| | | | | | | | |

FIG. 87(b)

CONTROL FLAG 873  
COUNTER AREA 871  
ITEM NAME AREA 872

| | 7 | COFFEE | | 6 | HAMB | | 3 | 3P-CHKN | | 5 | LG COKE |
|---|---|--------|---|---|------|---|---|---------|---|---|---------|
| | 2 | LG TEA | | 1 | SM MILK | | | | | | |
| | | | | | | | | | | | |
| . | . | . | . | . | . | . | . | . | . | . | . |
| . | . | . | . | . | . | . | . | . | . | . | . |
| . | . | . | . | . | . | . | . | . | . | . | . |
| | | | | | | | | | | | |

FIG. 88

```
         12345678901234567890123456789012345678901 2345678
      ┌─────────────────────────────────────────────────────┐
    1 │ #101    IN    #102    IN    #103    OUT            │
    2 │  3 HAMB        1 HAMB        2 HAMB                │
    3 │  2 LG COKE     2 3P-CHKN     3 3P-CHKN             │
    4 │  3 COFFEE      2 COFFEE      2 COFFEE              │
    5 │                1 SM MILK     3 LG COKE             │
    6 │                               2 LG TEA              │
    7 │                                                    │
    8 │                                                    │
    9 │                                                    │
   10 │                                                    │
   11 │                                                    │
   12 │                                                    │
   13 │                                                    │
   14 │                                                    │
   15 │                                                    │
      └─────────────────────────────────────────────────────┘
```

FIG. 89

```
         12345678901234567890123456789012345678901 2345678
      ┌─────────────────────────────────────────────────────┐
    1 │  7 COFFEE     6 HAMB      3 3P-CHKN    5 LG COKE   │
    2 │  2 LG TEA     1 SM MILK                            │
    3 │                                                    │
    4 │                                                    │
    5 │                                                    │
    6 │                                                    │
    7 │                                                    │
    8 │                                                    │
    9 │                                                    │
   10 │                                                    │
   11 │                                                    │
   12 │                                                    │
   13 │                                                    │
   14 │                                                    │
   15 │                                                    │
      └─────────────────────────────────────────────────────┘
```

FIG. 90(a)

901 — 
104   IN
1   COFFEE
2   CH BURG

FIG. 90(b)

| 1 | 8 | COFFEE |   | 6 | HAMB |   | 3 | 3P-CHKN |   | 5 | LG COKE |
|---|---|--------|---|---|------|---|---|---------|---|---|---------|
|   | 2 | LG TEA |   | 1 | SM MILK | 1 | 2 | CH BURG |   |   |  |
|   |   |        |   |   |      |   |   |         |   |   |  |
| . | . | .      | . | . | .    | . | . | .       | . | . | . |
| . | . | .      | . | . | .    | . | . | .       | . | . | . |
| . | . | .      | . | . | .    | . | . | .       | . | . | . |
|   |   |        |   |   |      |   |   |         |   |   |  |

FIG. 91

```
  123456789012345678901234567890123456789012345678
 1 [8] COFFEE    6 HAMB     3 3P-CHKN    5 LG COKE
 2  2 LG TEA    1 SM MILK  [2] CH BURG
 3
 4                                                    [8] : BLINK
 5
 6                                                    [2] : BLINK
 7
 8
 9
10
11
12
13
14
15
```

FIG. 92

```
  123456789012345678901234567890123456789012345678
 1 #101    IN  │ #102    IN  │ #103    OUT │ #104    IN
 2  3 HAMB     │  1 HAMB     │  2 HAMB     │  1 COFFEE
 3  2 LG COKE  │  2 3P-CHKN  │  3 3P-CHKN  │  2 CH BURG
 4  3 COFFEE   │  2 COFFEE   │  2 COFFEE   │
 5             │  1 SM MILK  │  3 LG COKE  │
 6             │             │  2 LG TEA   │
 7
 8
 9
10
11
12
13
14
15
```

FIG. 93(a)

| 8 | COFFEE | 6 | HAMB | 2 | CH BURG | 3 | 3P-CHKN |
|---|--------|---|------|---|---------|---|---------|
| 5 | LG COKE | 2 | LG TEA | 1 | SM MILK | | |
| | | | | | | | |
| . | . | . | . | . | . | . | . |
| . | . | . | . | . | . | . | . |
| . | . | . | . | . | . | . | . |
| | | | | | | | |

FIG. 93(b)

| 8 | COFFEE | 6 | HAMB | 2 | CH BURG | 3 | 3P-CHKN |
|---|--------|---|------|---|---------|---|---------|
| 5 | LG COKE | 2 | LG TEA | 1 | SM MILK | | |
| | | | | | | | |
| . . | . | . . | . | . . | . | . . | . |
| . . | . | . . | . | . . | . | . . | . |
| . . | . | . . | . | . . | . | . . | . |
| | | | | | | | |

FIG. 94

```
   12345678901234567890123456789012345678901234567
 1 | 8 COFFEE    6 HAMB     2 CH BURG   3 3P-CHKN
 2 | 5 LG COKE   2 LG TEA   1 SM MILK
 3 |
 4 |
 5 |
 6 |
 7 |
 8 |
 9 |
10 |
11 |
12 |
13 |
14 |
15 |
```

```
    * KITCHEN VIDEO *

(VIDEO# & FIELD#) SBTL (STATUS) CASH
         FIELD1   FIELD2
 VIDEO#   MODE    STATUS     <STATUS - N1N2>
    1      00       00      N1 = 1 BEEP
                               = 2 PRIORITY DISPLAY
    2      00       00      N2 = 1 SALES TOTAL
                               = 2 SERVER NAME
```

FIG. 102

```
     12345678901234567890123456789012345678901 2345678
   ┌─────────────┬─────────────┬─────────────┬────────┐
 1 │ #101        │ #102        │ #103        │        │
 2 │  3 HAMB     │  1 HAMB     │  2 HAMB     │        │
 3 │  2 LG COKE  │  2 3P-CHKN  │  3 CH BURG  │        │
 4 │  2 CH BURG  │  2 COFFEE   │  1 3P-CHKN  │        │
 5 │  3 COFFEE   │  1 SM MILK  │  2 COFFEE   │        │
 6 │             │             │  3 LG COKE  │        │
 7 │             │             │  2 LG TEA   │        │
 . │       .     │       .     │       .     │    .   │
 . │       .     │       .     │       .     │    .   │
13 │             │             │             │        │
14 │             │             │             │        │
15 │ TL    12.85 │ TL     8.20 │ TL    25.46 │        │
   └─────────────┴─────────────┴─────────────┴────────┘
```
TL 12.85 : SALES
           TOTAL

FIG. 103

```
     12345678901234567890123456789012345678901 2345678
   ┌─────────────┬─────────────┬─────────────┬────────┐
 1 │ #101        │ #102        │ #103        │        │
 2 │  3 HAMB     │  1 HAMB     │  2 HAMB     │        │
 3 │  2 LG COKE  │  2 3P-CHKN  │  3 CH BURG  │        │
 4 │  2 CH BURG  │  2 COFFEE   │  1 3P-CHKN  │        │
 5 │  3 COFFEE   │  1 SM MILK  │  2 COFFEE   │        │
 6 │             │             │  3 LG COKE  │        │
 7 │             │             │  2 LG TEA   │        │
 . │       .     │       .     │       .     │    .   │
 . │       .     │       .     │       .     │    .   │
13 │             │             │             │        │
14 │             │             │             │        │
15 │ JIM         │ LINDA       │ JIM         │        │
   └─────────────┴─────────────┴─────────────┴────────┘
```
JIM ; SERVER NAME

FIG. 104

```
   123456789012345678901234567890123456789012345678
 1 │ #101          │ #102         │ #103         │         │
 2 │   3 HAMB      │   1 HAMB     │   2 HAMB     │         │
 3 │   2 LG COKE   │   2 3P-CHKN  │   3 CH BURG  │         │
 4 │   2 CH BURG   │   2 COFFEE   │   1 3P-CHKN  │         │
 5 │   3 COFFEE    │   1 SM MILK  │   2 COFFEE   │         │
 6 │               │              │   3 LG COKE  │         │
 7 │               │              │   2 LG TEA   │         │
 .
 .
13 │               │              │              │         │
14 │ TL    12.85   │ TL     8.20  │ TL    25.46  │         │
15 │ JIM           │ LINDA        │ JIM          │         │
```

FIG. 107

| PLU CODE 1071 | ITEM NAME 1072 | UNIT PRICE 1073 | DESTINATION INFORMATION (STEER FLAG) 1074 | | | | PRIORITY NUMBER 1075 |
|---|---|---|---|---|---|---|---|
| | | | 1 | 2 | 3 | 4 | |
| PLU#10 | COFFEE | 150 | 1 | 1 | 0 | 0 | 2 |
| PLU#20 | JUICE | 200 | 1 | 0 | 0 | 0 | 2 |
| PLU#30 | HAMB | 250 | 1 | 0 | 0 | 0 | 1 |
| . | . | . | . | . | . | . | . |
| . | . | . | . | . | . | . | . |
| . | . | . | . | . | . | . | . |
| . | . | . | . | . | . | . | . |
| . | . | . | . | . | . | . | . |

| 1091 | #1 (DISPLAY ID NUMBER) | | |
|---|---|---|---|
| 1092 | #101 (ORDER ID NUMBER) | | |
| 1093 | 2 | 1 | JUICE |
| | 2 | 1 | COFFEE |
| | 1 | 2 | HAMB |
| | . | . | . |
| | . | . | . |
| | . | . | . |
| | . | . | . |
| | . | . | . |

10931 PRIORITY NUMBER

10932 NUMBER (COUNTER)

10933 ITEM NAME

| #1 (DISPLAY ID NUMBER) | | |
|---|---|---|
| #102 (ORDER ID NUMBER) | | |
| 2 | 2 | COFFEE |
| 1 | 1 | HAMB |
| 2 | 3 | JUICE |
| . | . | . |
| . | . | . |
| . | . | . |
| . | . | . |
| . | . | . |
| . | . | . |

FIG. 112(a)

```
 123456789012345678901234567890123456789012345678
 1 | #101       | #102       |            |
 2 |  2 HAMB    |  3 HAMB    |            |
 3 |  1 JUICE   |  2 COFFEE  |            |
 4 |  1 COFFEE  |  1 JUICE   |            |
 5 |            |            |            |
 6 |            |            |            |
 . |     .      |     .      |     .      |     .
 . |     .      |     .      |     .      |     .
 . |     .      |     .      |     .      |     .
14 |            |            |            |
15 |            |            |            |
```

FIG. 112(b)

```
 123456789012345678901234567890123456789012345678
 1 | #101       | #102       |            |
 2 |  1 JUICE   |  2 COFFEE  |            |
 3 |  1 COFFEE  |  3 HAMB    |            |
 4 |  2 HAMB    |  1 JUICE   |            |
 5 |            |            |            |
 6 |            |            |            |
 . |     .      |     .      |     .      |     .
 . |     .      |     .      |     .      |     .
 . |     .      |     .      |     .      |     .
14 |            |            |            |
15 |            |            |            |
```

FIG. 116(a)

```
  123456789012345678901234567890123456789012345678
 1 #101
 2   1 JUICE
 3   1 COFFEE
 4   2 HAMB
 5
 6
 .         .              .              .              .
 .         .              .              .              .
 .         .              .              .              .
14
15
```

FIG. 116(b)

```
  123456789012345678901234567890123456789012345678
 1
 2
 3
 4
 5 (DATA
 6  ERASION)
 .         .              .              .              .
 .         .              .              .              .
 .         .              .              .              .
14
15
```

FIG. 117(a)

```
   12345678901234567890123456789012345678901 2345678
  ┌─────────────────┬────────────────┬────────────────┬────────────────┐
 1│ #101            │ #102           │                │                │
 2│   1 JUICE       │   2 COFFEE     │                │                │
 3│   1 COFFEE      │   3 HAMB       │                │                │
 4│   2 HAMB        │   1 JUICE      │                │                │
 5│                 │                │                │                │
 6│                 │                │                │                │
  ·     ·                  ·                ·                ·
  ·     ·                  ·                ·                ·
14│                 │                │                │                │
15│                 │                │                │                │
  └─────────────────┴────────────────┴────────────────┴────────────────┘
```

FIG. 117(b)

```
   12345678901234567890123456789012345678901 2345678
  ┌─────────────────┬────────────────┬────────────────┬────────────────┐
 1│ #102            │                │                │                │
 2│   2 COFFEE      │                │                │                │
 3│   3 HAMB        │                │                │                │
 4│   1 JUICE       │                │                │                │
 5│                 │                │                │                │
 6│                 │                │                │                │
  ·     ·                  ·                ·                ·
  ·     ·                  ·                ·                ·
14│                 │                │                │                │
15│                 │                │                │                │
  └─────────────────┴────────────────┴────────────────┴────────────────┘
```

FIG. 119

```
* KITCHEN VIDEO *

(VIDEO# & FIELD#) SBTL (MODE#) CASH

FIELD1  FIELD2
VIDEO#   MODE    STATUS    <MODE>
  1       00      000      01 = 4SEG
                           02 = 8SEG
  2       00      000      03 = ITEM COMPARE
```

FIG. 120

| PLU CODE 1201 | ITEM NAME 1202 | UNIT PRICE 1203 | DESTINATION INFORMATION (STEER FLAG) 1204 | | | | COMPARISON ITEM STATUS 1205 |
|---|---|---|---|---|---|---|---|
| | | | 1 | 2 | 3 | 4 | |
| PLU#10 | COFFEE | 150 | 1 | 1 | 0 | 0 | 1 |
| PLU#20 | JUICE | 200 | 1 | 0 | 0 | 0 | 1 |
| PLU#30 | HAMB | 250 | 1 | 0 | 0 | 0 | 1 |
| . | . | . | . | . | . | . | . |
| . | . | . | . | . | . | . | . |

DATA BASE FILE 1220

|  | MONDAY | | | | TUESDAY | | | | WEDNESDAY ~SUNDAY |
| --- | --- | --- | --- | --- | --- | --- | --- | --- | --- |
|  | WK1 | WK2 | WK3 | WK4 | WK1 | WK2 | WK3 | WK4 |  |
| ITEM#1 (PLU#) | | | | | | | | | . . . |
| ITEM#2 | | | | | | | | | . . . |
| ITEM#3 | | | | | | | | | . . . |
| ITEM#4 | | | | | | | | | . . . |
| . . . | . | . | . | . | . | . | . | . | . . . |
| ITEM#30 | | | | | | | | | . . . |

FIG. 123

| 1230 | 0:00~0:30 | 0:30~1:00 | 1:00~1:30 | 1:30~2:00 | | 23:00~23:30 | 23:30~24:00 |
|---|---|---|---|---|---|---|---|
| ITEM#1 (PLU#) | | | | | | | |
| ITEM#2 | | | · | · | · | · | · |
| | | | · | · | · | · | · |
| | | | · | · | · | · | · |
| ITEM #30 | | | | | | | |

TIME RANGE DIVISION

FIG. 124

| 1240 | 0:00~0:30 | 0:30~1:00 | 1:00~1:30 | 1:30~2:00 | | 23:00~23:30 | 23:30~24:00 |
|---|---|---|---|---|---|---|---|
| ITEM#1 (PLU#) | | | | | | | |
| ITEM#2 | | | | | | | |
| | . | . | . | | | . | . |
| | . | . | . | | | . | . |
| | . | . | . | | | . | . |
| ITEM #30 | | | | | | | |

TIME RANGE DIVISION

```
     123456789012345678901234567890123456789012345678
 1 | 13:15      11:00    12:00    13:00    14:00    15:00 |    13:15 ; PRESENT
 2 | * ITEM *   11:30    12:30    13:30    14:30    15:30 |            TIME
 3 |                                                       |
 4 | COFFEE                                                |
 5 |    TODAY     98      111       76                     |
 6 |    AVRAGE   116      129      145      116       89   |
 7 |                                                       |
 8 | JUICE                                                 |
 9 |    TODAY    121      155       88                     |
 0 |    AVRAGE   114      139      149      121       98   |
11 |                                                       |
12 | HAMB                                                  |
13 |    TODAY     59       96       28                     |    28 : REVERSE
14 |    AVRAGE    47       88      102       81       41   |         INDICATION
15 |                                                       |
```

```
*** COMPARISON ITEM ***

(ADR) CASHIER ——— (/PLU#) CASH (PLU# - ITEM)          (PLU# - ITEM)
 1   10   COFFEE      16   200  LG COKE
 2   30   HAMB        17   210  LG TEA
 3   40   CH BURG     18   220  SM MILK
 4  110   3PC CHKN    19    ·    ·
 ·    ·    ·                ·    ·
 ·    ·    ·                ·    ·
15    ·    ·          30    ·    ·
```

FIG. 132

```
*** TIME RANGE ***

(ADR) CASHIER ──── (FROM ~ TO) CASH

ADR  TIME RANGE      ADR  TIME RANGE
 1   0:00 - 6:00      25    ·    ·
 2   6:00 - 6:15      26    ·    ·
 3   6:15 - 6:30      27    ·    ·
 4   6:30 - 6:45      28    ·    ·
  ·    ·    ·          ·    ·    ·
  ·    ·    ·          ·    ·    ·
 24    ·    ·         48    ·    ·
```

FIG. 133

| PRODUCT MATERIAL ID NUMBER 1331 | PRODUCT MATERIAL NAME 1332 | UNIT NUMBER 1333 |
|---|---|---|
| PROD. MIX#1 | CHIKIN | 0 |
| PROD. MIX#2 | NUGGET | 0 |
| PROD. MIX#3 | JUICE | 12 |
| · | · | · |
| · | · | · |
| PROD. MIX#30 | · | · |

FIG. 134

| PLU CODE 1341 | ITEM NAME 1342 | UNIT PRICE 1343 | DESTINATION INFORMATION (STEER FLAG) 1344 | | | | PRODUCT MATERIAL ID NUMBER 1345 | USE NUMBER (PIECE) 1346 |
|---|---|---|---|---|---|---|---|---|
| | | | 1 | 2 | 3 | 4 | | |
| PLU#10 | 3P-CHIKN | 300 | 1 | 1 | 0 | 0 | 1 | 3 |
| PLU#20 | 5P-CHIKN | 450 | 1 | 1 | 0 | 0 | 1 | 5 |
| PLU#30 | 6P-NUGGET | 180 | 1 | 1 | 0 | 0 | 2 | 6 |
| . | . | . | . | . | . | . | . | . |
| . | . | . | . | . | . | . | . | . |
| . | . | . | . | . | . | . | . | . |
| . | . | . | . | . | . | . | . | . |

FIG. 135

DATA BASE FILE
1350

| | MONDAY | | | | TUESDAY | | | | WEDNESDAY ~SUNDAY |
|---|---|---|---|---|---|---|---|---|---|
| | WK1 | WK2 | WK3 | WK4 | WK1 | WK2 | WK3 | WK4 | |
| PROD.MIX#1 | | | | | | | | | . . . |
| PROD.MIX#2 | | | | | | | | | . . . |
| PROD.MIX#3 | | | | | | | | | . . . |
| PROD.MIX#4 | | | | | | | | | . . . |
| . | . | . | . | . | . | . | . | . | . . . |
| . | . | . | . | . | . | . | . | . | . . . |
| . | . | . | . | . | . | . | . | . | . . . |
| PROD.MIX#30 | | | | | | | | | . . . |

FIG. 137

| 1370 | 0:00~0:30 | 0:30~1:00 | 1:00~1:30 | 1:30~2:00 | ... | 23:00~23:30 | 23:30~24:00 |
|---|---|---|---|---|---|---|---|
| PROD. MIX#1 | | | | | | | |
| PROD. MIX#2 | | | ... | ... | ... | | |
| | | ... | ... | ... | ... | | ... |
| | | ... | ... | | | ... | ... |
| | | ... | ... | ... | ... | | ... |
| PROD. MIX#30 | | | | | | | |

←———— TIME RANGE DIVISION ————→

FIG. 141(a)

| PLU CODE | ITEM NAME | SETTING USE NUMBER | REGISTRATION NUMBER | PRODUCT MATERIAL ID NUMBER | PRODUCT MATERIAL USE NUMBER |
|---|---|---|---|---|---|
| PLU#10 | 3P-CHKN | 3 | 2 | PROD.MIX#1 | 2×3=6 |
| PLU#20 | 5P-CHKN | 5 | 1 | PROD.MIX#1 | 1×5=5 |
| TOTAL NUMBER OF PROD.MIX#1 (CHIKIN) IN ORDER #101 | | | | | 11 |

FIG. 141(b)

| PRODUCT MATERIAL ID NUMBER | PRODUCT MATERIAL USE NUMBER |
|---|---|
| PROD.MIX#1 | 11 |

```
  123456789012345678901234567890123456789012345678
 1  13:15      11:00    12:00    13:00   14:00   15:00       13:15 ; PRESENT
 2  * ITEM *   11:30    12:30    13:30   14:30   15:30               TIME
 3
 4  CHIKIN
 5    TODAY      98      111       76
 6    AVRAGE    116      129      145     116      89
 7
 8  NUGGET
 9    TODAY     121      155       88                          88 : REVERSE
10    AVRAGE    114      139      149     121      98               INDICATION
11
12     .
13     .         .        .        .
14     .         .        .        .       .        .
15
```

FIG. 144

DISPLAY #1

| #151 | #152 | #153 | #154 |
|---|---|---|---|
| 1 HAMB | 1 HAMB | 2 HAMB | 3 LG COKE |
| 2 CH BURG | 2 3P-CHKN | 3 CH BURG | |
| 3 COFFEE | 2 COFFEE | 1 3P-CHKN | |
| | 3 SM MILK | 2 COFFEE | |
| | | 2 LG COKE | |

DISPLAY #2

| #155 | #156 | #157 | #158 |
|---|---|---|---|
| 2 HAMB | 1 HAMB | 2 CH BURG | 3 HAMB |
| 1 LG COKE | 1 COFFEE | 3 COFFEE | 2 COFFEE |
| 1 COFFEE | | | |

FIG. 145

DISPLAY #2

| #147 | #148 | #149 | #150 |
|---|---|---|---|
| 1 HAMB | 2 3P-CHKN | 2 HAMB | 2 HAMB |
| 1 COFFEE | 2 COFFEE | 1 CH BURG | 1 COFFEE |
| | 1 SM MILK | 3 COFFEE | 2 LG COKE |

\* \* \* \* RECALL ORDER \* \* \* \*

DISPLAY #1

| #151 | #152 | #153 | #154 |
|---|---|---|---|
| 1 HAMB | 1 HAMB | 2 HAMB | 3 LG COKE |
| 2 CH BURG | 2 3P-CHKN | 3 CH BURG | |
| 3 COFFEE | 2 COFFEE | 1 3P-CHKN | |
| | 3 SM MILK | 2 COFFEE | |
| | | 2 LG COKE | |

FIG. 147

DISPLAY #1

| #152 | #153 | #154 | #155 |
|---|---|---|---|
| 1 HAMB<br>2 3P-CHKN<br>2 COFFEE<br>3 SM MILK | 2 HAMB<br>3 CH BURG<br>1 3P-CHKN<br>2 COFFEE<br>2 LG COKE | 3 LG COKE | 2 HAMB<br>1 LG COKE<br>1 COFFEE |

DISPLAY #2

| #147 | #148 | #149 | #150 |
|---|---|---|---|
| 1 HAMB<br>1 COFFEE | 2 3P-CHKN<br>2 COFFEE<br>1 SM MILK | 2 HAMB<br>1 CH BURG<br>3 COFFEE | 2 HAMB<br>1 COFFEE<br>2 LG COKE |

* * * * * RECALL ORDER * * * * * *

FIG. 148

DISPLAY #1

| #152 | #153 | #154 | #155 | |
|---|---|---|---|---|
| 1 HAMB | 2 HAMB | 3 LG COKE | 2 HAMB | |
| 2 3P-CHKN | 3 CH BURG | | 1 LG COKE | |
| 3 COFFEE | 1 3P-CHKN | | 1 COFFEE | |
| 3 SM MILK | 2 COFFEE | | | |
| | 2 LG COKE | | | |

DISPLAY #2

| #156 | #157 | #158 | |
|---|---|---|---|
| 1 HAMB | 2 CH BURG | 3 HAMB | |
| 1 COFFEE | 3 COFFEE | 2 COFFEE | |

FIG. 152

DISPLAY #1

| #151 | #152 | #153 | #154 |
|---|---|---|---|
| 1 HAMB | 1 HAMB | 2 HAMB | 3 LG COKE |
| 2 CH BURG | 2 3P-CHKN | 3 CH BURG | |
| 3 COFFEE | 2 COFFEE | 1 3P-CHKN | |
| | 3 SM MILK | 2 COFFEE | |
| | | 2 LG COKE | |

DISPLAY #2

| #159 | #160 | #161 | #162 |
|---|---|---|---|
| 1 HAMB | 2 3P-CHKN | 2 HAMB | 2 HAMB |
| 2 COFFEE | 2 COFFEE | 1 CH BURG | 1 COFFEE |
| 1 CH BURG | 1 HAMB | 3 COFFEE | 1 LG COKE |
| | | 1 SM MILK | |

\* \* \* \* ORDER LOOK \* \* \* \* \*

FIG. 154

DISPLAY #1

| #152 | #153 | #154 | #155 |
|---|---|---|---|
| 1 HAMB | 2 HAMB | 3 LG COKE | 2 HAMB |
| 2 3P-CHKN | 3 CH BURG | | 1 LG COKE |
| 2 COFFEE | 1 3P-CHKN | | 1 COFFEE |
| 3 SM MILK | 2 COFFEE | | |
| | 2 LG COKE | | |

DISPLAY #2

| #159 | #160 | #161 | #162 |
|---|---|---|---|
| 1 HAMB | 2 3P-CHKN | 2 HAMB | 2 HAMB |
| 2 COFFEE | 2 COFFEE | 1 CH BURG | 1 COFFEE |
| 1 CH BURG | 1 HAMB | 3 COFFEE | 1 LG COKE |
| | | 1 SM MILK | |

* * * * ORDER LOOK * * * * *

FIG. 155

DISPLAY #1

| #152 | #153 | #154 | #155 |
|---|---|---|---|
| 1 HAMB | 2 HAMB | 3 LG COKE | 2 HAMB |
| 2 3P-CHKN | 3 CH BURG | | 1 LG COKE |
| 2 COFFEE | 1 3P-CHKN | | 1 COFFEE |
| 3 SM MILK | 2 COFFEE | | |
| | 2 LG COKE | | |

DISPLAY #2

| #156 | #157 | #158 | #159 |
|---|---|---|---|
| 1 HAMB | 2 CH BURG | 3 HAMB | 1 HAMB |
| 1 COFFEE | 3 COFFEE | 2 COFFEE | 2 COFFEE |
| | | | 1 CH BURG |

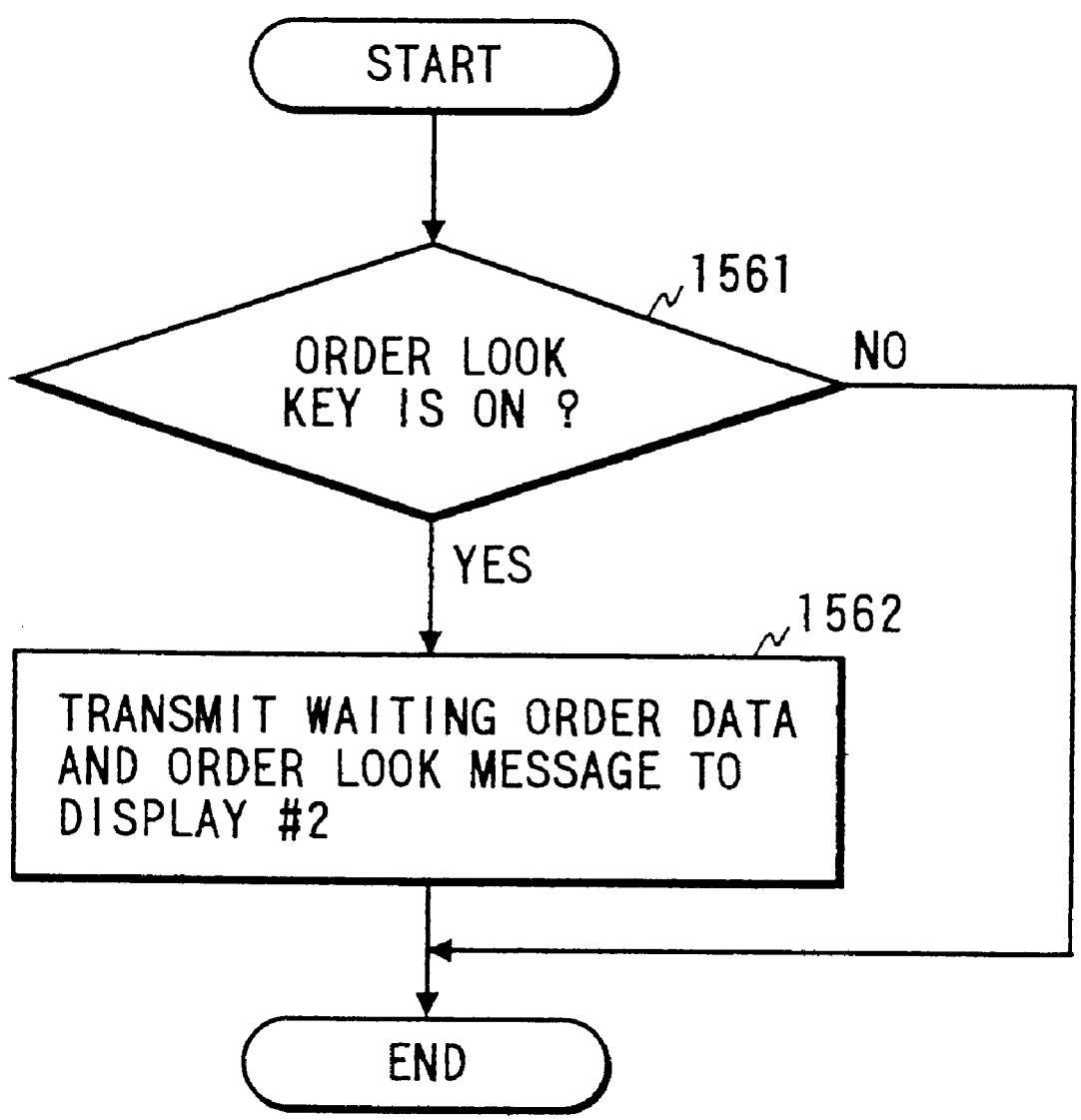

ELECTRONIC REGISTER

BACKGROUND OF THE INVENTION

1. Field of the Invention

This invention generally relates to an electronic register. This invention specifically relates to a system for a restaurant such as a fast-food restaurant which includes a register terminal for registering a customer's order, a device for transmitting information of the customer's order from the register terminal to a kitchen, and a display device for visualizing the information of the customer's order in the kitchen.

2. Description of the Prior Art

U.S. Pat. No. 5,377,097 corresponding to Japanese published unexamined patent application 5-151467 discloses a customer order processing system which includes a register terminal for registering customer's orders. The customer's orders are sequentially transmitted to a kitchen video controller. The customer's orders are sequentially indicated on a display device of the kitchen video controller. In the customer order processing system disclosed by U.S. Pat. No. 5,377,097, upon completion of preparation for a customer's order by a person in charge, the indication of that customer's order on the display device of the kitchen video controller is erased by manipulating a control switch. A time length between the reception of the customer's order and the erasure thereof is measured and stored as service time data in the kitchen video controller. The register terminal totalizes the service time data transmitted from the kitchen video controller to issue a management report.

SUMMARY OF THE INVENTION

It is an object of this invention to provide an improved electronic register.

A first aspect of this invention provides an electronic register comprising a) a register terminal; b) a kitchen video controller having one or more display devices; and c) data communication means connecting the register terminal and the kitchen video controller for providing data communication between the register terminal and the kitchen video controller; wherein the register terminal comprises a1) means for receiving setting data of display control functions and indicated picture formats corresponding to the display devices of the kitchen video controller, and for transmitting the setting data to the kitchen video controller to set display control functions provided by the kitchen video controller; a2) means for setting destination information related to each product item, and for setting a display number of the kitchen video controller in response to the destination information; and a3) means for searching a customer's order, which is registered in the register terminal, for registered product items related to the destination information corresponding to each display number by referring a correspondence relation among the destination information and the display devices, and for transmitting display data representative of the registered product items to the kitchen video controller; wherein the kitchen video controller comprises b1) means for enabling the display data transmitted from the register terminal to be sequentially indicated on the display devices in indicated picture formats designated by the setting data; b2) monitor control switches corresponding to the display devices respectively; b3) means for erasing customer's orders from pictures on the display devices in response to actuation of the monitor control switches; and b4) means for selecting the display control function and the indicated picture format in response to the setting data transmitted from the register terminal for each of the display devices.

A second aspect of this invention is based on the first aspect thereof, and provides an electronic register wherein the register terminal further comprises means for setting a segment division number of an indicated picture of a list of plural customer's orders as the indicated picture format in the kitchen video controller; and means for transmitting setting data representative of the segment division number to the kitchen video controller to set display control functions provided by the kitchen video controller; and wherein the kitchen video controller further comprises means for setting display segments of the display devices in response to the setting data of the segment division number transmitted from the register terminal; means for enabling the display data transmitted from the register terminal to be sequentially indicated on the display segments of the display devices; means for deciding whether or not a customer's order is of an overflow type having a quantity exceeding a capacity of one display segment; means for enabling the overflow-type customer's order to be indicated over at least two successive display segments; means for indicating a given message on one of the two successive display segments, the given message representing the related customer's order is of the overflow type; and means for allowing an overflow-type customer's order to be erased from pictures on the display devices in response to actuation of the monitor control switches only in cases where the whole of the overflow-type customer's order is indicated.

A third aspect of this invention is based on the first aspect thereof, and provides an electronic register wherein the register terminal further comprises means for designating one of an even segment-division indication format for indicating a list of customer's orders and an uneven segment-division indication format for indicating customer's orders in a condensed manner; and means for transmitting setting data representative of the designated indication format to the kitchen video controller to set display control functions provided by the kitchen video controller; and wherein the kitchen video controller further comprises means for enabling the display data transmitted from the register terminal to be sequentially indicated on the display device in the designated indication format represented by the setting data.

A fourth aspect of this invention is based on the first aspect thereof, and provides an electronic register further comprising a keyboard; an order-type inputting key provided on the keyboard; means for designating a type of a customer's order registered in the register terminal in response to operation of the order-type inputting key, the customer's order type being one of different types including an eat-in type and a take-out type; means for implementing setting such that a position of an indicated area of a customer's order in the kitchen video controller is determined by the type of the customer's order; means for transmitting setting data representative of the indicated area to the kitchen video controller to set display control functions provided by the kitchen video controller; and means for enabling a customer's order registered in the register terminal to be indicated in an indicated area of the display device of the kitchen video controller which is determined by the type of the customer's order.

A fifth aspect of this invention is based on the first aspect thereof, and provides an electronic register wherein the register terminal further comprises means for storing information of a preset terminal identification number; means for adding the terminal identification number to a customer's order registered in the register terminal; means for implementing setting such that a position of an indicated area of a customer's order in the kitchen video controller is determined by the terminal identification number of the customer's order; means for transmitting setting data representative of the indicated area to the kitchen video controller to set display control functions provided by the kitchen video controller; and means for enabling a customer's order registered in the register terminal to be indicated in an indicated area of the display device of the kitchen video controller which is determined by the terminal identification number of the customer's order.

A sixth aspect of this invention is based on the first aspect thereof, and provides an electronic register wherein the register terminal further comprises an end key; means for selecting and designating a timing of transmission of a registered customer's order to the kitchen video controller from among a timing corresponding to transmission upon registration of each item in the customer's order and a timing corresponding to operation of the end key; means for transmitting setting data representative of the transmission timing to the kitchen video controller to set display control functions provided by the kitchen video controller; and means for transmitting untransmitted order data to the kitchen video controller in response to key operation corresponding to each transmission timing by referring to the transmission timing setting data in cases where registration of each item is done and operation of the end key is done in the register terminal; whereby a timing of transmission of a registered customer's order to the kitchen video controller is selected and designated from among a timing corresponding to transmission upon registration of each item in the customer's order and a timing corresponding to operation of the end key.

A seventh aspect of this invention is based on the first aspect thereof, and provides an electronic register wherein the register terminal further comprises means for setting a tandem mode as a display control function provided by the kitchen video controller, the tandem mode being designed to unite pictures on the display devices; means for transmitting setting data representative of the tandem mode to the kitchen video controller to set display control functions provided by the kitchen video controller; and means for setting destination information and a display identification number with respect to each product item, the display identification number corresponding to the tandem mode of the kitchen video controller and responding to the destination information; and wherein the kitchen video controller further comprises means for, in cases where a picture on one of the display devices is fully filled with display data during indication of display data transmitted from register terminal in the tandem mode, enabling remaining display data to be indicated on another of the display devices; and means for erasing customer's orders from pictures on display devices in response to operation of the monitor control switches; whereby pictures on the display devices are united to serve as an enlarged picture on a single display device.

An eighth aspect of this invention is based on the first aspect thereof, and provides an electronic register further comprising means for separating a picture on each display device into an order list indication picture for indicating a list of customer's orders and a summary item indication picture for indicating numbers of specified product items in all customer's orders which have been informed by the register terminal; means provided in the register terminal for setting the specified product items; means provided in the register terminal for transmitting setting data representative of the specified product items to the kitchen video controller to set a summary item indicating function provided by the kitchen video controller; means provided in the kitchen video controller for enabling the display data transmitted from the register terminal to be sequentially indicated in a summary item indication picture on the display device; means for counting and calculating numbers of the specified product items in all customer's orders which have been informed by the register terminal; means for enabling a summary item indication picture on the display device to indicate the calculated numbers of the specified product items in an alphabetical sequence; means for decrementing the indicated numbers of the specified product items when a customer's order is erased from the picture on the display device in response to operation of the monitor control switch; and means for incrementing the indicated numbers of the specified product items when a new customer's order is transmitted from the register terminal.

A ninth aspect of this invention is based on the first aspect thereof, and provides an electronic register further comprising means for separating a picture on each display device into an order list indication picture for indicating a list of customer's orders and a summary item indication picture for indicating numbers of specified product items in all customer's orders which have been informed by the register terminal; means provided in the register terminal for setting the specified product items and an indication sequence of the specified product items; means provided in the register terminal for transmitting setting data representative of the specified product items and the indication sequence to the kitchen video controller to set a summary item indicating function provided by the kitchen video controller; means provided in the kitchen video controller for enabling the display data transmitted from the register terminal to be sequentially indicated in a summary item indication picture on the display device; means for counting and calculating numbers of the specified product items in all customer's orders which have been informed by the register terminal; means for enabling a summary item indication picture on the display device to indicate the calculated numbers of the specified product items in the indication sequence represented by the setting data; means for decrementing the indicated numbers of the specified product items when a customer's order is erased from the picture on the display device in response to operation of the monitor control switch; and means for incrementing the indicated numbers of the specified product items when a new customer's order is transmitted from the register terminal.

A tenth aspect of this invention is based on the first aspect thereof, and provides an electronic register wherein the monitor control switch of the kitchen video controller comprises a picture change switch; wherein the register terminal further comprises means for setting specified product items to be indicated in a summary item indication picture in the kitchen video controller; and means for transmitting setting data representative of the specified product items to the kitchen video controller to set a summary item indicating function provided by the kitchen video controller; wherein the kitchen video controller further comprises means for enabling the display data transmitted from the register terminal to be sequentially indicated in a summary item indication picture on the display device; means for counting and calculating numbers of the specified product items in all customer's orders which have been informed by the register terminal in response to operation of the picture change key; means for enabling a summary item indication picture on the display device to indicate the calculated numbers of the specified product items in an alphabetical sequence or a given indication sequence in response to operation of the picture change key; and means for replacing the summary item indication picture on the display device by the order item indication picture in response to next operation of the picture change key.

An eleventh aspect of this invention is based on the seventh aspect thereof, and provides an electronic register wherein the monitor control switch of the kitchen video controller comprises a picture change switch; wherein the register terminal further comprises means for setting specified product items to be indicated in a summary item indication picture in the kitchen video controller; and means for transmitting setting data representative of the specified product items to the kitchen video controller to set a summary item indicating function provided by the kitchen video controller; wherein the kitchen video controller further comprises means for enabling the display data transmitted from the register terminal to be sequentially indicated in a summary item indication picture on the display device; means for counting and calculating numbers of the specified product items in all customer's orders which have been informed by the register terminal in response to operation of the picture change key; means for enabling a summary item indication picture on one of the display devices to indicate the calculated numbers of the specified product items in an alphabetical sequence or a given indication sequence in response to operation of the picture change key; means for replacing the summary item indication picture on the display device by the order item indication picture in response to next operation of the picture change key; means for decrementing the indicated numbers of the specified product items when a customer's order is erased from the picture on the display device in response to operation of the monitor control switch; and means for incrementing the indicated numbers of the specified product items when a new customer's order is transmitted from the register terminal.

A twelfth aspect of this invention is based on the eighth aspect thereof, and provides an electronic register wherein the kitchen video controller further comprises means for inhibiting a specified product item having a calculated number of 0 from being indicated while providing an indicating area therefor; means for allowing names and calculated numbers of specified product items having calculated numbers different from 0 to be indicated in the alphabetical sequence or the given indication sequence; and means for providing a blinked indication or a reverse indication of one of a name and a calculated number of a specified product item which changes in calculated number or increases from 0 in calculated number in response to erasure of a customer's order from the indication or transmission of a new customer's order from the register terminal.

A thirteenth aspect of this invention is based on the ninth aspect thereof, and provides an electronic register wherein the kitchen video controller further comprises means for inhibiting a specified product item having a calculated number of 0 from being indicated, means for allowing names and calculated numbers of specified product items having calculated numbers different from 0 to be indicated in the alphabetical sequence or the given indication sequence without spaces provided therebetween; means for providing a blinked indication or a reverse indication of one of a name and a calculated number of a specified product item which changes in calculated number or decreases to 0 in calculated number in response to erasure of a customer's order from the indication or transmission of a new customer's order from the register terminal; means for indicating a name and a calculated number of a specified product item which increases from 0 in calculated number in a display area following display areas of currently indicated specified product items; and means for providing a blinked indication or a reverse indication of one of a name and a calculated number of a specified product item which increases from 0 in calculated number in response to erasure of a customer's order from the indication or transmission of a new customer's order from the register terminal.

A fourteenth aspect of this invention is based on the first aspect thereof, and provides an electronic register wherein the kitchen video controller further comprises confirmation sound generators corresponding to the display devices respectively; wherein the register terminal further comprises means for setting a present and an absence of generation of confirmation sound related to reception of a customer's order from the register terminal as a control function provided by the kitchen video controller; means for transmitting setting data representative of the confirmation sound generation to the kitchen video controller to set control functions provided by the kitchen video controller; and wherein the kitchen video controller further comprises means for, upon reception of each customer's order from the register terminal, deciding the display device to indicate the customer's order in cases where the presence of generation of the confirmation sound is set; and means for enabling the confirmation sound generator corresponding to the decided display device to generate the confirmation sound upon reception of each customer's order.

A fifteenth aspect of this invention is based on the first aspect thereof, and provides an electronic register wherein the register terminal further comprises means for selecting and designating a presence and an absence of indication of a total price of a customer's order as an indicated picture format in the kitchen video controller for each of the display devices; means for transmitting setting data representative of the total price indication to the kitchen video controller to set display control functions provided by the kitchen video controller; means for searching a customer's order, which is registered in the register terminal, for registered product items related to the destination information corresponding to each display number by referring a correspondence relation among the destination information and the display devices, and means for adding information of a total price of a customer's order to the registered product items and transmitting display data representative of the order total price and the registered product items to the kitchen video controller; wherein the kitchen video controller further comprises means for enabling the display data transmitted from the register terminal to be indicated on the display device; means for enabling the product items and the order total price to be indicated on the display device for which the presence of indication of the order total price is designated; and means for enabling the product items to be indicated on the display device and inhibiting the order total price from being indicated on the display device for which the absence of indication of the order total price is designated.

A sixteenth aspect of this invention is based on the first aspect thereof, and provides an electronic register wherein the register terminal further comprises means for selecting and designating a presence and an absence of indication of information of a person in charge of registration of a customer's order together with indication of the customer's order; means for transmitting setting data representative of the person-in-charge indication to the kitchen video controller to set display control functions provided by the kitchen video controller; means for searching a customer's order, which is registered in the register terminal, for registered product items related to the destination information corresponding to each display number by referring a correspondence relation among the destination information and the display devices, and means for adding person-in-charge information to the registered product items and transmitting display data representative of the person-in charge information and the registered product items to the kitchen video controller; wherein the kitchen video controller further comprises means for enabling the display data transmitted from the register terminal to be indicated on the display device; and means for enabling the product items and the person-in-charge information to be indicated on the display device for which the presence of indication of the person-in-charge information is designated.

A seventeenth aspect of this invention is based on the first aspect thereof, and provides an electronic register wherein the register terminal further comprises means for selecting and designating an indication sequence of product items in a customer's order in an indication format of each customer's order in pictures on the display devices of the kitchen video controller from among an indication sequence corresponding to a sequence of reception of the product items and an indication sequence determined by indication priority numbers transmitted together with the product items; means for transmitting setting data representative of the indication sequence to the kitchen video controller to set display control functions provided by the kitchen video controller; means for setting display priority numbers, destination information, and display identification numbers corresponding to the destination information for each product item, the display priority numbers being for controlling an item indication sequence in each customer's order in pictures in the kitchen video controller; means for searching a customer's order, which is registered in the register terminal, for registered product items related to the destination information corresponding to each display number by referring a correspondence relation among the destination information and the display devices, and means for adding information of the display priority numbers to the registered product items; means for transmitting display data representative of the priority information and the registered product items to the kitchen video controller; wherein the kitchen video controller further comprises means for rearranging product items in a customer's order into an item indication sequence based on the priority information regarding display data transmitted from the register terminal; and means for enabling product items in a customer's order to be indicated on the display device in the priority-based item indication sequence.

An eighteenth aspect of this invention is based on the first aspect thereof, and provides an electronic register further comprising a keyboard provided in the register terminal; a serve key provided on the keyboard; and means for erasing a customer's order from a picture on the display device in response to operation of the serve key.

A nineteenth aspect of this invention is based on the first aspect thereof, and provides an electronic register wherein the register terminal further comprises a clock; means for selecting an item registered number contradistinction function as a display control function by the kitchen video controller; means for setting specified product items to be indicated by the item registered number contradistinction function; means for setting time range division data for indicating the item registered number contradistinction function in a manner divided into time ranges; means for transmitting setting data representative of the item registered number contradistinction function, the specified product items, and the time range division to the kitchen video controller to set display control functions provided by the kitchen video controller; means for collecting sales data of respective product items for each day of the week and each of the time ranges over past several weeks in an everyday exactly calculating process in the register terminal; means for generating a data base from the collected sales data; means for calculating average sales numbers of respective product items from the data base for the day of the week and for each of the time ranges; means for transmitting information of the calculated average sales numbers to the kitchen video controller; and means for transmitting registered product item data and moments of registration of product items to the kitchen video controller during registration of a customer's order in the register terminal; and wherein the kitchen video controller further comprises a clock; and means for enabling the average sales numbers and today's registered numbers to be indicated in a contradistinctive manner for the specified product items and the time range containing the present time and immediately-preceding and immediately-following time ranges of the day of the week.

A twentieth aspect of this invention is based on the first aspect thereof, and provides an electronic register wherein the register terminal further comprises a clock; means for setting product material names in a product material file; means for setting product material identification numbers and numbers of members thereof in a registered item menu file; means for selecting a product material registered number contradistinction function as a display control function by the kitchen video controller; means for setting specified product materials to be indicated by the product material registered number contradistinction function; means for setting time range division data for indicating the product material registered number contradistinction function in a manner divided into time ranges; means for transmitting setting data representative of the product material registered number contradistinction function, the specified product materials, and the time range division to the kitchen video controller to set display control functions provided by the kitchen video controller; means for collecting sales data of respective product materials for each day of the week and each of the time ranges over past several weeks in an everyday exactly calculating process in the register terminal; means for generating a data base from the collected sales data; means for calculating average sales numbers of respective product materials from the data base for the day of the week and for each of the time ranges; means for transmitting information of the calculated average sales numbers to the kitchen video controller; and means for transmitting registered product material data and moments of registration of product materials to the kitchen video controller during registration of a customer's order in the register terminal; and wherein the kitchen video controller further comprises a clock; and means for enabling the average sales numbers and today's registered numbers to be indicated in a contradistinctive manner for the specified product materials and the time range containing the present time and immediately-preceding and immediately following time ranges of the day of the week.

A twenty-first aspect of this invention is based on the first aspect thereof, and provides an electronic register wherein the register terminal further comprises means for setting product material names and unit numbers in the product material file, the unit numbers serving as constants of unit conversion; and means for setting product material identification numbers and numbers of members thereof in the registered item menu file; and wherein the kitchen video controller further comprises means for indicating a value equal to a registered number divided by a unit number for a product material related to a set unit number in the contradistinctive indication of the average sales numbers and today's registered numbers for the specified product materials and the time range containing the present time and immediately-preceding and immediately-following time ranges of the day of the week.

A twenty-second aspect of this invention is based on the nineteenth aspect thereof, and provides an electronic register further comprising a product comparison key on the monitor control switch in the register terminal; and means for enabling later one of the display devices to indicate a contradistinctive picture in response to operation of the product comparison key.

A twenty-third aspect of this invention is based on the seventh aspect thereof, and provides an electronic register further comprising an order recall display buffer provided in the kitchen video controller; an order recall key provided on the monitor control switch; an order erasion key provided on the monitor control switch; means for storing current display information of a customer's order into the order recall display buffer in a fast-in fast-out manner and erasing the customer's order from a picture on the display device in response to operation of the order erasion key; and means for transmitting the contents of the order recall display buffer to a later one of the display devices and enabling erased customer's orders to be recalled and indicated on the display device.

A twenty-fourth aspect of this invention is based on the seventh aspect thereof, and provides an electronic register further comprising an order look key provided on the monitor control switch; a received data buffer storing order data transmitted from the register terminal; and means for transmitting a portion of the order data in the received data buffer, which overflows from a display data capacity of the display devices and which waits to be indicated, to a later one of the display devices and enabling the overflow portion of the order data to be indicated on the display device.

A twenty-fifth aspect of this invention provides an apparatus comprising a register terminal for registering a customer's order having product items containing a product item of a first type and a product item of a second type, and for generating information of the product item of the first type in the registered customer's order and information of the product item of the second type in the registered customer's order; a first display device connected to the register terminal; a second display device connected to the register terminal; means for storing predetermined assignment information representing that a product item of the first type and a product item of the second type are assigned to the first display device and the second display device respectively; means for transmitting the information of the product item of the first type in the registered customer's order from the register terminal to the first display device in response to the predetermined assignment information; means for transmitting the information of the product item of the second type in the registered customer's order from the register terminal to the second display device in response to the predetermined assignment information; wherein the first display device visualizes the information of the product item of the first type in a controllable visualization format; the second display device visualizes the information of the product item of the second type in a controllable visualization format; the register terminal comprises means for generating first data representing a setting visualization format related to the first display device and second data representing a setting visualization format related to the second display device; and means for transmitting the first data from the register terminal to the first display device; means for transmitting the second data from the register terminal to the second display device; means for controlling the visualization format in the first display device in response to the first data; and means for controlling the visualization format in the second display device in response to the second data.

BRIEF DESCRIPTION OF THE DRAWINGS

FIG. 11 is a diagram of a picture on a display device in the register terminal of FIG. 2 which operates in a setting mode.

FIG. 12 is a diagram of a picture of a kitchen video setting menu which is indicated on the display device in the register terminal of FIG. 2.

FIG. 22 is a diagram of pictures on a display device in the kitchen video controller of FIG. 4.

FIG. 29(a) is a diagram of a 4-segment picture on a display device in the kitchen video controller in the second embodiment of this invention.

FIG. 29(b) is a diagram of an 8-segment picture on the display device in the kitchen video controller in the second embodiment of this invention.

FIG. 32 is a diagram of a picture on a display device in a register terminal which operates in a kitchen video setting mode according to a third embodiment of this invention.

FIG. 37(a) is a diagram of an uneven (condensed) picture on a display device in the kitchen video controller in the third embodiment of this invention.

FIG. 37(b) is a diagram of another uneven (condensed) picture on the display device in the kitchen video controller in the third embodiment of this invention.

FIG. 39(a) is a diagram of a picture on a display device in the register terminal which operates in a system flag setting mode in the fourth embodiment of this invention.

FIG. 39(b) is a diagram of another picture on the display device in the register terminal which operates in the system flag setting mode in the fourth embodiment of this invention.

FIG. 44 is a diagram of a picture on a display device in the kitchen video controller in the fourth embodiment of this invention.

FIG. 47 is a diagram of a picture on a display device in the register terminal which operates in a system flag setting mode in the fifth embodiment of this invention.

FIG. 48 is a diagram of another picture on the display device in the register terminal which operates in the system flag setting mode in the fifth embodiment of this invention.

FIG. 52 is a diagram of a picture on a display device in the kitchen video controller in the fifth embodiment of this invention.

FIG. 53 is a diagram of an order file transmitted from a register terminal to a kitchen video controller in a sixth embodiment of this invention.

FIG. 56 is a flowchart of a segment of a program for controlling operation of the kitchen video controller in the sixth embodiment of this invention.

FIG. 57 is a diagram of a picture on a display device in the kitchen video controller in the sixth embodiment of this invention.

FIG. 58 is a diagram of a picture on a display device in a register terminal which operates in a kitchen video setting mode according to a seventh embodiment of this invention.

FIG. 59 is a diagram of pictures on display devices in a kitchen video controller in the seventh embodiment of this invention.

FIG. 60 is a diagram of the structure of a memory in the kitchen video controller in the seventh embodiment of this invention.

FIG. 61 is a diagram of pictures on the display devices in the kitchen video controller in the seventh embodiment of this invention.

FIG. 62 is a diagram of pictures on the display devices in the kitchen video controller in the seventh embodiment of this invention.

FIG. 64 is a diagram of a picture on a display device in a register terminal which operates in a setting mode in an eighth embodiment of this invention.

FIG. 65 is a diagram of a picture of a kitchen video setting menu which is indicated on the display device in the register terminal in the eighth embodiment of this invention.

FIG. 66 is a diagram of a picture on a display device in a kitchen video controller in the eighth embodiment of this invention.

FIG. 67 is a diagram of a summary item setting picture on the display device in the register terminal in the eighth embodiment of this invention.

FIG. 68 is a diagram of a picture on the display device in the kitchen video controller in the eighth embodiment of this invention.

FIG. 74 is a diagram of a summary item indication picture on the display device in the kitchen video controller in the ninth embodiment of this invention.

FIG. 75 is a diagram of another summary item indication picture on the display device in the kitchen video controller in the ninth embodiment of this invention.

FIG. 77 is a diagram of an order list indication picture and a summary item indication picture on the display devices in the kitchen video controller in the tenth embodiment of this invention.

FIG. 80 is a diagram of an order list indication picture and a summary item indication picture on the display devices in the kitchen video controller in the tenth embodiment of this invention.

FIG. 83 is a diagram of the structure of a summary-picture display buffer in an eleventh embodiment of this invention.

FIG. 84 is a diagram of a picture on a display device in a kitchen video controller in the eleventh embodiment of this invention.

FIG. 85 is a diagram of another picture on the display device in the kitchen video controller in the eleventh embodiment of this invention.

FIG. 87($a$) is a diagram of the structure of a summary-picture display buffer #1 in a twelfth embodiment of this invention.

FIG. 87($b$) is a diagram of the structure of another summary-picture display buffer #2 in the twelfth embodiment of this invention.

FIG. 88 is a diagram of an order list indication picture on a display device in a kitchen video controller in the twelfth embodiment of this invention.

FIG. 89 is a diagram of a summary item indication picture on the display device in the kitchen video controller in the twelfth embodiment of this invention.

FIG. 90($a$) is a diagram of an additional customer's order in the twelfth embodiment of this invention.

FIG. 90($b$) is a diagram of the structure of the summary-picture display buffer #2 in the twelfth embodiment of this invention.

FIG. 91 is a diagram of a summary item indication picture on the display device in the kitchen video controller in the twelfth embodiment of this invention.

FIG. 92 is a diagram of an order list indication picture on the display device in the kitchen video controller in the twelfth embodiment of this invention.

FIG. 93($a$) is a diagram of the structure of the summary-picture display buffer #1 in the twelfth embodiment of this invention.

FIG. 93($b$) is a diagram of the structure of the summary-picture display buffer #2 in the twelfth embodiment of this invention.

FIG. 94 is a diagram of a summary item indication picture on the display device in the kitchen video controller in the twelfth embodiment of this invention.

FIG. 102 is a diagram of a first picture on a display device in the kitchen video controller in the thirteenth embodiment of this invention.

FIG. 103 is a diagram of a second picture on the display device in the kitchen video controller in the thirteenth embodiment of this invention.

FIG. 104 is a diagram of a third picture on the display device in the kitchen video controller in the thirteenth embodiment of this invention.

FIG. 107 is a diagram of a PLU item setting file in a fourteenth embodiment of this invention.

FIG. 110(b) is a diagram of an order file related to the customer's order registration in FIG. 110(a).

FIG. 111 (a) is a diagram of key operations which occur during the registration of another customer's order in the fourteenth embodiment of this invention.

FIG. 111(b) is a diagram of an order file related to the customer's order registration in FIG. 111(a).

FIG. 112(a) is a diagram of a picture on a display device in the kitchen video controller in the fourteenth embodiment of this invention.

FIG. 112(b) is a diagram of another picture on the display device in the kitchen video controller in the fourteenth embodiment of this invention.

FIG. 113 is a flowchart of a segment of a program for controlling operation of the kitchen video controller in the fourteenth embodiment of this invention.

FIG. 114 is a front view of a keyboard in a register terminal in a fifteenth embodiment of this invention.

FIG. 115(a) is a diagram of key operations which occur during the registration of a customer's order in the fifteenth embodiment of this invention.

FIG. 115(b) is a diagram of key operations which occur during the registration of another customer's order in the fifteenth embodiment of this invention.

FIG. 116(a) is a diagram of a first picture on a display device in a kitchen video controller in the fifteenth embodiment of this invention.

FIG. 116(b) is a diagram of a second picture on the display device in the kitchen video controller in the fifteenth embodiment of this invention.

FIG. 117(a) is a diagram of a third picture on the display device in the kitchen video controller in the fifteenth embodiment of this invention.

FIG. 117(b) is a diagram of a fourth picture on the display device in the kitchen video controller in the fifteenth embodiment of this invention.

Figure 118:
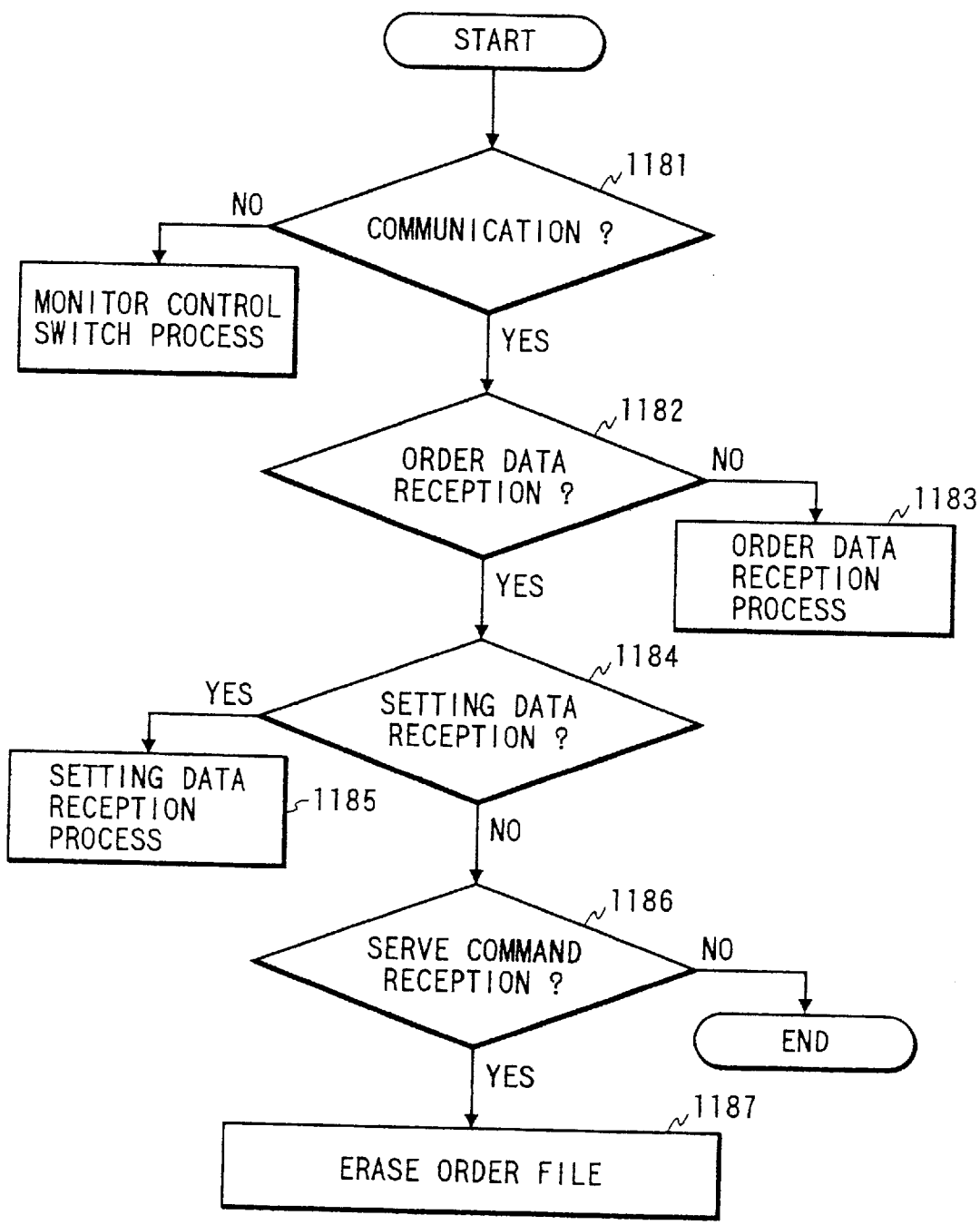

FIG. 118 is a flowchart of a segment of a program for controlling operation of the kitchen video controller in the fifteenth embodiment of this invention.

FIG. 119 is a diagram of a picture on a display device in a register terminal which operates in a kitchen video setting mode in a sixteenth embodiment of this invention.

FIG. 120 is a diagram of a PLU item setting file in the sixteenth embodiment of this invention.

Figure 121:
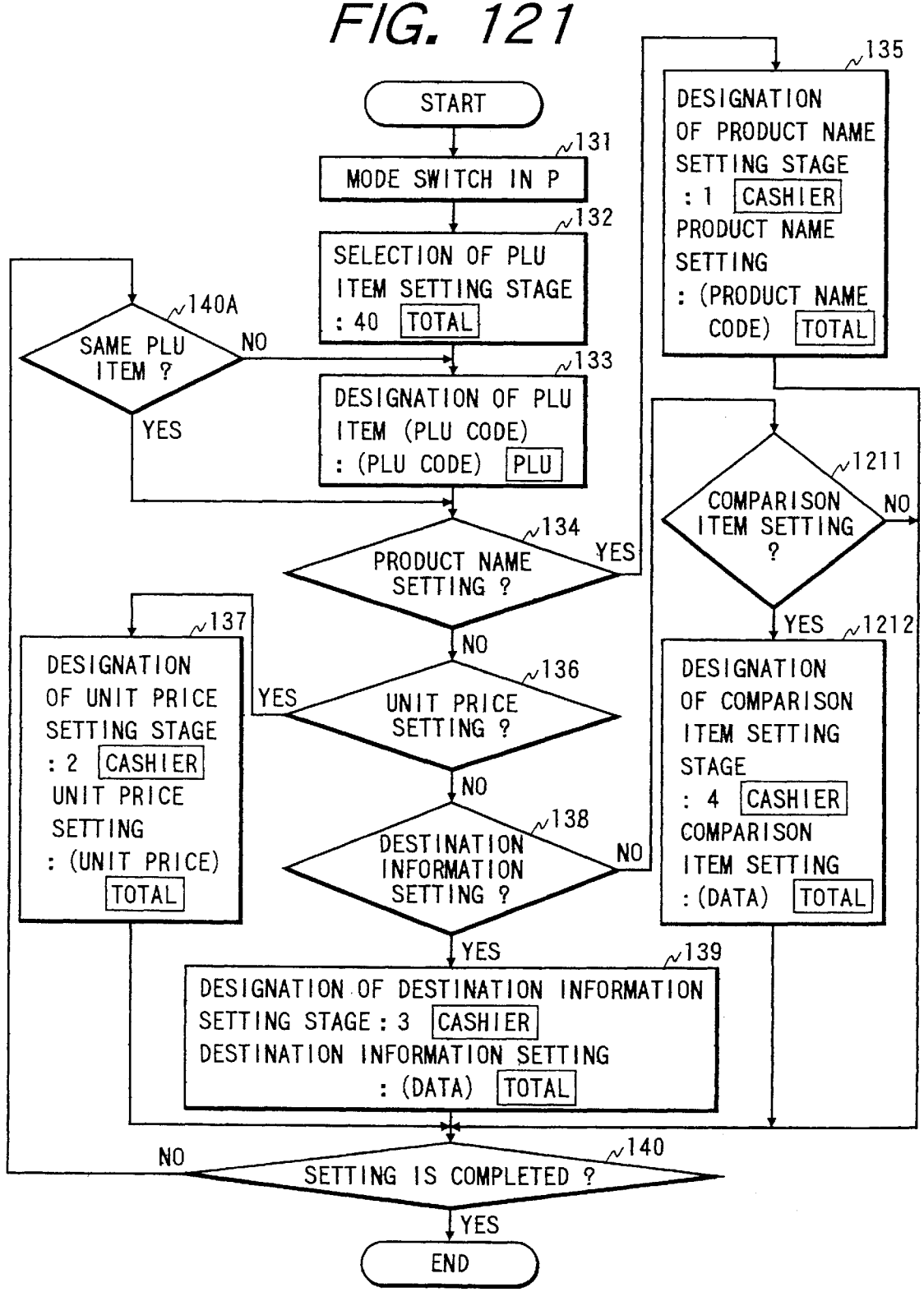

FIG. 121 is a flowchart of a segment of a program for controlling operation of a register terminal which is designed to provide the PLU item setting file in FIG. 120 according to the sixteenth embodiment of this invention.

Figures 122, 125:
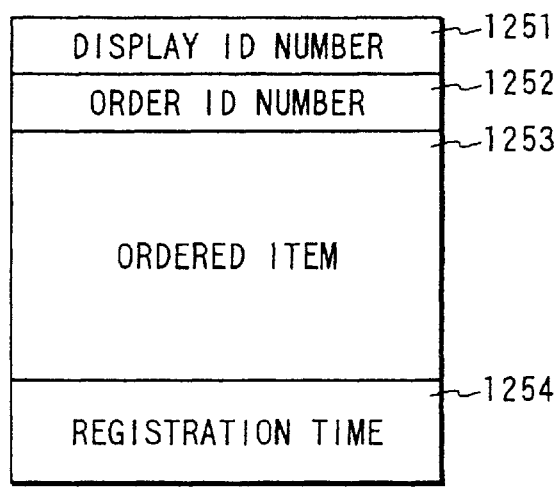

FIG. 122 is a diagram of a data base file in the register terminal in the sixteenth embodiment of this invention.

Figure 123:
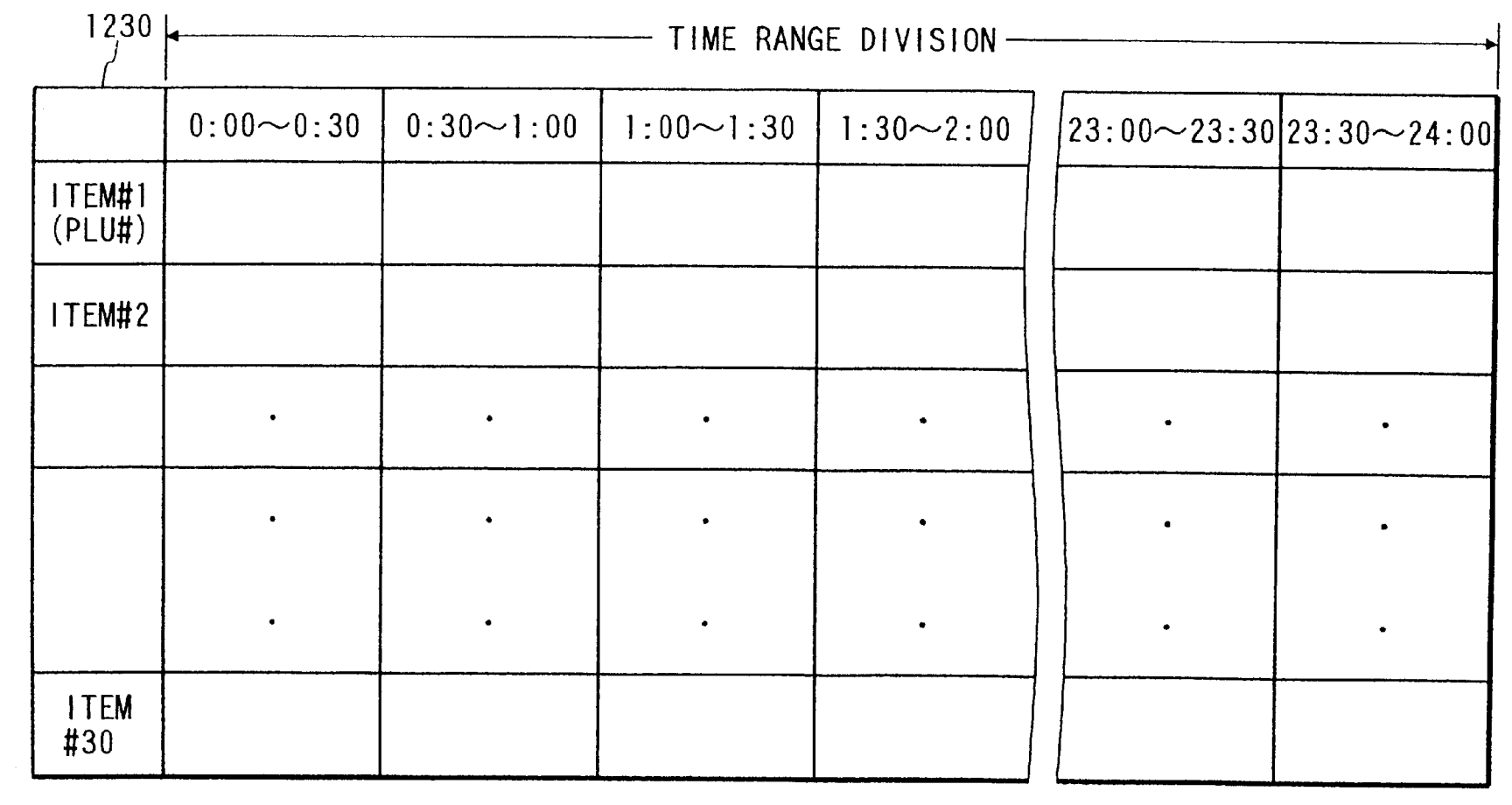

FIG. 123 is a diagram of the details of the data base file in FIG. 122.

FIG. 124 is a diagram of an average value data file in the sixteenth embodiment of this invention.

FIG. 125 is a diagram of an order file transmitted from the register terminal to a kitchen video controller in the sixteenth embodiment of this invention.

Figure 126:
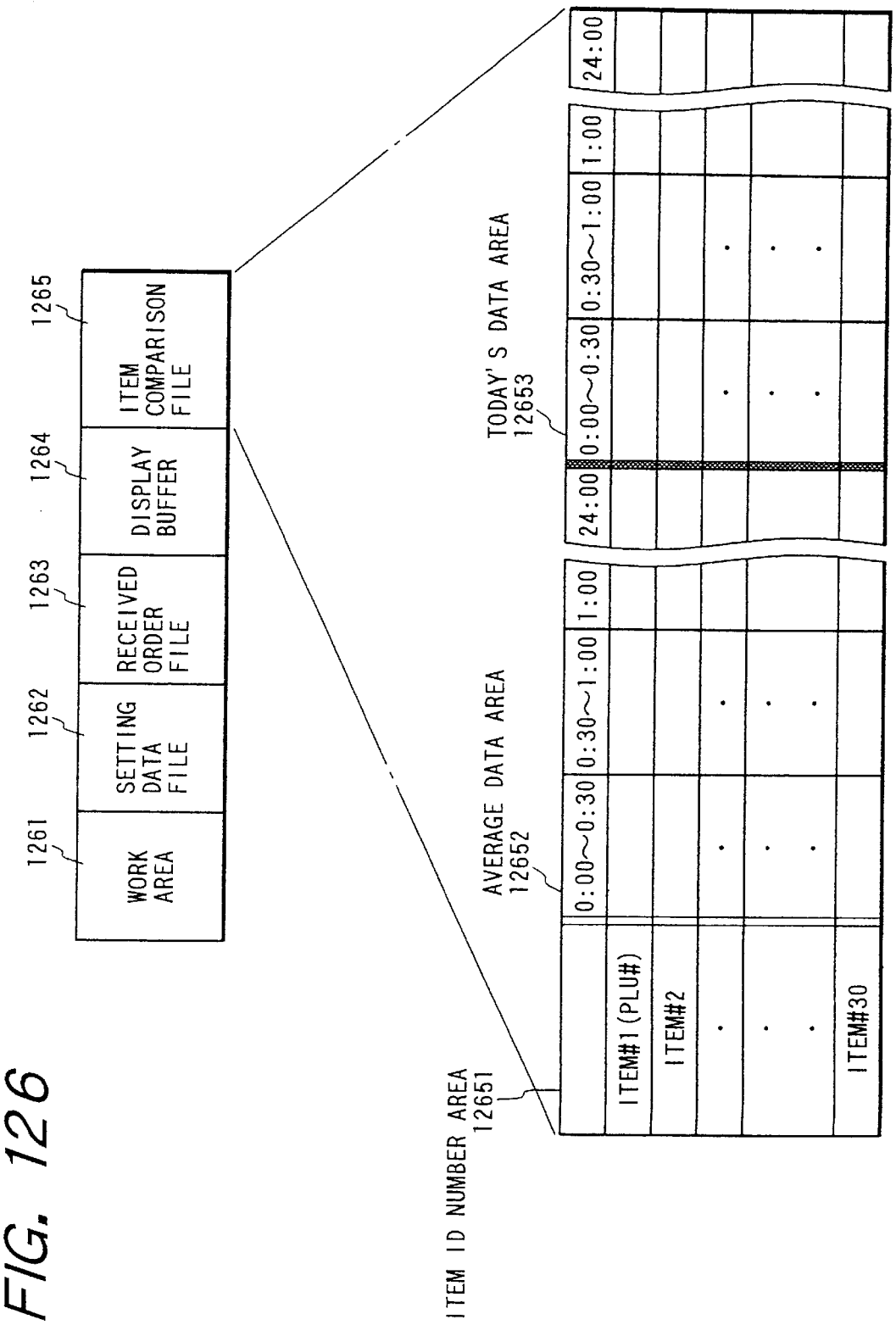

FIG. 126 is a diagram of the structure of a memory in the kitchen video controller in the sixteenth embodiment of this invention.

Figures 127, 128:
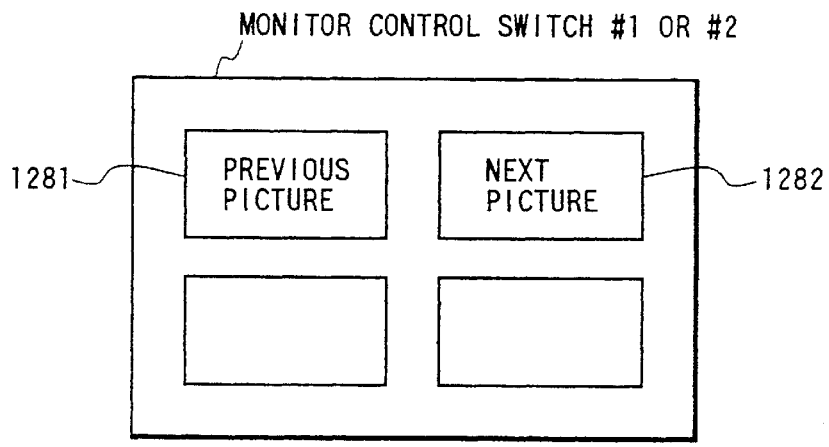

FIG. 127 is a diagram of a picture on a display device in the kitchen video controller in the sixteenth embodiment of this invention.

FIG. 128 is a front view of a monitor control switch in the sixteenth embodiment of this invention.

Figure 129:
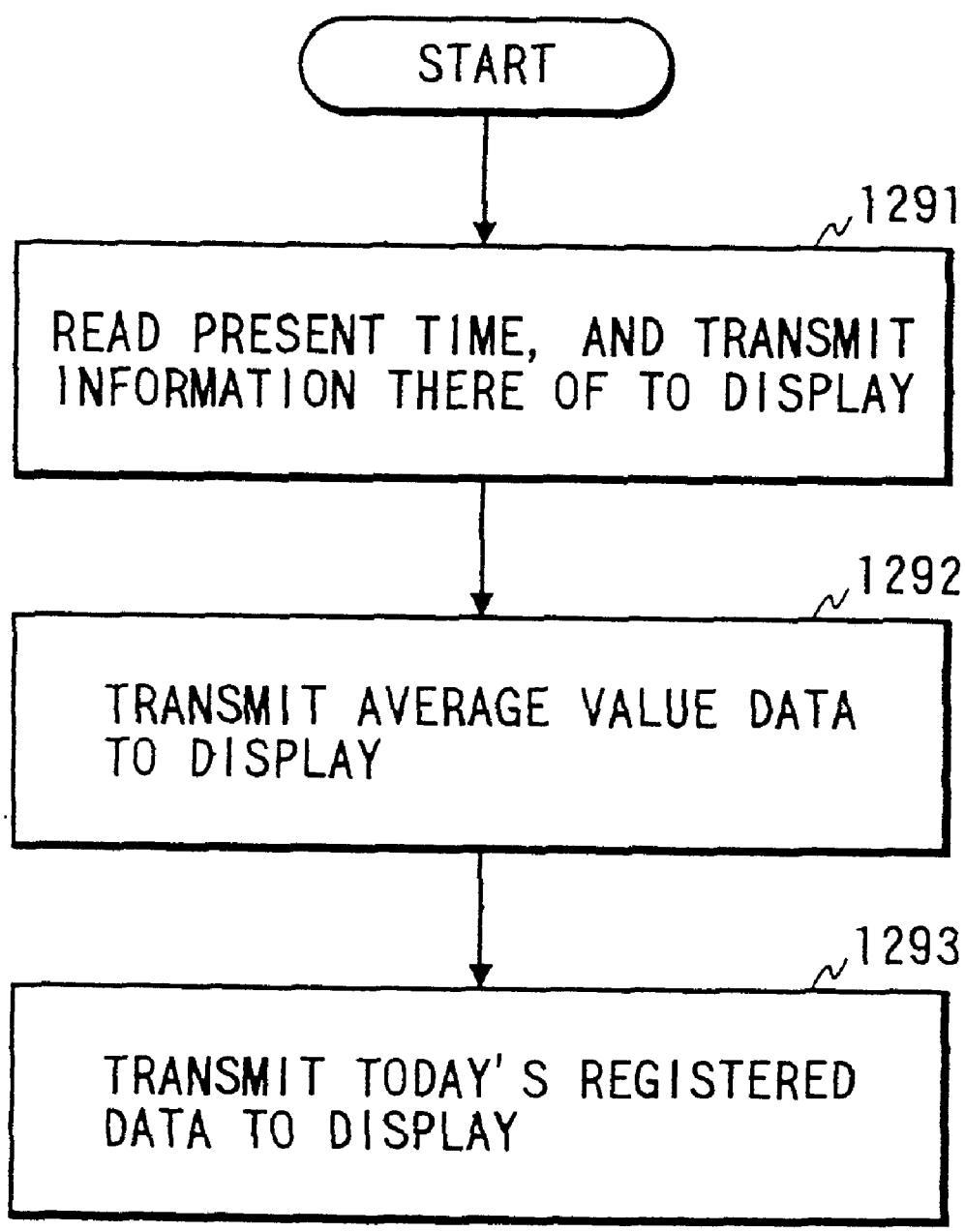

FIG. 129 is a flowchart of a segment of a program for controlling operation of the kitchen video controller which relates to picture indication in the sixteenth embodiment of this invention.

Figures 130, 131:
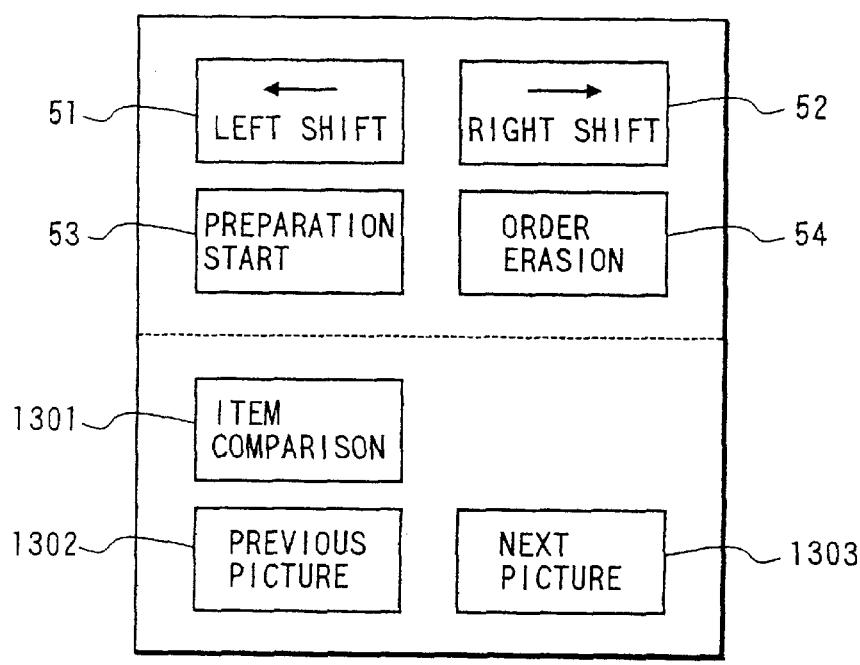

FIG. 130 is a front view of a modified monitor control switch in the sixteenth embodiment of this invention.

FIG. 131 is a diagram of a comparison item setting picture on a display device in the register terminal in the sixteenth embodiment of this invention.

FIG. 132 is a diagram of a time range setting picture on the display device in the register terminal in the sixteenth embodiment of this invention.

FIG. 133 is a diagram of a product material setting file in a seventeenth embodiment of this invention.

FIG. 134 is a diagram of a PLU item setting file in the seventeenth embodiment of this invention.

FIG. 135 is a diagram of a data base file in a register terminal in the seventeenth embodiment of this invention.

Figure 136:
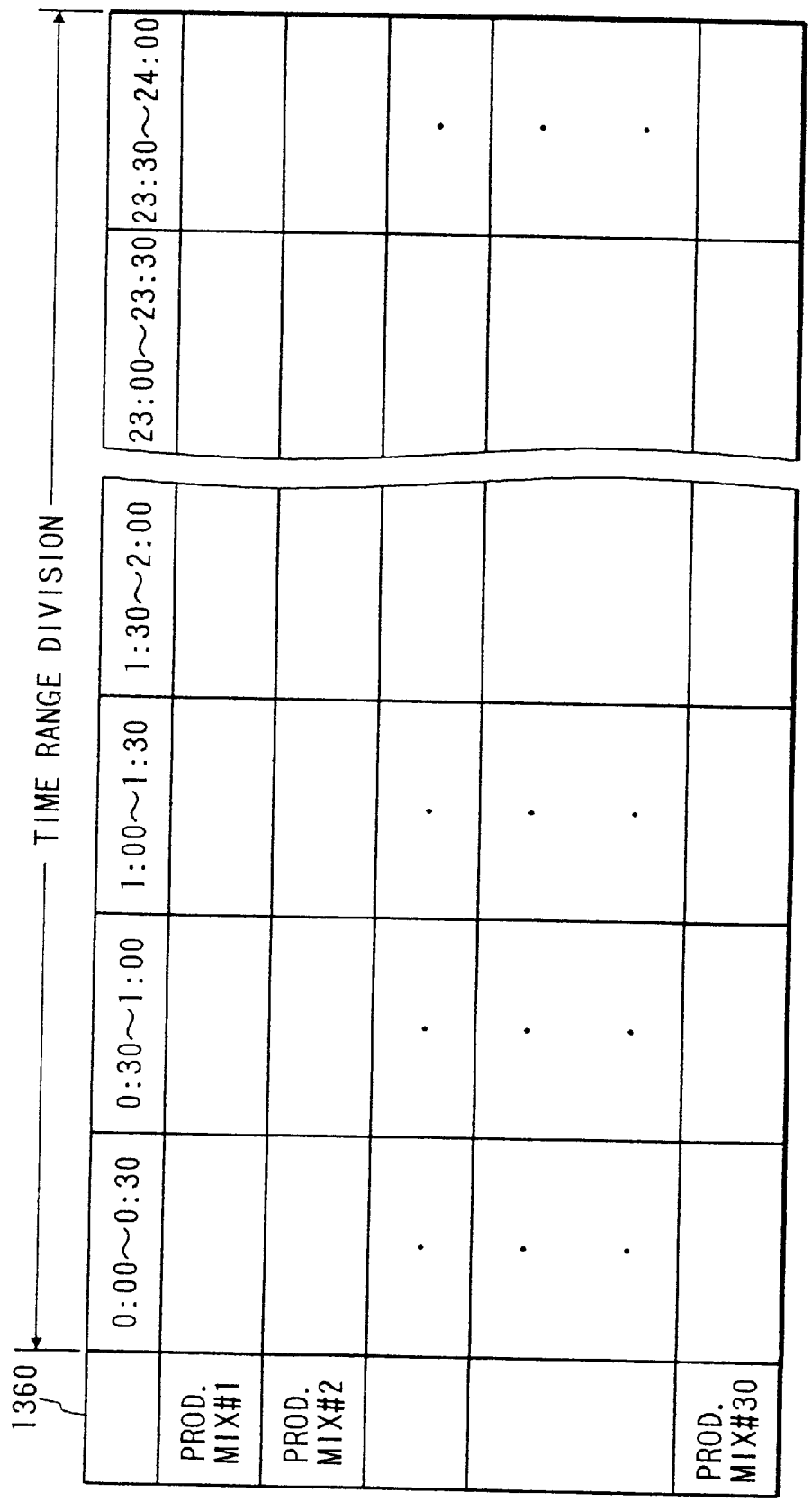

FIG. 136 is a diagram of the details of the data base file in FIG. 135.

FIG. 137 is a diagram of an average value data file in the seventeenth embodiment of this invention.

Figure 138:
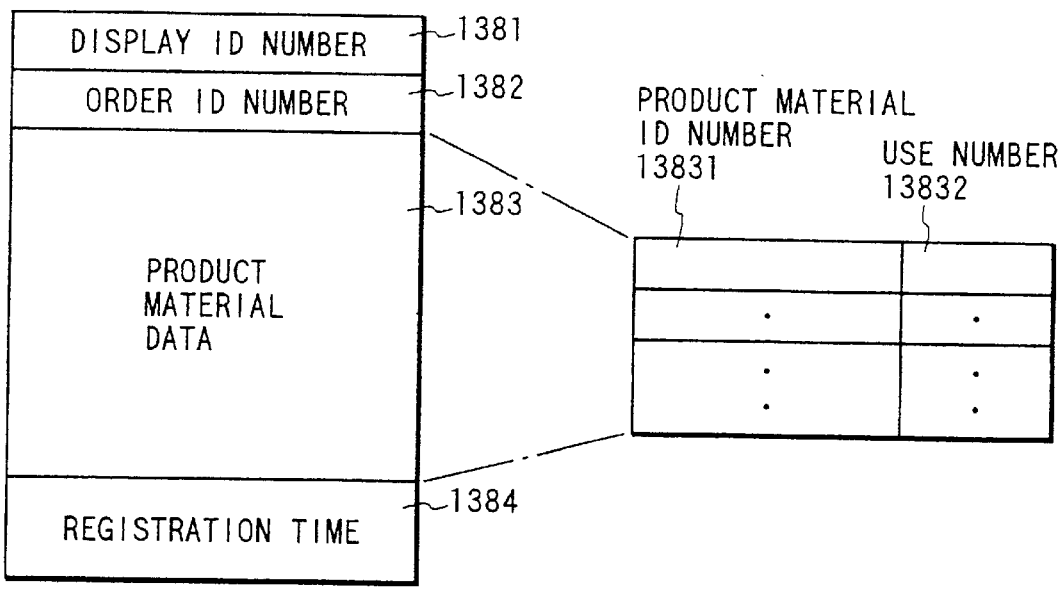

FIG. 138 is a diagram of an order file transmitted from the register terminal to a kitchen video controller in the seventeenth embodiment of this invention.

Figure 139:
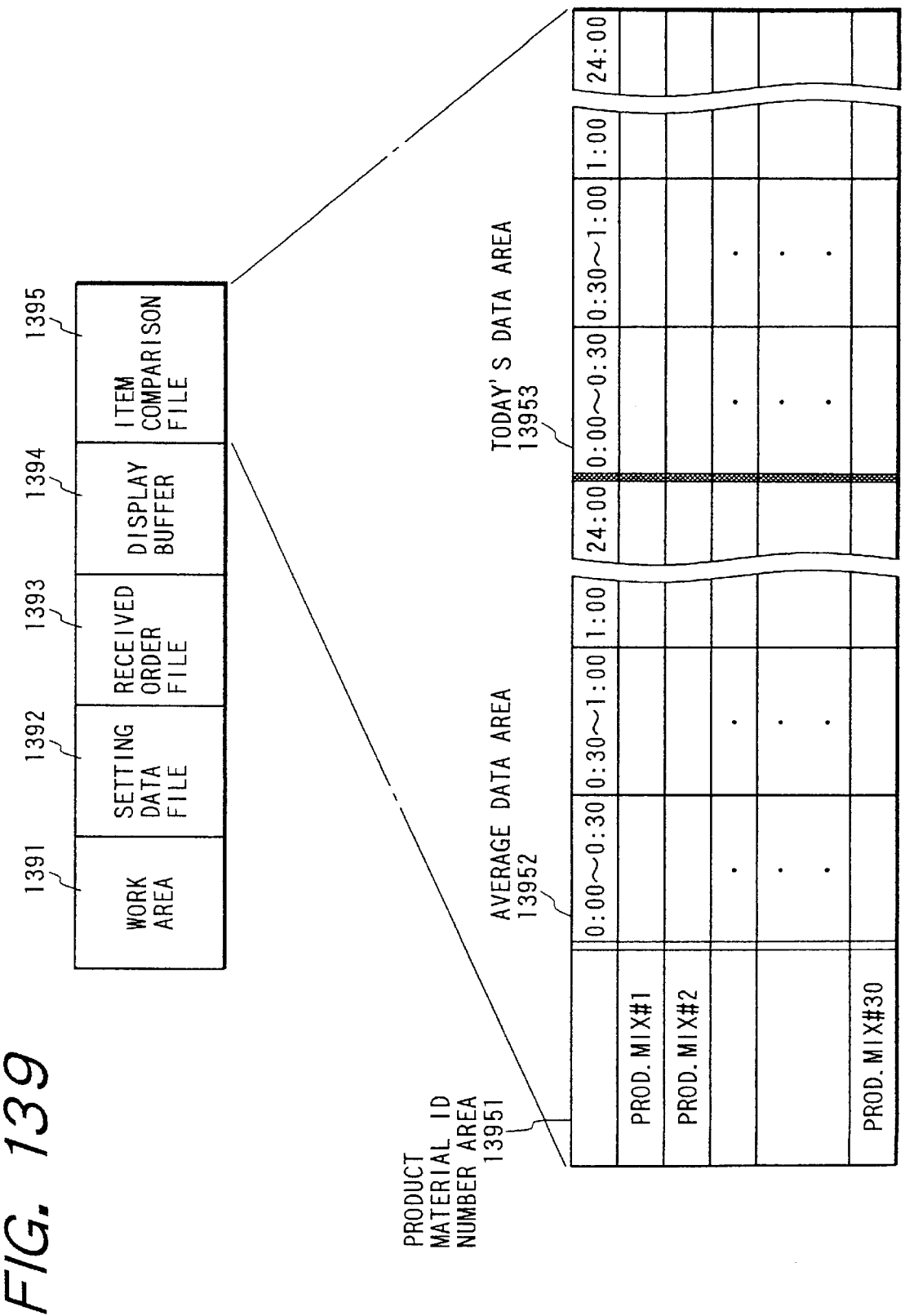

FIG. 139 is a diagram of the structure of a memory in the kitchen video controller in the seventeenth embodiment of this invention.

Figure 140:
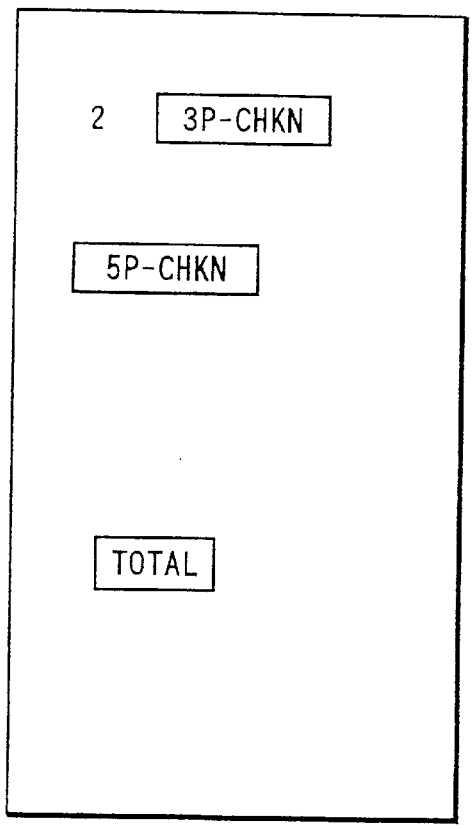

FIG. 140 is a diagram of key operations which occur during the registration of a customer's order in the seventeenth embodiment of this invention.

FIG. 141(a) is a diagram of the relation between PLU items and product materials in the seventeenth embodiment of this invention.

FIG. 141(b) is a diagram of the structure of product material data in a transmitted customer's order in the seventeenth embodiment of this invention.

Figures 142, 143:
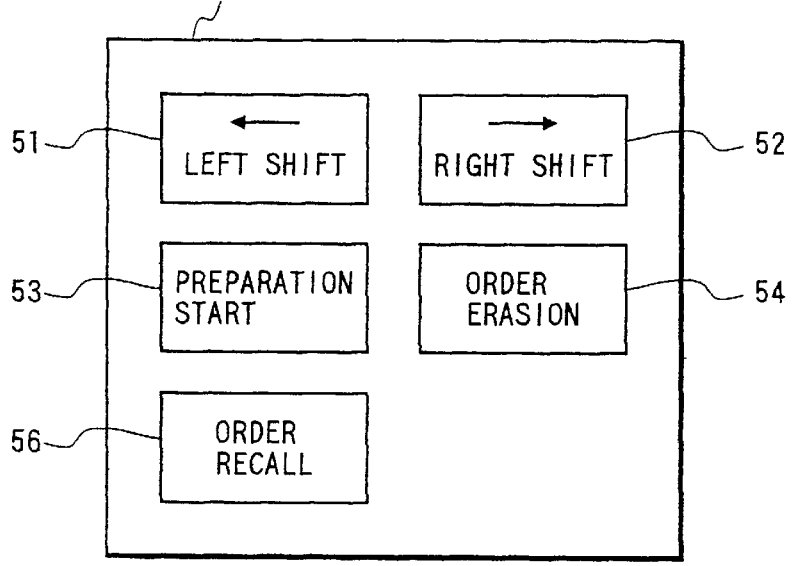

FIG. 142 is a diagram of a picture on a display device in the kitchen video controller in the seventeenth embodiment of this invention.

FIG. 143 is a front view of a monitor control switch in an eighteenth embodiment of this invention.

FIG. 144 is a diagram of first pictures on display devices in a kitchen video controller in the eighteenth embodiment of this invention.

FIG. 145 is a diagram of second pictures on the display devices in the kitchen video controller in the eighteenth embodiment of this invention.

Figure 146:
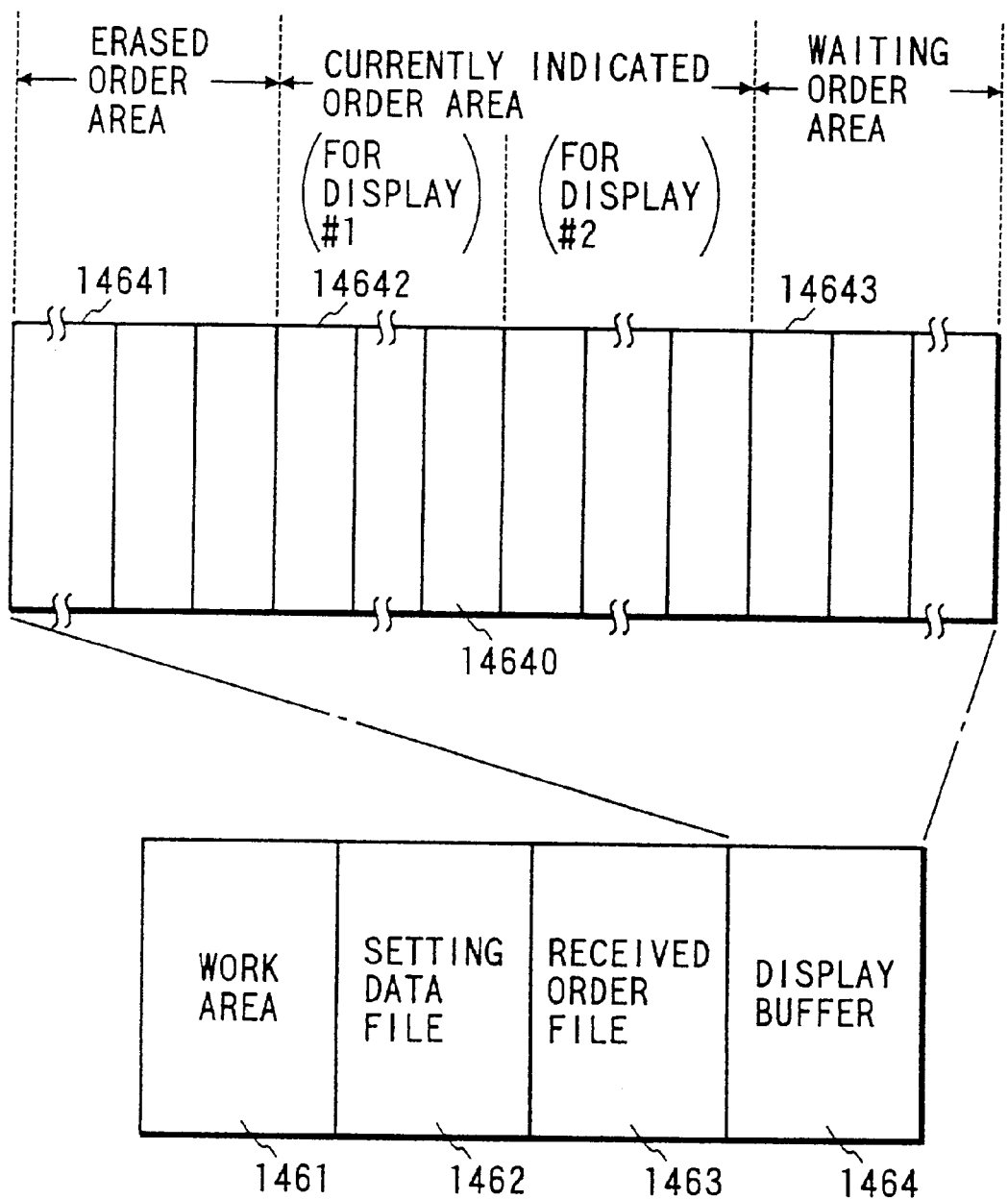

FIG. 146 is a diagram of the structure of a memory in the kitchen video controller in the eighteenth embodiment of this invention.

FIG. 147 is a diagram of third pictures on the display devices in the kitchen video controller in the eighteenth embodiment of this invention.

FIG. 148 is a diagram of fourth pictures on the display devices in the kitchen video controller in the eighteenth embodiment of this invention.

Figure 149:
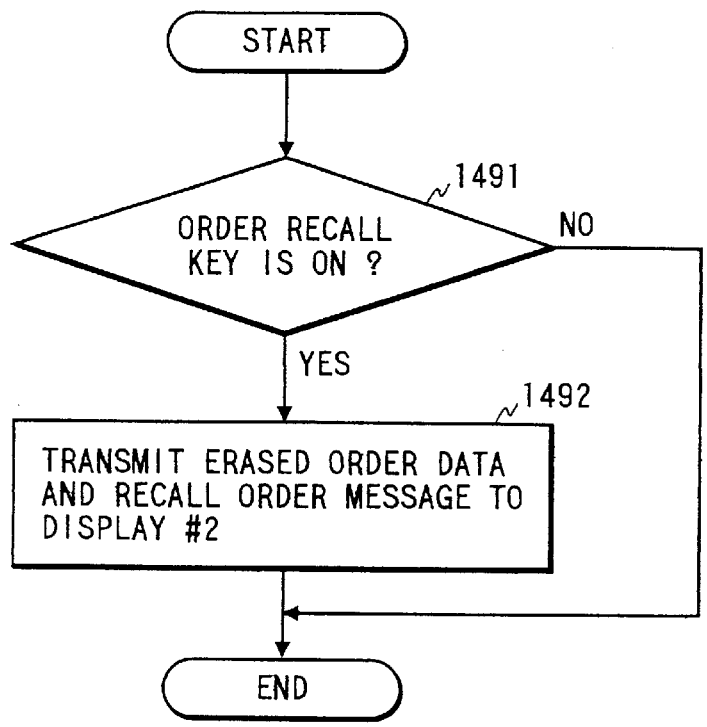

FIG. 149 is a flowchart of a segment of a program for controlling operation of the kitchen video controller which relates to order recall in the eighteenth embodiment of this invention.

Figure 150:
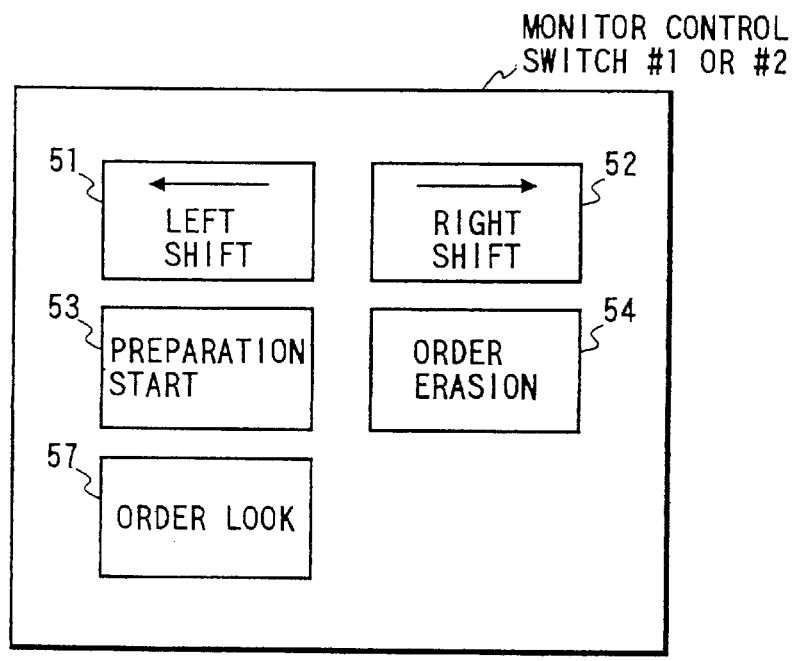

FIG. 150 is a front view of a monitor control switch in a nineteenth embodiment of this invention.

Figure 151:
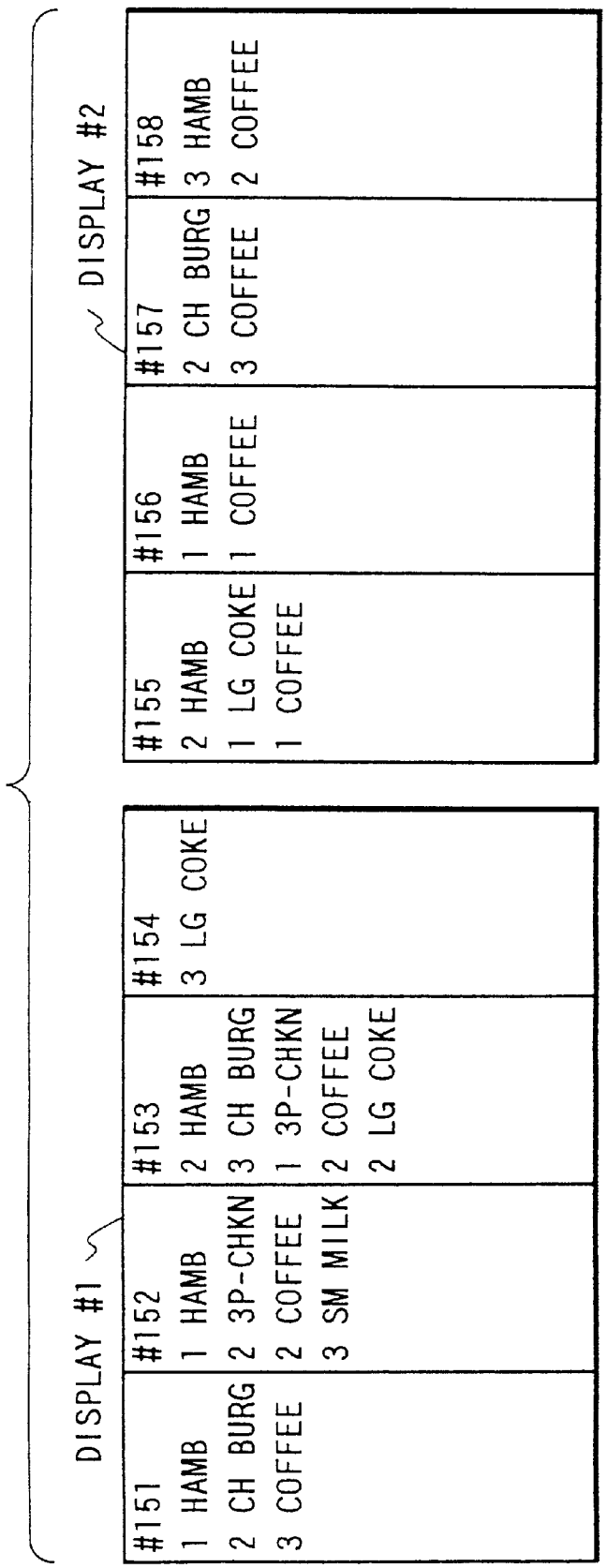

FIG. 151 is a diagram of first pictures on display devices in a kitchen video controller in the nineteenth embodiment of this invention.

FIG. 152 is a diagram of second pictures on the display devices in the kitchen video controller in the nineteenth embodiment of this invention.

Figure 153:
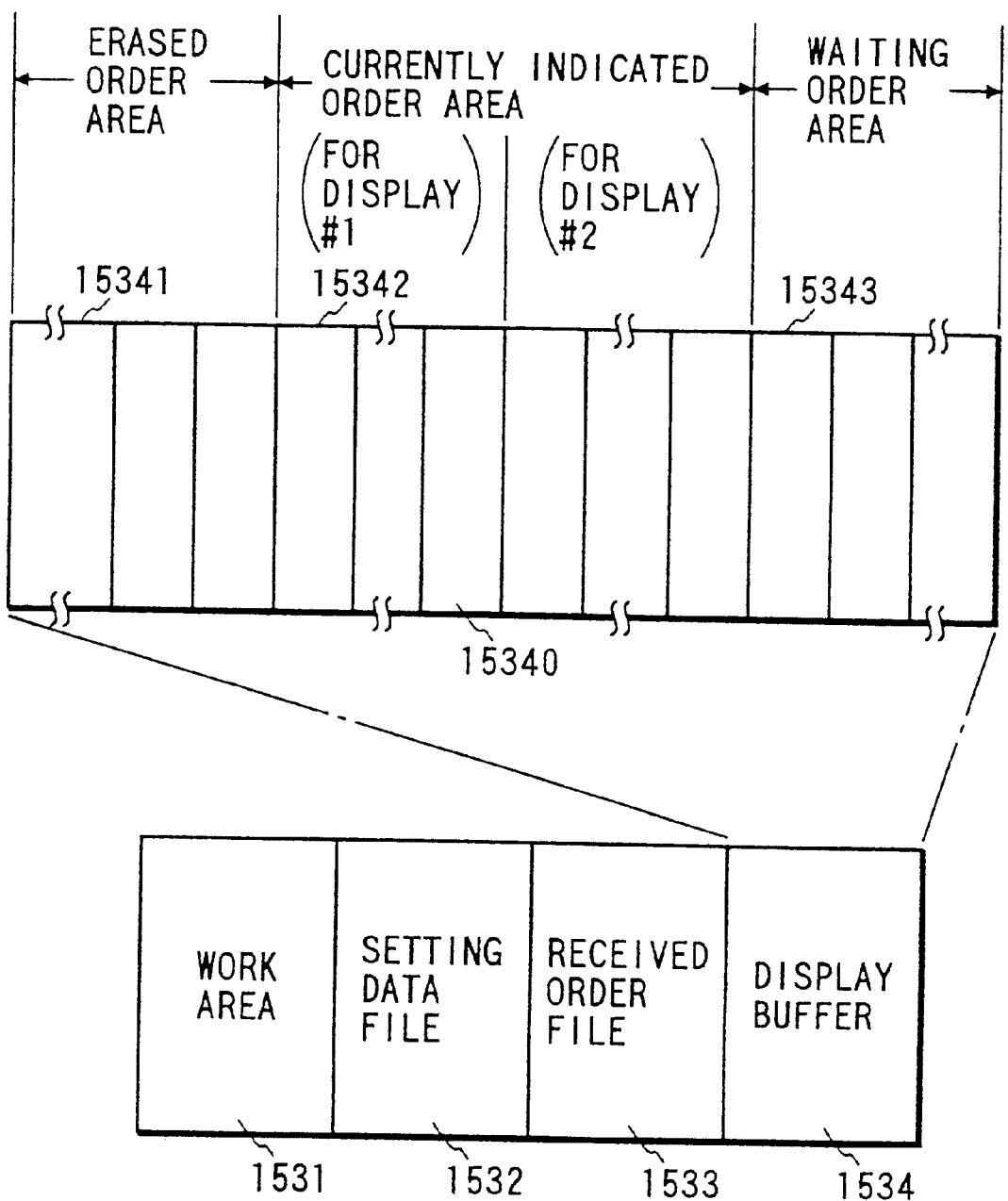

FIG. 153 is a diagram of the structure of a memory in the kitchen video controller in the nineteenth embodiment of this invention.

FIG. 154 is a diagram of third pictures on the display devices in the kitchen video controller in the nineteenth embodiment of this invention.

FIG. 155 is a diagram of fourth pictures on the display devices in the kitchen video controller in the nineteenth embodiment of this invention.

FIG. 156 is a flowchart of a segment of a program for controlling operation of the kitchen video controller which relates to order look in the nineteenth embodiment of this invention.

DESCRIPTION OF THE PREFERRED EMBODIMENTS

First Embodiment

Figure 1:
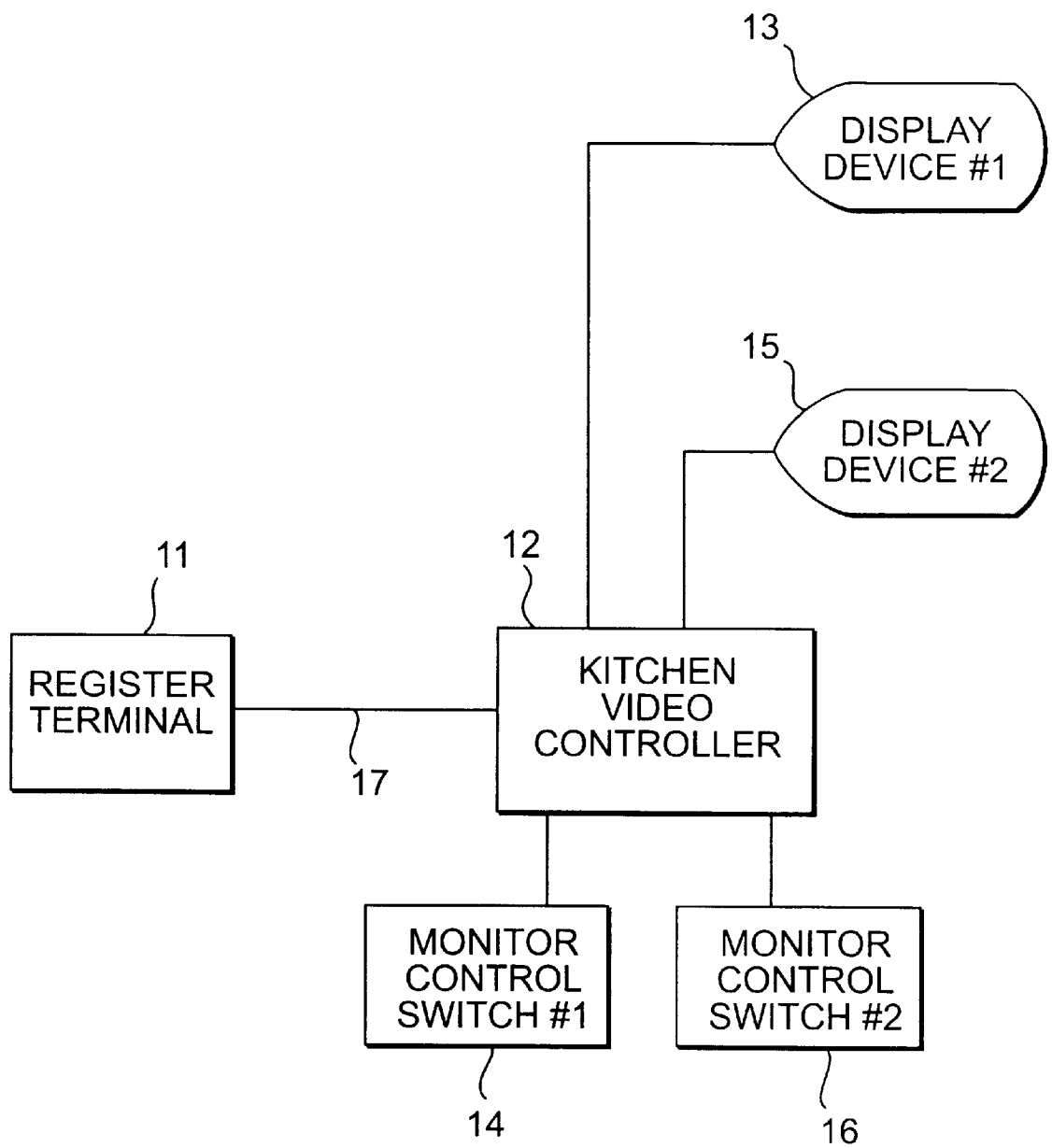
FIG. 1 is a block diagram of an electronic register according to a first embodiment of this invention.

With reference to FIG. 1, an electronic register includes a register terminal 11 which is connected to a kitchen video controller 12 via a data communication line or a data communication path 17. The kitchen video controller 12 is connected to a display device (#1) 13, a monitor control switch (#1) 14, a display device (#2) 15, and a monitor control switch (#2) 16. An instruction signal for controlling information indicated on the display device (#1) 13 can be generated by operating the monitor control switch (#1) 14. An instruction signal for controlling information indicated on the display device (#2) 15 can be generated by operating the monitor control switch (#2) 16.

Figure 2:
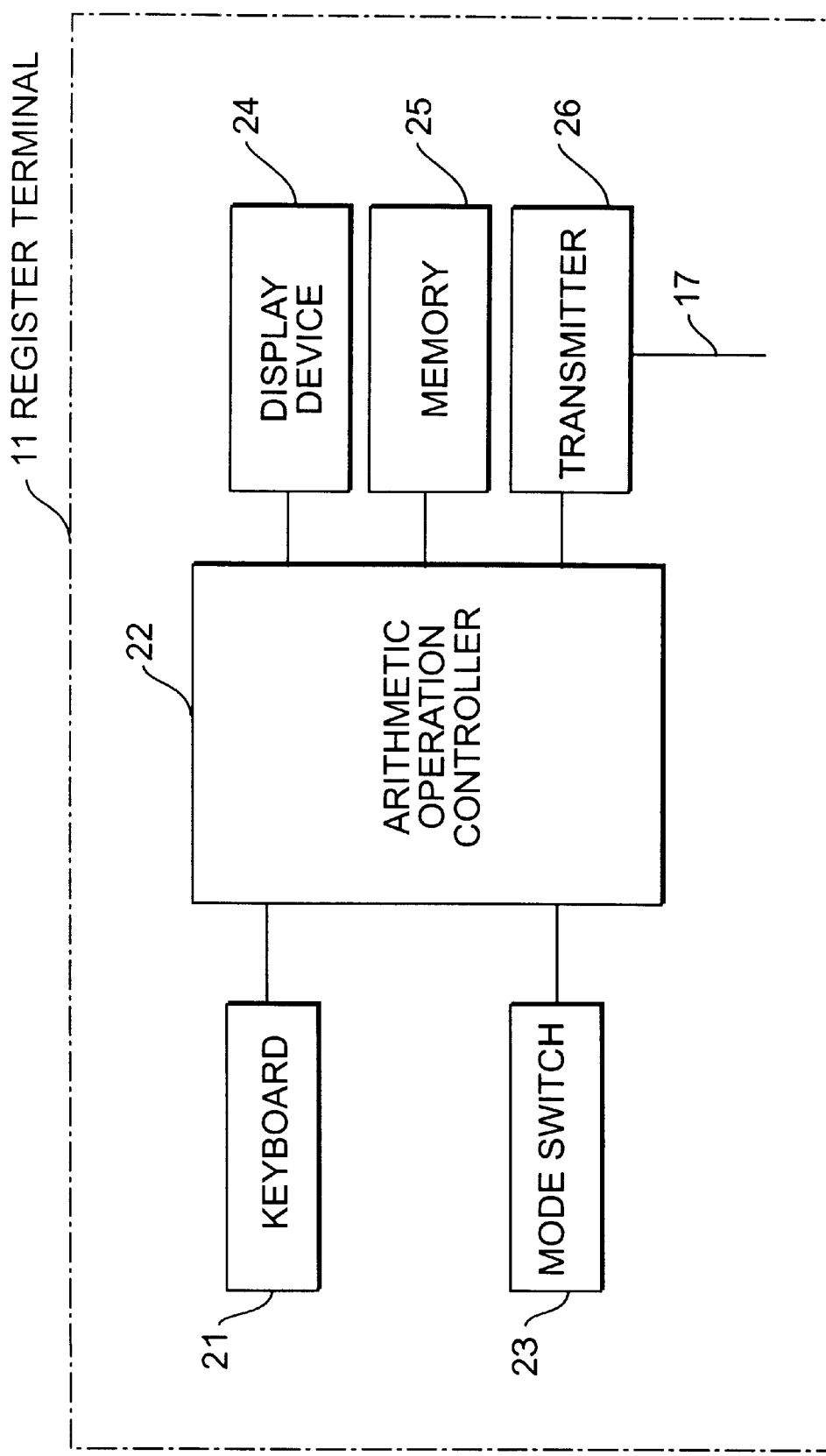
FIG. 2 is a block diagram of a register terminal in FIG. 1.

As shown in FIG. 2, the register terminal 11 includes a keyboard 21, an arithmetic operation controller 22, a mode switch 23, a display device 24, a memory 25, and a transmitter 26. The keyboard 21 is connected to the arithmetic operation controller 22. The keyboard 21 has an array of keys including numeral registering keys, ordered item registering keys, and a totalizing key. Upon operation of these keys, signals representative of corresponding key code words are generated. The generated key code signals are fed to the arithmetic operation controller 22. The arithmetic operation controller 22 includes a microcomputer, a digital signal processor, or a similar device having a combination of an interface, a processing section, a RAM, and a ROM. The ROM within the arithmetic operation controller 22 stores processing programs for implementing the tasks assigned to the register terminal 11. The arithmetic operation controller 22 is connected to the mode switch 23, the display device 24, the memory 25, and the transmitter 26. The transmitter 26 is connected to the data communication line 17.

Figure 3:
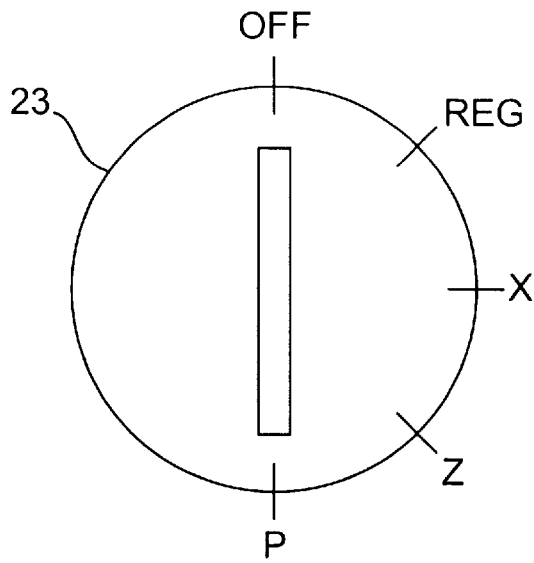
FIG. 3 is a front view of a mode switch in FIG. 2.

With reference to FIG. 3, the mode switch 23 serves to designate operation modes such as an OFF mode, a registration (REG) mode, an inspection (X) mode, an adjustment (Z) mode, an a setting (P) mode. The switch input data generated by manipulating the mode switch 23 is read by the arithmetic operation controller 22 before the start of the execution of every task processing program. The switch input data determines the processing to be implemented.

Figure 6:
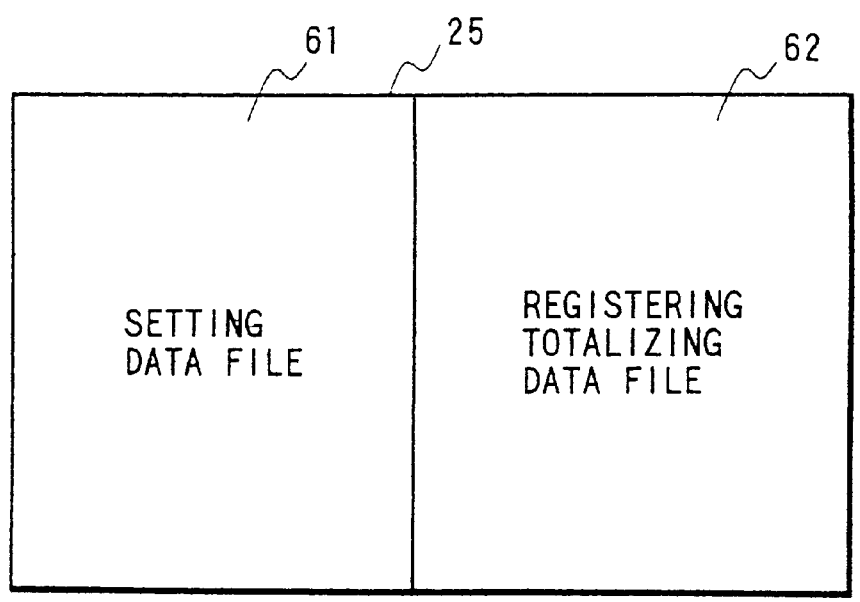
FIG. 6 is a diagram of the structure of a memory in the register terminal of FIG. 2.

Returning to FIG. 2, the display device 24 is controlled by the arithmetic operation controller 22 to indicate the contents of the processings such as the contents of registered customer's orders, the contents of data occurring at the moment of the setting, and the contents of reports made at the time of the inspection and the time of the adjustment. The memory 25 stores setting data for registration processings and totalization processings as well as data generated during these processings. As shown in FIG. 6, the memory 25 contains a setting data file 61 and a data file 62 for the registration processings and the totalization processings.

With reference to FIG. 2, the transmitter 26 serves to transmit the data, set by the register terminal 11, to the kitchen video controller 12 via the data communication line 17. The transmitter 26 implements transmission processings for setting the control function by the kitchen video controller 12, and transmission processings for sequentially transmitting registered customer's orders to the kitchen video controller 12.

Figure 4:
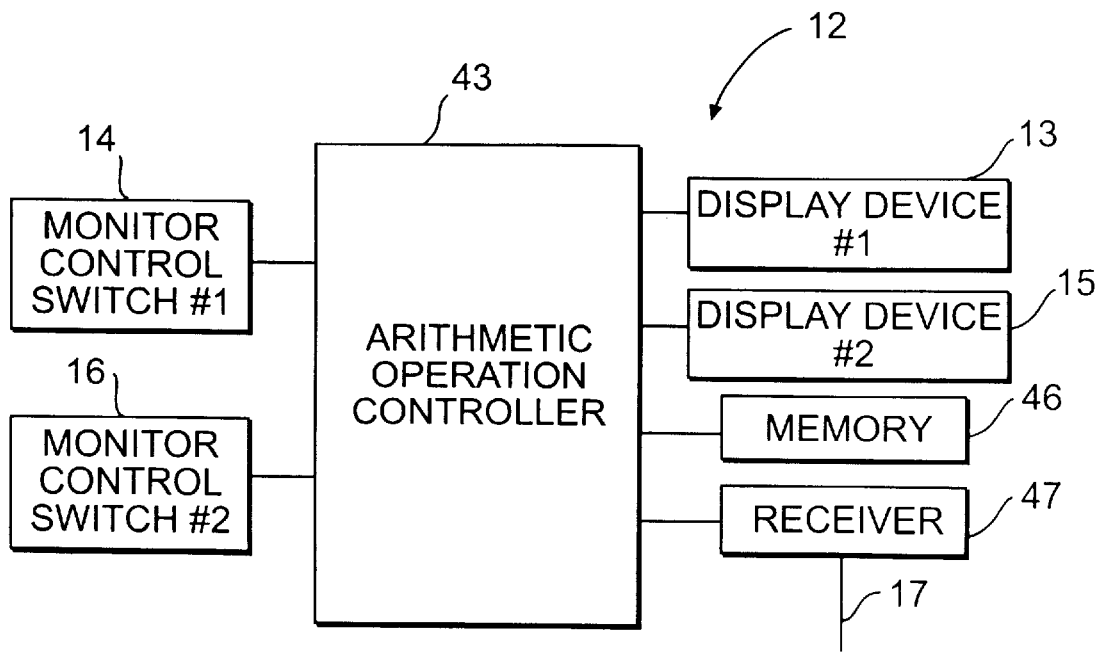
FIG. 4 is a block diagram of a kitchen video controller and associated devices in FIG. 1.

As shown in FIG. 4, the kitchen video controller 12 includes an arithmetic operation controller 43, a memory 46, and a receiver 47. The arithmetic operation controller 43 includes a microcomputer, a digital signal processor, or a similar device having a combination of an interface, a processing section, a RAM, and a ROM. The ROM within the arithmetic operation controller 43 stores processing programs for implementing the tasks assigned to the kitchen video controller 12. The arithmetic operation controller 43 is connected to the display device (#1) 13, the monitor control switch (#1) 14, the display device (#2) 15, the monitor control switch (#2) 16, the memory 46, and the receiver 47. The receiver 47 is connected to the data communication line 17.

Figure 5:
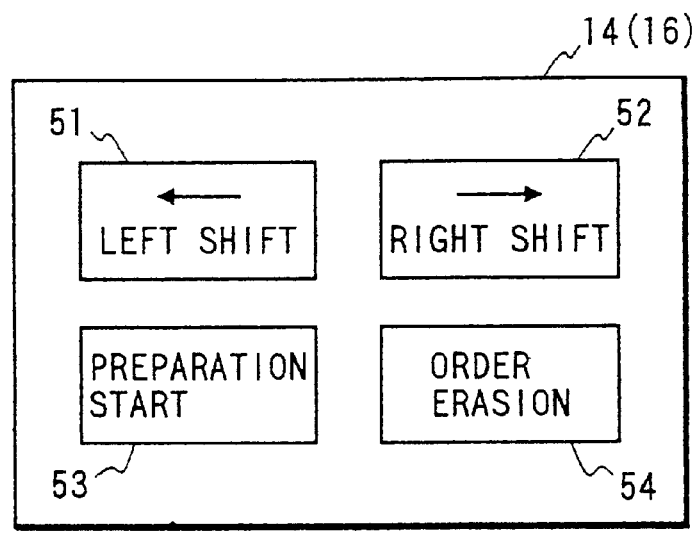
FIG. 5 is a front view of a monitor control switch in FIG. 4.

The monitor control switch (#1) 14 and the monitor control switch (#2) 16 are similar in structure. As previously described, the monitor control switch (#1) 14 is used for the control of the display device (#1) 13. The monitor control switch (#2) 16 is used for the control of the display device (#2) 15. As shown in FIG. 5, the monitor control switch (#1) 14 (or the monitor control switch (#2) 16) has an array of keys such as a left-hand shift key 51, a right-hand shift key 52, a preparation start key 53, and an order erasion key 54. Upon operation of these keys, corresponding key signals are generated. The generated key signals are fed to the arithmetic operation controller 43.

Returning to FIG. 4, the display device (#1) 13 and the display device (#2) 15 are controlled by the arithmetic operation controller 43 to indicate customer's orders represented by the data transmitted from the register terminal 11. The memory 46 contains a setting data file and a reception data file. The setting data file in the memory 46 stores setting data for the control of the kitchen video controller 12 which is set by the register terminal 11 and which is transmitted therefrom via the data communication line 17. The reception order file in the memory 46 stores data representative of customer's orders which is transmitted from the register terminal 11 via the data communication line 17. The reception order file in the memory 46 remains accessed during the indication of the order data on the display device (#1) 13 and the display device (#2) 15. The receiver 47 serves to receive the order data and the setting data from the register terminal 11 via the data communication line 17. As previously described, the setting data is generated by the register terminal 11, and is designed for the kitchen video controller 12.

Figure 7:
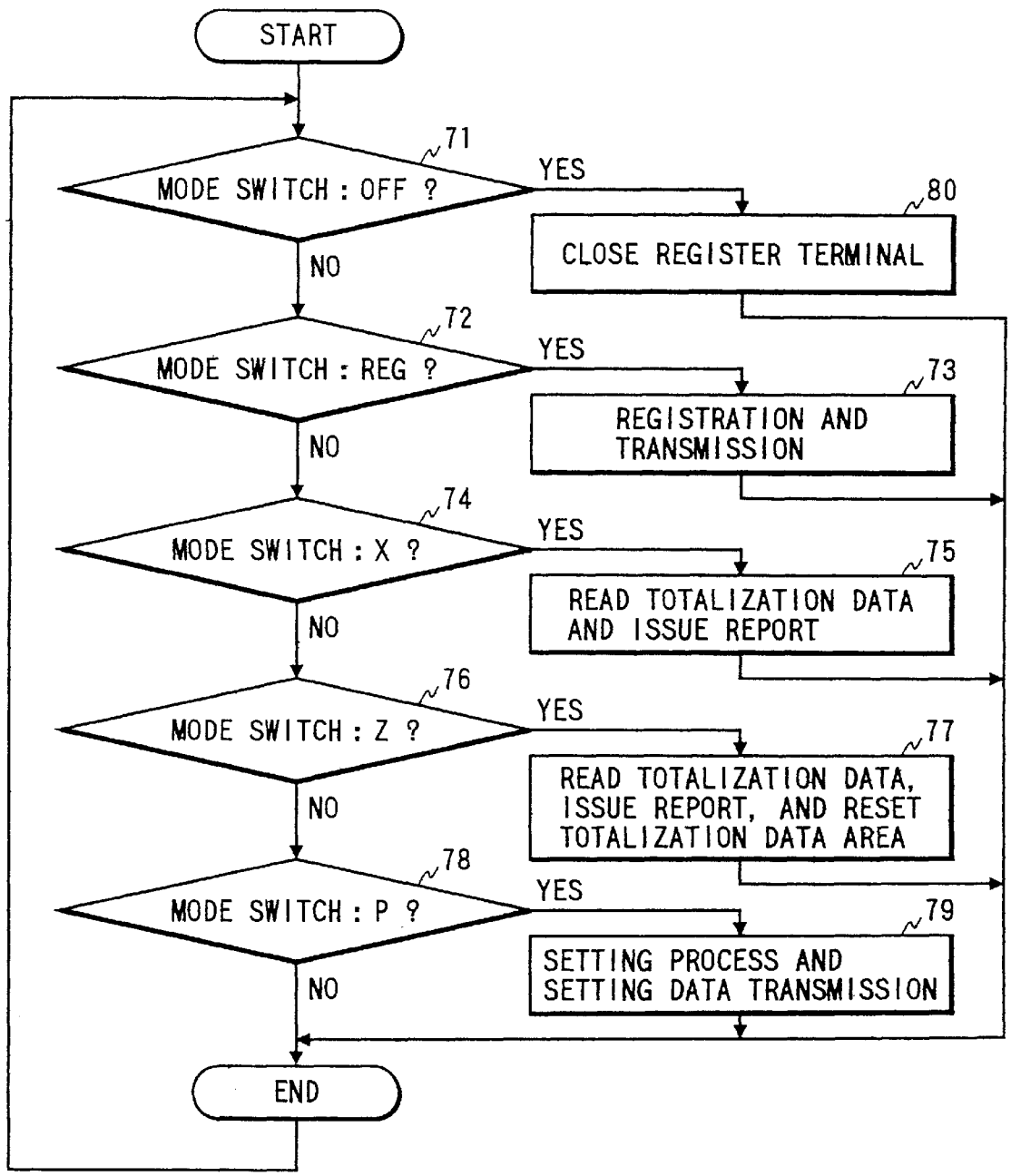
FIG. 7 is a flowchart of a segment of a program for controlling operation of the register terminal in FIG. 2.

FIG. 7 is a flowchart of a program controlling the task processing executed by the register terminal 11. The program is periodically reiterated. With reference to FIG. 7, a first step 71 of the program decides whether or not the mode switch 23 is in an OFF state. When the mode switch 23 is in the OFF state, the program advances from the step 71 to a step 80. Otherwise, the program advances from the step 71 to a step 72. The step 80 places the register terminal 11 in a closed state to inhibit operation of the register terminal 11. After the step 80, the current execution cycle of the program ends.

The step 72 decides whether or not the mode switch 23 is in a REG (registration) state. When the mode switch 23 is in the REG state, the program advances from the step 72 to a step 73. Otherwise, the program advances from the step 72 to a step 74. The step 73 executes a process of registering customer's orders. The step 73 transmits information of customer's orders to the kitchen video controller 12 in response to the states of steer flags or destination flags for respective ordered items (ordered products). After the step 73, the current execution cycle of the program ends. The step 74 decides whether or not the mode switch 23 is in an X (inspection) state. When the mode switch 23 is in the X state, the program advances from the step 74 to a step 75. Otherwise, the program advances from the step 74 to a step 76. The step 75 reads out data representative of a totalization result generated in the register terminal 11. The step 75 issues a report in response to the totalization result data. After the step 75, the current execution cycle of the program ends.

The step 76 decides whether or not the mode switch 23 is in a Z (adjustment) state. When the mode switch 23 is in the Z state, the program advances from the step 76 to a step 77. Otherwise, the program advances from the step 76 to a step 78. The step 77 reads out data representative of a totalization result generated in the register terminal 11. The step 77 issues a report in response to the totalization result data. Then, the step 77 resets or clears a memory area for the totalization result data. After the step 77, the current execution cycle of the program ends.

The step 78 decides whether or not the mode switch 23 is in a P (setting) state. When the mode switch 23 is in the P state, the program advances from the step 78 to a step 79. Otherwise, the program exits from the step 78, and then the current execution cycle of the program ends. The step 79 implements tasks of setting the register terminal 11, for example, setting a PLU and setting a kitchen video control mode. The step 79 transmits the kitchen video setting data to the kitchen video controller 12. After the step 79, the current execution cycle of the program ends.

Figure 8:
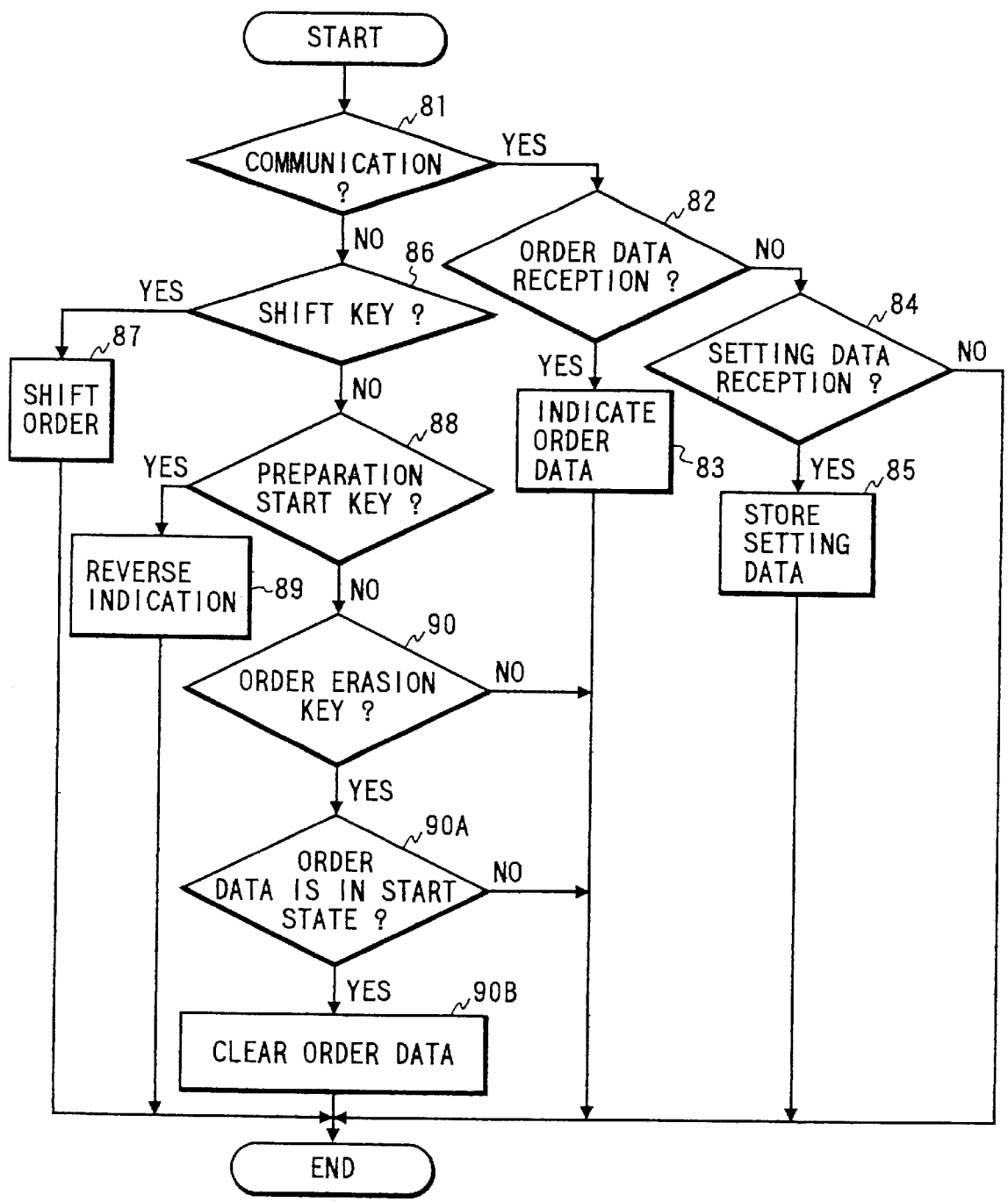
FIG. 8 is a flowchart of a segment of a program for controlling operation of the kitchen video controller in FIG. 4.

FIG. 8 is a flowchart of a program controlling the task processing executed by the kitchen video controller 12. The program is periodically reiterated. With reference to FIG. 8, a first step 81 of the program decides whether or not a process of communication with the register terminal 11 is required. When the process of communication with the register terminal 11 is required, the program advances from the step 81 to a step 82. Otherwise, the program advances from the step 81 to a step 86.

The step 82 decides whether or not information of a customer's order is received from the register terminal 11. When the information of the customer's order is received, the program advances from the step 82 to a step 83. Otherwise, the program advances from the step 82 to a step 84. The step 83 controls the display devices 13 and 15 to indicate the received information of the customer's order. After the step 83, the current execution cycle of the program ends.

The step 84 decides whether or not setting data is received from the register terminal 11. When the setting data is received, the program advances from the step 84 to a step 85. Otherwise, the program exits from the step 84, and then the current execution cycle of the program ends. The step 85 stores the received setting data into the setting data file in the memory 46. After the step 85, the current execution cycle of the program ends.

The step 86 decides whether or not one of the shift keys 51 and 52 in the monitor control switch 14 (or the monitor control switch 16) is depressed. When one of the shift keys 51 and 52 is depressed, the program advances from the step 86 to a step 87. Otherwise, the program advances from the step 86 to a step 88. The step 87 shifts the currently-addressed order, indicated on the display device, leftward or rightward in response to the type of the depressed shift key. Regarding the address position, the order number (the order ID number) indicated on the display device is blinked. After the step 87, the current execution cycle of the program ends.

The step 88 decides whether or not the preparation start key 53 in the monitor control switch 14 (or the monitor control switch 15) is depressed. When the preparation start key 53 is depressed, the program advances from the step 88 to a step 89. Otherwise, the program advances from the step 88 to a step 90. The step 89 controls the display devices 13 and 15 to implement reverse indication of the order number part of the corresponding order file. After the step 89, the current execution cycle of the program ends.

The step 90 decides whether or not the order erasion key 54 in the monitor control switch 14 (or the monitor control switch 15) is depressed. When the order erasion key 54 is depressed, the program advances from the step 90 to a step 90A. Otherwise, the program exits from the step 88, and then the current execution cycle of the program ends.

The step 90A decides whether or not the order data in question is in a start state. When the order data is in the start state, the program advances from the step 90A to a step 90B. Otherwise, the program exits from the step 90A, and then the current execution cycle of the program ends. The step 90B clears the order data in question, and places indicated order data pieces in an area starting from the left-hand edge of a display screen without providing positive spaces therebetween. After the step 90B, the current execution cycle of the program ends.

Figures 9, 10:
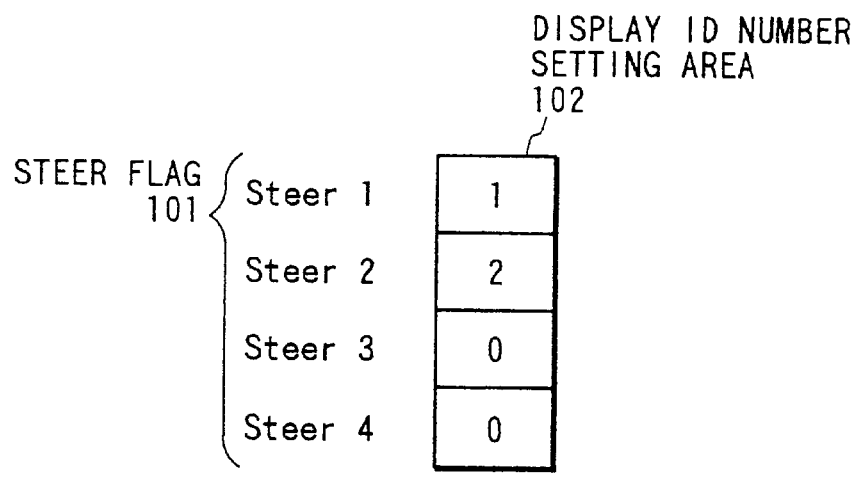
FIG. 9 is a diagram of a PLU item setting file in the first embodiment of this invention.
FIG. 10 is a diagram of a setting file of display device ID numbers in the first embodiment of this invention.

FIG. 9 shows the structure of a price look up PLU item setting file provided in the memory 25 within the register terminal 11. The PLU item setting file has information pieces 91 of PLU code words, information pieces 92 of item names, information pieces 93 of unit prices, and destination information pieces 94 of steer flags. The destination information pieces 94 of the steer flags determine the assignment of ordered items to the display devices 13 and 15 related to the kitchen video controller 12.

FIG. 10 shows the structure of a display number setting table provided in the memory 25 within the register terminal 11. With reference to FIG. 10, the number for identifying a display device connected to the kitchen video controller 12 is set in a setting area 102 in correspondence with each of the destination information flags (the steer flags) 101.

FIG. 11 shows an example of displayed conditions of a setting task menu related to the register terminal 11. When the mode switch 23 is moved to the setting mode position (P), the setting task menu in FIG. 11 is indicated on the display device 24. FIG. 12 shows an example of displayed conditions of a kitchen video setting menu related to the register terminal 11. When "60 KITCHEN VIDEO" is selected from among character combinations (stages) in FIG. 11 by operating the keyboard 21, the kitchen video setting menu in FIG. 12 is indicated on the display device 24.

Figure 13:
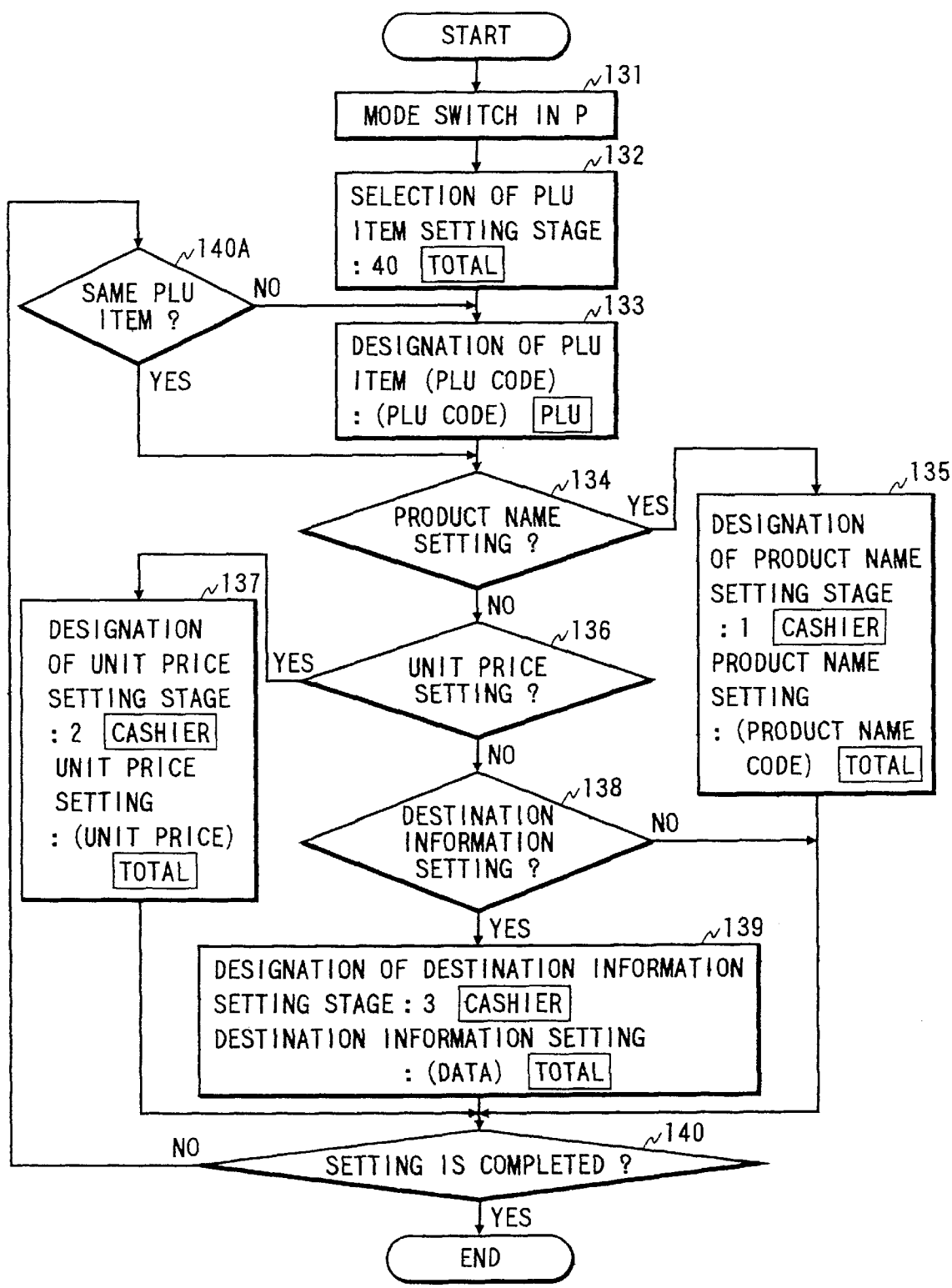
FIG. 13 is a flowchart of a segment of a program for controlling operation of the register terminal in FIG. 2 which is designed to provide the PLU item setting file in FIG. 9.

FIG. 13 is a flowchart of a program for providing the PLU item setting file in FIG. 9. With reference to FIG. 13, a first step 131 of the program waits motion of the mode switch 23 to the setting mode position (P). When the mode switch 23 is moved to the setting mode position (P), the step 131 indicates the setting task menu of FIG. 11 on the display device 24.

A step 132 following the step 131 waits operation of the keyboard 21 which corresponds to "40" (totalization). When the operation of the keyboard 21 which corresponds to "40" (totalization) is executed, "PLU item setting stage 40" is selected. After the step 132, the program advances to a step 133.

The step 133 waits operation of the keyboard 21 which corresponds to "10" (PLU). When the operation of the keyboard 21 which corresponds to "10" (PLU) is executed, an area corresponding to, for example, PLU#10 is designated and selected from among areas in the PLU item setting file in FIG. 9. After the step 133, the program advances to a step 134.

The step 134 decides whether or not setting of a product name (an article name) is required. When the setting of the product name is required, the program advances from the step 134 to a step 135. Otherwise, the program advances from the step 134 to a step 136. The step 135 enables the setting of the product name. Specifically, an item name setting address area corresponding to, for example, PLU#10 is designated by operation of the keyboard 21 which corresponds to "1" (cashier). A product name (an item name) corresponding to, for example, PLU#10 is set by operation of the keyboard 21 which corresponds to "product name code" (totalization). After the step 135, the program advances to a step 140.

The step 136 decides whether or not setting of a unit price is required. When the setting of the unit price is required, the program advances from the step 136 to a step 137. Otherwise, the program advances from the step 136 to a step 138. The step 137 enables the setting of the unit price in response to operation of the keyboard 21. After the step 137, the program advances to the step 140.

The step 138 decides whether or not the setting of destination information (steer information) is required. When the setting of the destination information is required, the program advances from the step 138 to a step 139. Otherwise, the program advances from the step 138 to the step 140. The step 139 enables the setting of the destination information in response to operation of the keyboard 21. After the step 139, the program advances to the step 140.

The step 140 decides whether or not all the setting processes have been completed. In the case where all the setting processes have been completed, the program exits from the step 140 and then the current execution cycle of the program ends. Otherwise, the program advances from the step 140 to a step 140A.

The step 140A decides whether or not maintaining the same PLU item is required, that is, whether or not change of the PLU item is required. When maintaining the same PLU item is required, that is, when the change of the PLU item is not required, the program advances from the step 140A to the step 134. Otherwise, the program advances from the step 140A to the step 133.

A part of the sequence of the above-indicated steps is repeated while the PLU code number is changed. As a result, different PLU code areas are sequentially selected.

Figure 14:
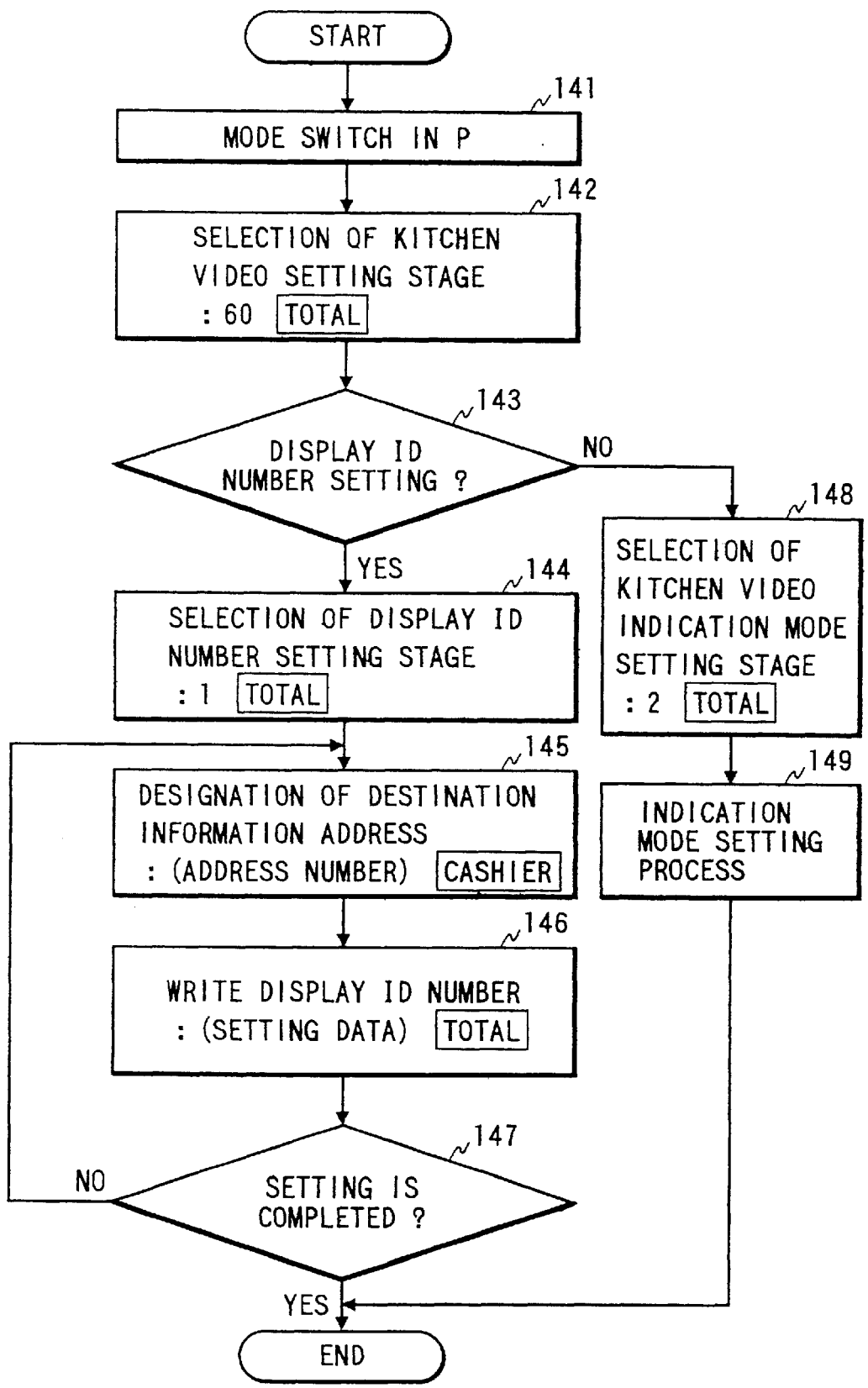
FIG. 14 is a flowchart of a segment of a program for controlling operation of the register terminal in FIG. 2 which is designed to set ID numbers of display devices in the kitchen video controller of FIG. 4.

FIG. 14 is a flowchart of a program for providing the display number setting table in FIG. 10. With reference to FIG. 14, a first step 141 of the program waits motion of the mode switch 23 to the setting mode position (P). When the mode switch 23 is moved to the setting mode position (P), the step 141 indicates the setting task menu of FIG. 11 on the display device 24.

A step 142 following the step 141 waits operation of the keyboard 21 which corresponds to "60" (totalization). When the operation of the keyboard 21 which corresponds to "60" (totalization) is executed, "kitchen video setting stage 60" is selected. In addition, the kitchen video setting menu of FIG. 12 is indicated on the display device 24.

A step 143 following the step 142 decides whether or not setting of a display ID number is required. When the setting of the display ID number is required, the program advances from the step 143 to a step 144. Otherwise, the program advances from the step 143 to a step 148. The step 144 enables selection of a display number setting stage. Specifically, a display setting stage "STEER# VS VIDEO#" is selected by operation of the keyboard 21 which corresponds to "1" (totalization). After the step 144, the program advances to a step 145.

The step 145 enables designation of a destination information address (a steer flag number or an address number) in response to operation of the keyboard 21 which corresponds to, for example, "1" (cashier). For example, a destination flag number "1" (STEER 1) is designated.

A step 146 following the step 145 enables setting of a display ID number corresponding to the destination flag number (for example, the destination flag number "1") in response to operation of the keyboard 21 which corresponds to "display number" (totalization).

A step 147 following the step 146 decides whether or not all the setting processes have been completed. In the case where all the setting processes have been completed, the program exits from the step 147 and then the current execution cycle of the program ends. Otherwise, the program returns from the step 147 to the step 145.

The steps 145 and 146 are repeated while the destination flag number is changed. As a result, display ID numbers are sequentially set which correspond to the respective destination flag numbers "1", "2", "3", and "4".

The step 148 enables movement out of the setting stage in response to operation of the keyboard 21 which corresponds to "totalization". A step 149 following the step 148 executes a process of setting a display mode. After the step 149, the current execution cycle of the program ends. The display setting data is automatically transmitted from the transmitter 26 within the register terminal 11 to the receiver 47 within the kitchen video controller 12 via the data communication line 17. Then, the display setting data is down-loaded into the setting data file in the memory 46 within the kitchen video controller 12.

Figure 15:
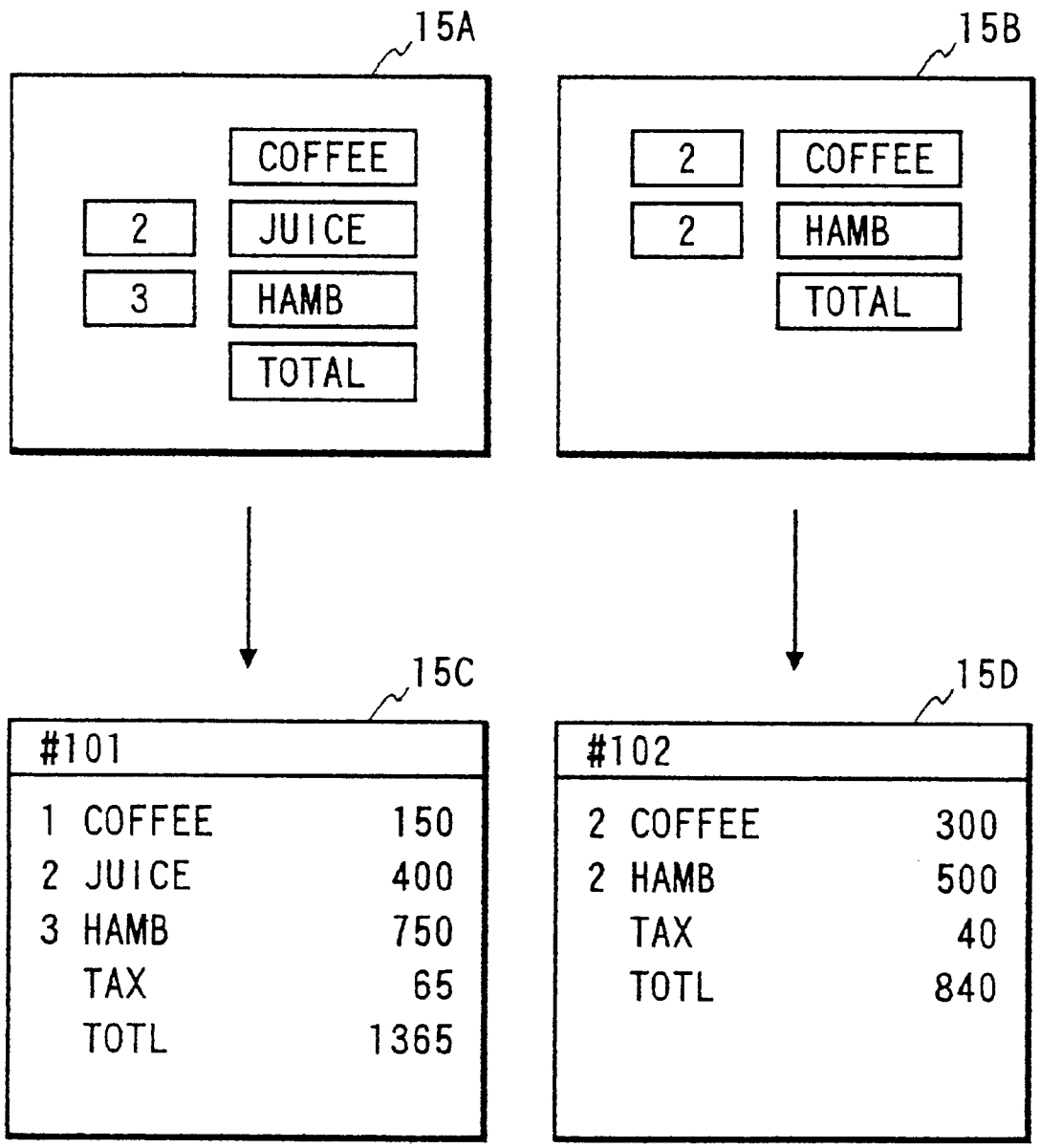
FIG. 15 is a diagram of examples of registering key operations and customer's orders in connection with the register terminal of FIG. 2.

FIG. 15 shows examples 15A and 15B of operation of the keyboard 21 which occurs when a customer's order is registered. FIG. 15 also shows examples 15C and 15D of a registered customer's order which relate to the keyboard operation 15A and the keyboard operation 15B respectively. With reference to FIG. 15, according to the key operation 15A, one "COFFEE", two "JUICE", and three "HAMB" are registered. The contents of the related customer's order 15C are indicated on the display device 24. In FIG. 15, "#101" denotes an order number (an order ID number) which is automatically issued by the register terminal 11 in a serial manner when the customer's order is registered. In FIG. 15, "1 COFFEE 150" means that one "COFFEE" is registered, and a price thereof is 150 yen. In addition, "2 JUICE 400" means that two "JUICE"s are registered, and a price thereof is 400 yen. Further, "3 HAMB 750" means that three "HAMB"s are registered, and a price thereof is 750 yen. In FIG. 15, "TAX" denotes an amount of consumption tax, and "TOTL" indicates a total sum of the prices of the registered items and the consumption tax. According to the key operation 15B, the related customer's order 15D is registered which has the order ID number "#102". The contents of the customer's order 15D are indicated on the display device 24. In FIG. 15, the customer's order with the order number "#101" is registered, and then the customer's order with the order number "#102" is registered.

Figure 16:
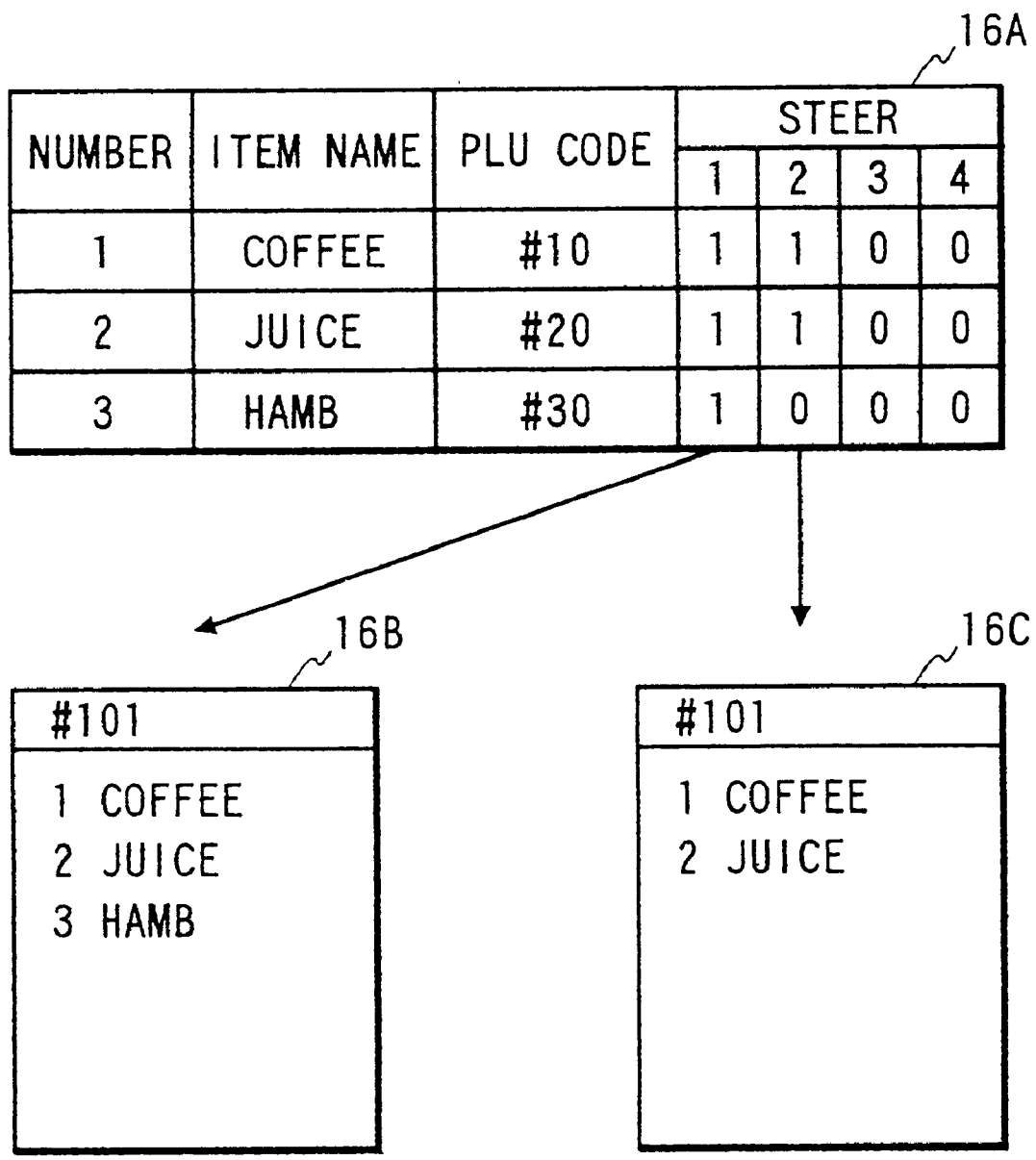
FIG. 16 is a diagram of an example of separation of a customer's order in response to destination flags (steer flags) in the first embodiment of this invention.

FIG. 16 shows the structure 16A of the customer's order #101 in FIG. 15, and the structures 16B and 16C of transmission data pieces. With reference to FIG. 16, the order data 16A which is registered in the register terminal 11 is divided or separated according to the destination information (STEER). The ordered items for which the destination information "1" (STEER 1) is set are combined into the transmission item file 16B. The ordered items for which the destination information "2" (STEER 2) is set are combined into the transmission item file 16C. The transmission item files 16B and 16C are of a format suited to transmission to the kitchen video controller 12.

Figure 17:
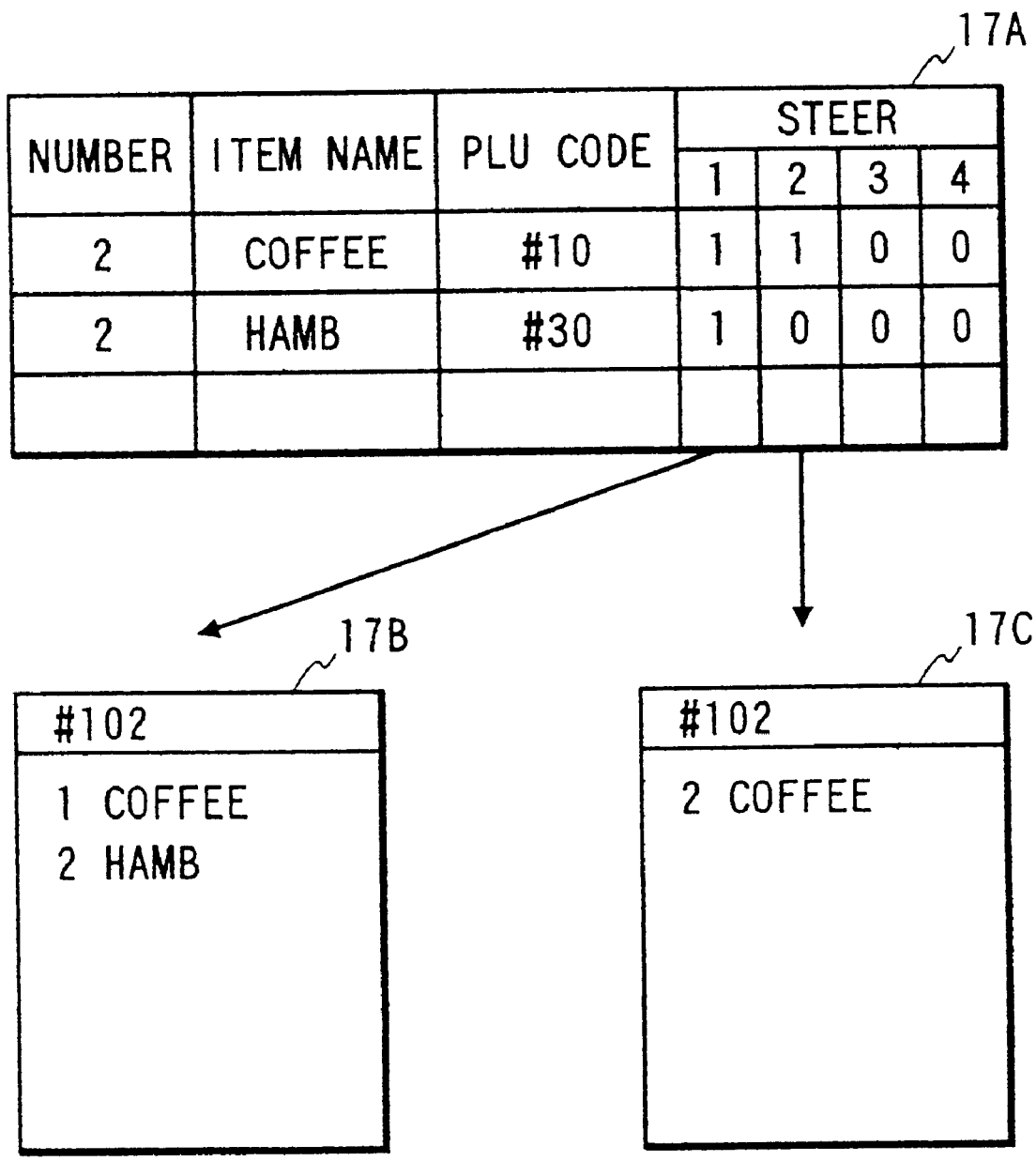
FIG. 17 is a diagram of another example of separation of a customer's order in response to destination flags (steer flags) in the first embodiment of this invention.

FIG. 17 shows the structure 17A of the customer's order #102 in FIG. 15, and the structures 17B and 17C of transmission data pieces. With reference to FIG. 17, the order data 17A which is registered in the register terminal 11 is divided or separated according to the destination information (STEER). The ordered items for which the destination information "1" (STEER 1) is set are combined into the transmission item file 17B. The ordered items for which the destination information "2" (STEER 2) is set are combined into the transmission item file 17C. The transmission item files 17B and 17C are of a format suited to transmission to the kitchen video controller 12.

Figure 18:
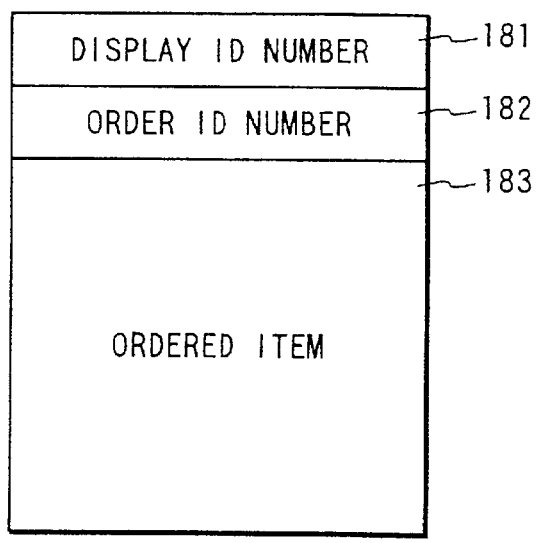
FIG. 18 is a diagram of an order file transmitted from the register terminal to the kitchen video controller in the first embodiment of this invention.

FIG. 18 shows the structure of a transmission order file used in the transmission of a registered customer's order from the register terminal 11 to the kitchen video controller 12. As shown in FIG. 18, the transmission order file has an area 181 for storing information of a display ID number, an area 182 for storing information of an order ID number, and an area 183 for storing information of ordered items. Upon every operation of the keyboard 21 which corresponds to "totalization" and which represents an end of a customer's order, the register terminal 11 sequentially transmits order data pieces of a format corresponding to the previously-indicated transmission file structure to the kitchen video controller 12. The transmitted order data pieces are indicated on the display devices 13 and 15.

With reference to FIGS. 16, 17, and 18, the transmission item files 16B, 16C, 17B, and 17C are stored in the order number area 182 and the ordered item area 183. A display ID number corresponding to every order item destination information is determined by referring to the display number setting table of FIG. 10, and information of the determined display ID number is stored into the display number area 181. Then, the transmission order file is transmitted to the kitchen video controller 12.

Figure 19:
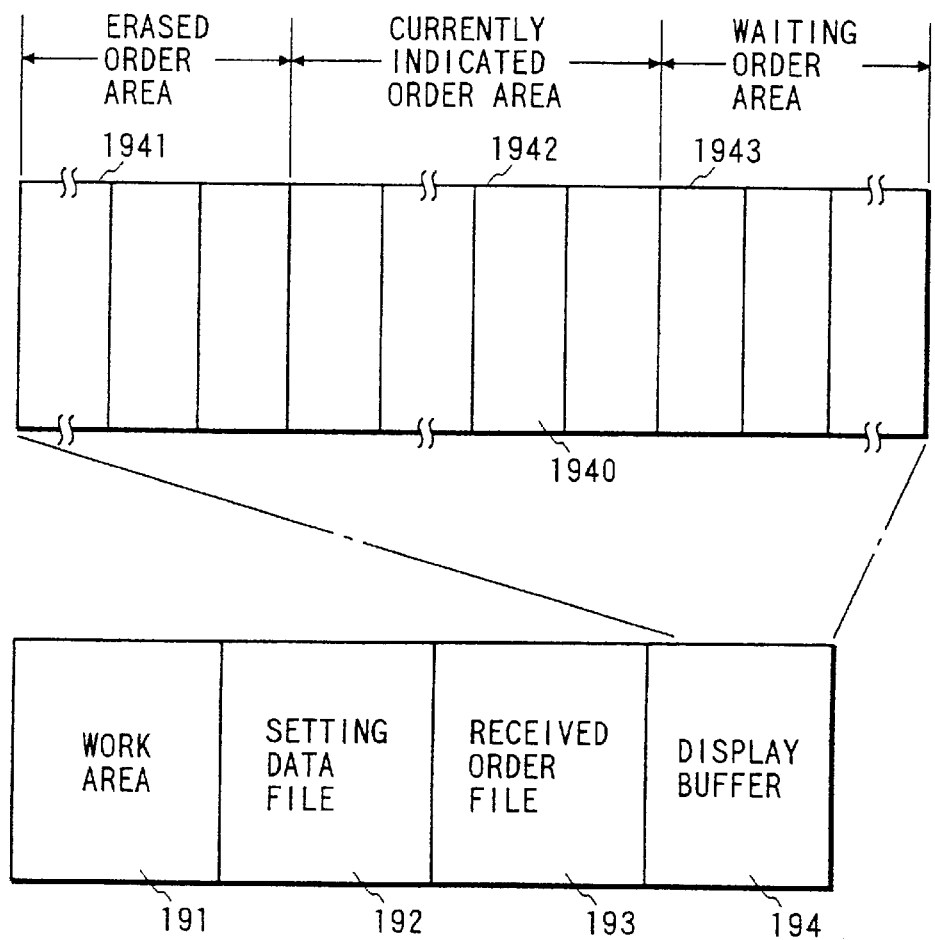
FIG. 19 is a diagram of the structure of a memory in the kitchen video controller of FIG. 4.

FIG. 19 shows the structure of an information recording area in the memory 46 within the kitchen video controller 12. As shown in FIG. 19, the memory 46 is provided with a work area 191, a setting data file 192, a received order file 193, and a display buffer 194. The work area 191 is used for the control of the kitchen video controller 12. Setting data for the control of the kitchen video controller 12 is generated by the register terminal 11, and is transmitted from the register terminal 11 to the kitchen video controller 12 via the data communication line 17. The setting data file 192 stores the transmitted setting data. The received order file 193 stores order data transmitted from the register terminal 11. The display buffer 194 is used to enable data pieces in the received order file 193 to be sequentially indicated by the display device 13 or 15. The display buffer 194 has a set of unit segments 1940 each corresponding to an indication area on the screen of the display device 13 or 15. The display buffer 194 is divided into an order area 1941 storing information which has been erased, an order area 1942 storing information which is currently indicated, and an order area 1943 storing information which will be indicated later. The order area 1941 for the erased information is of the fast-in fast-out structure. The order area 1941 for the erased information serves as a save area for the erased information which is used in recalling the erased information and confirming the erased information.

Figure 20:
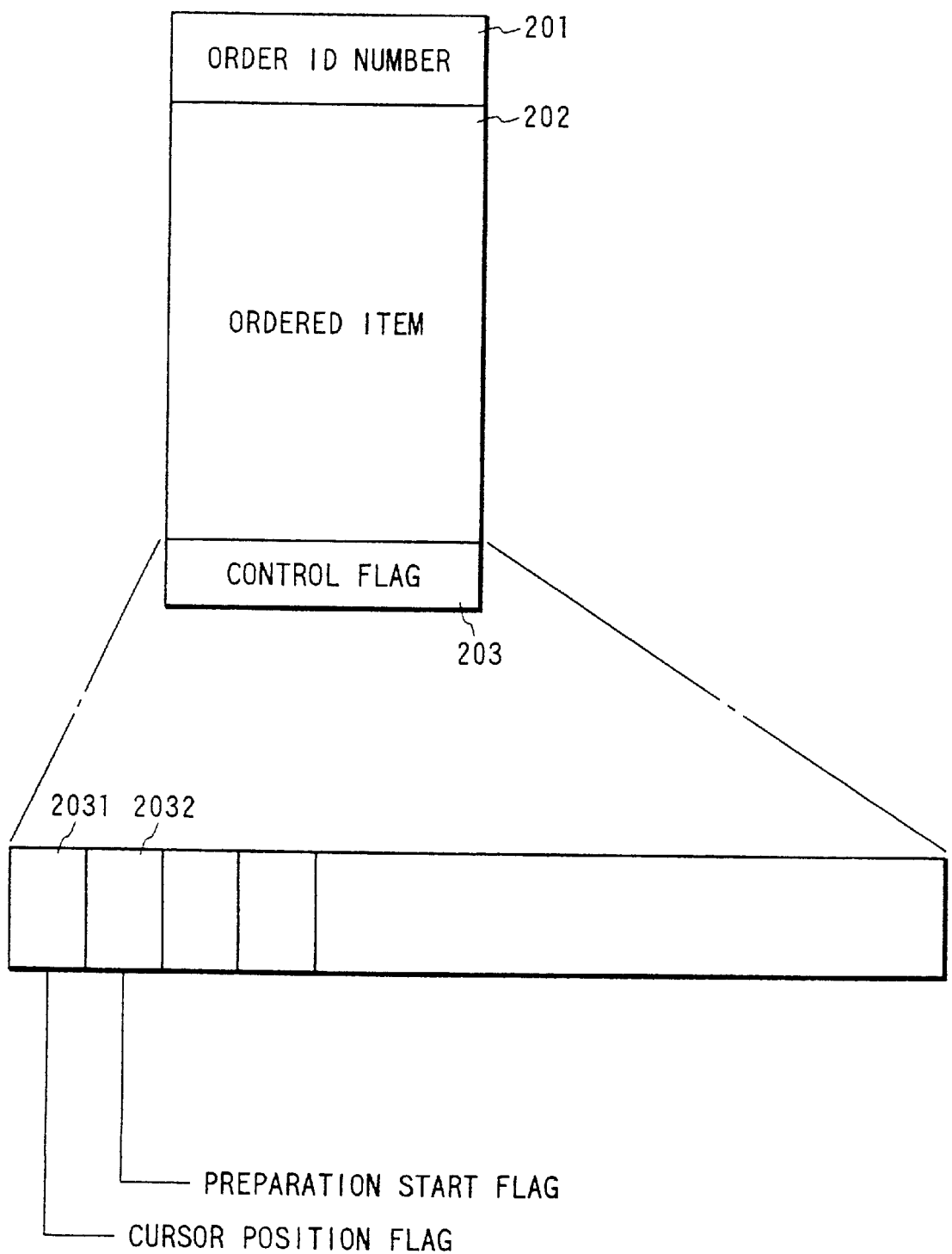
FIG. 20 is a diagram of segment data in a display buffer provided in the kitchen video controller memory of FIG. 19.

FIG. 20 shows the structure of segment data stored in the display buffer 194. As shown in FIG. 20, the segment data has an order ID number area 201, an ordered item area 202, and a control flag area 203. The control flag area 203 stores flags used in the control of the indication of a customer's order. The stored flags include a cursor position flag 2031 and a preparation start flag 2032. The cursor position flag 2031 represents the position of a cursor which is moved in response to actuation of the shift keys 51 and 52 in the monitor control switch 14 or 16. The preparation start flag 2032 is set by actuation of the preparation start key 53 in the monitor control switch 14 or 16.

Figure 21:
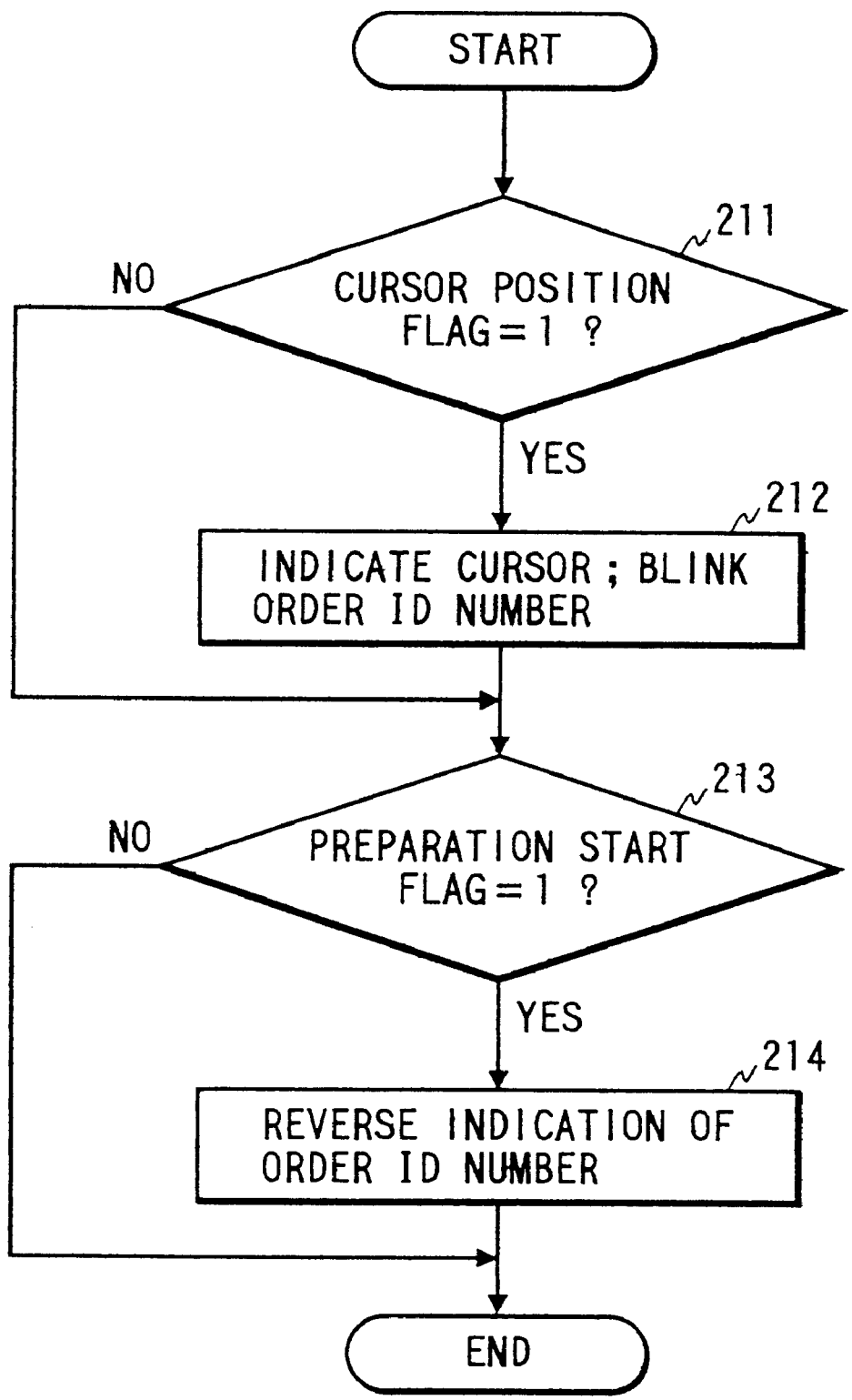
FIG. 21 is a flowchart of a segment of a program for controlling the kitchen video controller in FIG. 4 which relates to display buffer control flags.

FIG. 21 is a flowchart of a program for processing the previously-indicated control flags. As shown in FIG. 21, a first step 211 of the program decides whether or not the cursor position flag is "1" (corresponding to a set state). When the cursor position flag is "1", the program advances from the step 211 to a step 212. Otherwise, the program advances from the step 211 to a step 213.

The step 212 blinks the corresponding indicated order number to implement the indication of the cursor position.

The step 213 decides whether or not the preparation start flag is "1" (corresponding to a set state). When the preparation start flag is "1", the program advances from the step 213 to a step 214. Otherwise, the program exits from the step 213, and then the current execution cycle of the program ends. The step 214 enables the corresponding order number to be indicated in a reverse manner. After the step 214, the current execution cycle of the program ends.

FIG. 22 shows examples 22A, 22B, and 22C of pictures indicated on the display device 13 connected to the kitchen video controller 12. Ordered items in the previously-mentioned transmission item files 16B and 17B are indicated on the display device 13 in a manner such as shown in FIG. 22. In the picture 22A, the order ID number is blinked as an indication of the cursor position. The cursor position is moved leftward and rightward by actuation of the left-hand shift key 51 and the right-hand shift key 52 in the monitor control switch 14 respectively.

A person in charge of preparation for a response to a customer's order is invited to actuate the preparation start key 53 in the monitor control switch 14 (or 16) before starting the preparation. The actuation of the preparation start key 53 changes the picture 22A to the picture 22B in which the order number "#101" is indicated in a reverse manner while being blinked. The reverse indication of the order number "#101" prevents duplicate responses to the single customer's order from being prepared. Immediately after the preparation for a response to the customer's order is completed, the person in charge of preparation is invited to actuate the order erasion key 54 in the monitor control switch 14 to erase the contents of the order "#101" from the display device 13. Accordingly, the picture 22B is replaced by the picture 22C in which the order number "#102" is blinked.

Figures 23, 24:
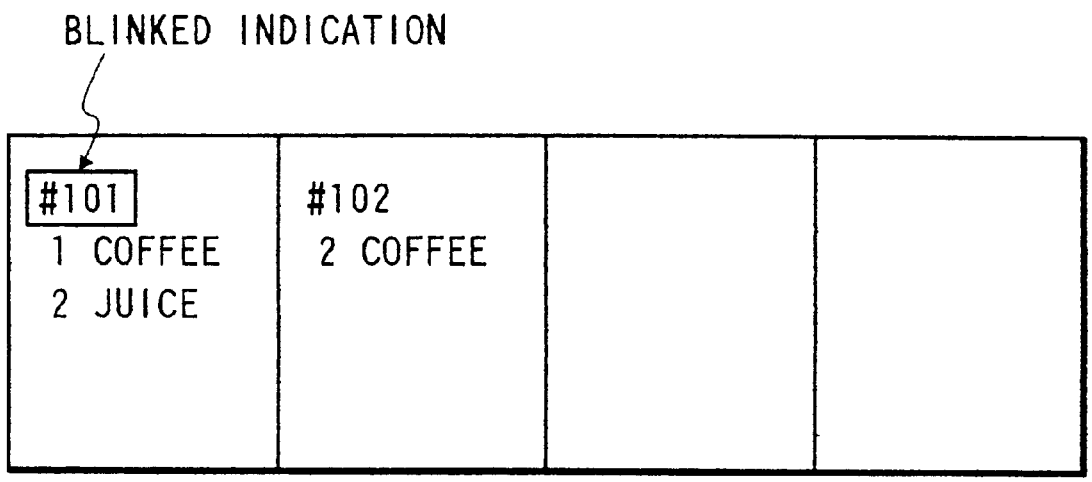
FIG. 23 is a diagram of a picture on a display device in the kitchen video controller of FIG. 4.
FIG. 24 is a diagram of a picture on a display device in a register terminal which operates in a kitchen video setting mode according to a second embodiment of this invention.

FIG. 23 shows an example of a picture indicated on the display device 15 connected to the kitchen video controller 12. Control of the information indicated on the display device 15 is similar to the previously-mentioned control of the information indicated on the display device 13. Ordered items in the previously-mentioned transmission item files 16C and 17C are indicated on the display device 15 in a manner such as shown in FIG. 23. According to the picture example in FIG. 23, the order ID number is blinked as an indication of the cursor position.

The STEER 2 is set for every ordered item corresponding to drink, and the STEER 1 is set for every ordered item. Accordingly, ordered items corresponding to drinks can be prepared by monitoring the display device 15. All items in every customer's order are indicated on the display device 13. Therefore, the display device 13 can be used for dishing completed items onto a tray or packing the completed items.

Second Embodiment

A second embodiment of this invention is similar to the first embodiment thereof except for an additional arrangement described later. Regarding the format of an indicated picture on the display device 13 or 15, the second embodiment is provided with the function of setting the segment division number related to the indicated picture for simultaneous indication of plural customer's orders. In the case where a customer's order exceeds the indication capacity of a unit display segment, a message "CONT→" is indicated while the indication of the customer's order is extended from the corresponding display segment into a next display segment. The message "CONT→" represents that the indication of the customer's order extends beyond the unit display segment.

Regarding such a lengthy customer's order, the indication of the customer's order is erased from the picture on the display device 13 and 15 by actuating the monitor control switch 14 or 16 under conditions where all the related order data is indicated on the display device 13 or 15.

When the mode switch 23 in the register terminal 11 is moved to the setting mode position (P), the setting task menu in FIG. 11 is indicated on the display device 24. Upon operation of the keyboard 21 which corresponds to "60" (totalization), a "KITCHEN VIDEO" setting stage 60 is selected. Then, the "KITCHEN VIDEO PROG" menu in FIG. 12 is indicated on the display device 24. When operation of the keyboard 21 which corresponds to "2" (totalization) is executed, a setting state "VIDEO MODE" is selected which relates to a kitchen video operation mode.

FIG. 24 shows an example of a setting picture related to an indication status and an indication mode of the kitchen video. In FIG. 24, "FIELD 1" denotes a setting area for the kitchen video indication mode, and "FIELD 2" denotes a setting area for the kitchen video indication status. Here, "FIELD 1" of "VIDEO #2 (display device #2)" is designated by operating the keyboard 21, and the keyboard 21 is subjected to operation corresponding to "21" (SBTL). Subsequently, the indication format (the segment division number) related to "KVS #2" is set by operation of the keyboard 21 which corresponds to "segment division mode #" (totalization). For example, one can be selected out of the 4-segment indication format and the 8-segment indication format.

Figure 25:
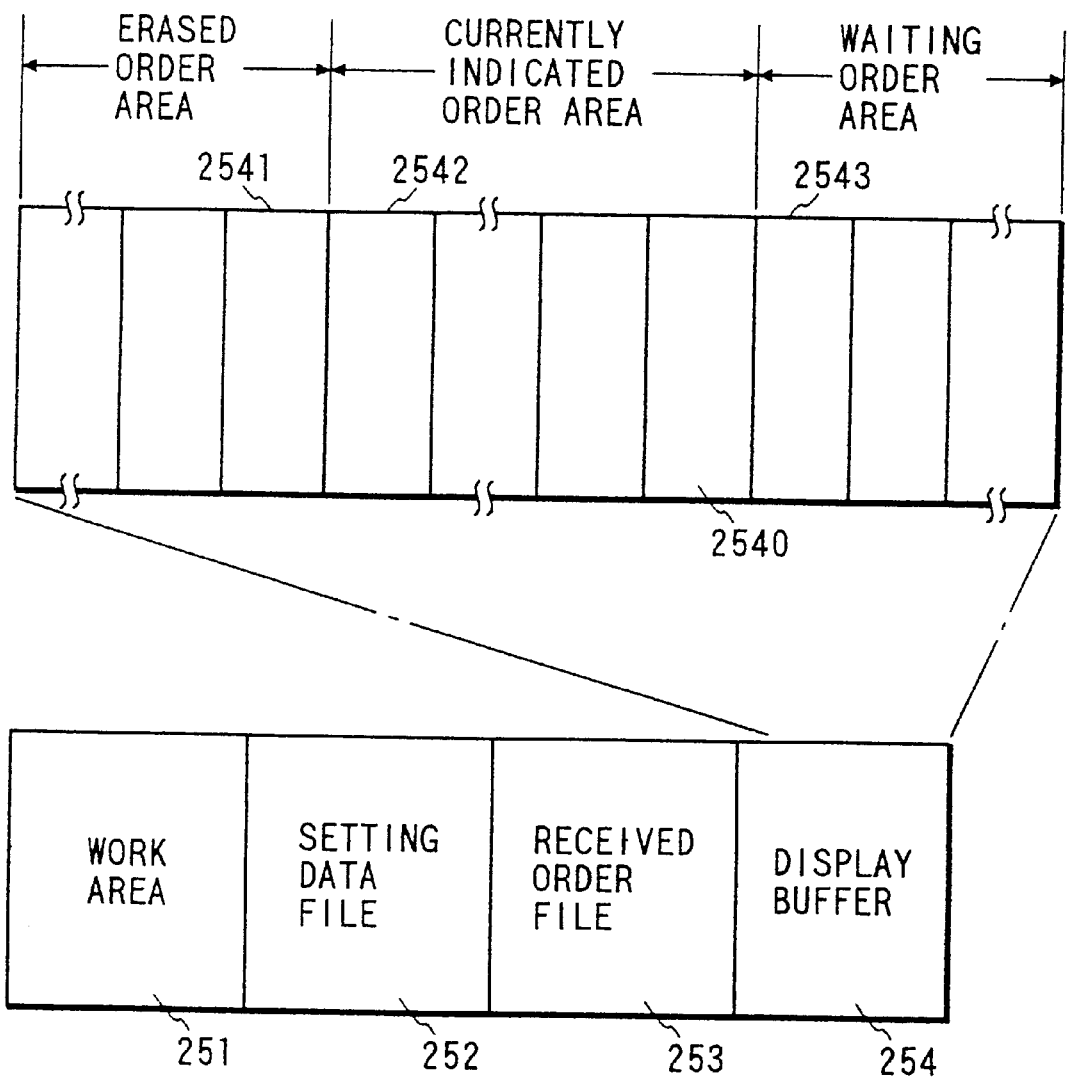
FIG. 25 is a diagram of the structure of a memory in a kitchen video controller in the second embodiment of this invention.

FIG. 25 shows the structure of an information recording area in the memory 46 within the kitchen video controller 12. As shown in FIG. 25, for each of the display devices 13 and 15, the memory 46 is provided with a work area 251, a setting data file 252, a received order file 253, and a display buffer 254. The work area 251 is used for the control of the kitchen video controller 12. Setting data for the control of the kitchen video controller 12 is generated by the register terminal 11, and is transmitted from the register terminal 11 to the kitchen video controller 12 via the data communication line 17. The setting data file 252 stores the transmitted setting data. The received order file 253 stores order data transmitted from the register terminal 11. The display buffer 254 is used to enable data pieces in the received order file 253 to be sequentially indicated by the display device 13 or 15. The display buffer 254 has a set of unit segments 2540 each corresponding to an indication area on the screen of the display device 13 or 15. The display buffer 254 is divided into an order area 2541 storing information which has been erased, an order area 2542 storing information which is currently indicated, and an order area 2543 storing information which will be indicated later. The order area 2541 for the erased information is of the fast-in fast-out structure. The order area 2541 for the erased information serves as a save area for the erased information which is used in recalling the erased information and confirming the erased information.

Figure 26:
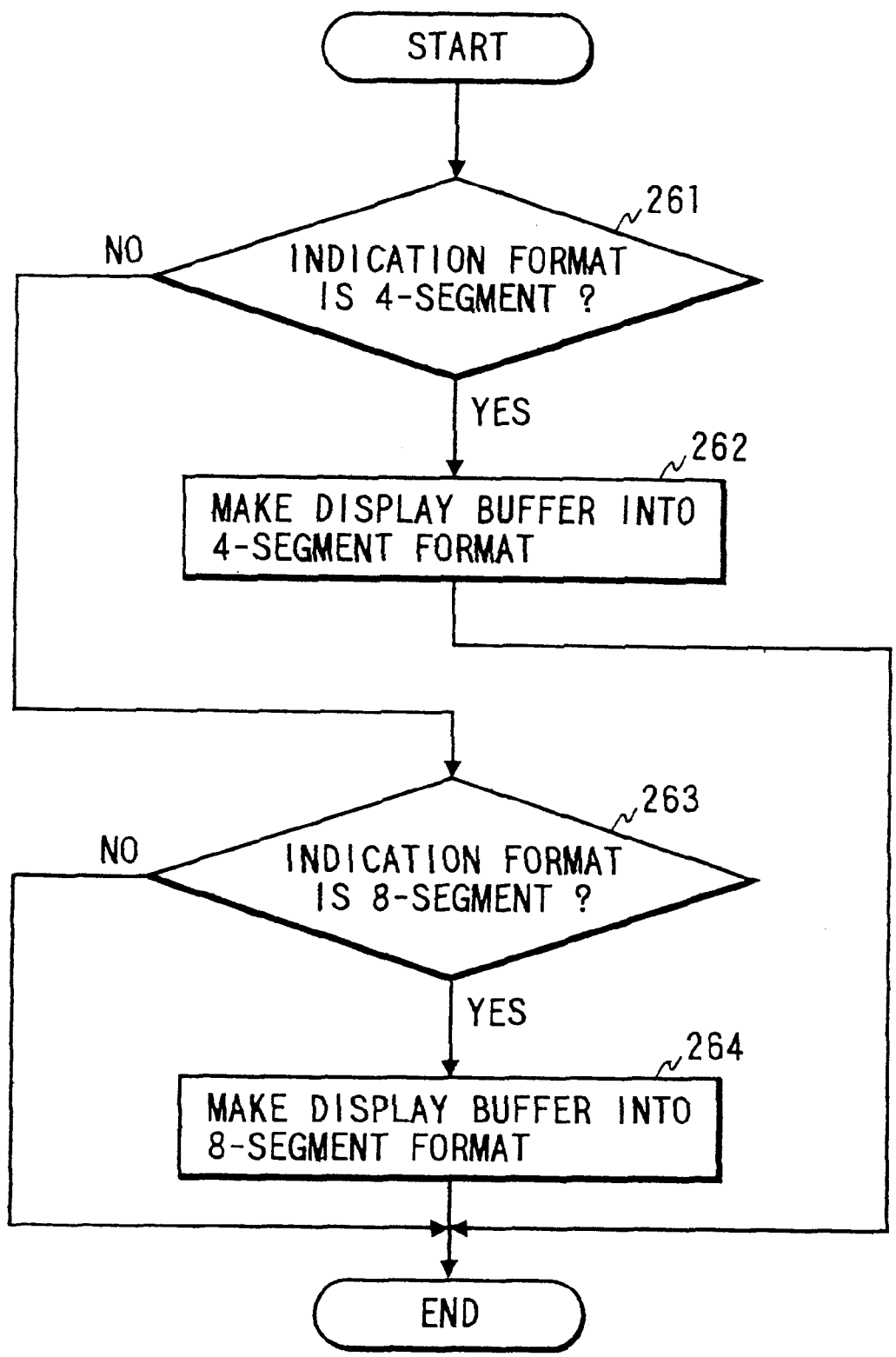
FIG. 26 is a flowchart of a segment of a program for controlling the kitchen video controller which is designed to decide the structure of a display buffer in the second embodiment of this invention.

FIG. 26 is a flowchart of a program for setting the indication format. As shown in FIG. 26, a first step 261 of the program decides whether or not a required indication format agrees with the 4-segment indication format. When the required indication format agrees with the 4-segment indication format, the program advances from the step 261 to a step 262. Otherwise, the program advances from the step 261 to a step 263. The step 262 sets the display buffer 254 into agreement with the 4-segment indication format. After the step 262, the current execution cycle of the program ends.

The step 263 decides whether or not the required indication format agrees with the 8-segment indication format. When the required indication format agrees with the 8-segment indication format, the program advances from the step 263 to a step 264. Otherwise, the program exits from the step 263, and then the current execution cycle of the program ends. The step 264 sets the display buffer 254 into agreement with the 8-segment indication format. After the step 264, the current execution cycle of the program ends.

Figure 27:
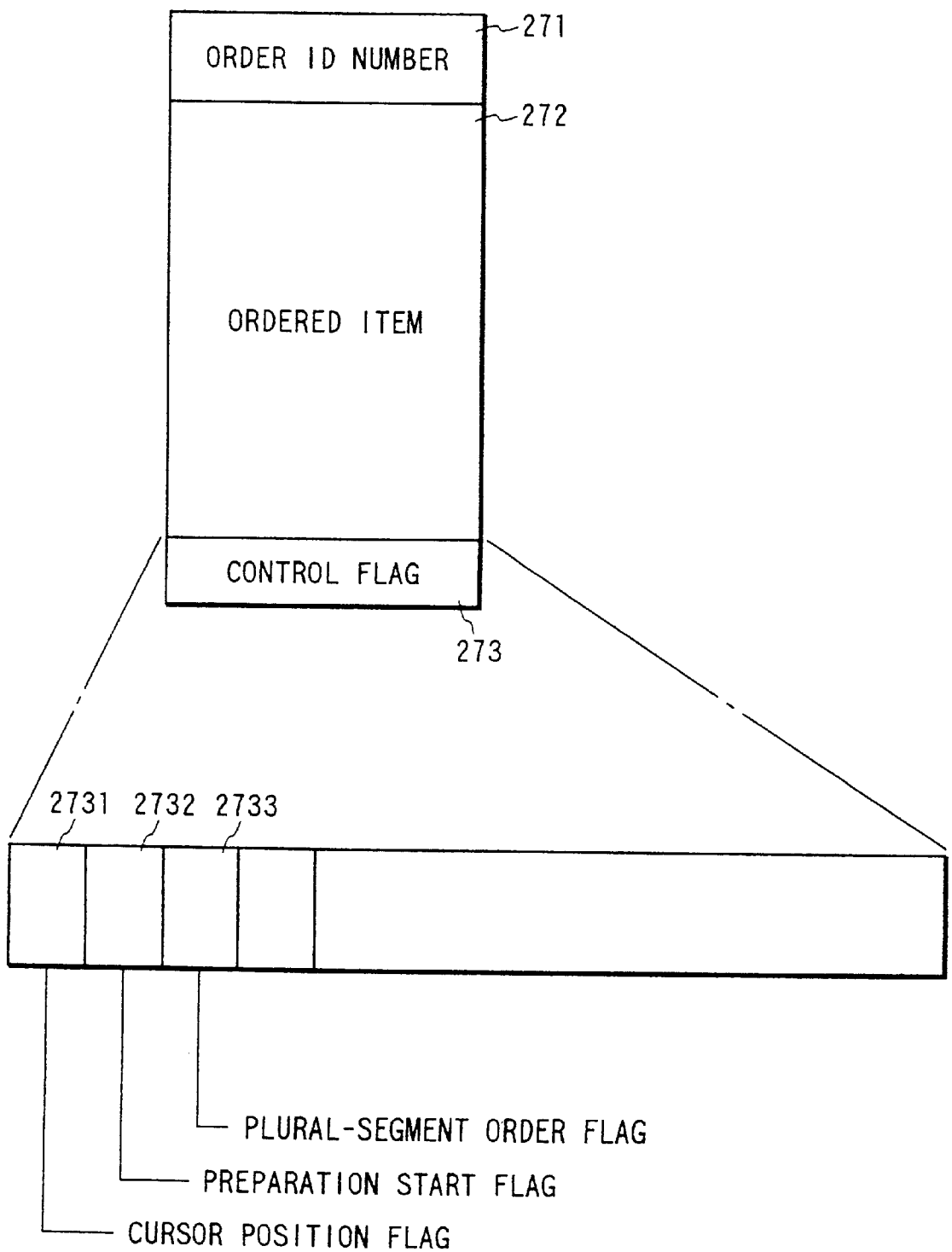
FIG. 27 is a diagram of segment data in a display buffer provided in the kitchen video controller memory of FIG. 25.

FIG. 27 shows the structure of segment data stored in the display buffer 254. As shown in FIG. 27, the segment data has an order number area 271, an ordered item area 272, and a control flag area 273. The control flag area 273 stores flags used in the control of the indication of a customer's order. The stored flags include a cursor position flag 2731, a preparation start flag 2732, and a plural-segment order flag 2733. During movement of the cursor position by actuating the shift keys 51 and 52 in the monitor control switch 14 or 16, the cursor position flag 2731 is set when the cursor comes to the corresponding display segment. The preparation start flag 2732 is set by actuation of the preparation start key 53 in the monitor control switch 14 or 16. The plural-segment order flag 2733 represents whether or not ordered items designated by a single order can not be placed within the corresponding display segment.

Figure 28:
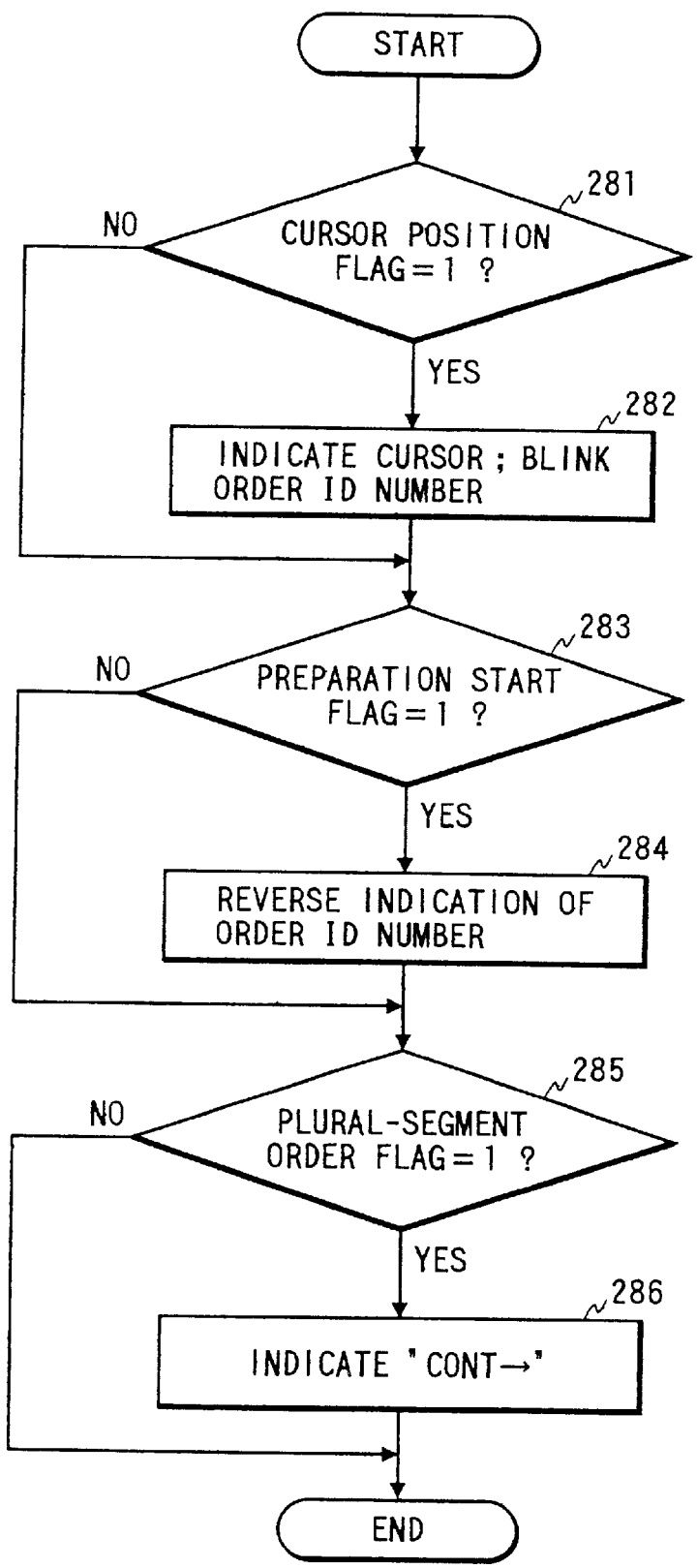
FIG. 28 is a flowchart of a segment of a program for controlling the kitchen video controller which relates to display buffer control flags in the second embodiment of this invention.

FIG. 28 is a flowchart of a program corresponding to processes responsive to the previously-mentioned control flags. As shown in FIG. 28, a first step 281 of the program decides whether or not the cursor position flag 2731 is "1" (corresponding to a set state). When the cursor position flag 2731 is "1", the program advances from the step 281 to a step 282. Otherwise, the program advances from the step 281 to a step 283. The step 282 blinks the indication of the order ID number to implement the cursor indication. After the step 282, the program advances to the step 283.

The step 283 decides whether or not the preparation start flag 2732 is "1" (corresponding to a set state). When the preparation start flag 2732 is "1", the program advances from the step 283 to a step 284. Otherwise, the program advances from the step 283 to a step 285. The step 284 enables the indication of the order ID number to be in a reverse manner. After the step 284, the program advances to the step 285.

The step 285 decides whether or not the plural-segment order flag 2733 is "1" (corresponding to a set state). When the plural-segment order flag 2733 is "1", the program advances from the step 285 to a step 286. Otherwise, the program exits from the step 285, and then the current execution cycle of the program ends. The step 286 enables the indication of "CONT→". After the step 286, the current execution cycle of the program ends.

FIG. 29(a) shows an example of a picture displayed according to the indication format of the 4-segment type. FIG. 29(b) shows an example of a picture displayed according to the indication format of the 8-segment type. In the 4-segment indication of FIG. 29(a), all items of each of customer's orders are contained in a corresponding display segment. In the 8-segment indication of FIG. 29(b), items of the customer's order "#101" overflow from the first display segment into the second display segment while the message "CONT→" is indicated at the bottom of the first display segment. All the items of the customer's order "#101" are indicated on the two display segments. Such a customer's order is referred to as a first-type overflow customer's order. In the 8-segment indication of FIG. 29(b), a part of items of the customer's order "#107" fully occupies the eighth display segment while the remaining part thereof is not indicated. Such a customer's order is referred to as a second-type overflow customer's order. The indication of the first-type overflow customer's order can be erased from the picture on the display device 13 or 15 by actuating the order erasion key 54 in the monitor control switch 14 or 16. On the other hand, the indication of the second-type overflow customer's order is inhibited from being erased from the picture on the display device 13 or 15.

Figure 30:
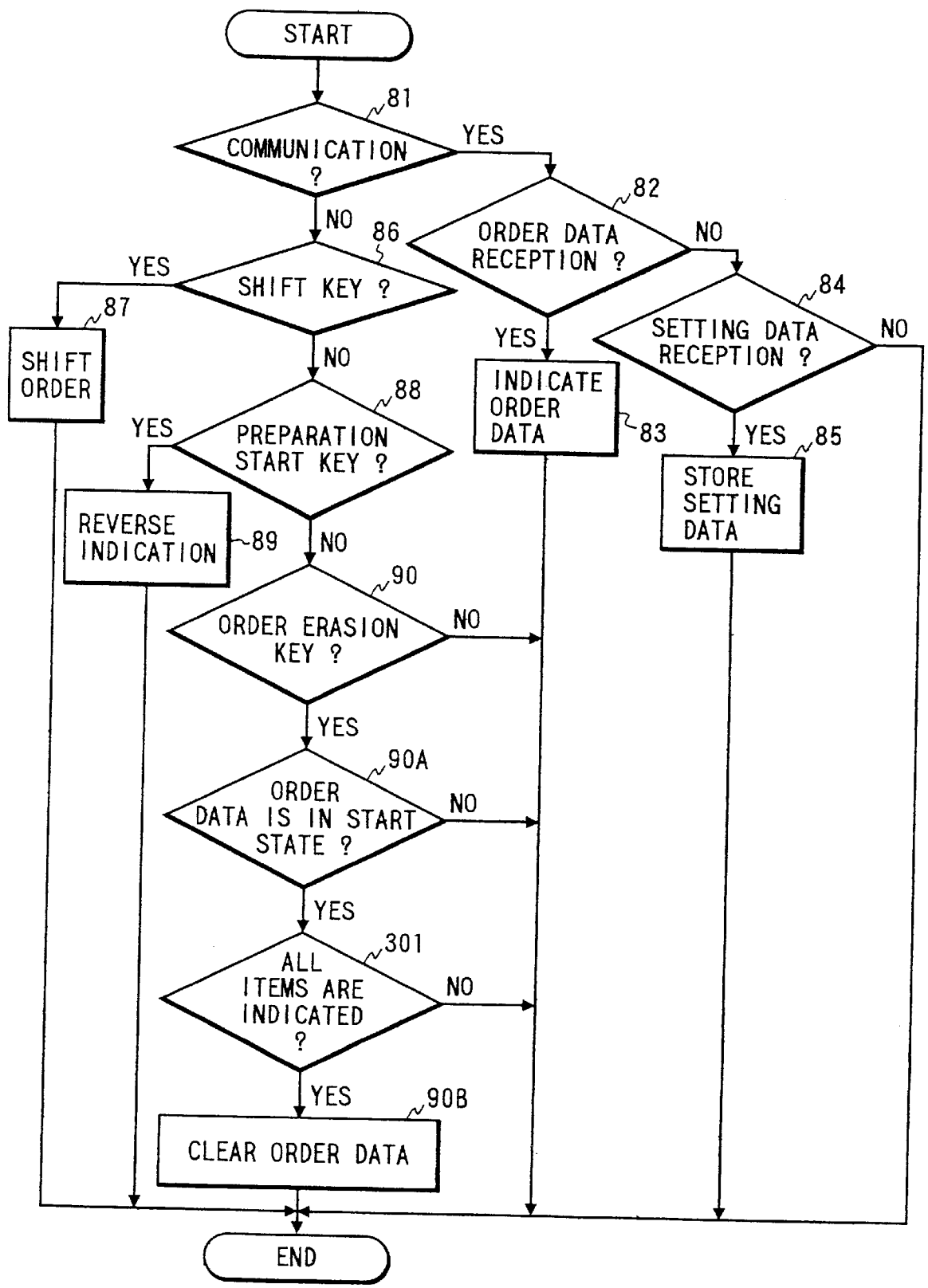
FIG. 30 is a flowchart of a segment of a program for controlling operation of the kitchen video controller in the second embodiment of this invention.

FIG. 30 is a flowchart of a program controlling the task processing executed by the kitchen video controller 12. The program in FIG. 30 is similar to the program in FIG. 8 except that a block 301 is added. As shown in FIG. 30, the block 301 follows the step 90A. The block 301 decides whether or not all items of order data in question (all items of a customer's order in question) are indicated. When the all items are indicated, the program advances from the block 301 to the step 90B. Otherwise, the program exits from the block 301, and then the current execution cycle of the program ends.

Figure 31:
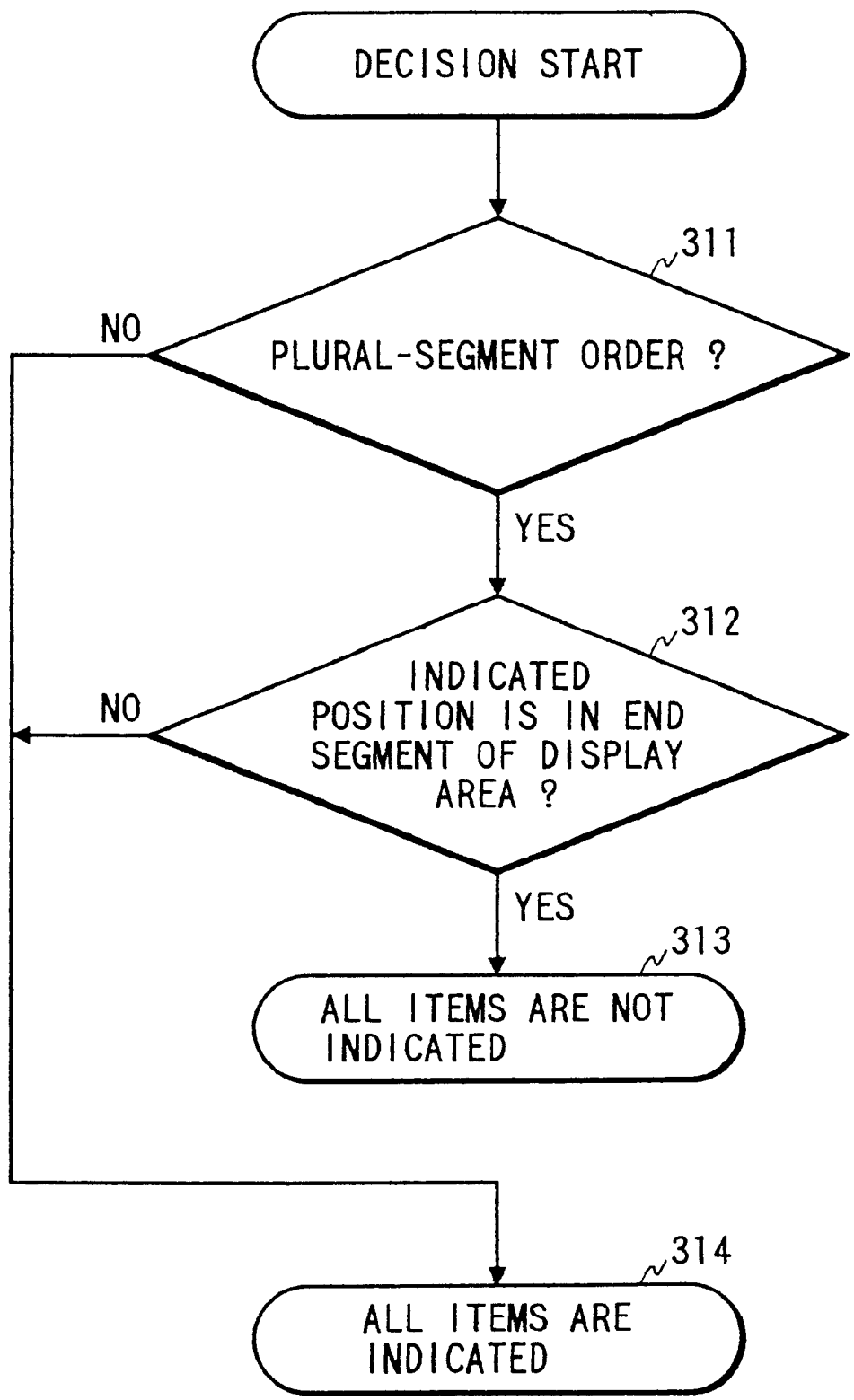
FIG. 31 is a flowchart of a segment of a program for controlling operation of the kitchen video controller which relates to a decision regarding indication of items in a customer's order in the second embodiment of this invention.

FIG. 31 shows the details of the block 301 in FIG. 30. As shown in FIG. 31, the block 301 includes a step 311 following the step 90A. The step 311 decides whether or not the customer's order in question corresponds to a plurality of display segments. When the customer's order in question corresponds to a plurality of display segments, the program advances from the step 311 to a step 312. Otherwise, the program exits from the step 311, and it is decided at a step 314 that all the items of the customer's order in question are indicated. The step 312 decides whether or not the position of the indication of the customer's order in question corresponds to the final display segment. When the position of the indication corresponds to the final display segment, the program exits from the step 312 and it is decided at a step 313 that at least part of the items of the customer's order is not indicated. When the position of the indication does not correspond to the final display segment, the program exits from the step 312 and it is decided at the step 314 that all the items of the customer's order in question are indicated.

Third Embodiment

A third embodiment of this invention is similar to the first embodiment thereof except for an additional arrangement described later. Regarding the format of an indicated picture on the display device 13 or 15 which is provided by the kitchen video controller 12, the third embodiment is provided with the function of setting an uneven segment-division indication format where customer's orders are indicated in a condensed manner.

When the mode switch 23 in the register terminal 11 is moved to the setting mode position (P), a setting task menu similar to that in FIG. 11 is indicated on the display device 24. Upon operation of the keyboard 21 which corresponds to "60" (totalization), a "KITCHEN VIDEO" setting stage 60 is selected. Then, a "KITCHEN VIDEO PROG" menu similar to that in FIG. 12 is indicated on the display device 24. When operation of the keyboard 21 which corresponds to "2" (totalization) is executed, a setting state "VIDEO MODE" is selected which relates to a kitchen video operation mode.

FIG. 32 shows an example of a setting picture related to an indication status and an indication mode of the kitchen video. In FIG. 32, "FIELD 1" denotes a setting area for the kitchen video indication mode, and "FIELD 2" denotes a setting area for the kitchen video indication status. Here, "FIELD 1" of "VIDEO #2 (display device #2)" is designated by operating the keyboard 21, and the keyboard 21 is subjected to operation corresponding to "21" (SBTL). Subsequently, the indication format (the segment division number) related to "KVS #2" is set by operation of the keyboard 21 which corresponds to "segment division mode #" (totalization). In uneven (condensed) indication format is selected. According to the uneven (condensed) indication format, customer's orders are sequentially indicated without spaces provided therebetween. The uneven (condensed) indication format enables the indication of more customer's orders than those indicated according to the even segment-division indication format in the second embodiment of this invention.

Figure 33:
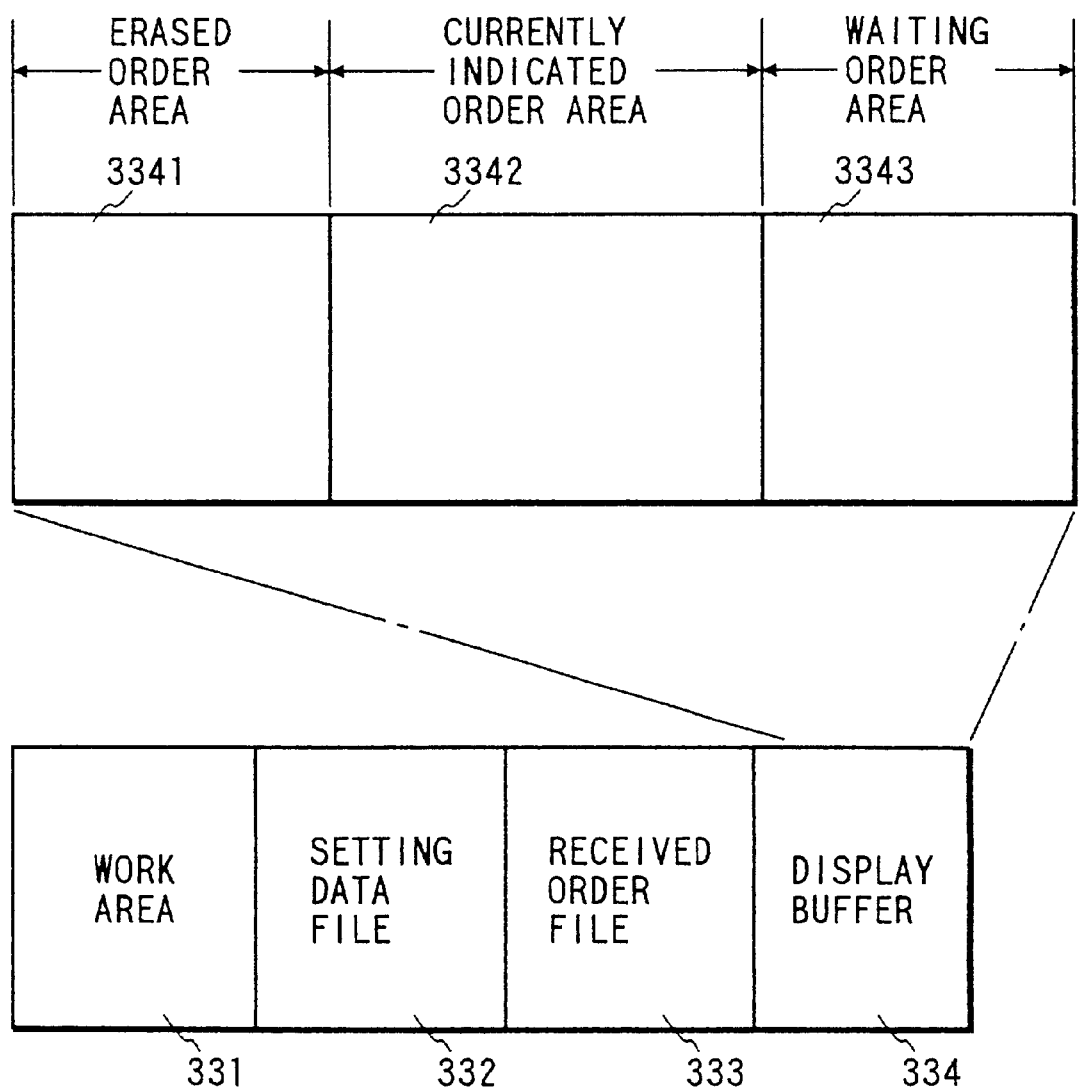
FIG. 33 is a diagram of the structure of a memory in a kitchen video controller in the third embodiment of this invention.

FIG. 33 shows the structure of an information recording area in the memory 46 within the kitchen video controller 12. As shown in FIG. 33, for each of the display devices 13 and 15, the memory 46 is provided with a work area 331, a setting data file 332, a received order file 333, and a display buffer 334. The work area 331 is used for the control of the kitchen video controller 12. Setting data for the control of the kitchen video controller 12 is generated by the register terminal 11, and is transmitted from the register terminal 11 to the kitchen video controller 12 via the data communication line 17. The setting data file 332 stores the transmitted setting data. The received order file 333 stores order data transmitted from the register terminal 11. The display buffer 334 is used to enable data pieces in the received order file 333 to be sequentially indicated by the display device 13 or 15. The display buffer 334 is divided into an order area 3341 storing information which has been erased, an order area 3342 storing information which is currently indicated, and an order area 3343 storing information which will be indicated later. The display buffer 334 is of the structure which does not have a set of unit segments each corresponding to an indication area on the screen of the display device 13 or 15. The order area 3341 for the erased information is of the fast-in fast-out structure. The order area 3341 for the erased information serves as a save area for the erased information which is used in recalling the erased information and confirming the erased information.

Figure 34:
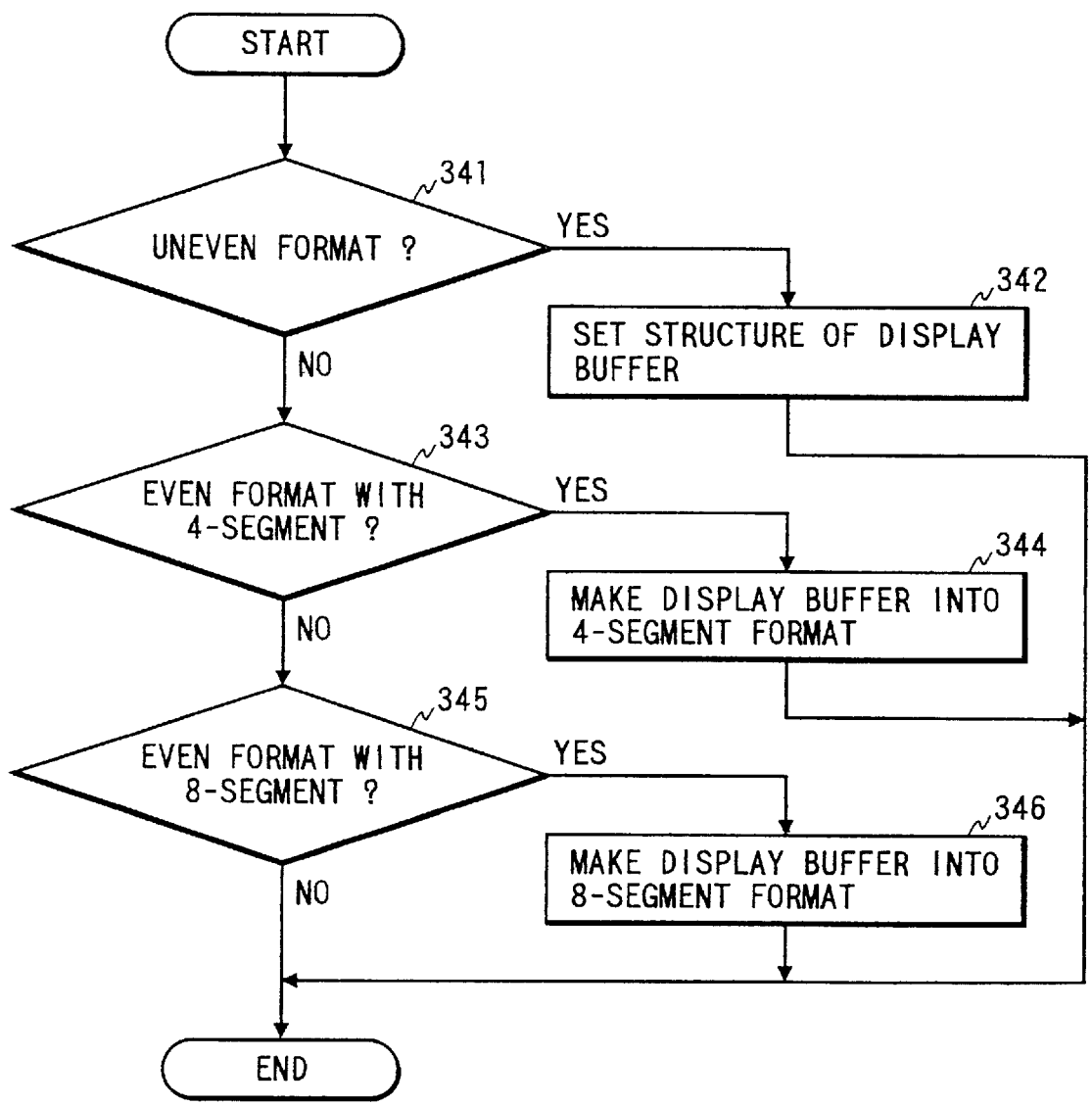
FIG. 34 is a flowchart of a segment of a program for controlling the kitchen video controller which is designed to decide the structure of a display buffer in the third embodiment of this invention.

FIG. 34 is a flowchart of a program for setting the indication format. As shown in FIG. 34, a first step 341 of the program decides whether or not a required indication format agrees with the uneven (condensed) indication format. When the required indication format agrees with the uneven (condensed) indication format, the program advances from the step 341 to a step 342. Otherwise, the program advances from the step 341 to a step 343. The step 342 sets the display buffer 334 into agreement with the uneven (condensed) indication format. After the step 342, the current execution cycle of the program ends.

The step 343 decides whether or not the required indication format agrees with the 4-segment indication format. When the required indication format agrees with the 4-segment indication format, the program advances from the step 343 to a step 344. Otherwise, the program advances from the step 343 to a step 345. The step 344 sets the display buffer 334 into agreement with the 4segment indication format. After the step 344, the current execution cycle of the program ends.

The step 345 decides whether or not the required indication format agrees with the 8-segment indication format. When the required indication format agrees with the 8-segment indication format, the program advances from the step 345 to a step 346. Otherwise, the program exits from the step 345, and then the current execution cycle of the program ends. The step 346 sets the display buffer 334 into agreement with the 8-segment indication format. After the step 346, the current execution cycle of the program ends.

Figure 35:
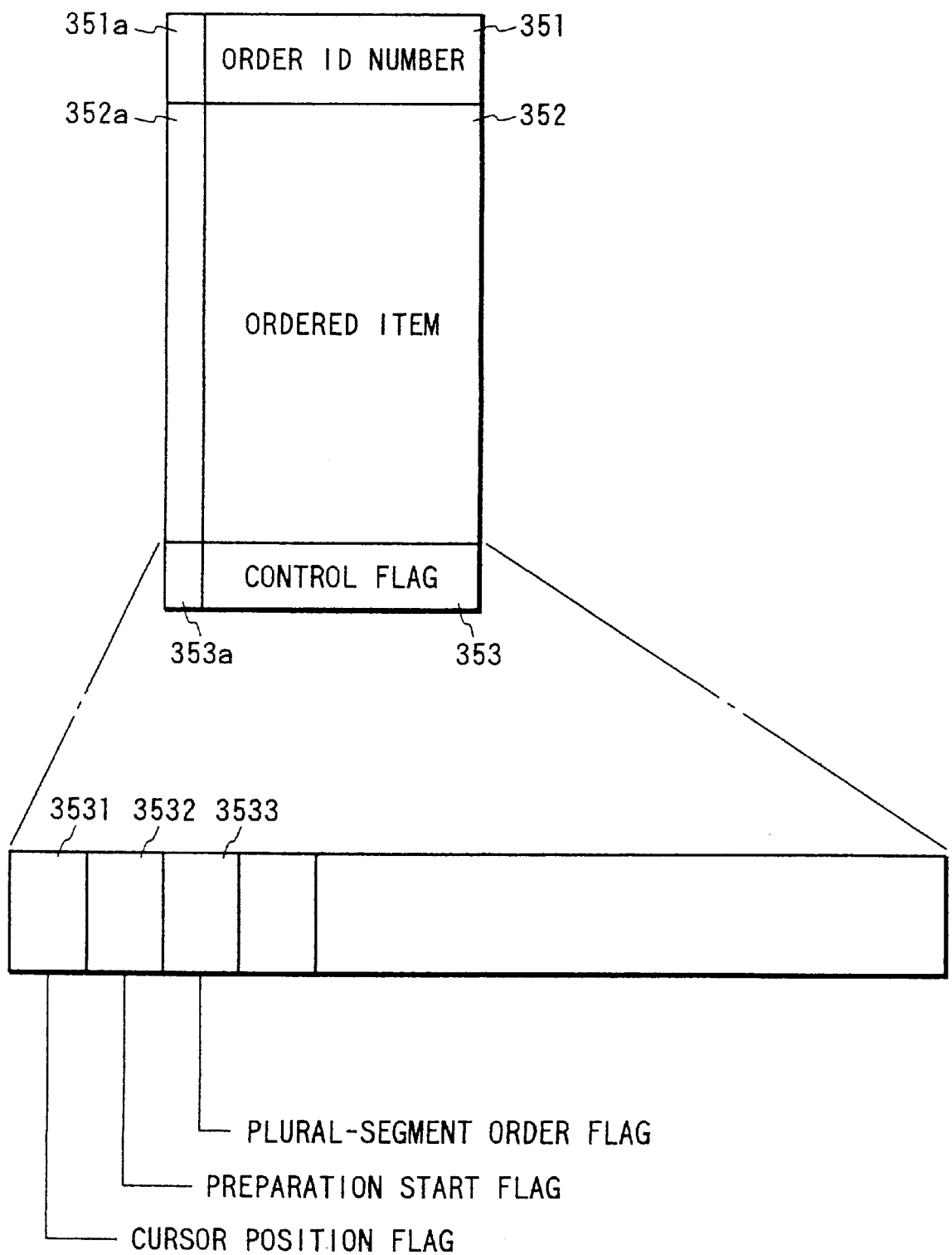
FIG. 35 is a diagram of segment data in a display buffer provided in the kitchen video controller memory of FIG. 33.

FIG. 35 shows the structure of segment data stored in the display buffer 334. As shown in FIG. 35, the segment data has an order number area 351, an ordered item area 352, and a control flag area 353. The number of ordered items in the ordered item area 352 is variable. The data length of each segment of the display buffer 334 depends on the number of ordered items. Discrimination among the ordered number area 351, the ordered item area 352, and the control flag area 353 is implemented by using ID (identification) information pieces 351a, 352a, and 353a provided in head addresses thereof. Discrimination among segments is implemented by using the ID information piece 353a in the control flag area 353. After the inputting of each customer's order is completed, segment borders are indicated in response to the discrimination among the segments. The control flag area 353 stores flags used in the control of the indication of a customer's order. The stored flags include a cursor position flag 3531, a preparation start flag 3532, and a plural-segment order flag 3533. The cursor position flag 3531 indicates the position of the cursor which is moved by actuating the shift keys 51 and 52 in the monitor control switch 14 or 16. The preparation start flag 3532 is set by actuation of the preparation start key 53 in the monitor control switch 14 or 16. The plural-segment order flag 3533 represents whether or not a part of ordered items designated by a single order can not be indicated due to an overflow.

Figure 36:
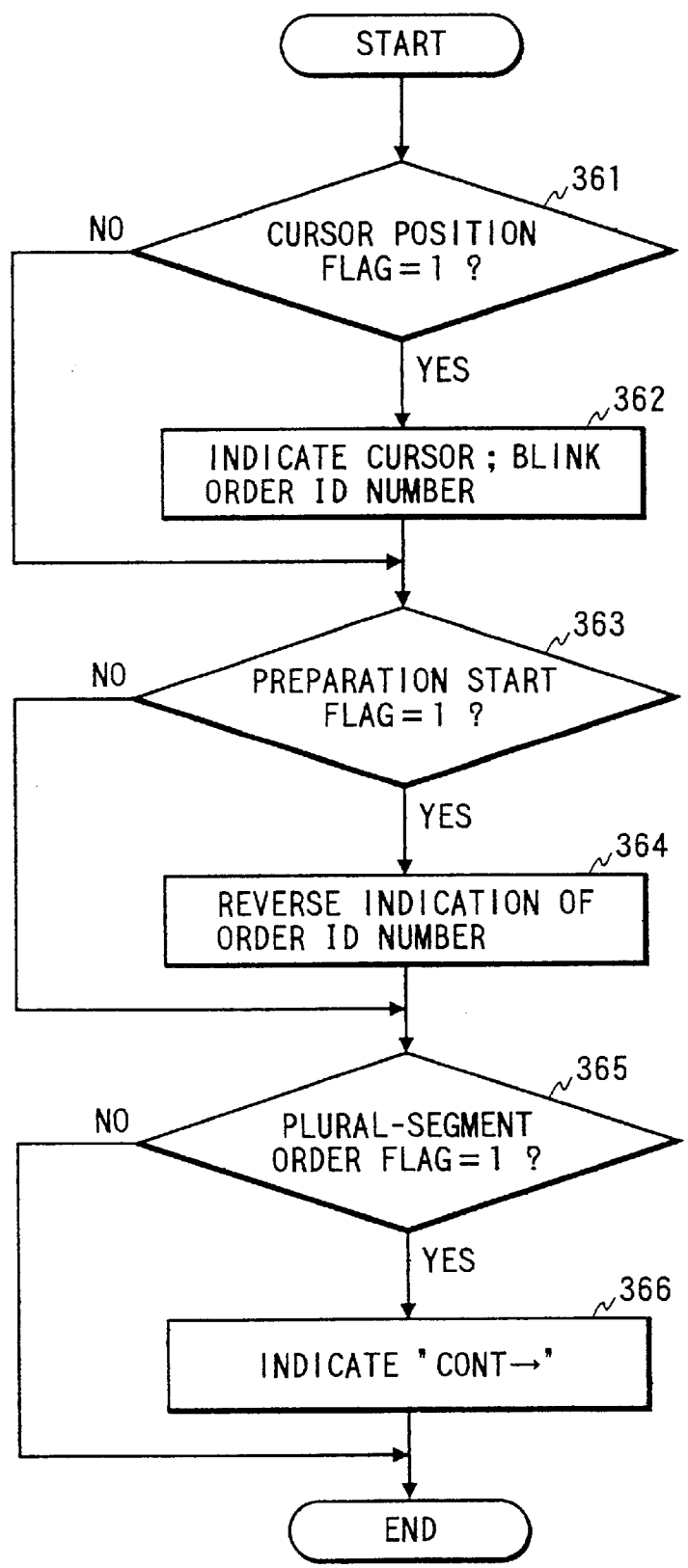
FIG. 36 is a flowchart of a segment of a program for controlling the kitchen video controller which relates to display buffer control flags in the third embodiment of this invention.

FIG. 36 is a flowchart of a program corresponding to processes responsive to the previously-mentioned control flags (353). As shown in FIG. 36, a first step 361 of the program decides whether or not the cursor position flag 3531 is "1" (corresponding to a set state). When the cursor position flag 3531 is "1", the program advances from the step 361 to a step 362. Otherwise, the program advances from the step 361 to a step 363. The step 362 blinks the indication of the order ID number to implement the cursor indication. After the step 362, the program advances to the step 363.

The step 363 decides whether or not the preparation start flag 3532 is "1" (corresponding to a set state). When the preparation start flag 3532 is "1", the program advances from the step 363 to a step 364. Otherwise, the program advances from the step 363 to a step 365. The step 364 enables the indication of the order ID number to be in a reverse manner. After the step 364, the program advances to the step 365.

The step 365 decides whether or not the plural-segment order flag 3533 is "1" (corresponding to a set state). When the plural-segment order flag 3533 is "1", the program advances from the step 365 to a step 366. Otherwise, the program exits from the step 365, and then the current execution cycle of the program ends. The step 366 enables the indication of "CONT→". After the step 366, the current execution cycle of the program ends.

FIGS. 37(a) and 37(b) show examples of pictures displayed according to the uneven (condensed) indication format. In the uneven (condensed) indication format, customer's orders are sequentially indicated without spaces provided therebetween. In the uneven indication picture of FIG. 37(a), a part of items of the customer's order "#109" fully occupies the final display segment while the remaining part is not indicated and the message "CONT→" is indicated at the bottom of the final display segment. The indication of such a partially-indicated customer's order is inhibited from being erased from the picture on the display device 13 or 15. On the other hand, the indication of a completely-indicated customer's order can be erased from the picture on the display device 13 or 15 by actuating the order erasion key 54 in the monitor control switch 14 or 16. In FIG. 37(a), the order ID number of the customer's order "#101" is indicated in a reverse manner as a result of the actuation of the preparation start key 53 in the monitor control switch 14 or 16. When the indication of the customer's order "#101" is erased from the picture on the display device 13 or 15 by actuating the order erasion key 54 in the monitor control switch 14 or 16, the picture of FIG. 37(a) changes to the picture of FIG. 37(b) on the display device 13 or 15. In FIG. 37(b), all items of the customer's order "#109" are indicated, and the message "CONT→" is absent. Accordingly, it is now possible to erase the customer's order "#109" from the picture on the display device 13 or 15.

Fourth Embodiment

A fourth embodiment of this invention is similar to the first embodiment thereof except that the following function is additionally provided. Generally, customer's orders are of different types such as "eat in" and "take out". The keyboard 21 in the register terminal 11 further includes order-type inputting keys. During the registration of a customer's order via the register terminal 11, information of the type of the customer's order is inputted by manipulating the corresponding order-type inputting key on the keyboard 21. Display areas of the indication of customer's orders in the kitchen video controller 12 are separated or classified according to the types of the customer's orders. It is now assumed that the 8-segment indication format is selected through the indication format setting function.

Figure 38:
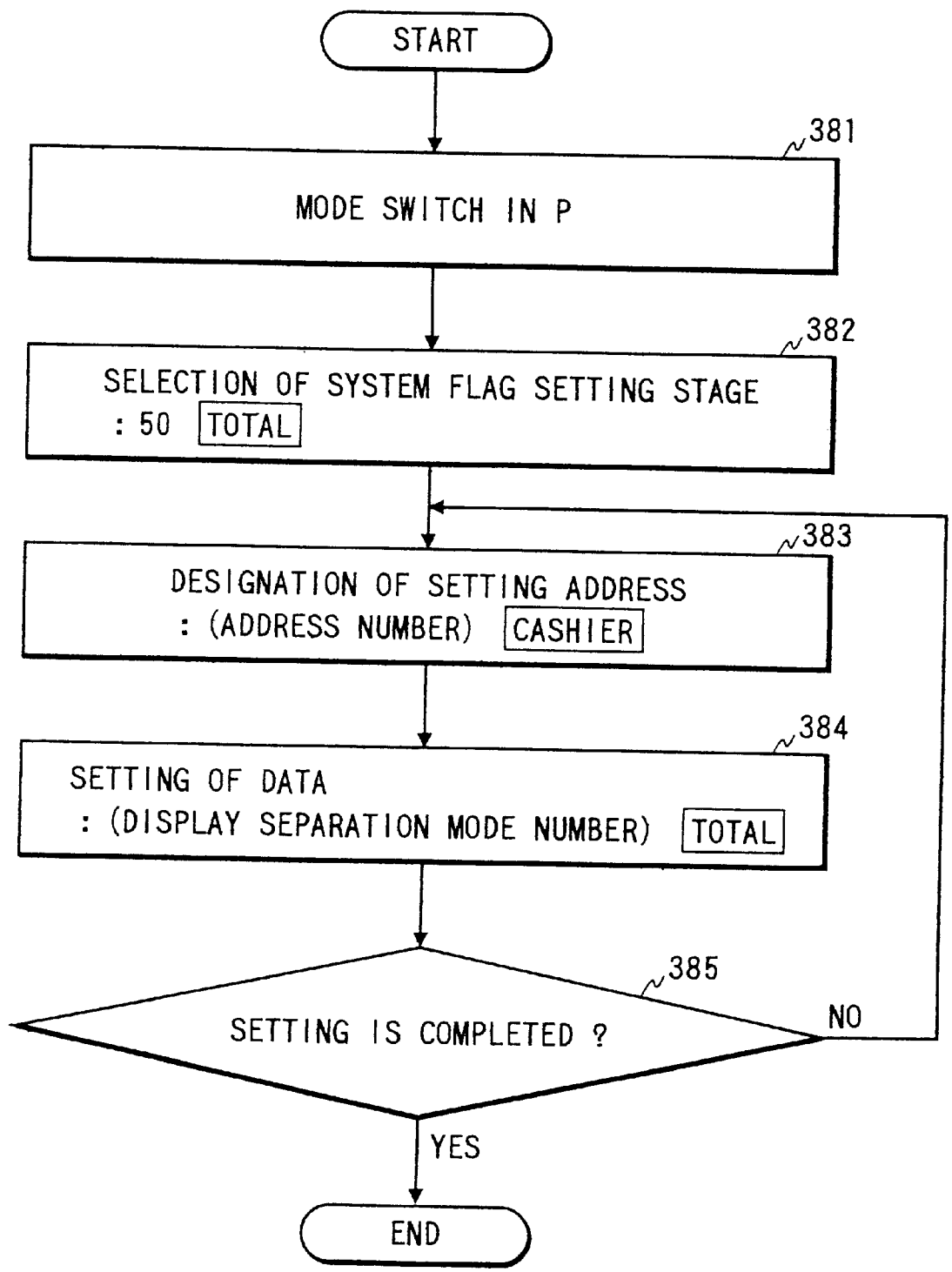
FIG. 38 is a flowchart of a segment of a program for controlling operation of a register terminal which is designed to set system flags in a fourth embodiment of this invention.

FIG. 38 is a flowchart of a program for the setting task executed by the register terminal 11. With reference to FIG. 38, a first step 381 of the program waits motion of the mode switch 23 in the register terminal 11 to the setting mode position (P). When the mode switch 23 is moved to the setting mode position (P), the step 381 indicates a setting task menu on the display device 24 which is similar to that of FIG. 11.

A step 382 following the step 381 waits operation of the keyboard 21 which corresponds to "50" (totalization). When the operation of the keyboard 21 which corresponds to "50" (totalization) is executed, "system flag setting stage 40" is selected. In addition, a setting picture is indicated on the display device 24. FIG. 39(a) shows an example of the setting picture on the display device 24. After the step 382, the program advances to a step 383.

The step 383 waits operation of the keyboard 21 which corresponds to "120" (cashier). In the case where the operation of the keyboard 21 which corresponds to "120" (cashier) has been executed, upon the designation of the setting address "ADR120" for the control of indication area classification in response to the type of a customer's order, the step 383 indicates a picture of FIG. 39(b) on the display device 24.

A step 384 following the step 383 waits operation of the keyboard 21 which corresponds to "indication area classifying mode #" (totalization). When the operation of the keyboard 21 which corresponds to "indication area classifying mode #" (totalization) is executed, the step 384 sets the indication area classifying mode for the customer's order which relates to the kitchen video controller 12.

A step 385 subsequent to the step 384 decides whether or not the setting is completed. When the setting is not completed, the program returns from the step 385 to the step 383. When the setting is completed, the program exits from the step 385 and then the current execution cycle of the program ends.

According to "indication area classifying mode #" being "0", both customer's orders of "eat in" and "take out" are indicated on the lower half of the display device 13 (or 15) in the kitchen video controller 12. In the case of "indication area classifying mode #" being "1", a customer's order of "eat in" is indicated on the upper half of the display device 13 (or 15) while a customer's order of "take out" is indicated on the lower half of the display device 13 (or 15). In the case of "indication area classifying mode #") being "2", a customer's order of "eat in" is indicated on the lower half of the display device 13 (or 15) while a customer's order of "take out" is indicated on the upper half of the display device 13 (or 15). According to "indication area classifying mode #" being "3", both customer's orders of "eat in" and "take out" are indicated on the upper half of the display device 13 (or 15). It is now assumed that "indication area classifying mode #" being "1" is set.

Figure 40:
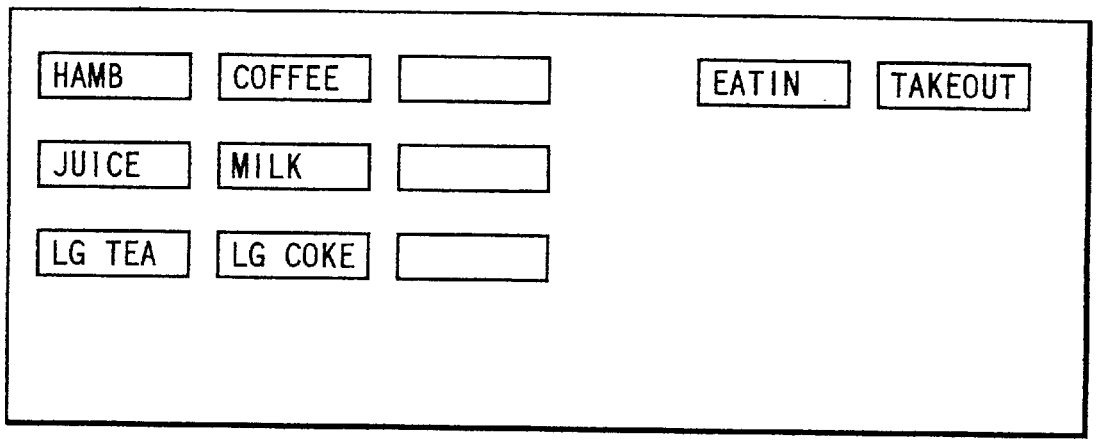
FIG. 40 is a front view of a keyboard in the register terminal in the fourth embodiment of this invention.

FIG. 40 shows the keyboard 21 in the register terminal 11 which has order-type inputting keys corresponding to "eat in" and "take out" respectively.

Figure 41A:
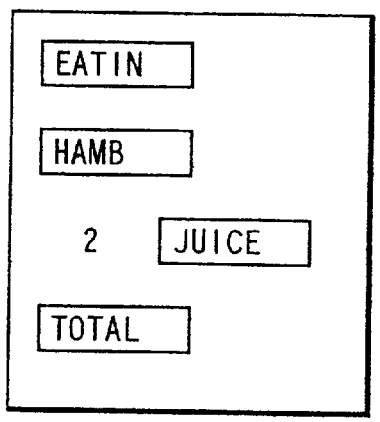
FIG. 41(a) is a diagram of key operations which occur during the registration of a customer's order in the fourth embodiment of this invention.
Figure 41B:
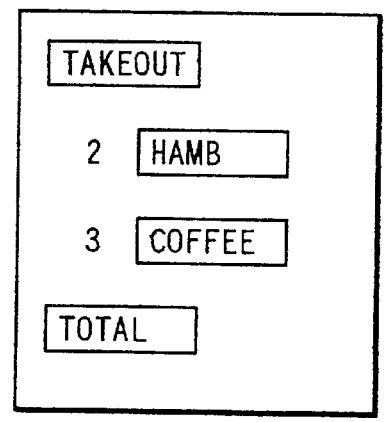
FIG. 41(b) is a diagram of key operations which occur during the registration of another customer's order in the fourth embodiment of this invention.

FIGS. 41(a) and 41(b) illustrate conditions of the ordered item registrations in the register terminal 11 which relate to an "eat in" customer's order and a "take out" customer's order respectively. With reference to FIGS. 41(a) and 41(b), ordered items are registered after their respective order destinations have been registered by actuating the key "eat in" or the key "take out" on the keyboard 21.

Figure 42:
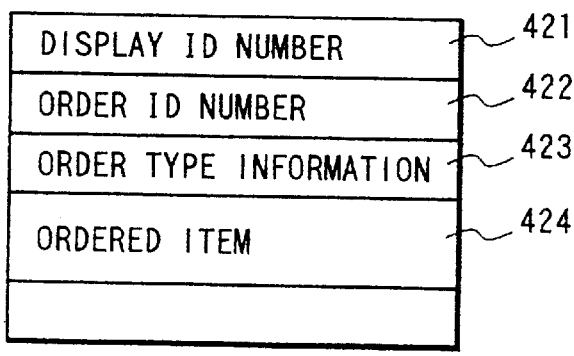
FIG. 42 is a diagram of an order file transmitted from the register terminal to a kitchen video controller in the fourth embodiment of this invention.

FIG. 42 shows a structure of a transmission order file including a display number storing area (a display ID number storing area) 421, an order number storing area (an order ID number storing area) 422, an order type information storing area 423, and an ordered item storing area 424. During the ordered item registration via the register terminal 11, the order type information storing area 423 is loaded with information of an order destination (or an order type) designated by the actuated order type inputting key. When the kitchen video controller 12 receives an order file from the register terminal 11, the kitchen video controller 12 detects the order type information in the received order file and enables the related customer's order to be indicated on a display area (an indication area) corresponding to the detected order type information.

Figure 43:
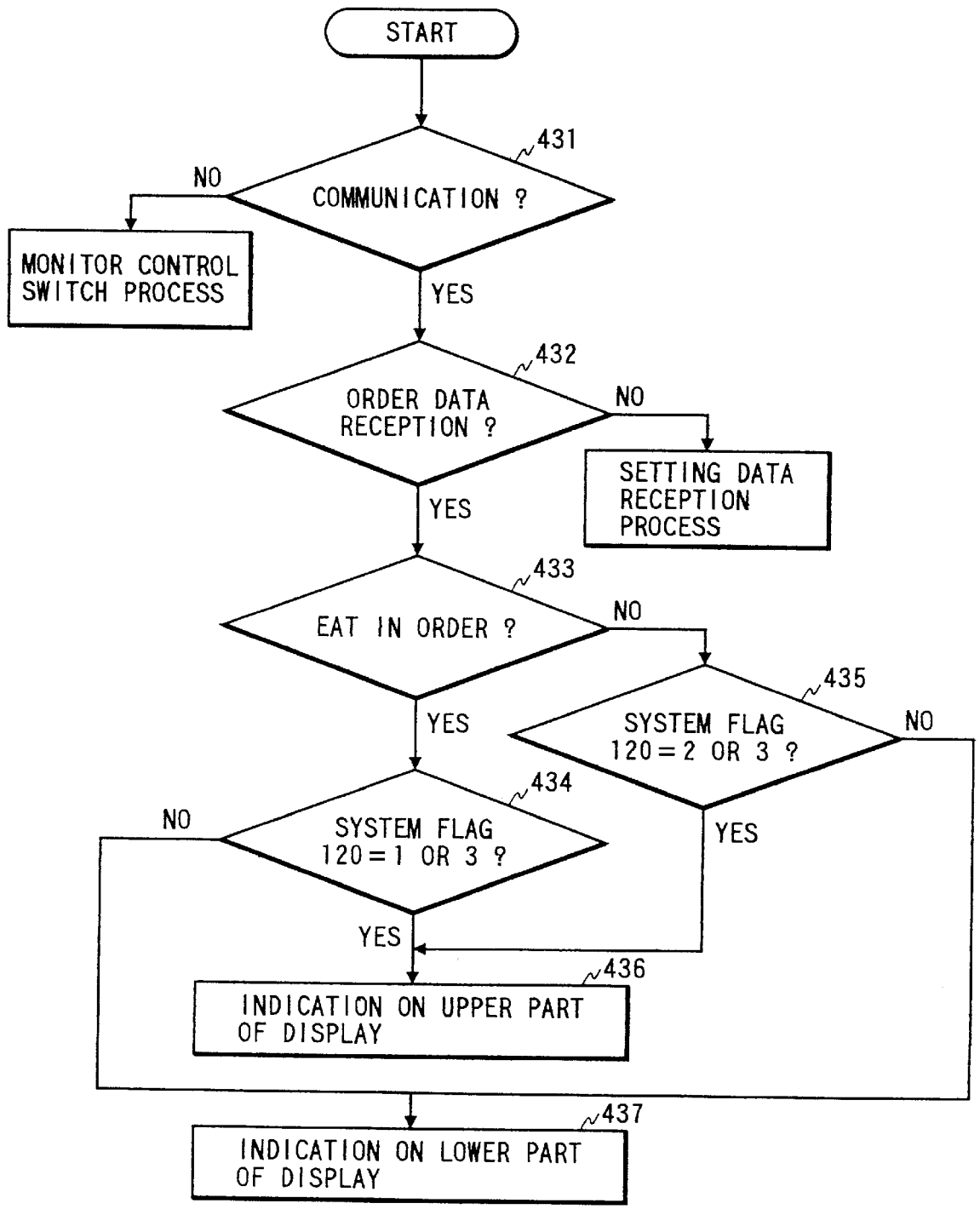
FIG. 43 is a flowchart of a segment of a program for controlling operation of the kitchen video controller in the fourth embodiment of this invention.

FIG. 43 is a flowchart of a program controlling the task processing executed by the kitchen video controller 12. The program is periodically reiterated. With reference to FIG. 43, a first step 431 of the program decides whether or not a process of communication with the register terminal 11 is required. When the process of communication with the register terminal 11 is required, the program advances from the step 431 to a step 432. Otherwise, the program advances from the step 431 to a block related to the processing responsive to the monitor control switch 14 or 16.

The step 432 decides whether or not information of a customer's order is received from the register terminal 11.

When the information of the customer's order is received, the program advances from the step 432 to a step 433. Otherwise, the program advances from the step 432 to a block related to a process of receiving the setting data.

The step 433 decides whether or not the received customer's order corresponds to "eat in". When the received customer's order corresponds to "eat in", the program advances from the step 433 to a step 434. Otherwise, the program advances from the step 433 to a step 435.

The step 434 decides whether or not the system flag "120" is equal to one of "1" and "3", that is, whether or not "indication area classifying mode #" is equal to one of "1" and "3". When the system flag "120" is equal to one of "1" and "3", the program advances from the step 434 to a step 436. Otherwise, the program advances from the step 434 to a step 437.

The step 435 decides whether or not the system flag "120" is equal to one of "2" and "3", that is, whether or not "indication area classifying mode #" is equal to one of "2" and "3". When the system flag "120" is equal to one of "2" and "3", the program advances from the step 435 to the step 436. Otherwise, the program advances from the step 435 to the step 437.

The step 436 indicates the received customer's order on the upper half of the display device 13 (or 15). On the other hand, the step 437 indicates the received customer's order on the lower half of the display device 13 (or 15).

FIG. 44 shows an example of a picture indicated on the display device 13 (or 15) in the kitchen video controller 12. With reference to FIG. 44, in the case where "indication area classifying mode #" is set to "1" and the customer's order registration is performed, the "eat in" customer's order "#101" is indicated on the upper half 441 of the display device 13 (or 15) while the "take out" customer's order "#102" is indicated on the lower half 442 of the display device 13 (or 15). The indicated forms of the order type information are "IN" and "OUT" for "eat in" and "take out" respectively. As shown in FIG. 44, the order type information is indicated at a region in the right-hand side of the indication of the related order ID number.

Fifth Embodiment

A fifth embodiment of this invention is similar to the first embodiment thereof except that a plurality of register terminals are provided, and different areas of the display device 13 (or 15) in the kitchen video controller 12 are assigned to the register terminals respectively. A customer's order registered via a first register terminal is indicated on a first area of the display device 13 (or 15) while a customer's order registered via a second register terminal is indicated on a second area of the display device 13 (or 15) which differs from the first area thereof.

Figure 45:
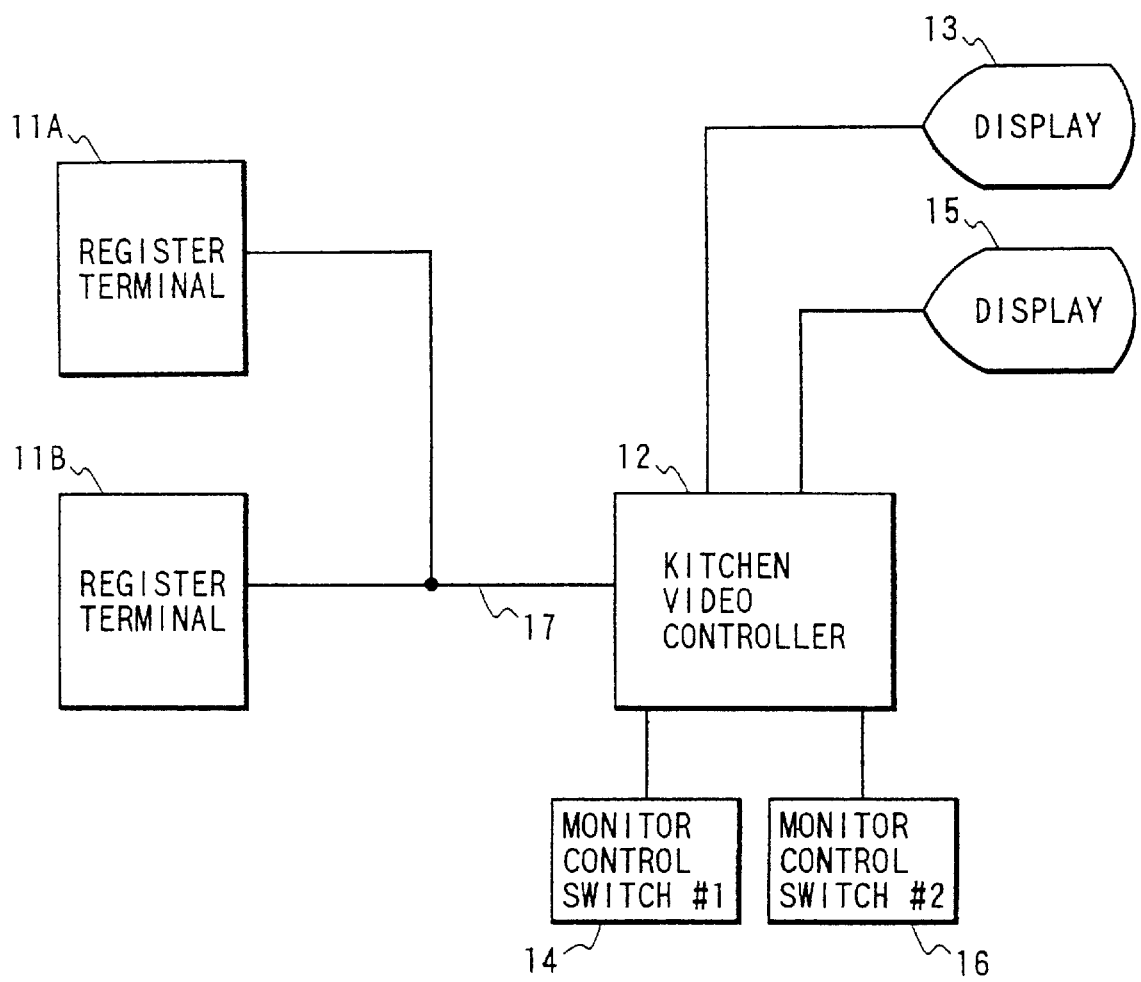
FIG. 45 is a block diagram of an electronic register according to a fifth embodiment of this invention.

With reference to FIG. 45, an electronic register includes register terminals 11A and 11B which are connected to a kitchen video controller 12 via a data communication line or a data communication path 17. The kitchen video controller 12 is connected to a display device (#1) 13, a monitor control switch (#1) 14, a display device (#2) 15, and a monitor control switch (#2) 16. An instruction signal for controlling information indicated on the display device (#1) 13 can be generated by operating the monitor control switch (#1) 14. An instruction signal for controlling information indicated on the display device (#2) 15 can be generated by operating the monitor control switch (#2) 16. The register terminals 11A and 11B are similar in structure to the register terminal 11 of FIG. 2.

Figure 46:
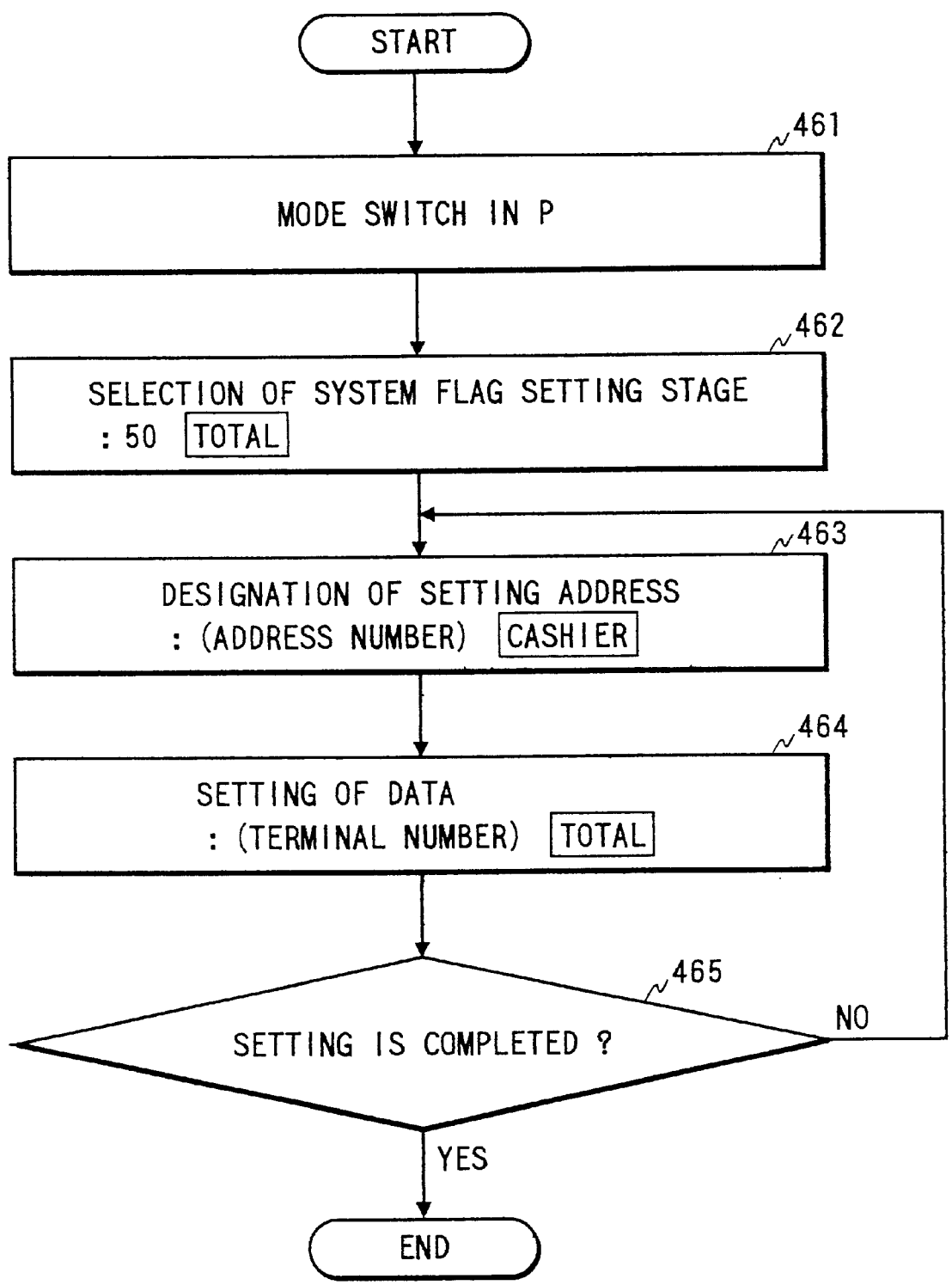
FIG. 46 is a flowchart of a segment of a program for controlling operation of a register terminal which is designed to set system flags in the fifth embodiment of this invention.

FIG. 46 is a flowchart of a program for the setting task executed by each of the register terminals 11A and 11B. With reference to FIG. 46, a first step 461 of the program waits motion of the mode switch 23 in the register terminal 11A or 11B to the setting mode position (P). When the mode switch 23 is moved to the setting mode position (P), the step 461 indicates a setting task menu on the display device 24 which is similar to that of FIG. 11.

A step 462 following the step 461 waits operation of the keyboard 21 which corresponds to "50" (totalization). When the operation of the keyboard 21 which corresponds to "50" (totalization) is executed, "system flag setting stage 50" is selected. In addition, a setting picture similar to that of FIG. 39(a) is indicated on the display device 24. After the step 462, the program advances to a step 463.

The step 463 waits operation of the keyboard 21 which corresponds to "120" (cashier). In the case where the operation of the keyboard 21 which corresponds to "120" (cashier) has been executed, upon the designation of the setting address "ADR120" for the control of indication area classification in response to the terminal number, the step 463 indicates a picture of FIG. 47 on the display device 24.

A step 464 following the step 463 waits operation of the keyboard 21 which corresponds to "terminal #" (totalization). When the operation of the keyboard 21 which corresponds to "terminal #" (totalization) is executed, the step 384 sets each "terminal #" representing a terminal ID number. It is now assumed that the register terminals 11A and 11B are set as "terminal #1" and "terminal #2" respectively.

A step 465 subsequent to the step 464 decides whether or not the setting is completed. When the setting is not completed, the program returns from the step 465 to the step 463. When the setting is completed, the program exits from the step 465 and then the current execution cycle of the program ends.

Thereafter, in the case where the operation of the keyboard 21 which corresponds to "130" (cashier) has been executed, upon the designation of the setting address "ADR130" for the control of indication area classification in response to the terminal ID number, the step 463 indicates a picture of FIG. 48 on the display device 24.

When the operation of the keyboard 21 which corresponds to "indication area classifying mode #" (totalization) is executed, the step 464 sets the indication area classifying mode for the customer's order which relates to the kitchen video controller 12.

According to "indication area classifying mode #" being "0", both customer's orders related to "terminal #1" and "terminal #2" are indicated on the lower half of the display device 13 (or 15) in the kitchen video controller 12. In the case of "indication area classifying mode #" being "1", a customer's order related to "terminal #1" is indicated on the upper half of the display device 13 (or 15) while a customer's order related to "terminal #2" is indicated on the lower half of the display device 13 (or 15). In the case of "indication area classifying mode #" being "2", a customer's order related to "terminal #1" is indicated on the lower half of the display device 13 (or 15) while a customer's order related to "terminal #2" is indicated on the upper half of the display device 13 (or 15). According to "indication area classing mode #" being "3", both customer's orders related to "terminal #1" and "terminal #2" are indicated on the upper half of the display device 13 (or 15). It is now assumed that "indication area classifying mode #" being "1" is set.

Figure 49A:
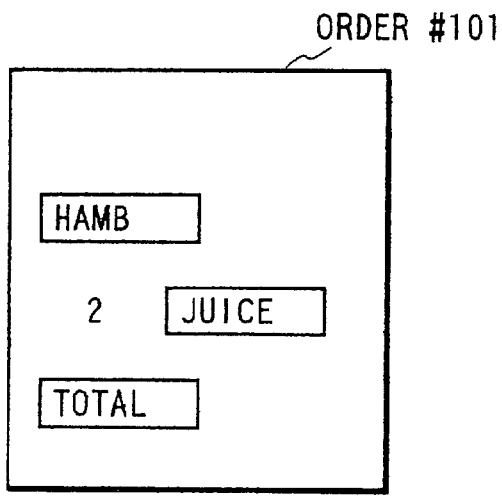
FIG. 49(a) is a diagram of key operations which occur during the registration of a customer's order in the fifth embodiment of this invention.
Figure 49B:
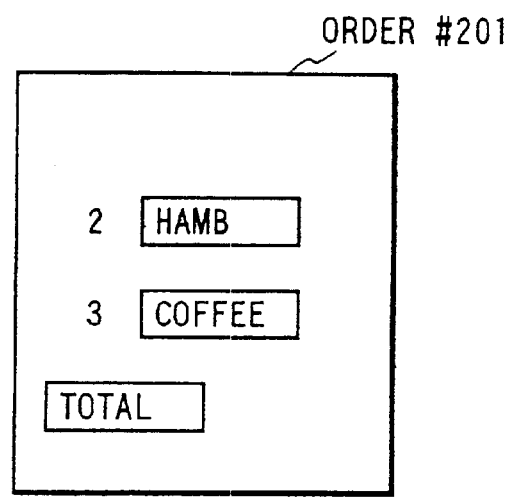
FIG. 49(b) is a diagram of key operations which occur during the registration of another customer's order in the fifth embodiment of this invention.

FIG. 49(a) illustrates conditions of the item registration in the register terminal 11A (terminal #1) which relates to a customer's order "#101". The order ID number is automatically issued in the register terminal 11A (terminal #1). The order ID number is serially and cyclically changed among #100-#199 regarding the register terminal 11A (terminal #1). FIG. 49(b) illustrates conditions of the item registration in the register terminal 11B (terminal #2) which relates to a customer's order "#201". The order ID number is automatically issued in the register terminal 11B (terminal #2). The order ID number is serially and cyclically changed among #200-#299 regarding the register terminal 11B (terminal #2).

Figure 50:
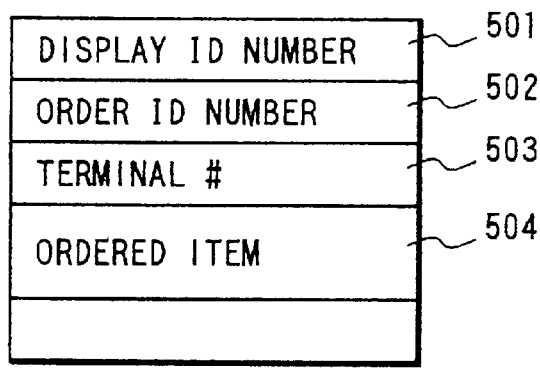
FIG. 50 is a diagram of an order file transmitted from the register terminal to a kitchen video controller in the fifth embodiment of this invention.

FIG. 50 shows a structure of a transmission order file including a display number storing area (a display ID number storing area) 501, an order number storing area (an order ID number storing area) 502, a terminal ID number storing area 503, and an ordered item storing area 504. During the ordered item registration via the register terminal 11A (or 11B), the terminal ID number storing area 503 is loaded with information of the terminal ID number assigned to the register terminal 11A (or 11B). When the kitchen video controller 12 receives an order file from the register terminal 11A or the register terminal 11B, the kitchen video controller 12 detects the terminal ID information in the received order file and enables the related customer's order to be indicated on a display area (an indication area) corresponding to the detected terminal ID information.

Figure 51:
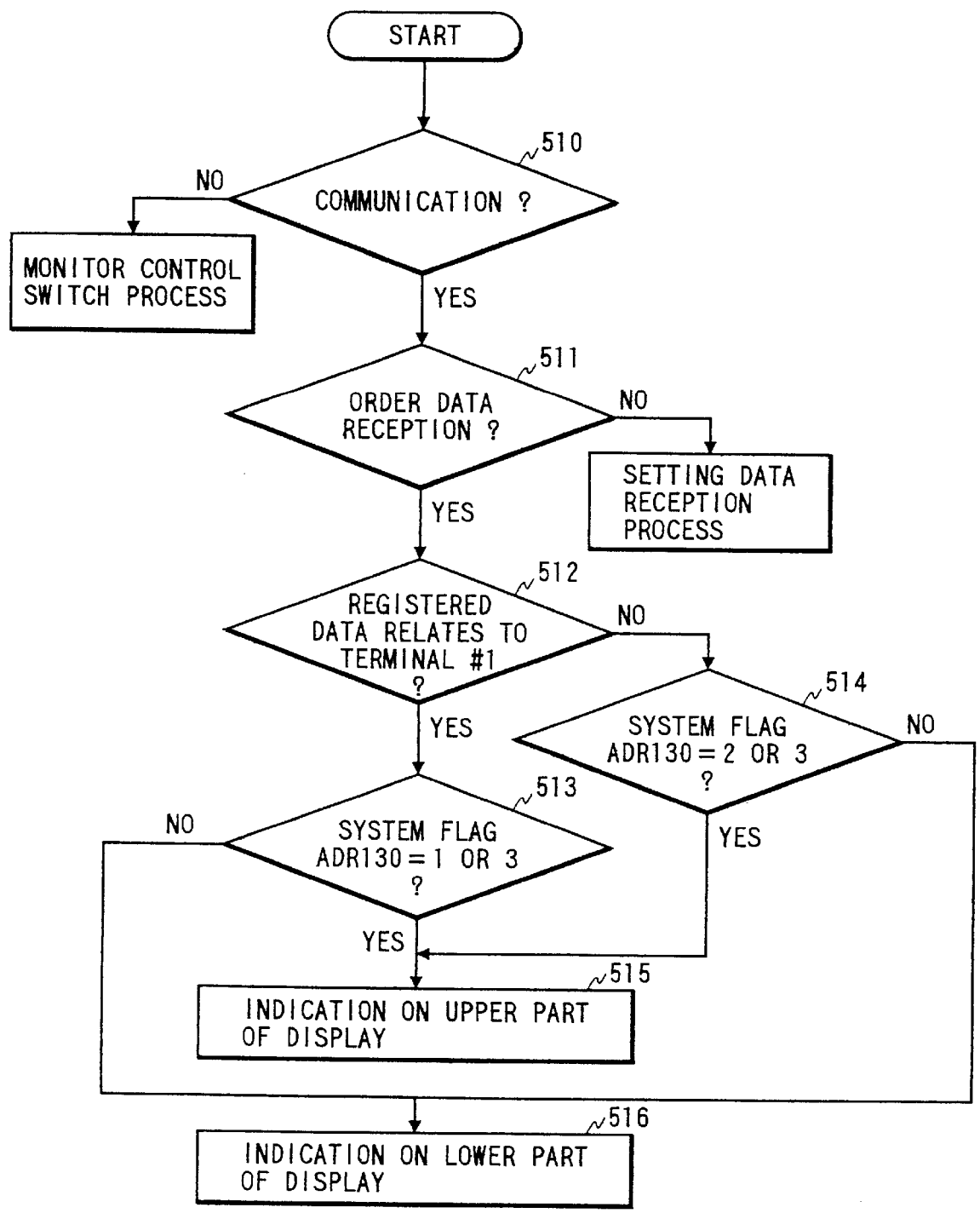
FIG. 51 is a flowchart of a segment of a program for controlling operation of the kitchen video controller in the fifth embodiment of this invention.

FIG. 51 is a flowchart of a program controlling the task processing executed by the kitchen video controller 12. The program is periodically reiterated. With reference to FIG. 51, a first step 510 of the program decides whether or not a process of communication with the register terminal 11A (or 11B) is required. When the process of communication with the register terminal 11A (or 11B) is required, the program advances from the step 510 to a step 511. Otherwise, the program advances from the step 510 to a block related to the processing responsive to the monitor control switch 14 or 16.

The step 511 decides whether or not information of a customer's order is received from the register terminal 11A (or 11B). When the information of the customer's order is received, the program advances from the step 511 to a step 512. Otherwise, the program advances from the step 511 to a block related to a process of receiving the setting data.

The step 512 decides whether or not the received customer's order comes from "terminal #1". When the received customer's order comes from "terminal #1", the program advances from the step 512 to a step 513. Otherwise, the program advances from the step 512 to a step 514.

The step 513 decides whether or not the system flag "130" is equal to one of "1" and "3", that is, whether or not "indication area classifying mode #" is equal to one of "1" and "3". When the system flag "120" is equal to one of "1" and "3", the program advances from the step 513 to a step 515. Otherwise, the program advances from the step 513 to a step 516.

The step 514 decides whether or not the system flag "120" is equal to one of "2" and "3", that is, whether or not "indication area classifying mode #" is equal to one of "2" and "3". When the system flag "120" is equal to one of "2" and "3", the program advances from the step 514 to the step 515. Otherwise, the program advances from the step 514 to the step 516.

The step 515 indicates the received customer's order on the upper half of the display device 13 (or 15). On the other hand, the step 516 indicates the received customer's order on the lower half of the display device 13 (or 15).

FIG. 52 shows an example of a picture indicated on the display device 13 (or 15) in the kitchen video controller 12. With reference to FIG. 52, in the case where "indication area classifying mode #" is set to "1", the customer's order "#101" registered via "terminal #1" is indicated on the upper half 521 of the display device 13 (or 15) while the customer's order "#201" registered via "terminal #2" is indicated on the lower half 522 of the display device 13 (or 15).

Sixth Embodiment

A sixth embodiment of this invention is similar to the first embodiment thereof except that the manner and the timing of the transmission of information of a registered customer's order from the register terminal 11 to the kitchen video controller 12 are changeable between two different types (modes). According to the first type, each time an ordered item is registered, a segment of information of a customer's order is transmitted. According to the second type, upon the actuation of the totalizing key on the keyboard 21, information of the registered customer's order is transmitted.

A program for the setting task executed by the register terminal 11 is similar to the program in FIG. 46. Specifically, a first step 461 of the program waits motion of the mode switch 23 in the register terminal 11 to the setting mode position (P). When the mode switch 23 is moved to the setting mode position (P), the first step indicates a setting task menu on the display device 24 which is similar to that of FIG. 11.

A second step following the first step waits operation of the keyboard 21 which corresponds to "50" (totalization). When the operation of the keyboard 21 which corresponds to "50" (totalization) is executed, "system flag setting stage 50" is selected. In addition, a setting picture similar to that of FIG. 39(a) is indicated on the display device 24. After the second step, the program advances to a third step.

The third step waits operation of the keyboard 21 which corresponds to "140" (cashier). In the case where the operation of the keyboard 21 which corresponds to "140" (cashier) has been executed, the setting address "ADR140" for the control of the timing of the transmission of a customer's order is designated.

A fourth step following the third step waits operation of the keyboard 21 which corresponds to "transmission timing mode number" (totalization). When the operation of the keyboard 21 which corresponds to "transmission timing mode number" (totalization) is executed, the fourth step selects corresponding one out of the previously-indicated first and second types of the manner and the timing of the transmission of the customer's order.

A fifth step subsequent to the fourth step decides whether or not the setting is completed. When the setting is not completed, the program returns from the fifth step to the third step. When the setting is completed, the program exits from the fifth step and then the current execution cycle of the program ends.

In the case of "transmission timing mode number" equal to "0", each time an ordered item is registered, a segment of information of a customer's order is transmitted. This process is similar to that in the first embodiment of this invention. In the case of "transmission timing mode number" equal to "1", upon the actuation of the totalizing key on the keyboard 21, information of a registered customer's order is transmitted.

FIG. 53 shows a structure of a transmission order file including a display number storing area (a display ID number storing area) 531, an order number storing area (an order ID number storing area) 532, an ordered item storing area 533, and a control flag storing area 534. Two control flags F1 and F2 are provided in the control flag storing area 534. The control flag F1 being "1" (corresponding to a set state) represents that a related ordered item is a first one. The control flag F2 being "1" (corresponding to a set state) represents that a related ordered item is a last one. In the case where both the control flags F1 and F2 being "1", a related customer's order has only one item so that the first item and the last item thereof are the same.

Figure 54:
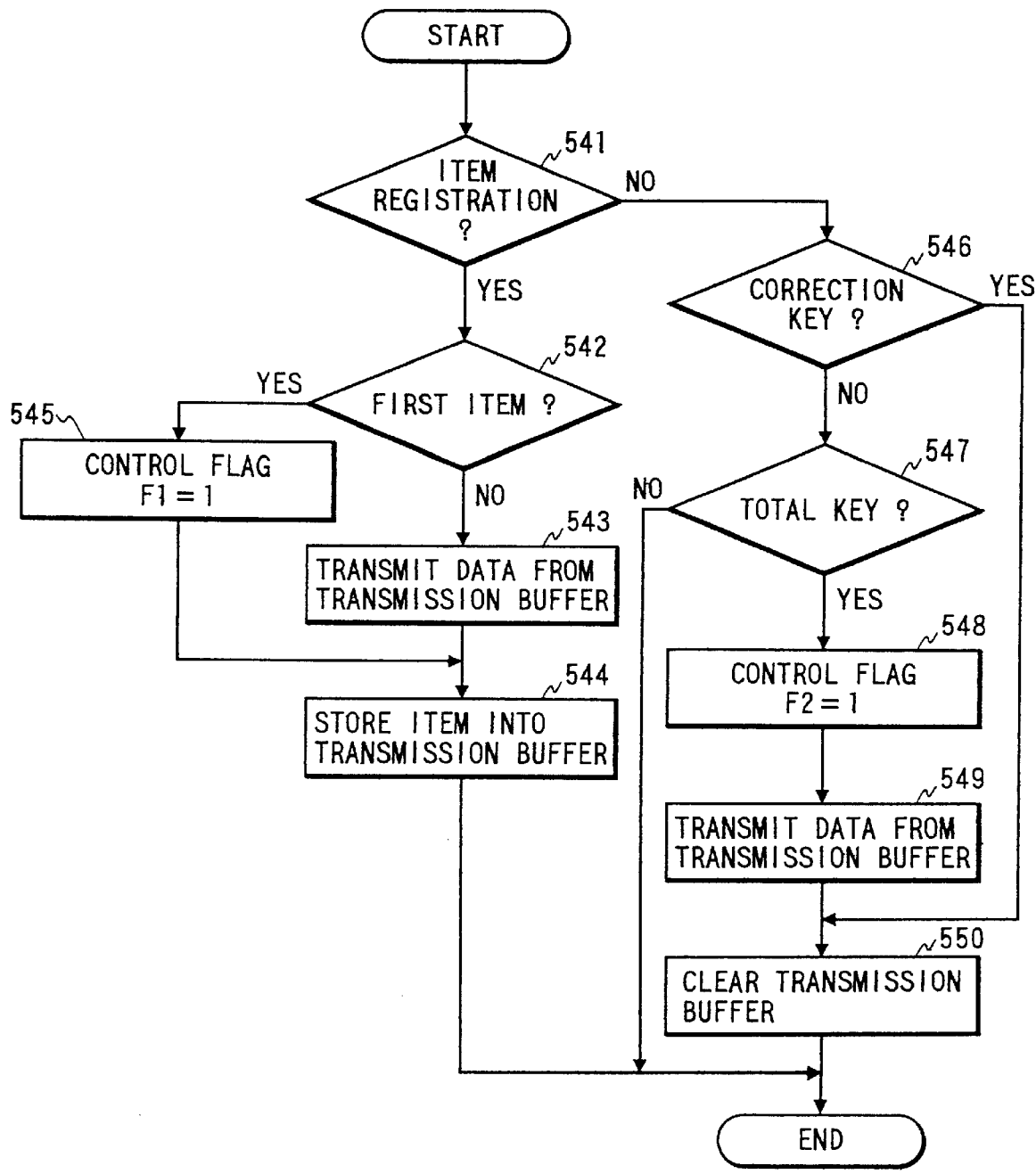
FIG. 54 is a flowchart of a segment of a program for controlling the register terminal which is designed to transmit customer's order information to the kitchen video controller in the sixth embodiment of this invention.

FIG. 54 is a flowchart of a program controlling the transmission processing which is executed in the register terminal 11 when "transmission timing mode number" is equal to "1". The program is periodically reiterated. With reference to FIG. 54, a first step 541 of the program decides whether or not an ordered item is currently registered. When an ordered item is currently registered, the program advances from the step 541 to a step 542. Otherwise, the program advances from the step 541 to a step 546.

The step 542 decides whether or not the currently-registered ordered item is a first item of a related customer's order. When the currently-registered ordered item is the first item of the related customer's order, the program advances from the step 542 to a step 545. Otherwise, the program advances from the step 542 to a step 543. The step 545 sets the control flag F1 to "1". After the step 545, the program advances to a step 544. The step 543 transmits data (information of a registered ordered item) from a register-terminal transmission buffer to the kitchen video controller 12. After the step 543, the program advances to the step 544. The step 544 stores information of the currently-registered ordered item into the register-terminal transmission buffer. After the step 544, the current execution cycle of the program ends.

The step 546 decides whether or not a correction key on the keyboard 21 is actuated. When the correction key is actuated, the program jumps from the step 546 to a step 550. Otherwise, the program advances from the step 546 to a step 547. The step 547 decides whether or not the totalizing key on the keyboard 21 is actuated. When the totalizing key is actuated, the program advances from the step 547 to a step 548. Otherwise, the program exits from the step 547, and then the current execution cycle of the program ends. The step 548 sets the control flag F2 to "1". A step 549 following the step 548 transmits data (information of a registered ordered item) from the register-terminal transmission buffer to the kitchen video controller 12. After the step 549, the program advances to the step 550. The step 550 clears the register-terminal transmission buffer. After the step 550, the current execution cycle of the program ends.

According to the transmission processing in FIG. 54, each time an item of a customer's order is registered, information of the immediately-preceding item of the customer's order is transmitted from the register terminal 11 to the kitchen video controller 12.

Figure 55A:
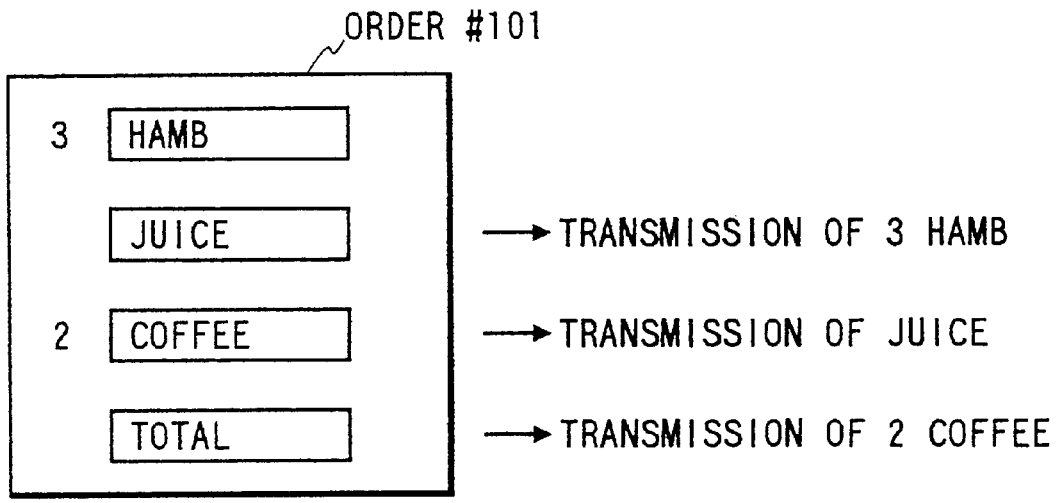
FIG. 55(a) is a diagram of an example of registering key operations and transmission timings in the sixth embodiment of this invention.
Figure 55B:
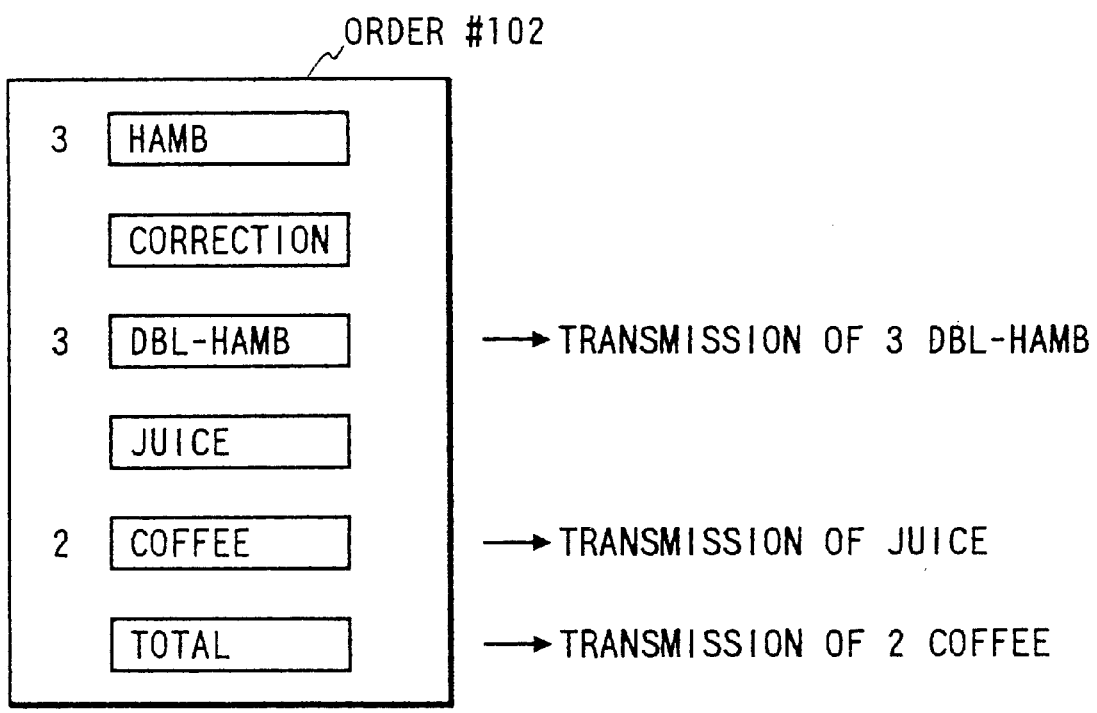
FIG. 55(b) is a diagram of another example of registering key operations and transmission timings in the sixth embodiment of this invention.

With reference to FIG. 55(*a*), a customer's order "#101" has a sequence of items, that is, three "HAMB", one "JUICE", and two "COFFEE", which are sequentially registered. When three "HAMB" is registered by keyboard operation, three "HAMB" corresponds to a first item of the customer's order "#101" and therefore the transmission of information to the kitchen video controller 12 is not performed. In this case, the control flag F1 is set to "1" by the step 545 in FIG. 54, and information of three "HAMB" is stored into the register-terminal transmission buffer by the step 544 in FIG. 54. When one "JUICE" is registered by keyboard operation, the information of three "HAMB" is transmitted to the kitchen video controller 12 by the step 543 in FIG. 54 and information of one "JUICE" is stored into the register-terminal transmission buffer by the step 544 in FIG. 54. When two "COFFEE" is registered by keyboard operation, the information of one "JUICE" is transmitted to the kitchen video controller 12 by the step 543 in FIG. 54 and information of two "COFFEE" is stored into the register-terminal transmission buffer by the step 544 in FIG. 54. Keyboard operation of "TOTL" follows the keyboard operation for registering two "COFFEE". Upon the keyboard operation of "TOTL", the information of two "COFFEE" is transmitted to the kitchen video controller 12 by the step 549 in FIG. 54. In addition, the control flag F2 is set to "1" by the step 548 in FIG. 54, and the register-terminal transmission buffer is cleared by the step 550 in FIG. 54.

With reference to FIG. 55(*b*), the correction key is actuated during the registration of a customer's order "#102". Specifically, the correction key is actuated immediately after three "HAMB" is registered. Regarding the registration of three "HAMB", three "HAMB" corresponds to a first item of the customer's order "#102" and therefore the transmission of information to the kitchen video controller 12 is not performed. In this case, the control flag F1 is set to "1" by the step 545 in FIG. 54, and information of three "HAMB" is stored into the register-terminal transmission buffer by the step 544 in FIG. 54. When the correction key is actuated, the register-terminal transmission buffer is cleared by the step 550 in FIG. 54 so that the information of three "HAMB" is erased therefrom. After the correction key is actuated, three "DBL-HAMB" is registered. When three "DBL-HAMB" is registered by keyboard operation, information of three "DBL-HAMB" is stored into the register-terminal transmission buffer by the step 544 in FIG. 54. After three "DBL-HAMB" is registered, one "JUICE" is registered. When one "JUICE" is registered by keyboard operation, the information of three "DBL-HAMB" is transmitted to the kitchen video controller 12 by the step 543 in FIG. 54 and information of one "JUICE" is stored into the register-terminal transmission buffer by the step 544 in FIG. 54. After one "JUICE" is registered, two "COFFEE" is registered, When two "COFFEE" is registered by keyboard operation, the information of one "JUICE" is transmitted to the kitchen video controller 12 by the step 543 in FIG. 54 and information of two "COFFEE" is stored into the register-terminal transmission buffer by the step 544 in FIG. 54. Keyboard operation of "TOTL" follows the keyboard operation for registering two "COFFEE". Upon the keyboard operation of "TOTL", the information of two "COFFEE" is transmitted to the kitchen video controller 12 by the step 549 in FIG. 54. In addition, the control flag F2 is set to "1" by the step 548 in FIG. 54, and the register-terminal transmission buffer is cleared by the step 550 in FIG. 54.

FIG. 56 is a flowchart of a program controlling the task processing executed by the kitchen video controller 12. The program is periodically reiterated. The program in FIG. 56 is similar to the program in FIG. 8 except that a set of steps 561, 562, 563, 564, and 565 replaces the step 83, and that an additional step 566 is provided between the steps 90A and 90B. With reference to FIG. 56, when the step 82 decides that information of an ordered item is received from the register terminal 11, the program advances from the step 82 to the step 561. The step 561 decides whether or not the control flag F1 related to the received information of the ordered item is equal to "1" (corresponding to a set state). When the control flag F1 is equal to "1", the program advances from the step 561 to a step 562. Otherwise, the program advances from the step 561 to a step 563. The step 562 indicates the received information of the ordered item on an area of the display device 13 or 15 which immediately follows the area of the indication of preceding customer's order information. After the step 562, the current execution cycle of the program ends.

The step 563 decides whether or not the control flag F2 related to the received information of the ordered item is equal to "1" (corresponding to a set state). When the control flag F2 is equal to "1", the program advances from the step 563 to a step 564. Otherwise, the program advances from the step 563 to a step 565. The step 564 searches indicated customer's orders for a customer's order to which the current ordered item belongs. The step 564 adds the indication of the current ordered item to the indication of the related customer's order. In addition, the step 564 indicates "COMPLETE" on the display device 13 or 15 which represents the completion of the registration and the indication of the customer's order. As shown in FIG. 57, the indication of "COMPLETE" is placed at the bottom of a display area (a display segment) assigned to the related customer's order. After the step 564, the current execution cycle of the program ends. The step 565 searches indicated customer's orders for a customer's order to which the current ordered item belongs. The step 565 adds the indication of the current ordered item to the indication of the related customer's order. After the step 565, the current execution cycle of the program ends.

The step 566 following the step 90A decides whether or not the order data in question is in a "COMPLETE" state. When the order data is in the "COMPLETE" state, the program advances from the step 566 to the step 90B. Otherwise, the program exits from the step 566, and then the current execution cycle of the program ends. Accordingly, only a customer's order with the indication of "COMPLETE" can be erased by actuating the order erasion key 54 (see FIG. 5).

Seventh Embodiment

A seventh embodiment of this invention is similar to the first embodiment thereof except for an additional arrangement described later. Regarding the display control function implemented by the kitchen video controller 12, the seventh embodiment is provided with the function of setting a tandem operation mode in which the screens of plural display devices are united so that they serve as the screen of a single display device.

When the mode switch 23 in the register terminal 11 is moved to the setting mode position (P), a setting task menu similar to that in FIG. 11 is indicated on the display device 24. Upon operation of the keyboard 21 which corresponds to "60" (totalization), a "KITCHEN VIDEO" setting stage 60 is selected. Then, a "KITCHEN VIDEO PROG" menu similar to that in FIG. 12 is indicated on the display device 24. When operation of the keyboard 21 which corresponds to "2" (totalization) is executed, a setting state "VIDEO MODE" is selected which relates to a kitchen video operation mode.

FIG. 58 shows an example of a setting picture related to an indication status and an indication mode of the kitchen video. In FIG. 58, "FIELD 1" denotes a setting area for the kitchen video indication mode, and "FIELD 2" denotes a setting area for the kitchen video indication status. Here, "FIELD 1" of "VIDEO #1 (display device #1)" is designated by operating the keyboard 21, and the keyboard 21 is subjected to operation corresponding to "11" (SBTL).

Subsequently, the indication format (the segment division number and the tandem mode selection) related to the display device #1 is set by operation of the keyboard 21 which corresponds to "indication mode #" (totalization). In the case of setting as "indication mode #" being equal to "1", the 4-segment indication format (see FIG. 29(a)) is set for the display device #1. In the case of setting as "indication mode #" being equal to "2", the 8-segment indication format (see FIG. 29(b)) is set for the display device #1.

On the other hand, in the case of setting as "indication mode #" being equal to "11" or "12", one of tandem operation modes are set for the display device #1 and the display device #2. FIG. 59 shows examples of pictures on the display device #1 and the display device #2 which occur during the tandem operation modes. According to the tandem operation mode 591 of the first type, the screens of plural display devices each driven in the 4-segment indication format are united so that they serve as the screen of a single display device. According to the tandem operation mode 592 of the second type, the screens of plural display devices each driven in the 8-segment indication format are united so that they serve as the screen of a single display device. In FIG. 59, the numerals in the display segments denote the indication order numbers (the indication sequence numbers). After the setting process is completed, the actuation of the totalizing key on the keyboard 21 starts a transmission process by which the display setting data is transmitted from the register terminal 11 to the kitchen video controller 12. Specifically, the display setting data is downloaded into the setting data file in the memory 46 within the kitchen video controller 12.

FIG. 60 shows the structure of an information recording area in the memory 46 within the kitchen video controller 12. As shown in FIG. 60, the memory 46 is provided with a work area 601, a setting data file 602, a received order file 603, and a display buffer 604. The work area 601 is used for the control of the kitchen video controller 12. Setting data for the control of the kitchen video controller 12 is generated by the register terminal 11, and is transmitted from the register terminal 11 to the kitchen video controller 12 via the data communication line 17. The setting data file 602 stores the transmitted setting data. The received order file 603 stores order data transmitted from the register terminal 11. The display buffer 604 is used to enable data pieces in the received order file 603 to be sequentially indicated by the display device 13 or 15 (#1 or #2). The display buffer 604 has a set of unit segments 6040 each corresponding to an indication area on the screen of the display device 13 or 15 (#1 or #2). The display buffer 604 is divided into an order area 6041 storing information which has been erased, an order area 6042 storing information which is currently indicated, and an order area 6043 storing information which will be indicated later. The order area 6041 for the erased information is of the fast-in fast-out structure. The order area 6041 for the erased information serves as a save area for the erased information which is used in recalling the erased information and confirming the erased information. The order area 6042 for the currently-indicated information is divided into two portions, that is, a first portion having a set of unit display segments for the display device #1 and a second portion having a set of unit display segments for the display device #2.

The setting of the indication format (the segment division number) is a process of determining the display-segment structure of the display buffer 604. A process of setting the indication format is similar to that shown in FIG. 26. During the setting of the indication format, decisions are made as to the display segment number per display device and the indicated item number per display segment.

The structure of segment data stored in the display buffer 604 is similar to that shown in FIG. 27. Specifically, the segment data has an order ID number area, an ordered item area, and a control flag area. The control flag area stores flags used in the control of the indication of a customer's order. The stored flags include a cursor position flag, a preparation start flag, and a plural-segment order flag. During movement of the cursor position by actuating the shift keys 51 and 52 in the monitor control switch 14 or 16, the cursor position flag is set when the cursor comes to the corresponding display segment. The preparation start flag is set by actuation of the preparation start key 53 in the monitor control switch 14 or 16. The plural-segment order flag represents whether or not ordered items designated by a single order can not be placed within the corresponding display segment. A program corresponding to processes responsive to the previously-mentioned control flags is similar to that shown in FIG. 28.

FIG. 61 shows an example of pictures indicated on the display device #1 and the display device #2 according to the tandem operation mode with the 4-segment indication format. In FIG. 61, items of a customer's order "#101" overflow from the first display segment of the display device #1 into the second display segment of the display device #1 while the message "CONT→" is indicated at the bottom of the first display segment. All the items of the customer's order "#101" are indicated on the two display segments. Such a customer's order is referred to as a first-type overflow customer's order. In addition, items of a customer's order "#103" overflow from the fourth display segment of the display device #1 into the first display segment of the display device #2 while the message "CONT→" is indicated at the bottom of the fourth display segment of the display device #1. The customer's order "#103" also corresponds to the first-type overflow customer's order. Further, a former part of items of a customer's order "#106" fully occupies the fourth display segment of the display device #2 while the remaining part thereof is not indicated. In this case, the message "CONT→" is indicated at the bottom of the fourth display segment. Such a customer's order is referred to as a second-type overflow customer's order. The indication of the first-type overflow customer's order can be erased from the pictures on the display device 13 or 15 (#1 and #2) by actuating the order erasion key 54 in the monitor control switch 14 or 16. On the other hand, the indication of the second type overflow customer's order is inhibited from being erased from the pictures on the display device 13 or 15 (#1 and #2).

Each of the monitor control switches #1 and #2 (14 and 16) related to the respective display devices #1 and #2 (13 and 15) has keys similar to those shown in FIG. 5. The monitor control switches #1 and #2 (14 and 16) operate on the display devices #1 and #2 (13 and 15) respectively. In other words, the operation of the monitor control switch #1 (14) on the display device #1 (13) and the operation of the monitor control switch #2 (16) on the display device #2 (15) are independent of each other.

In FIG. 61, the order number "#101" is indicated in a reverse manner. The reverse indication of the order number "#101" is implemented in response to the actuation of the preparation start key 53 on the monitor control switch #1 (14). When the contents of the customer's order "#101" are erased from the picture on the display device #1 (13) by actuating the order erasion key 54 in the monitor control switch #1 (14), the pictures in FIG. 61 change to pictures in FIG. 62. In FIG. 62, all items of the customer's order "#106" are now indicated. In the case where data of at least one customer's order remains in the order area 6043 for the later-indicated information, the contents of the remaining customer's order (see the customer's order "#107" in FIG. 62) are newly indicated when a sufficient display space results from the picture change.

Figure 63:
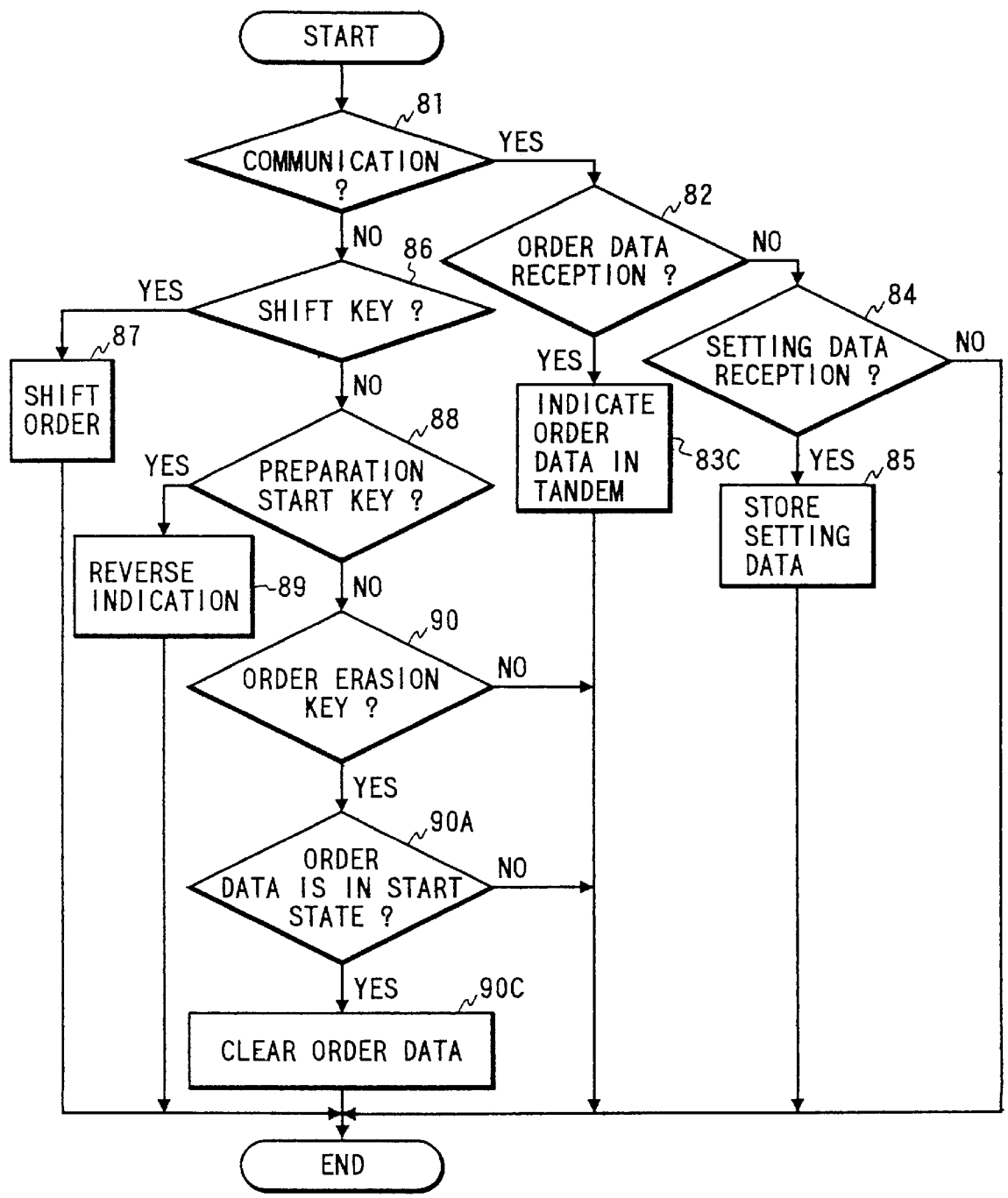
FIG. 63 is a flowchart of a segment of a program for controlling operation of the kitchen video controller in the seventh embodiment of this invention.

FIG. 63 is a flowchart of a program controlling the task processing executed by the kitchen video controller 12. The program in FIG. 63 is similar to the program in FIG. 8 except that steps 83C and 90C replace the steps 83 and 90B respectively. In FIG. 63, the step 83C controls the display devices 13 and 15 (#1 and #2) to indicate the received information of the customer's order in a manner such that the screens of the display devices 13 and 15 (#1 and #2) are united and they serve as the screen of a single display device. In addition, the step 90C clears the order data in question, and places indicated order data pieces in an area starting from the left-hand edge of a display screen in a manner such that the screens of the display devices 13 and 15 (#1 and #2) are united and they serve as the screen of a single display device.

Eighth Embodiment

An eighth embodiment of this invention is similar to the first embodiment thereof except for an additional arrangement described later. Regarding the display control function implemented by the kitchen video controller 12, the eighth embodiment is provided with the function of setting a separated indication format in which a picture on the display device 13 or 15 is separated into an order indication sub-picture and a summary indication sub-picture. The order indication sub-picture is designed to indicate a list of customer's orders. The summary indication sub-picture is designed to indicate the total number of each of predesignated ordered items among all customer's orders which have been received from the register terminal 11.

When the mode switch 23 in the register terminal 11 is moved to the setting mode position (P), a setting task menu similar to that in FIG. 11 is indicated on the display device 24. Upon operation of the keyboard 21 which corresponds to "60" (totalization), a "KITCHEN VIDEO" setting stage 60 is selected. Then, a "KITCHEN VIDEO PROG" menu is indicated on the display device 24. FIG. 64 shows an example of the "KITCHEN VIDEO PROG" menu. When operation of the keyboard 21 which corresponds to "2" (totalization) is executed, a setting state "VIDEO MODE" is selected which relates to a kitchen video operation mode.

FIG. 65 shows an example of a setting picture related to an indication status and an indication mode of the kitchen video. In FIG. 65, "FIELD 1" denotes a setting area for the kitchen video indication mode, and "FIELD 2" denotes a setting area for the kitchen video indication status. Here, "FIELD 1" of "VIDEO #1 (display device #1)" is designated by operating the keyboard 21, and the keyboard 21 is subjected to operation corresponding to "11" (SBTL). Subsequently, the indication format (the segment division number and the tandem mode selection) related to the display device #1 is set by operation of the keyboard 21 which corresponds to "indication mode #" (totalization). In the case of setting as "indication mode #" being equal to "1", the 4-segment indication format (see FIG. 29(a)) is set for the display device #1. Operation according to the 4-segment indication format is similar to that in the second embodiment of this invention. In the case of setting as "indication mode #" being equal to "2", the separated indication format is set for the display device #1.

FIG. 66 shows an example of a picture on the display device #1 or #2 (13 or 15) according to the separated indication format. As shown in FIG. 66, the picture is separated into an upper half and a lower half corresponding to an order indication sub-picture 661 and a summary indication sub-picture 662 respectively. The order indication sub-picture 661 is of the 4-segment indication format. In the summary indication sub-picture 662 of FIG. 66, the indicated items are arranged in the order of setting thereof (that is, in the programmed order).

When a clear key on the keyboard 21 is actuated, the picture on the display device 24 in the register terminal 11 returns to the "KITCHEN VIDEO PROG" menu in FIG. 64. In the case where operation of the keyboard 21 which corresponds to "3" (totalization) is executed thereafter, a setting state "SUMMARY ITEM" is selected which relates to summary items.

FIG. 67 shows an example of the summary item setting picture. In the case where addresses "0"~"28" are inputted and then a cashier key on the keyboard 21 is actuated, a setting address or addresses are designated. When setting data is inputted and then the cashier key is actuated, data pieces are set in the designated addresses respectively. An address of "0" is a setting address for an item indication order number (an item indication sequence number) related to the summary indication sub-picture. In the case where data of "0" is set to implement an item indication order (an item indication sequence) equal to the programmed order (the setting sequence), summary items are indicated in the summary indication sub-picture in an order (a sequence) corresponding to the order (the sequence) of setting of address numbers "1"~"28".

FIG. 68 shows an example of a picture on the display device #1 or #2 (13 or 15) according to the separated indication format. As shown in FIG. 66, the picture is separated into an upper half and a lower half corresponding to an order indication sub-picture 681 and a summary indication sub-picture 682 respectively. The order indication sub-picture 681 is of the 4-segment indication format. With reference back to FIG. 67, numbers "1"~"28" denote ordered items respectively. In the case where data of "1" is set to implement an item indication order (an item indication sequence) equal to the alphanumeric order (the alphanumeric sequence), summary items are indicated in the summary indication sub-picture 682 in an order (a sequence) such as shown in FIG. 68.

With reference back to FIG. 67, address numbers of "1"~"28" represent respective setting addresses of ordered items to be indicated in the summary indication sub picture. Regarding each of ordered items, a PLU number is set as data. When a PLU number is set, the PLU number and a related item name are indicated in a corresponding address area as shown in FIG. 67.

After the setting process is completed, the actuation of the totalizing key on the keyboard 21 starts a transmission process by which the display setting data is transmitted from the register terminal 11 to the kitchen video controller 12. Specifically, the display setting data is down-loaded into the setting data file in the memory 46 within the kitchen video controller 12.

Figure 69:
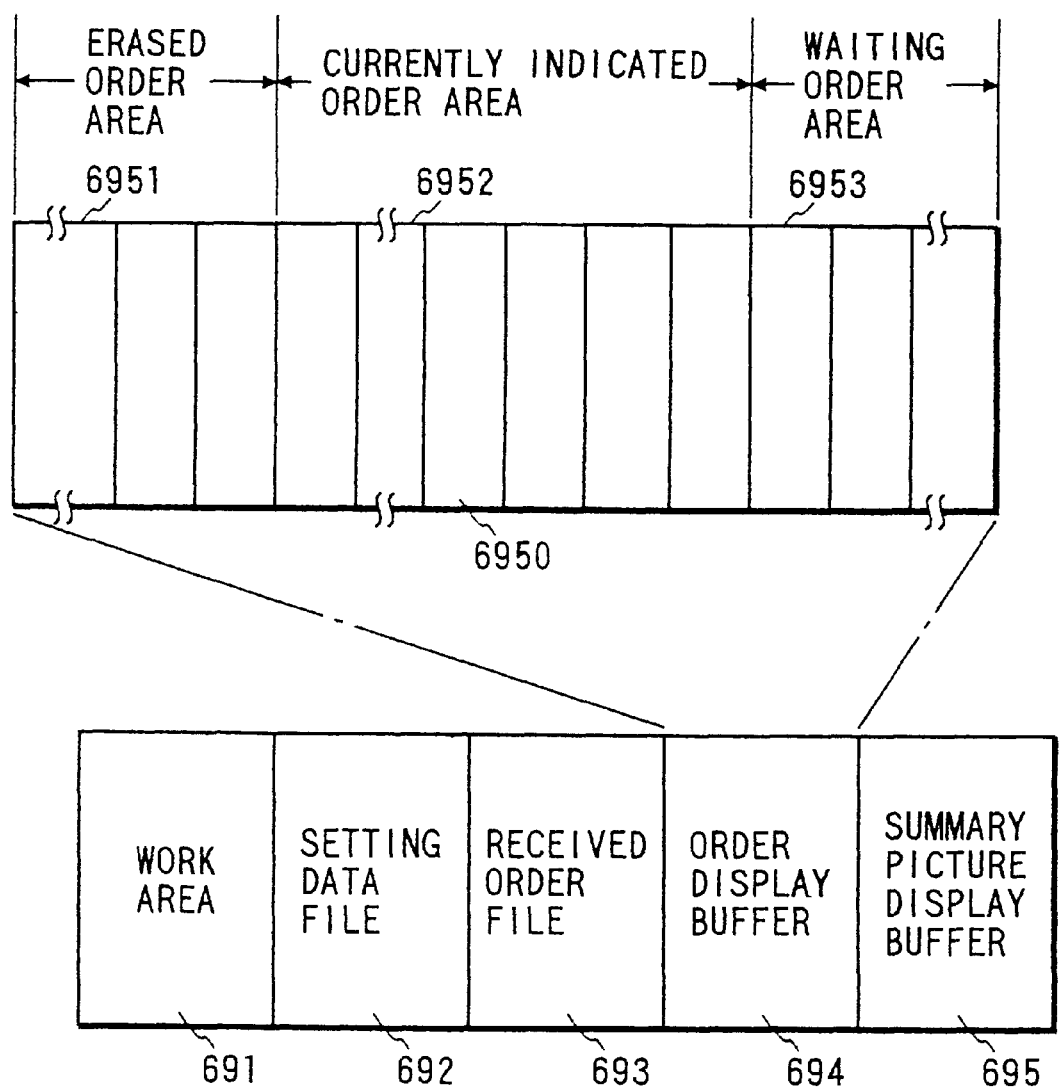
FIG. 69 is a diagram of the structure of a memory in the kitchen video controller in the eighth embodiment of this invention.

FIG. 69 shows the structure of an information recording area in the memory 46 within the kitchen video controller 12 which occurs when "indication mode #" being equal to "2" is set to implement the separation of a picture on the display device 13 or 15 into an order indication sub-picture and a summary indication sub-picture. As shown in FIG. 69, the memory 46 is provided with a work area 691, a setting data file 692, a received order file 693, an order display buffer 694, and a summary-picture display buffer 695. The work area 691 is used for the control of the kitchen video controller 12. Setting data for the control of the kitchen video controller 12 is generated by the register terminal 11, and is transmitted from the register terminal 11 to the kitchen video controller 12 via the data communication line 17. The setting data file 692 stores the transmitted setting data. The received order file 693 stores order data transmitted from the register terminal 11. The order display buffer 694 is used to enable data pieces in the received order file 693 to be sequentially indicated by the display device 13 or 15 (#1 or #2). The summary-picture display buffer 695 is used for the summary indication sub-picture. The order display buffer 694 has a set of unit segments 6950 each corresponding to an indication area on the screen of the display device 13 or 15 (#1 or #2) which occurs in the case where the number of indicated ordered items per display segment is equal to 6 and the number of display segments is equal to 4. The order display buffer 694 is divided into an order area 6951 storing information which has been erased, an order area 6952 storing information which is currently indicated, and an order area 6953 storing information which will be indicated later. The order area 6951 for the erased information is of the fast-in fast-out structure. The order area 6951 for the erased information serves as a save area for the erased information which is used in recalling the erased information and confirming the erased information. The order display buffer 694 is similar in operation to the display buffer in the second embodiment of this invention.

The structure of segment data stored in the display buffer 694 is similar to that shown in FIG. 27. Specifically, the segment data has an order ID number area, an ordered item area, and a control flag area. The control flag area stores flags used in the control of the indication of a customer's order. The stored flags Include a cursor position flag, a preparation start flag, and a plural-segment order flag. During movement of the cursor position by actuating the shift keys 51 and 52 in the monitor control switch 14 or 16, the cursor position flag is set when the cursor comes to the corresponding display segment. The preparation start flag is set by actuation of the preparation start key 53 in the monitor control switch 14 or 16. The plural-segment order flag represents whether or not ordered items designated by a single order can not be placed within the corresponding display segment. A process of indicating a list of customer's orders in the 4-segment indication format is similar to the corresponding processing in the first embodiment or the second embodiment of this invention.

Figures 70, 71:
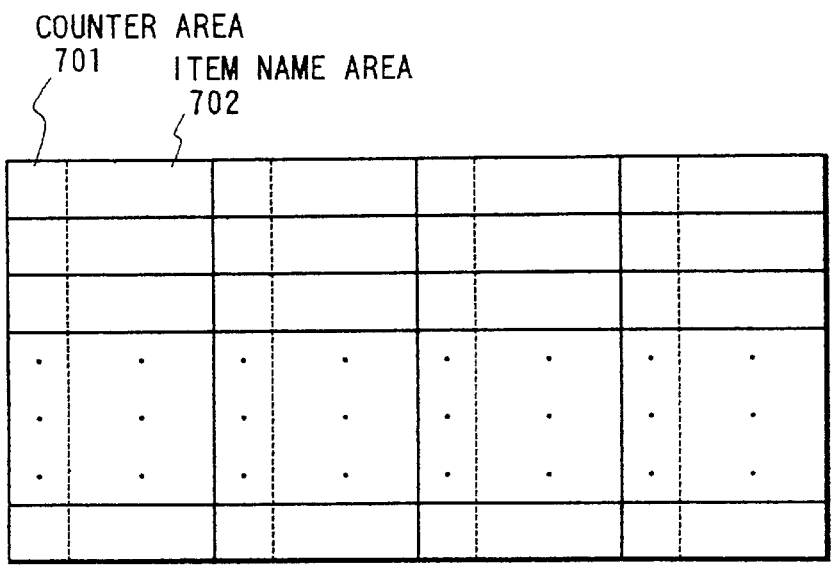
FIG. 70 is a diagram of the structure of a summary-picture display buffer in FIG. 69.
FIG. 71 is a diagram of a summary item setting picture on a display device in a register terminal in a ninth embodiment of this invention.

FIG. 70 shows an example of the structure of the summary-picture display buffer 695. As shown in FIG. 70, the summary-picture display buffer 695 is divided into areas 701 storing counter information, and areas 702 storing information of item names. In the case of setting of an item indication order equal to the programmed order (the setting order), the item name areas 702 are loaded with respective information pieces of the names of summary-indication items which are preset in the register terminal 11, and which are in the programmed order (the setting order). In the case of setting of an item indication order equal to the alphanumeric order, the summary-indication items are rearranged into the alphanumeric order, and the item name areas 702 are loaded with respective information pieces of the names of the summary-indication items in the alphanumeric order. Regarding all customer's orders which have been received from the register terminal 11 and which are in the order areas 6952 and 6953, ordered items of every equal type are counted to detect the total number thereof. The counting is executed during the reception of each customer's order. The counter areas 701 are loaded with information pieces of the total numbers of ordered items of equal types respectively. When information of a customer's order is erased from the picture on the display device 13 or 15 by operating the monitor control switch 14 or 16, the indicated numbers of ordered items in the summary indication sub-picture are decremented in accordance with the erased customer's order. On the other hand, when information of a new customer's order is received from the register terminal 11, the indicated numbers of ordered items in the summary indication sub-picture are incremented in accordance with the new customer's order. The summary-picture display buffer 695 selectively provides the summary indication sub-picture 662 in FIG. 66 or the summary indication sub-picture 682 in FIG. 68 in response to the setting of the indication mode. It should be noted that the indicated items in the summary indication sub-picture 662 of FIG. 66 are arranged in the order of setting thereof while the indicated items in the summary indication sub-picture 682 of FIG. 68 are arranged in the alphanumeric order.

Ninth Embodiment

A ninth embodiment of this invention is similar to the first embodiment thereof except for an additional arrangement described later. In the ninth embodiment, each of the monitor control switches 14 and 16 is provided with a picture change switch for changing a picture on the display device 13 or 15 between two different forms, that is, a first form (an order list indication form) indicating a list of customer's orders and a second form (a summary item indication form) indicating the total number of each of predesignated ordered items among all customer's orders which have been received by the kitchen video controller 12 from the register terminal 11.

Similarly to the second embodiment of this invention, the mode switch 23 in the register terminal 11 is moved to the setting mode position (P), and a setting picture similar to that shown in FIG. 24 is provided. Regarding the display device #1 (13), one is selected out of the 4-segment indication format (see FIG. 29(a)) and the 8-segment indication format (see FIG. 29(b)).

Similarly to the eighth embodiment of this invention, ordered items to be indicated in a summary item indication picture are designated, and the indication order of the summary items is set to one of the order of setting of the summary items (the programmed order) and the alphanumeric order regarding the names of the summary Items.

FIG. 71 shows an example of the summary item setting picture. In the case where addresses "0"~"60" are inputted and then a cashier key on the keyboard 21 is actuated, a setting address or addresses are designated. When setting data is inputted and then the cashier key is actuated, data pieces are set in the designated addresses respectively. An address of "0" is a setting address for an item indication order number related to the summary item indication picture. In the case where data of "0" is set to implement an item indication order equal to the programmed order (the setting order), summary items are indicated in the summary item indication picture in an order corresponding to the order of setting of address numbers "1"~"60".

Figures 72, 73:
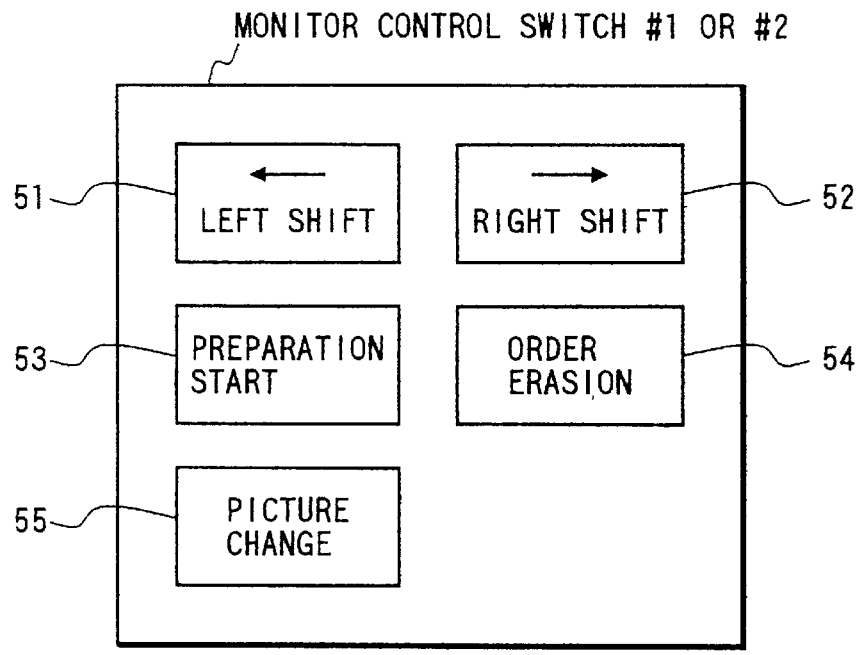
FIG. 72 is a front view of a monitor control switch in the ninth embodiment of this invention.
FIG. 73 is a diagram of an order list indication picture on a display device in a kitchen video controller in the ninth embodiment of this invention.

As shown in FIG. 72, the monitor control switch (#1) 14 (or the monitor control switch (#2) 16) has an array of keys such as a left-hand shift key 51, a right-hand shift key 52, a preparation start key 53, an order erasion key 54, and a picture change key 55. Upon operation of these keys, corresponding key signals are generated. The generated key signals are fed to the arithmetic operation controller 43. Each time the picture change key 55 is actuated, the picture on the display device #1 or #2 (13 or 15) changes between the order list indication form and the summary item indication form.

FIG. 73 shows an example of the order list indication picture of the 4-segment type. FIG. 74 shows an example of the summary item indication picture in which the summary items are arranged in the order of setting thereof. FIG. 75 shows an example of the summary item indication picture in which the summary items are arranged in the alphanumeric order.

The structure of the memory 46 of the kitchen video controller 12 is similar to that shown in FIGS. 69 and 70.

When information of a customer's order is erased from the picture on the display device 13 or 15 by operating the monitor control switch 14 or 16, the indicated numbers of ordered items in the summary item indication picture are decremented in accordance with the erased customer's order. On the other hand, when information of a new customer's order is received from the register terminal 11, the indicated numbers of ordered items in the summary item indication picture are incremented in accordance with the new customer's order.

Tenth Embodiment

A tenth embodiment of this invention is similar to the seventh embodiment thereof except for an additional arrangement described later. In the tenth embodiment, each of the monitor control switches 14 and 16 is provided with a picture change switch for changing a picture on the display device 13 or 15 between two different forms, that is, a first form (an order list indication form) indicating a list of customer's orders and a second form (a summary item indication form) indicating the total number of each of predesignated ordered items among all customer's orders which have been received by the kitchen video controller 12 from the register terminal 11.

Each of the monitor control switches #1 and #2 (14 and 16) has a picture change key 55 similar to that shown in FIG. 72. The way of setting the indication mode is similar to that in the seventh embodiment of this invention. The monitor control switches #1 and #2 (14 and 16) operate on the display devices #1 and #2 (13 and 15) respectively. In other words, the operation of the monitor control switch #1 (14) on the display device #1 (13) and the operation of the monitor control switch #2 (16) on the display device #2 (15) are basically independent of each other.

Figure 76:
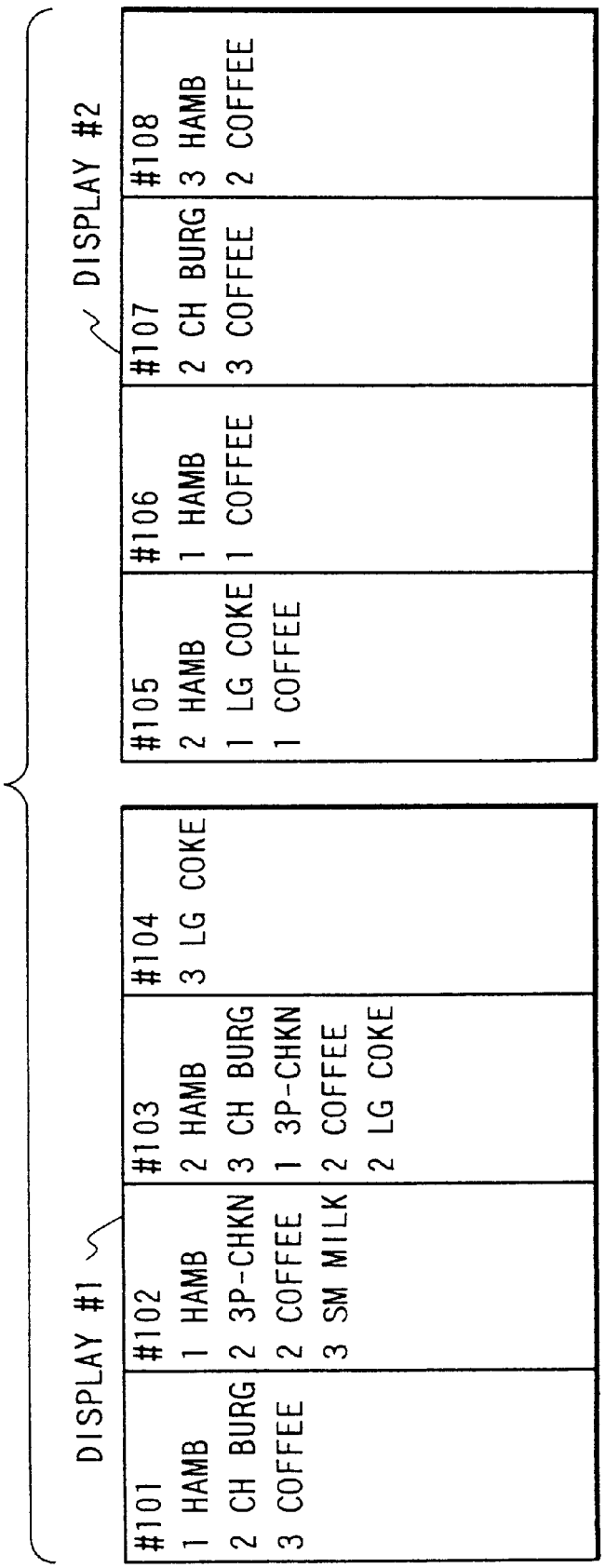
FIG. 76 is a diagram of order list indication pictures on display devices in a kitchen video controller in a tenth embodiment of this invention.

FIG. 76 shows an example of order list indication pictures indicated on the display device #1 and the display device #2 according to the tandem operation mode with the 4-segment indication format. When the picture change key 55 on the monitor control switch #2 (16) is actuated, the order list indication picture on the display device #2 changes to the summary item indication picture in FIG. 77. In the case where the picture change key 55 on the monitor control switch #2 (16) is actuated again, the summary item indication picture on the display device #2 is replaced by the order list indication picture in FIG. 76.

When information of a customer's order is erased from the summary item indication picture on the display device 13 or 15 by operating the monitor control switch 14 or 16, the indicated numbers of ordered items in the summary item indication picture are decremented in accordance with the erased customer's order. On the other hand, when information of a new customer's order is received from the register terminal 11, the indicated numbers of ordered items in the summary item indication picture are incremented in accordance with the new customer's order.

Figure 78:
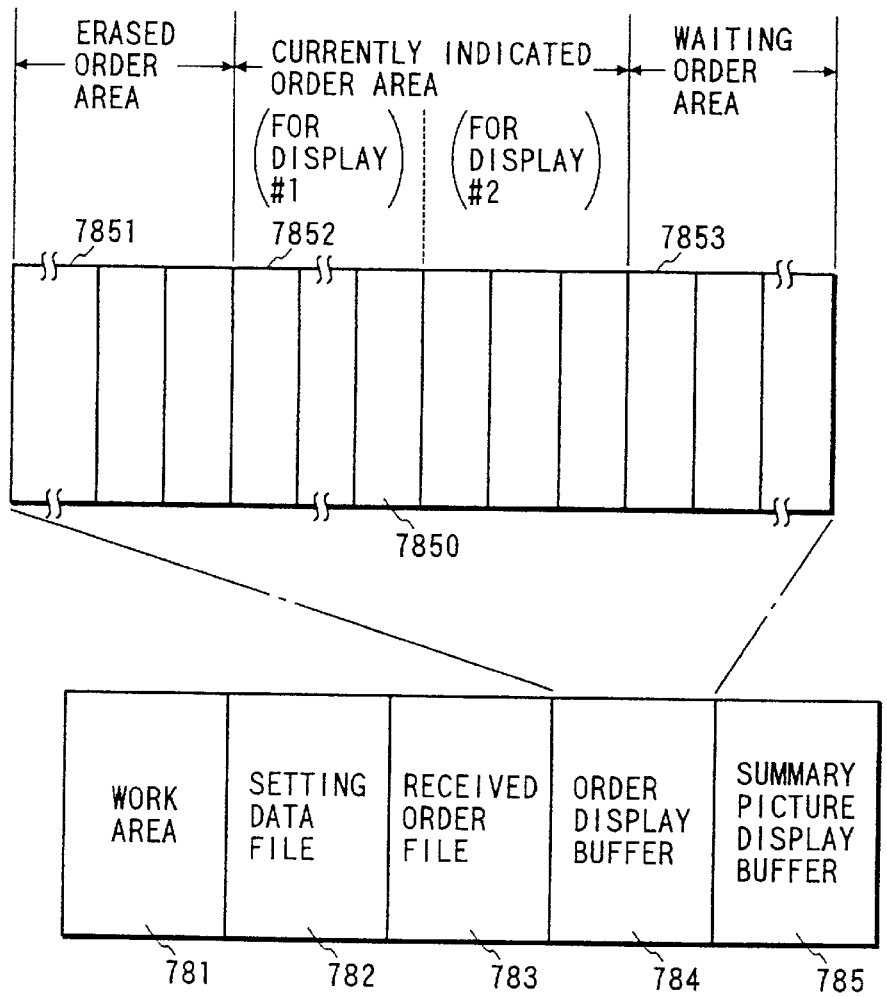
FIG. 78 is a diagram of the structure of a memory in the kitchen video controller in the tenth embodiment of this invention.

FIG. 78 shows the structure of an information recording area in the memory 46 within the kitchen video controller 12. As shown in FIG. 78, the memory 46 is provided with a work area 781, a setting data file 782, a received order file 783, an order display buffer 784, and a summary-picture display buffer 785. The work area 781 is used for the control of the kitchen video controller 12. Setting data for the control of the kitchen video controller 12 is generated by the register terminal 11, and is transmitted from the register terminal 11 to the kitchen video controller 12 via the data communication line 17. The setting data file 782 stores the transmitted setting data. The received order file 783 stores order data transmitted from the register terminal 11. The order display buffer 784 is used to enable data pieces in the received order file 783 to be sequentially indicated by the display device 13 or 15 (#1 or #2). The summary-picture display buffer 785 is used for the summary item indication picture. The order display buffer 784 has a set of unit segments 7850 each corresponding to an indication area on the screen of the display device 13 or 15 (#1 or #2). The order display buffer 784 is divided into an order area 7851 storing information which has been erased, an order area 7852 storing information which is currently indicated, and an order area 7853 storing information which will be indicated later. The order area 7851 for the erased information is of the fast-in fast-out structure. The order area 7851 for the erased information serves as a save area for the erased information which is used in recalling the erased information and confirming the erased information. The order area 7852 for the currently-indicated information is divided into two portions, that is, a first portion having a set of unit display segments for the display device #1 and a second portion having a set of unit display segments for the display device #2.

The setting of the indication format (the segment division number) is a process of determining the display-segment structure of the order display buffer 784. A process of setting the indication format is similar to that shown in FIG. 26. During the setting of the indication format, decisions are made as to the display segment number per display device and the indicated item number per display segment.

The structure of segment data stored in the order display buffer 784 is similar to that shown in FIG. 27. Specifically, the segment data has an order ID number area, an ordered item area, and a control flag area. The control flag area stores flags used in the control of the indication of a customer's order. The stored flags include a cursor position flag, a preparation start flag, and a plural-segment order flag. During movement of the cursor position by actuating the shift keys 51 and 52 in the monitor control switch 14 or 16, the cursor position flag is set when the cursor comes to the corresponding display segment. The preparation start flag is set by actuation of the preparation start key 53 in the monitor control switch 14 or 16. The plural-segment order flag represents whether or not ordered items designated by a single order can not be placed within the corresponding display segment. A program corresponding to processes responsive to the previously-mentioned control flags is similar to that shown in FIG. 28.

Figure 79:
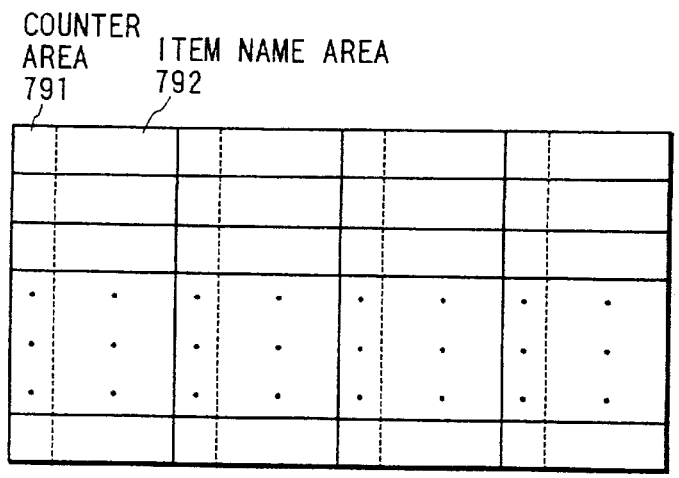
FIG. 79 is a diagram of the structure of a summary-picture display buffer in FIG. 78.

FIG. 79 shows an example of the structure of the summary-picture display buffer 785. As shown in FIG. 79, the summary-picture display buffer 785 is divided into areas 791 storing counter information, and areas 792 storing information of item names. In the case of setting of an item indication order equal to the programmed order (the setting order), the item name areas 792 are loaded with respective information pieces of the names of summary-indication items which are preset in the register terminal 11, and which are in the programmed order (the setting order). In the case of setting of an item indication order equal to the alphanumeric order, the summary-indication items are rearranged into the alphanumeric order, and the item name areas 792 are loaded with respective information pieces of the names of the summary-indication items in the alphanumeric order. Regarding all customer's orders which have been received from the register terminal 11, ordered items of every equal type are counted to detect the total number thereof. The counting is executed during the reception of each customer's order. The counter areas 791 are loaded with information pieces of the total numbers of ordered items of equal types respectively. When information of a customer's order is erased from the picture on the display device 13 or 15 by operating the monitor control switch 14 or 16, the indicated numbers of ordered items in the summary item indication picture are decremented in accordance with the erased customer's order. On the other hand, when information of a new customer's order is received from the register terminal 11, the indicated numbers of ordered items in the summary item indication picture are incremented in accordance with the new customer's order. The actuation of the picture change key 55 in the monitor control switch #2 changes the display data base for the display device #2 from the order display buffer 784 to the summary-picture display buffer 785, thereby enabling the display device #2 to indicate the summary item indication picture of FIG. 77.

Figure 81:
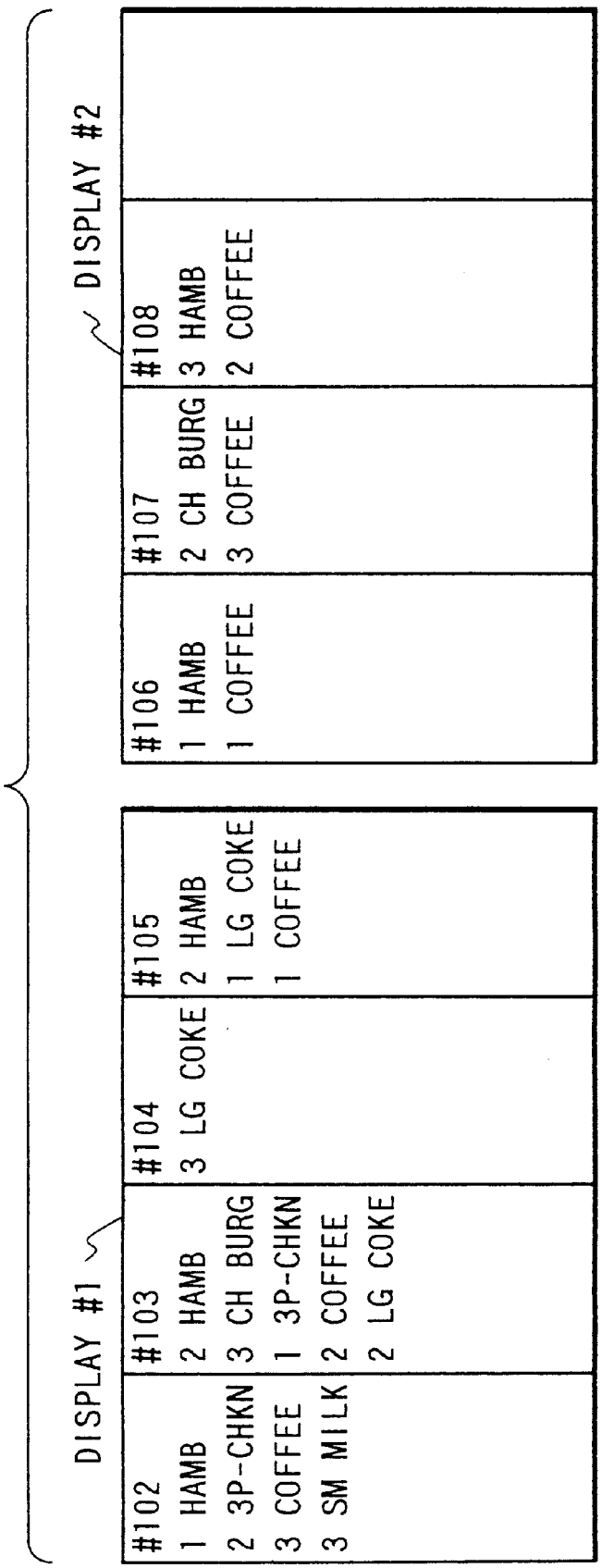
FIG. 81 is a diagram of an order list indication picture and a summary item indication picture on the display devices in the kitchen video controller in the tenth embodiment of this invention.

It is now assumed that, as shown in FIG. 77, an order list indication picture and a summary item indication picture are indicated on the display device #1 and the display device #2 respectively. These display conditions result from the actuation of the picture change key 55 in the monitor control switch #2. When the indication of the customer's order "#101" is erased from the order list indication picture on the display device #1 by actuating the order erasion key 54 in the monitor control switch #1, the order list indication picture in FIG. 77 changes to an order list indication picture in FIG. 80. During this change of the order list indication picture, the indicated positions of the customer's orders "#102"~"#104" shift leftward and the customer's order "#105" is newly indicated on the display device #1. In addition, the indicated numbers of ordered items in the summary item indication picture are decremented in accordance with the erasion of the customer's order "#101". In the case where the picture change key 55 on the monitor control switch #2 is actuated again, the summary item indication picture on the display device #2 is replaced by an order list indication picture. In this case, as shown in FIG. 81, both the display devices #1 and #2 indicate the order list indication pictures.

Figure 82:
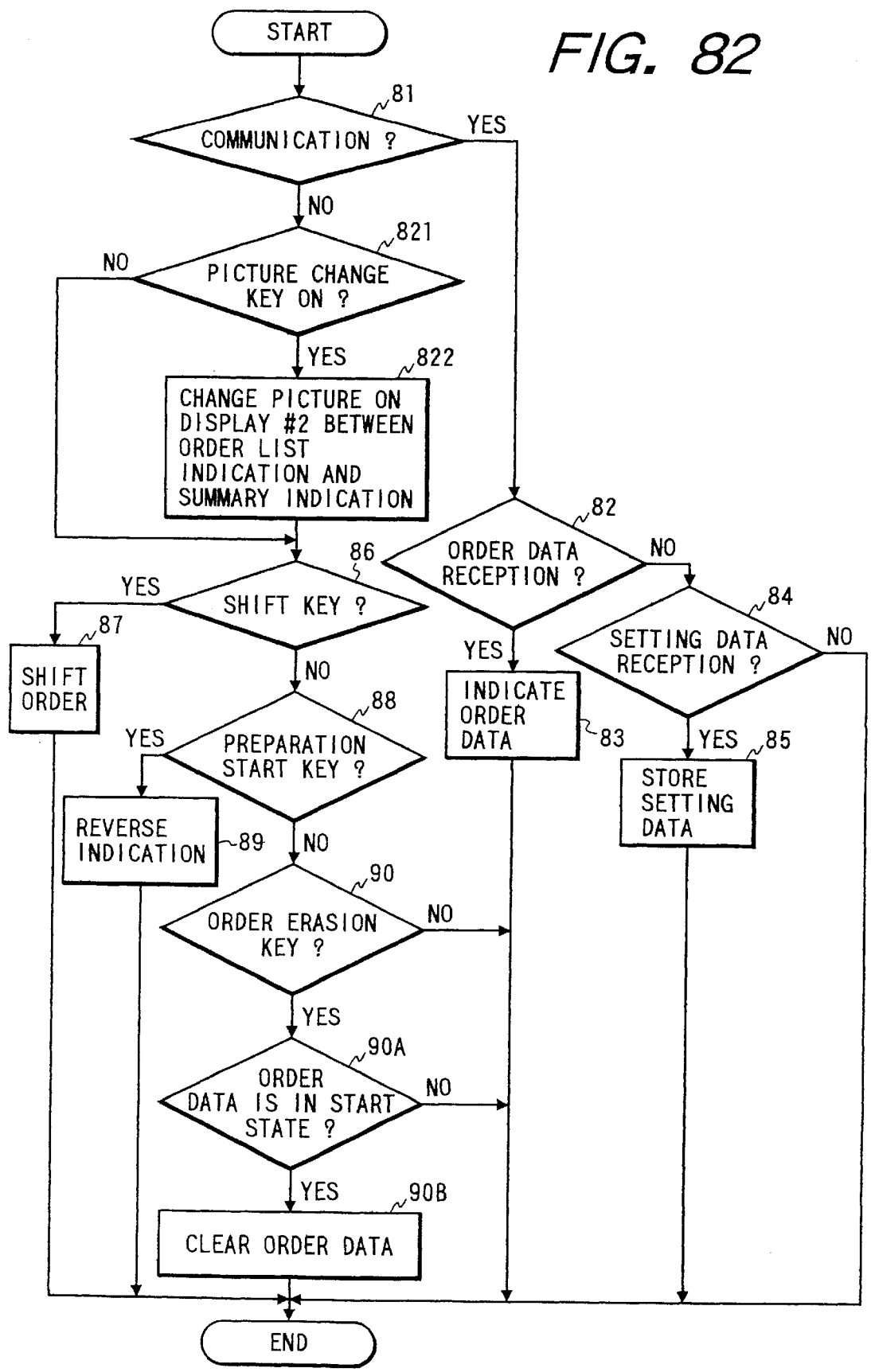
FIG. 82 is a flowchart of a segment of a program for controlling operation of the kitchen video controller in the tenth embodiment of this invention.

FIG. 82 is a flowchart of a program controlling the task processing executed by the kitchen video controller 12. The program is periodically reiterated. The program in FIG. 82 is similar to the program in FIG. 8 except that steps 821 and 822 are additionally provided between the steps 81 and 86. In FIG. 82, the step 821 which follows the step 81 decides whether or not the picture change key 55 is changed to an on position. When the picture change key 55 is changed to the on position, the program advances from the step 821 to the step 822. Otherwise, the program jumps from the step 821 to the step 86. The step 822 changes the picture on the display device #2 from one of the order list indication form and the summary item indication form to the other. After the step 822, the program advances to the step 86.

Eleventh Embodiment

An eleventh embodiment of this invention is similar to one of the eighth embodiment, the ninth embodiment, and the tenth embodiment thereof except for an additional arrangement described later. The eleventh embodiment is provided with the function of inhibiting ordered items, the counted numbers of which are equal to zero, from being indicated in the summary item indication picture while display areas for the unindicated ordered items are kept in the summary item indication picture. On the other hand, ordered items, the counted numbers of which are equal to 1 or more, are indicated in the summary item indication picture in the alphanumeric order or the programmed order (the setting order).

FIG. 83 shows an example of the structure of the summary-picture display buffer. As shown in FIG. 83, the summary-picture display buffer is divided into areas 831 storing counter information, and areas 832 storing information of item names. In FIG. 83, the summary item "CH BURG" has a counted number of "0".

FIG. 84 shows an example of a picture on the display device #1 or #2 (13 or 15) according to the separated indication format. As shown in FIG. 84, the picture is separated into an upper half and a lower half corresponding to an order indication sub-picture 841 and a summary indication sub-picture 842 respectively. The order indication sub-picture 841 is of the 4-segment indication format. In the summary indication sub-picture 842 of FIG. 84, the indicated items are arranged in the order of setting thereof (that is, in the programmed order). As shown in FIG. 84, the summary item "CH BURG" having a counted number of "0" is inhibited from being indicated in the summary indication sub-picture 842 while a blank area is provided therefor.

FIG. 85 shows an example of a picture on the display device #1 or #2 (13 or 15) according to the separated indication format. As shown in FIG. 85, the picture is separated into an upper half and a lower half corresponding to an order indication sub-picture 851 and a summary indication sub-picture 852 respectively. The order indication sub-picture 851 is of the 4-segment indication format. In the summary indication sub-picture 852 of FIG. 85, the indicated items are arranged in the alphanumeric order. As shown in FIG. 85, the summary item "CH BURG" having a counted number of "0" is inhibited from being indicated in the summary indication subpicture 852 while a blank area is provided therefor.

Figure 86:
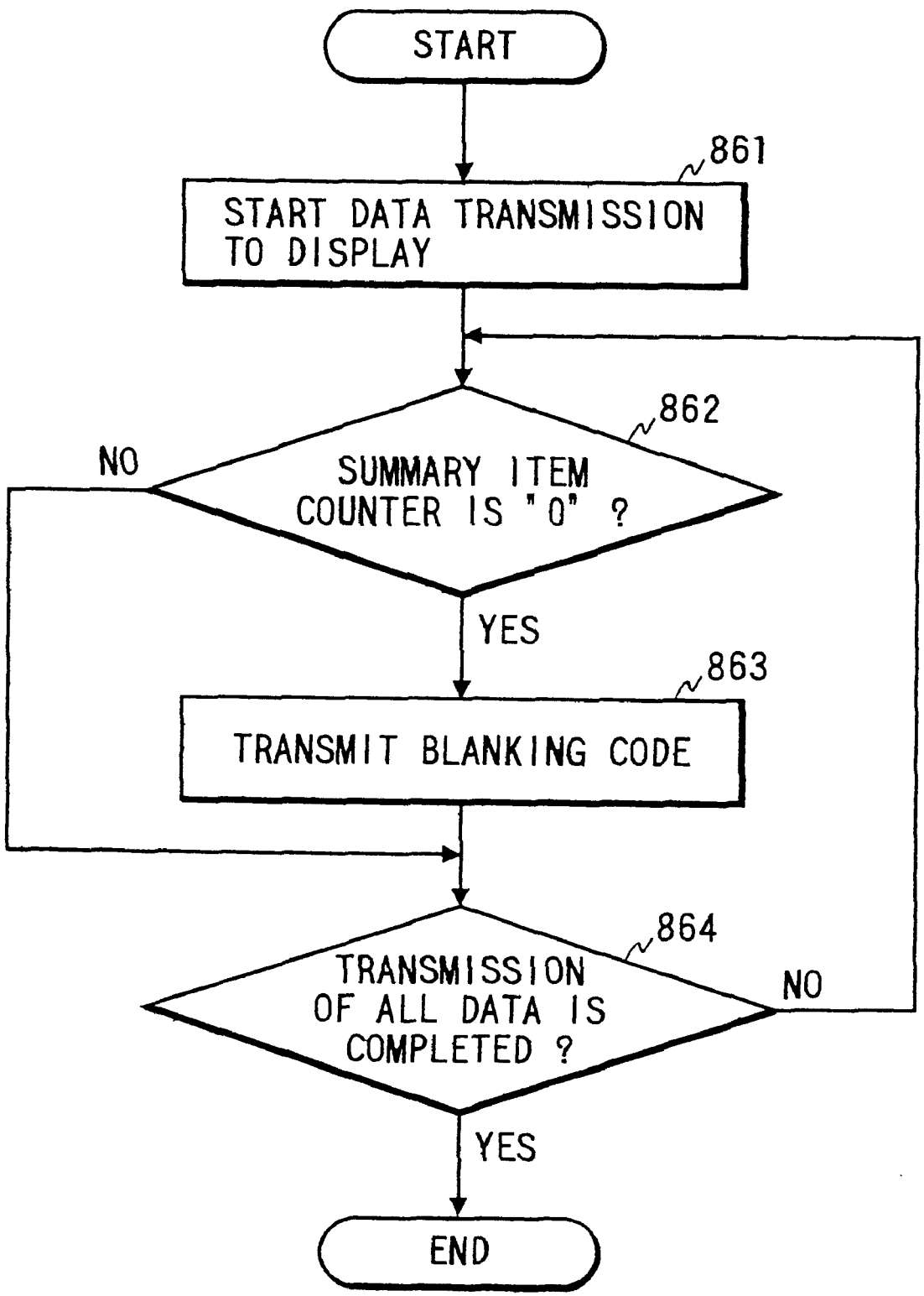
FIG. 86 is a flowchart of a segment of a program for controlling operation of the kitchen video controller which relates to a summary item indication picture in the eleventh embodiment of this invention.

FIG. 86 is a flowchart of a program for indicating a summary indication sub-picture on the display device #1 or #2. As shown in FIG. 86, a first step 861 of the program starts the transmission of data from the summary-picture display buffer to the display device #1 or #2. After the step 861, the program advances to a step 862. The step 862 decides whether or not the counted number of a summary item is equal to "0". When the counted number of the summary item is equal to "0", the program advances from the step 862 to a step 863. Otherwise, the program jumps from the step 862 to a step 864. The step 863 transmits a blank code signal for the summary item. After the step 863, the program advances to the step 864. The step 864 decides whether or not the transmission of data of all the summary items is completed. When the transmission of data of all the summary items is completed, the program exits from the step 864 and then the current execution cycle of the program ends. Otherwise, the program returns from the step 864 to the step 862 so that the previously-mentioned processes are repeated for a next summary item.

Twelfth Embodiment

A twelfth embodiment of this invention is similar to the ninth embodiment or the tenth embodiment thereof except for an additional arrangement described later. The twelfth embodiment is provided with the function of inhibiting ordered items, the counted numbers of which are equal to zero, from being indicated in the summary item indication picture while display areas for the unindicated ordered items are absent from the summary item indication picture. On the other hand, ordered items, the counted numbers of which are equal to 1 or more, are indicated in the summary item indication picture in the alphanumeric order or the programmed order (the setting order).

FIG. 87(*a*) shows an example of the structure of a first summary-picture display buffer #1. As shown in FIG. 87(*a*), the first summary-picture display buffer is divided into areas 871 storing counter information, and areas 872 storing information of item names. In FIG. 87(*a*), the summary item "CH BURG" has a counted number of "0".

FIG. 87(*b*) shows an example of the structure of a second summary-picture display buffer #2. As shown in FIG. 87(*b*), the second summary-picture display buffer is divided into areas 871 storing counter information, areas 872 storing information of item names, and areas 873 storing control-flag information. When the picture change key 5 is actuated, the second summary-picture display buffer #2 is loaded with the data of the summary items except the summary item having a counted number of "0" from the first summary-picture display buffer #1. In the second summary-picture display buffer #2, the data pieces of the respective summary items are sequentially arranged without any spaces provided therebetween. In the case where the counted number of a summary item or the counted numbers of summary items in the first summary-picture display buffer #1 increase from zero upon the reception of a new customer's order from the register terminal 11, the data pieces of the summary items are sequentially stored into areas of the second summary-picture display buffer #2 which immediately follow the used areas thereof.

Regarding the summary item or the summary items which have been changed from the conditions occurring when the picture change is executed and the information of the summary items is stored into the second summary-picture display buffer #2, corresponding control flags in the areas 873 are set to "1". The indication of a customer's order can be erased from the display device #1 or #2 by actuating the related monitor control switch #1 or #2. Regarding the summary item or the summary items whose counted numbers have fallen to zero in response to the erasion of the indication of a customer's order (that is, regarding the summary item or the summary items which have been changed from the conditions occurring when the picture change is executed and the information of the summary items is stored into the second summary-picture display buffer #2), corresponding control flags in the areas 873 are set to "1". At this time, the summary items whose counted numbers have fallen to zero are prevented from being erased from the summary item indication picture. The counted-number information in a position of the second summary-picture display buffer #2 which corresponds to each of the 0-number summary items is changed to "0". In the summary item indication picture, the counter indication of each of the summary items changed in counted number to "0" is blinked.

FIG. 88 shows an example of the order list indication picture of the 4-segment type. When the picture change key 55 is actuated, the order list indication picture in FIG. 88 is replaced by a summary item indication picture in FIG. 89. It is now assumed that the counted number of the ordered item "CH BURG" is equal to zero. As shown in FIG. 89, summary items except the ordered item "CH BURG" are sequentially arranged in the summary item indication picture without providing any space for the ordered item "CH BURG". In the case where the information of an additional customer's order 901 of FIG. 90(a) is received by the kitchen video controller 12 while the display device #1 or #2 continues to indicate the summary item indication picture of FIG. 89, the summary-picture display buffer #2 changes from the state in FIG. 87(b) to a state in FIG. 90(b). Data of the newly-added summary item "CH BURG" is stored into an area of the summary-picture display buffer #2 which immediately follows the area of the last summary item. Regarding the summary item "COFFEE", the counted number is corrected. Regarding the newly-added summary item and the corrected summary item (that is, "CH BURG" and "COFFEE"), corresponding control flags in the areas 873 are set to "1". The above-mentioned change of the data in the second summary-picture display buffer #2 replaces the summary item indication picture of FIG. 89 by a summary item indication picture of FIG. 91. The indication of the counted numbers of the newly-added summary item and the corrected summary item (that is, "CH BURG" and "COFFEE") is blinked. The blinked indication represents that a related summary item or items are newly added or corrected.

The actuation of the picture change key 55 replaces the summary item indication picture in FIG. 91 by an order list indication picture in FIG. 92. When the picture change key 55 is actuated again, summary items of every equal type are counted to detect the total number thereof regarding all customer's orders which have been received. In addition, a state of the first summary picture display buffer #1 in FIG. 93(a) is provided. Data in the second summary-picture display buffer #2 in FIG. 93(b) is generated from the data in the first summary-picture display buffer #1 in FIG. 93(a). A summary item indication picture in FIG. 94 is provided in accordance with the data in the second summary-picture display buffer #2 in FIG. 93(b).

Figure 95:
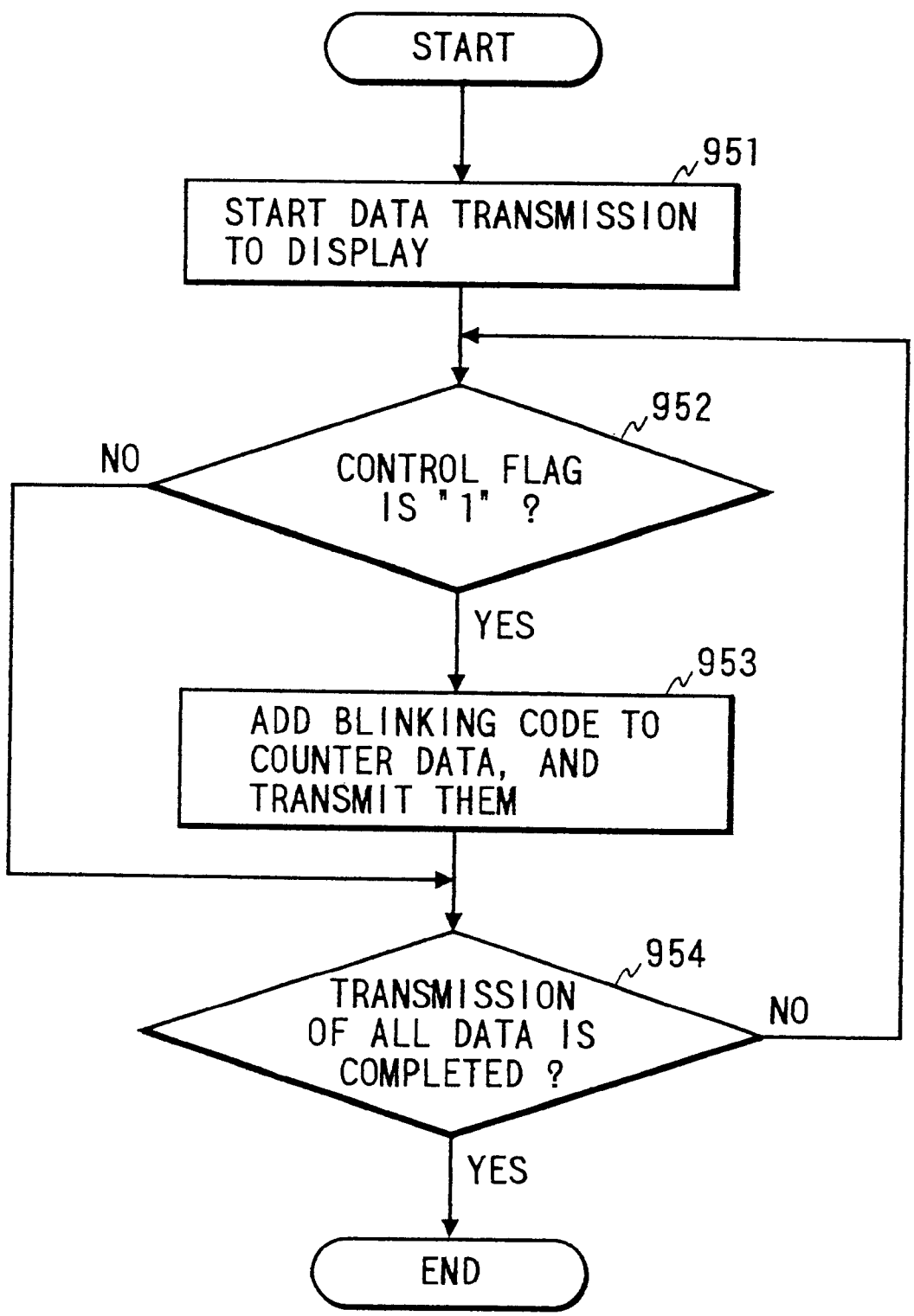
FIG. 95 is a flowchart of a segment of a program for controlling operation of the kitchen video controller which relates to a summary item indication picture in the twelfth embodiment of this invention.

FIG. 95 is a flowchart of a program for indicating a summary item indication picture on the display device #1 or #2. As shown in FIG. 95, a first step 951 of the program starts the transmission of data from the summary picture display buffer to the display device #1 or #2. After the step 951, the program advances to a step 952. The step 952 decides whether or not the control flag of a summary item is equal to "1" (corresponding to a set state). When the control flag of the summary item is equal to "0", the program advances from the step 952 to a step 953. Otherwise, the program jumps from the step 952 to a step 954. The step 953 adds a blinking code signal to the counter data (the data in the area 871) of the summary item, and transmits the resultant composite data of the summary item. After the step 953, the program advances to the step 954. The step 954 decides whether or not the transmission of data of all the summary items is completed. When the transmission of data of all the summary items is completed, the program exits from the step 954 and then the current execution cycle of the program ends. Otherwise, the program returns from the step 964 to the step 952 so that the previously-mentioned processes are repeated for a next summary item.

Thirteenth Embodiment

A thirteenth embodiment of this invention is similar to one of the first embodiment to the twelfth embodiment thereof except for an additional arrangement described later. Regarding the control of each of the display devices 13 and 15 by the kitchen video controller 12, the thirteenth embodiment is provided with the following three functions. The first function is to select the presence and the absence of the generation of confirmation sound upon the reception of a customer's order from the register terminal 11. The second function is to select the presence and the absence of the indication of a total sum of the item prices related to a customer's order as an indication format provided by the kitchen video controller 12. The third function is to decide whether or not information of the person in charge of the registration of a customer's order should be indicated on the display device 13 or 15 in addition to the indication of the customer's order.

Figure 96:
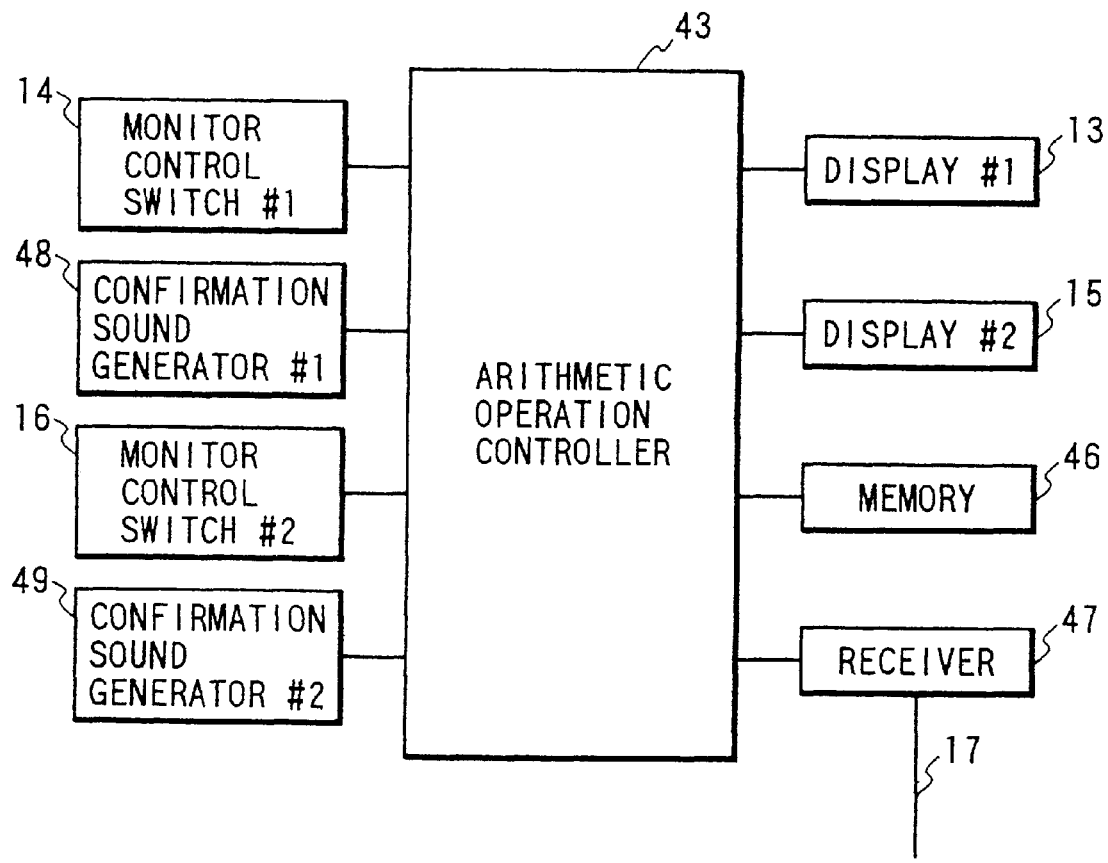
FIG. 96 is a block diagram of a kitchen video controller and associated devices in a thirteenth embodiment of this invention.

As shown in FIG. 96, the kitchen video controller 12 includes an arithmetic operation controller 43, a memory 46, and a receiver 47. The arithmetic operation controller 43 includes a microcomputer, a digital signal processor, or a similar device having a combination of an interface, a processing section, a RAM, and a ROM. The ROM within the arithmetic operation controller 43 stores processing programs for implementing the tasks assigned to the kitchen video controller 12. The arithmetic operation controller 43 is connected to the display device (#1) 13, the monitor control switch (#1) 14, the display device (#2) 15, the monitor control switch (#2) 16, the memory 46, and the receiver 47. The receiver 47 is connected to the data communication line 17.

The arithmetic operation controller 43 is also connected to confirmation sound generators 48 and 49 (#1 and #2). The confirmation sound generator 48 (#1) relates to the monitor control switch 14 (#1) and the display device 13 (#1). The confirmation sound generator 48 (#1) may be provided in the monitor control switch 14 (#1) or the display device 13 (#1). The confirmation sound generator 49 (#2) relates to the monitor control switch 16 (#2) and the display device 15 (#2). The confirmation sound generator 49 (#2) may be provided in the monitor control switch 16 (#2) or the display device 15 (#2).

When the mode switch 23 in the register terminal 11 is moved to the setting mode position (P), a setting task menu similar to that in FIG. 11 is indicated on the display device 24. Upon operation of the keyboard 21 which corresponds to "60" (totalization), a "KITCHEN VIDEO" setting stage 60 is selected. Then, a "KITCHEN VIDEO PROG" menu similar to that in FIG. 12 is indicated on the display device 24. When operation of the keyboard 21 which corresponds to "2" (totalization) is executed, a setting state "VIDEO MODE" is selected which relates to a kitchen video operation mode.

Figures 97, 98:
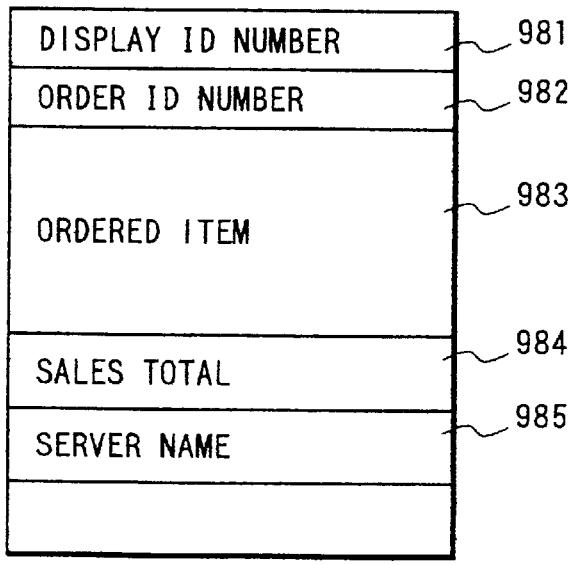
FIG. 97 is a diagram of a picture on a display device in a register terminal which operates in a kitchen video setting mode in the thirteenth embodiment of this Invention.
FIG. 98 is a diagram of an order file transmitted from the register terminal to a kitchen video controller in the thirteenth embodiment of this invention.

FIG. 97 shows an example of a setting picture related to an indication status and an indication mode of the kitchen video. In FIG. 97, "FIELD 1" denotes a setting area for the kitchen video indication mode, and "FIELD 2" denotes a setting area for the kitchen video indication status. Here, "FIELD 2" of "VIDEO #1 (display device #1)" is designated by operating the keyboard 21, and the keyboard 21 is subjected to operation corresponding to "12" (SBTL). Subsequently, the indication status related to "KVS #1" is set by operation of the keyboard 21 which corresponds to "status data" (totalization).

There are different statuses as follows.

N1 N2=10; generation of confirmation sound (beep)

N1 N2=01; indication of a total sum of the item prices in a customer's order (sales total)

N1 N2=02; indication of the name of a person in charge (server name)

N1 N2=13; generation of confirmation sound (beep) & indication of a total sum of the item prices in a customer's order (sales total) & indication of the name of a person in charge (server name)

One of the statuses or a combination of at least two of the statuses can be set.

FIG. 98 shows the structure of a transmission order file used in the transmission of a registered order from the register terminal 11 to the kitchen video controller 12. As shown in FIG. 98, the transmission order file has an area 981 for storing information of a display ID number, an area 982 for storing information of an order ID number, an area 983 for storing information of ordered items, an area 984 for storing information of a total sum of the item prices in a customer's order (sales total), and an area 985 for storing information of the name of a person in charge (server name). When a customer's order is registered via the register terminal 11, the information of the total sum of the item prices in the customer's order and the information of the name of the person in change are stored into the areas 984 and 985 in the transmission order file respectively. The transmission order file containing the information of the total sum of the item prices in the customer's order and the information of the name of the person in change is transmitted from the register terminal 11 to the kitchen video controller 12.

Figure 99:
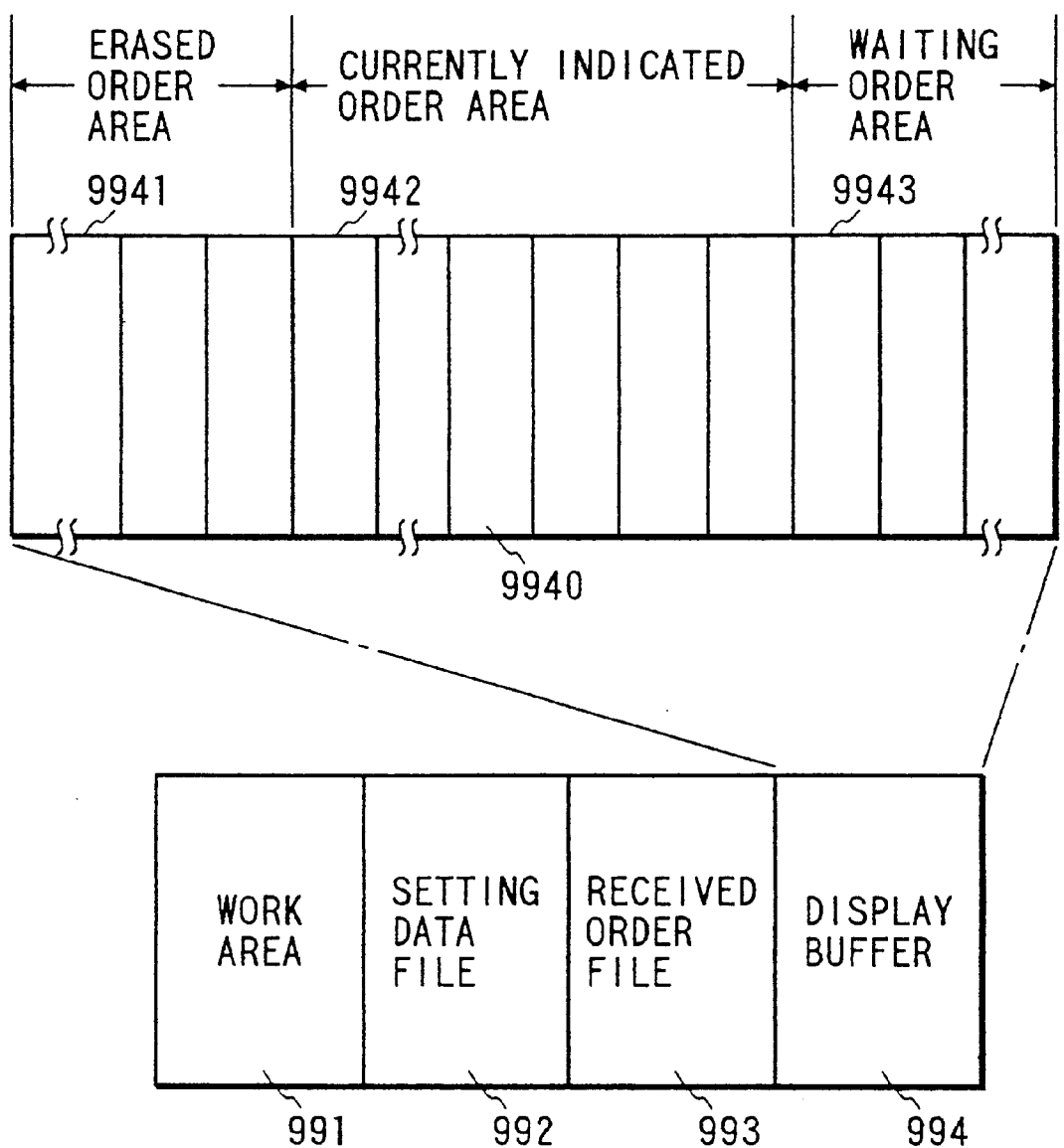
FIG. 99 is a diagram of the structure of a memory in the kitchen video controller in the thirteenth embodiment of this invention.

FIG. 99 shows the structure of an information recording area in the memory 46 within the kitchen video controller 12. As shown in FIG. 99, for each of the display devices 13 and 15, the memory 46 is provided with a work area 991, a setting data file 992, a received order file 993, and a display buffer 994. The work area 991 is used for the control of the kitchen video controller 12. Setting data for the control of the kitchen video controller 12 is generated by the register terminal 11, and is transmitted from the register terminal 11 to the kitchen video controller 12 via the data communication line 17. The setting data file 992 stores the transmitted setting data. The received order file 993 stores order data transmitted from the register terminal 11. The display buffer 994 is used to enable data pieces in the received order file 993 to be sequentially indicated by the display device 13 or 15. The display buffer 994 has a set of unit segments 9940 each corresponding to an indication area on the screen of the display device 13 or 15. The display buffer 994 is divided into an order area 9941 storing information which has been erased, an order area 9942 storing information which is currently indicated, and an order area 9943 storing information which will be indicated later. The order area 9941 for the erased information is of the fast-in fast-out structure. The order area 9941 for the erased information serves as a save area for the erased information which is used in recalling the erased information and confirming the erased information.

The setting of the indication format (the segment division number) is a process of determining the display-segment structure of the order display buffer 994. A process of setting the indication format is similar to that in the second embodiment. During the setting of the indication format, decisions are made as to the display segment number per display device and the indicated item number per display segment.

Figure 100:
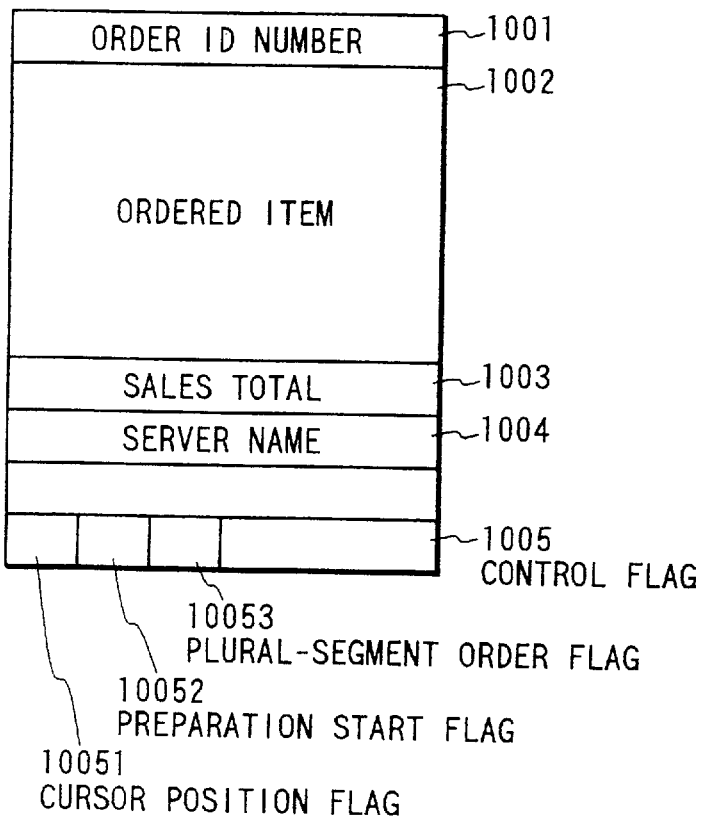
FIG. 100 is a diagram of segment data in a display buffer provided in the kitchen video controller memory of FIG. 99.

FIG. 100 shows the structure of segment data stored in the display buffer 994. As shown in FIG. 100, the segment data has an order ID number portion 1001, an ordered item portion 1002, a portion 1003 representative of the total sum of the item prices in a customer's order, a portion 1004 representative of the name of the person in charge, and a control flag portion 1005. The control flag portion 1005 contains flags used in the control of the indication of a customer's order. The stored flags include a cursor position flag 10051, a preparation start flag 10052, and a plural-segment order flag 10053.

Figure 101:
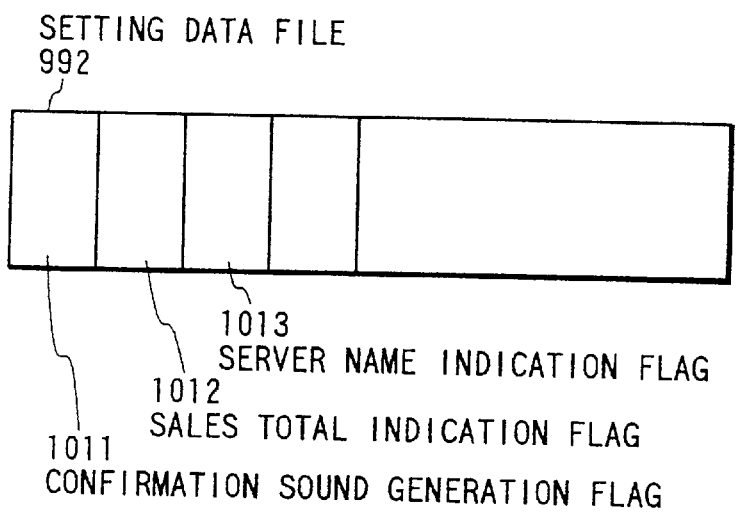
FIG. 101 is a diagram of the structure of a setting data file in the kitchen video controller memory of FIG. 99.

FIG. 101 shows the structure of data in the setting data file 992. As shown in FIG. 101, the data in the setting data file 992 has a sequence of a confirmation sound generation flag 1011, an order sum indication flag 1012, a person-in-charge indication flag 1013, and others. In the register terminal 11, the status information related to the kitchen video is set with reference to the status setting picture (see FIG. 97). When the setting process is completed, the status information is transmitted from the register terminal 11 to the kitchen video controller 12. Then, the status information is stored into the setting data file 992 in the kitchen video controller 12. During the control of each of the display devices 13 and 15 (#1 and #2), the kitchen video controller 12 enables the indication of a picture on the display device 13 or 15 in correspondence with the setting status thereof.

FIG. 102 shows an example of a picture indicated on the display device 13 or 15 in which the indication of the total sum of the item prices in each customer's order is present. FIG. 103 shows an example of a picture indicated on the display device 13 or 15 in which the indication of the name of the person in charge is present regarding each customer's order. FIG. 104 shows an example of a picture indicated on the display device 13 or 15 in which the indication of the total sum of the item prices in each customer's order is present, and also the indication of the name of the person in charge is present regarding each customer's order.

Figure 105:
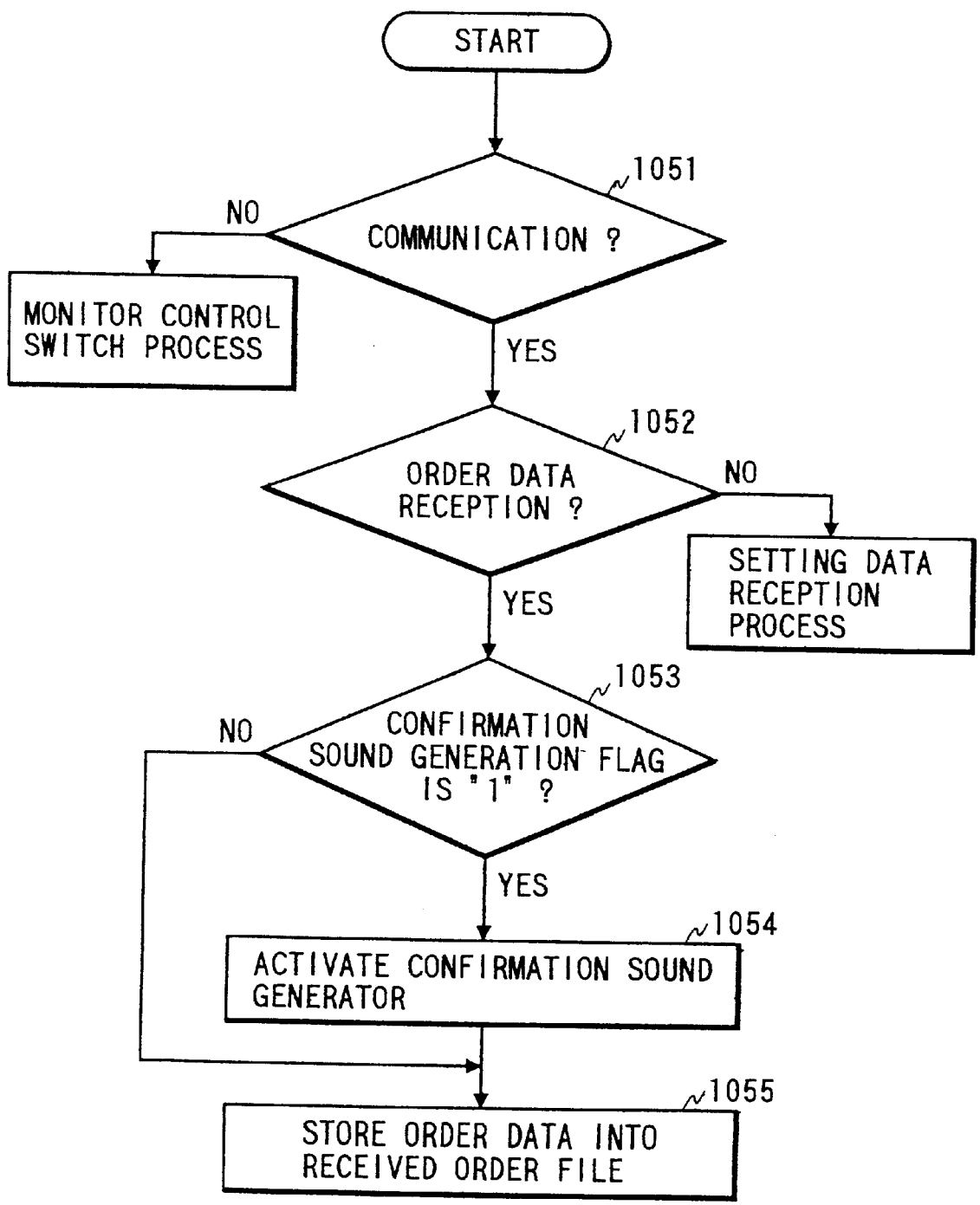
FIG. 105 is a flowchart of a segment of a program for controlling operation of the kitchen video controller which relates to the generation of confirmation sound in the thirteenth embodiment of this invention.

FIG. 105 is a flowchart of a program controlling the task processing executed by the kitchen video controller 12. The program is periodically reiterated. With reference to FIG. 105, a first step 1051 of the program decides whether or not a process of communication with the register terminal 11 is required. When the process of communication with the register terminal 11 is required, the program advances from the step 1051 to a step 1052. Otherwise, the program advances from the step 1051 to a block related to the processing responsive to the monitor control switch 14 or 16.

The step 1052 decides whether or not information of a customer's order is received from the register terminal 11. When the information of the customer's order is received, the program advances from the step 1052 to a step 1053. Otherwise, the program advances from the step 1052 to a block related to a process of receiving the setting data.

The step 1053 decides whether or not the confirmation sound generation flag 1011 in the setting data file 992 related to the received customer's order is equal to "1" (corresponding to a set state). When the confirmation sound generation flag 1011 is equal to "1", the program advances from the step 1053 to a step 1054. Otherwise, the program jumps from the 1053 to a block 1055. The step 1054 activates the confirmation sound generator 48 or 49 corresponding to the received customer's order. Accordingly, the confirmation sound generator 48 or 49 produces confirmation sound representing the reception of the customer's order. After the step 1054, the program advances to the block 1055. The block 1055 has a step of storing the data of the received customer's order into the received order file 993, and a step of indicating the information of the received customer's order on the display device 13 or 15.

Figure 106:
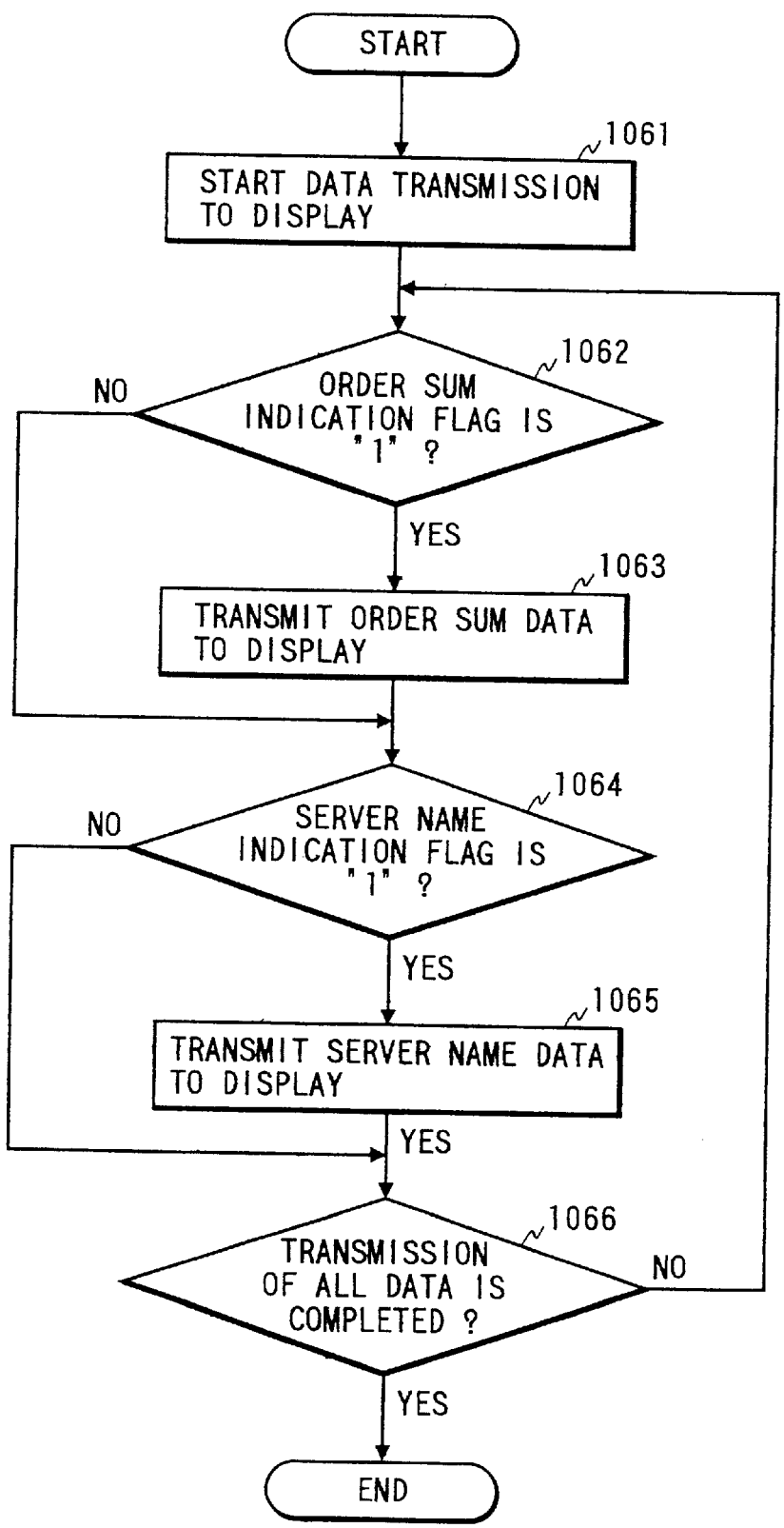
FIG. 106 is a flowchart of a segment of a program for controlling operation of the kitchen video controller which relates to picture indication in the thirteenth embodiment of this invention.

FIG. 106 is a flowchart of a program for indicating a picture on the display device 13 or 15 (#1 or #2). As shown in FIG. 106, a first step 1061 of the program starts the transmission of the order number data 1001 and the ordered item data 1002 from the display buffer 994 to the display device 13 or 15 (#1 or #2). After the step 1061, the program advances to a step 1062. The step 1062 decides whether or not the order sum indication flag 1012 in the setting data file 992 is equal to "1" (corresponding to a set state). When the order sum indication flag 1012 is equal to "1", the program advances from the step 1062 to a step 1063. Otherwise, the program jumps from the step 1062 to a step 1064. The step 1063 transmits the data 1003 of the total sum of the item prices from the display buffer 994 to the display device 13 or 15 (#1 or #2). After the step 1063, the program advances to the step 1064. The step 1064 decides whether or not the person-in-charge indication flag 1013 in the setting data file 992 is equal to "1" (corresponding to a set state). When the person-in-charge indication flag 1013 is equal to "1", the program advances from the step 1064 to a step 1065. Otherwise, the program jumps from the step 1064 to a step 1066. The step 1065 transmits the data 1004 of the name of the person in charge from the display buffer 994 to the display device 13 or 15 (#1 or #2). After the step 1065, the program advances to the step 1066. The step 1066 decides whether or not the transmission of all pieces of the order data is completed. When the transmission of all pieces of the order data is completed, the program exits from the step 1066 and then the current execution cycle of the program ends. Otherwise, the program returns from the step 1066 to the step 1062 so that the previously-mentioned processes are repeated for a next piece of the order data.

Fourteenth Embodiment

A fourteenth embodiment of this invention is similar to one of the first embodiment to the thirteenth embodiment thereof except for an additional arrangement described later. The fourteenth embodiment is provided with the function of changing the indication format provided by the kitchen video controller 12 between two different types. According to the first type of the indication format, indicated items in each customer's order are arranged in the order (sequence) equal to the order of the reception thereof. According to the second type of the indication format, indicated items in each customer's order are arranged in the order (sequence) determined by priority numbers given to the respective items.

By referring to a status setting picture similar to that in FIG. 97, the indication sequence of items in a customer's order is set in the status setting procedure. It is now assumed that the 4-segment indication format is selected. Here, "FIELD 2" of "VIDEO #1 (display device #1)" is designated by operating the keyboard 21, and the keyboard 21 is subjected to operation corresponding to "12" (SBTL). Subsequently, the indication status related to "KVS #1" is set by operation of the keyboard 21 which corresponds to "status data" (totalization).

In the case where "N1N2=20" (a kitchen display priority number mode) is set as the status data, the indication format provided by the kitchen video controller 12 is made into agreement with the second type where the sequence (order) of indicated items in each customer's order is determined by priority numbers given to the respective items. It should be noted that information pieces of the priority numbers are transmitted together with information pieces of ordered items respectively. In the case where the status data exclusive of "N1=2" is set, the indication format provided by the kitchen video controller 12 is made into agreement with the first type where indicated items in each customer's order are arranged in the order (sequence) equal to the order of the reception thereof.

FIG. 107 shows the structure of a PLU item setting file provided in the memory 25 within the register terminal 11. The PLU item setting file has information pieces 1071 of PLU code words, information pieces 1072 of item names, information pieces 1073 of unit prices, destination information pieces 1074 of steer flags, and information pieces 1075 of kitchen display priority numbers.

Figure 108:
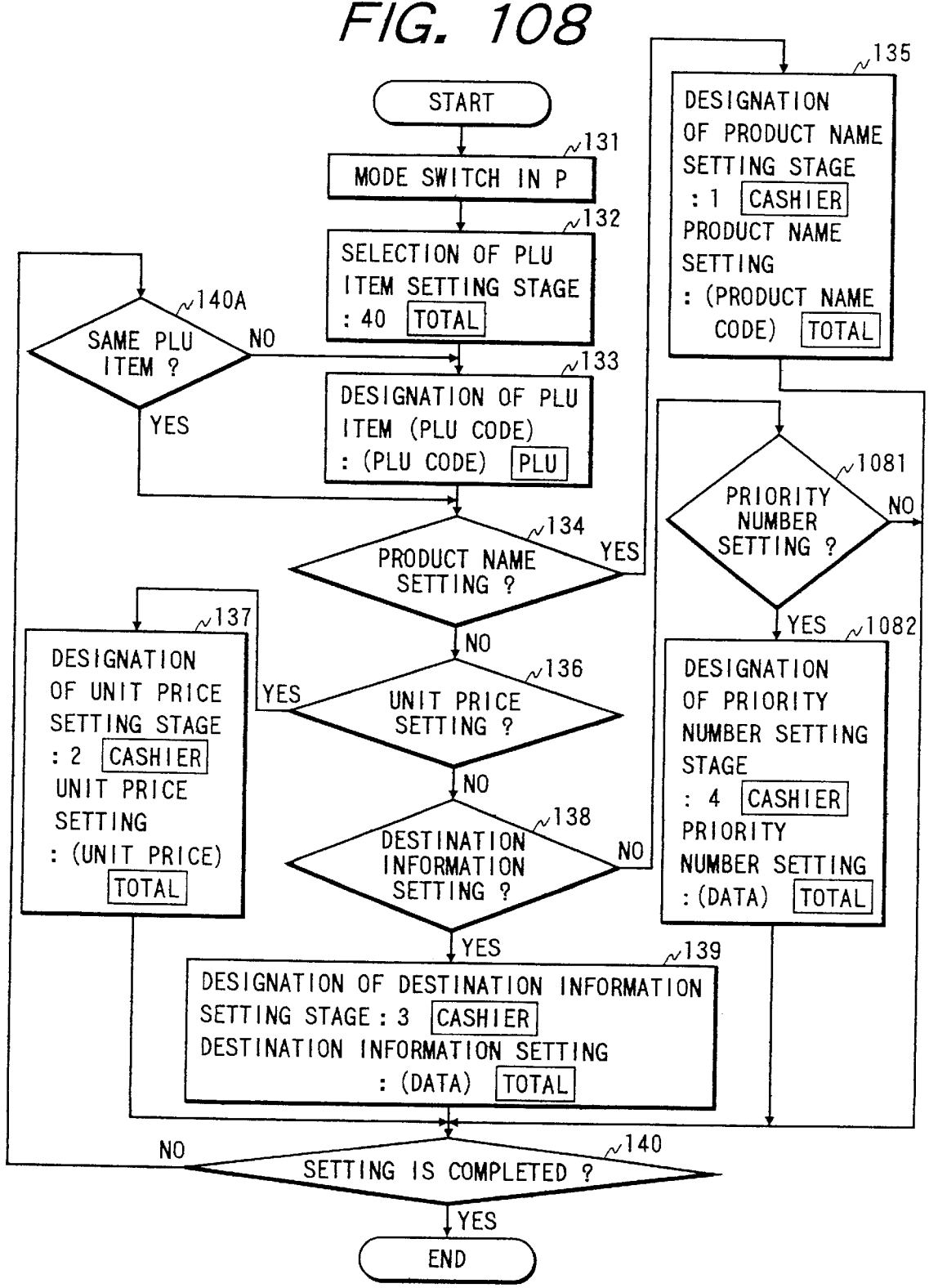
FIG. 108 is a flowchart of a segment of a program for controlling operation of a register terminal which is designed to provide the PLU item setting file in FIG. 107 according to the fourteenth embodiment of this invention.

FIG. 108 is a flowchart of a program for providing the PLU item setting file in FIG. 107. The program in FIG. 108 is similar to the program in FIG. 13 except that steps 1081 and 1082 are additionally provided. With reference to FIG. 108, when the step 138 decides that the setting of destination information is not required, the program advances from the step 138 to the step 1081. The step 1081 decides whether or not the setting of a kitchen display priority number is required. When the setting of the kitchen display priority number is required, the program advances from the step 1081 to a step 1082. Otherwise, the program jumps from the step 1081 to the step 140. The step 1082 enables the setting of the kitchen display priority number in response to operation of the keyboard 21. After the step 1082, the program advances to the step 140.

Figure 109:
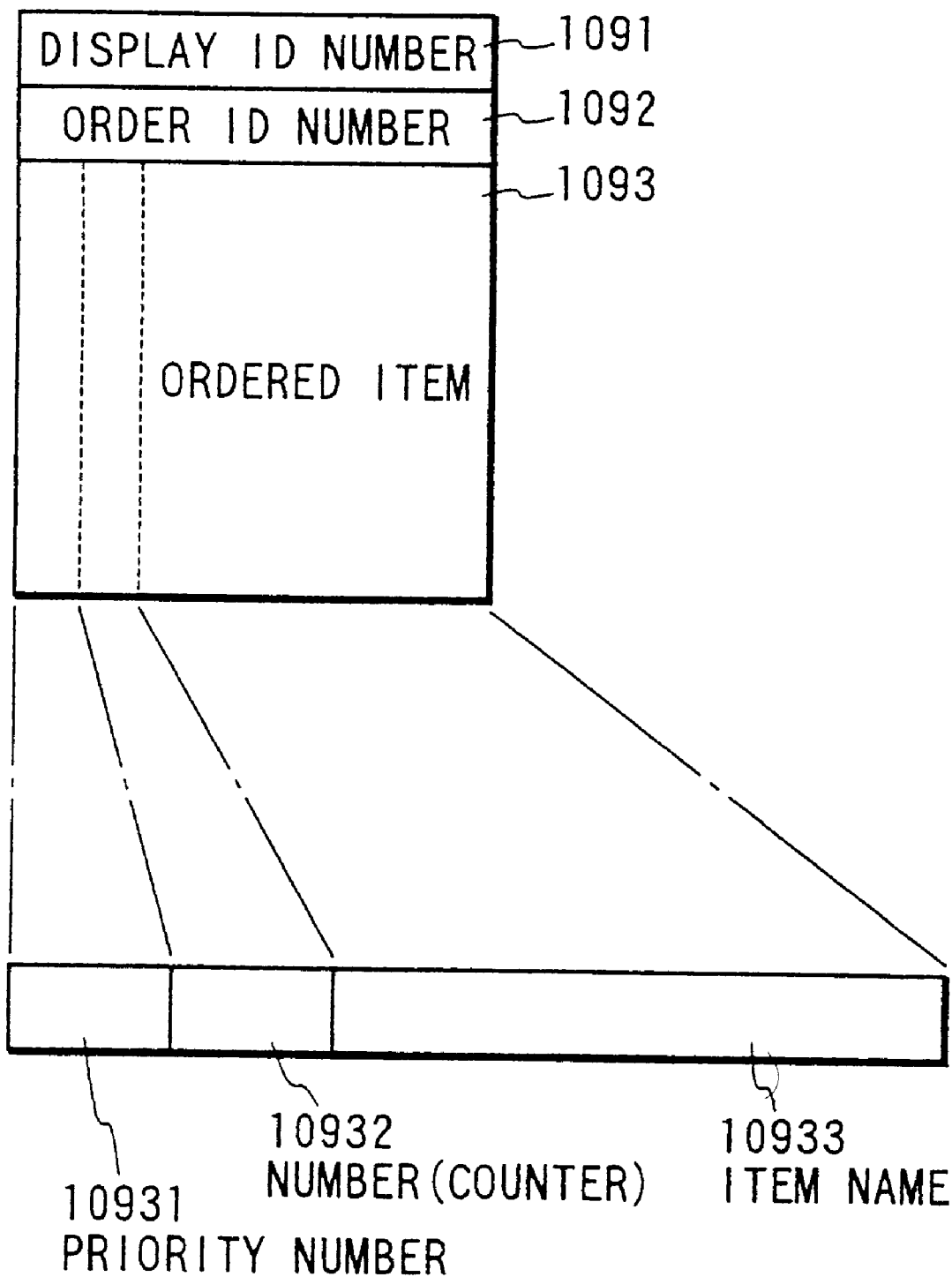
FIG. 109 is a diagram of an order file transmitted from the register terminal to a kitchen video controller in the fourteenth embodiment of this invention.

FIG. 109 shows the structure of a transmission order file used in the transmission of a registered order from the register terminal 11 to the kitchen video controller 12. As shown in FIG. 109, the transmission order file has an area 1091 for storing information of a display ID number, an area 1092 for storing information of an order ID number, and an area 1093 for storing information of ordered items. Regarding every ordered item, the ordered item area 1093 has a portion 10931 for storing information of a kitchen display priority number, a portion 10932 for storing information of a counted number, and a portion 10933 for storing information of an item name.

FIG. 110(*a*) shows an example of operation of the keyboard 21 which occurs when a customer's order "#101" is registered. With reference to FIG. 110(*a*), according to the key operation, one "JUICE", one "COFFEE", and two "HAMB" are registered. FIG. 110(*b*) shows the contents of an order transmission file made in response to the registration of the customer's order "#101" of FIG. 110(*a*). As shown in FIG. 110(*b*), the order transmission file contains information pieces 10931 of kitchen display priority numbers, information pieces 10932 of counted numbers, and information pieces 10933 of item names.

Figure 111:
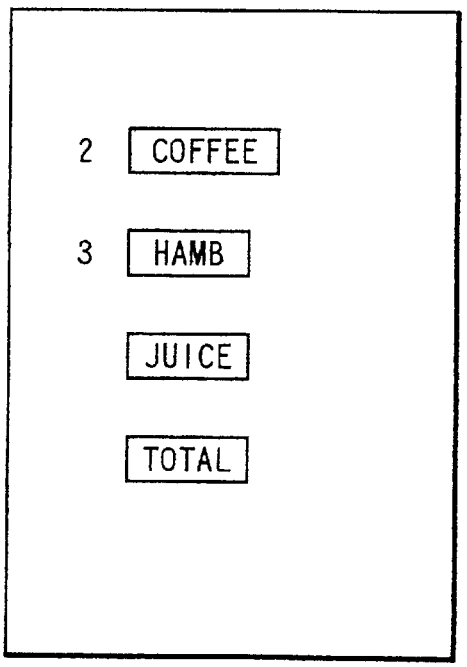

FIG. 111(*a*) shows an example of operation of the keyboard 21 which occurs when a customer's order "#102" is registered. With reference to FIG. 111(*a*), according to the key operation, two "COFFEE", three "HAMB", and one "JUICE" are registered. FIG. 111(*b*) shows the contents of an order transmission file made in response to the registration of the customer's order "#102" of FIG. 111(*a*). As shown in FIG. 111(*b*), the order transmission file contains information pieces of kitchen display priority numbers, information pieces of counted numbers, and information pieces of item names.

FIG. 112(*a*) shows an example of a picture indicated on the display device 13 or 15 which occurs when the customer's orders "#101" and "#102" in FIGS. 110(*a*) and 111(*a*) are present and the kitchen display priority number mode, that is, the second type of the indication format, is selected. In FIG. 112(a), the indicated items in each customer's order are arranged in the order (sequence) determined by the priority numbers given to the respective items. In addition, the ordered items having the equal priority numbers are arranged in the order (sequence) equal to the order of the transmission thereof.

Figures 110A, 110B:
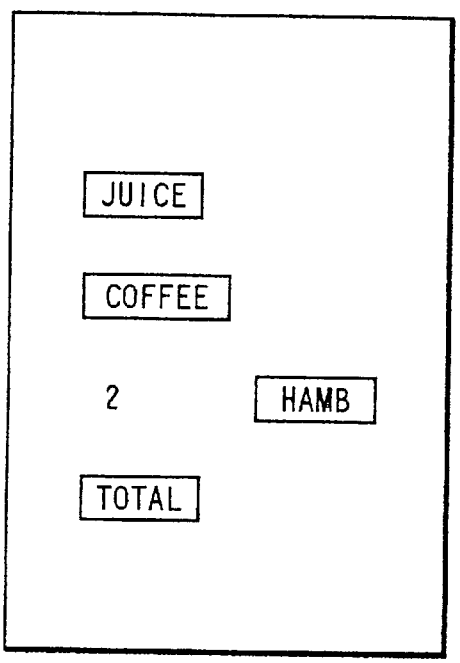
FIG. 110(a) is a diagram of key operations which occur during the registration of a customer's order in the fourteenth embodiment of this invention.

FIG. 112(b) shows an example of a picture indicated on the display device 13 or 15 which occurs when the customer's orders "#101" and "#102" in FIGS. 110(a) and 111(a) are present and the kitchen display priority number mode is not selected. In FIG. 112(b), the indicated items in each customer's order are arranged in the order (sequence) equal to the order of the reception thereof.

Figure 113:
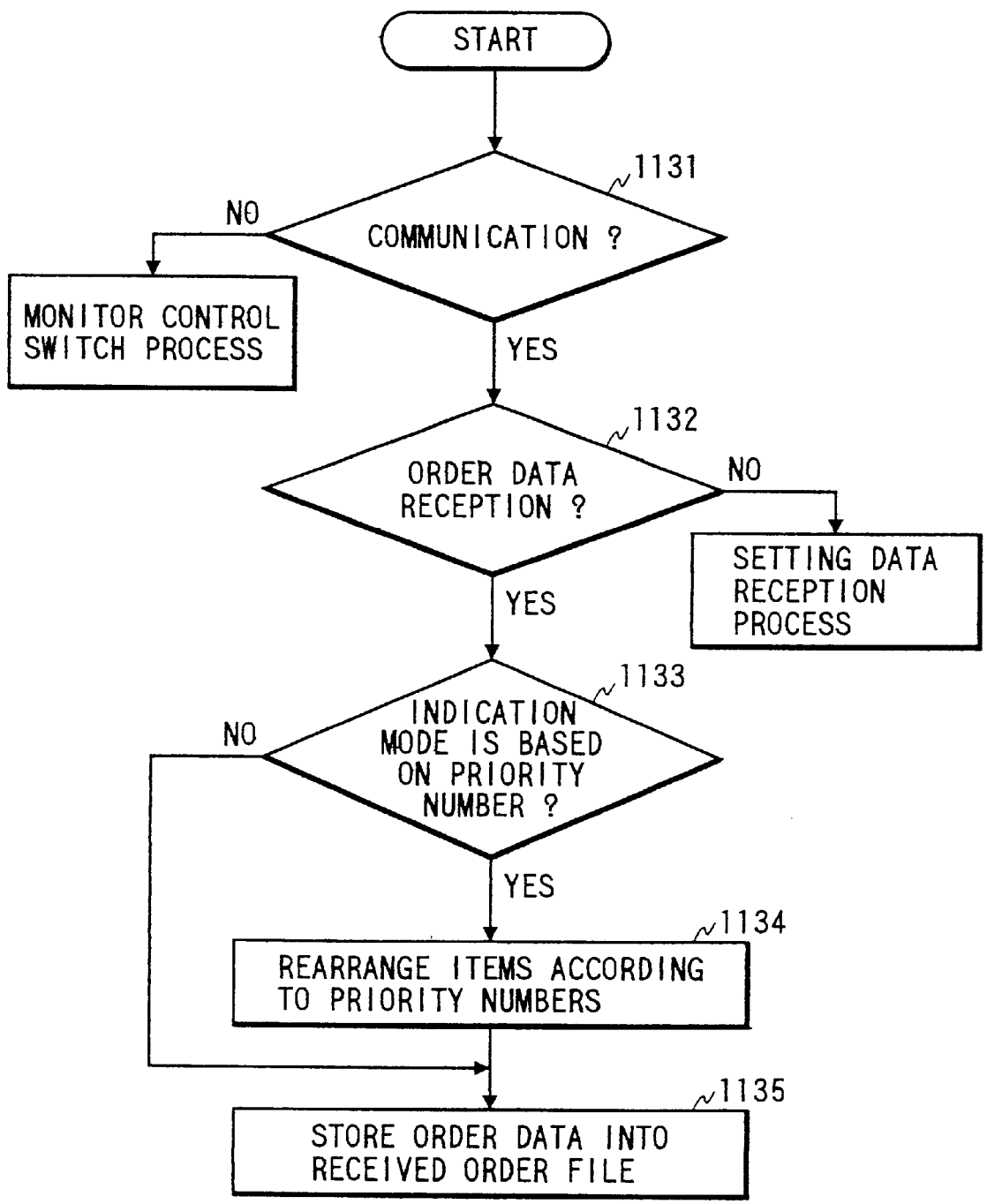

FIG. 113 is a flowchart of a program controlling the task processing executed by the kitchen video controller 12. The program is periodically reiterated. With reference to FIG. 113, a first step 1131 of the program decides whether or not a process of communication with the register terminal 11 is required. When the process of communication with the register terminal 11 is required, the program advances from the step 1131 to a step 1132. Otherwise, the program advances from the step 1131 to a block related to the processing responsive to the monitor control switch 14 or 16.

The step 1132 decides whether or not information of a customer's order is received from the register terminal 11. When the information of the customer's order is received, the program advances from the step 1132 to a step 1133. Otherwise, the program advances from the step 1132 to a block related to a process of receiving the setting data.

The step 1133 decides whether or not the received customer's order has the kitchen display priority numbers. When the received customer's order has the kitchen display priority numbers, the program advances from the step 1133 to a step 1134. Otherwise, the program jumps from the step 1133 to a block 1135. The step 1134 rearranges the items of the received customer's order into the sequence (order) according to the priority numbers thereof. In this case, the ordered items having the equal priority numbers are arranged in the order (sequence) equal to the order of the reception thereof. After the step 1134, the program advances to the block 1135. The block 1135 has a step of storing the data of the received customer's order into the received order file, and a step of indicating the information of the received customer's order on the display device 13 or 15.

Fifteenth Embodiment

A fifteenth embodiment of this invention is similar to one of the first embodiment to the fourteenth embodiment thereof except for an additional arrangement described later. In the fifteenth embodiment, the register terminal 11 is provided with a serve key (an order erasion key) for generating a command of erasing a designated order from a picture on the display device 13 or 15.

Figure 114:
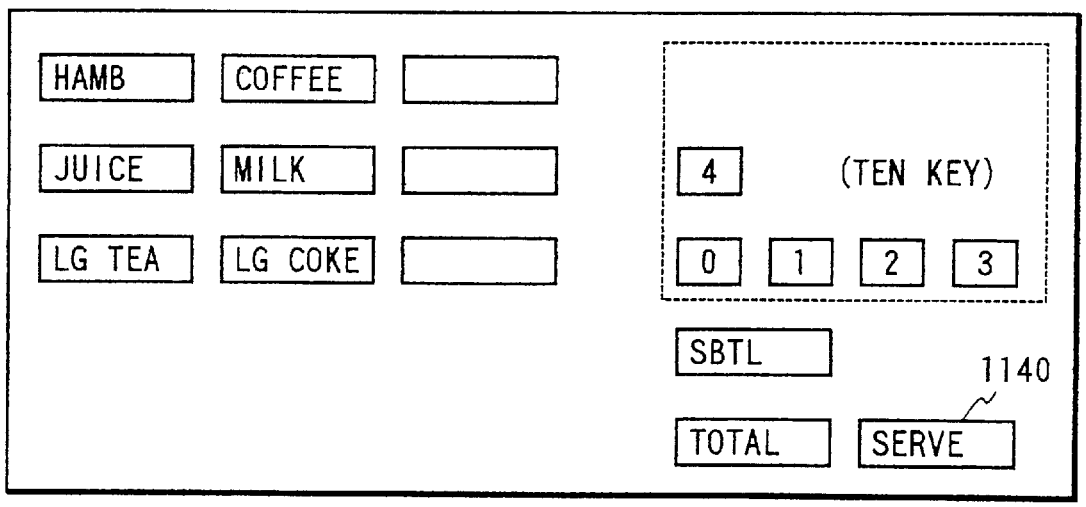
Figure 115A:
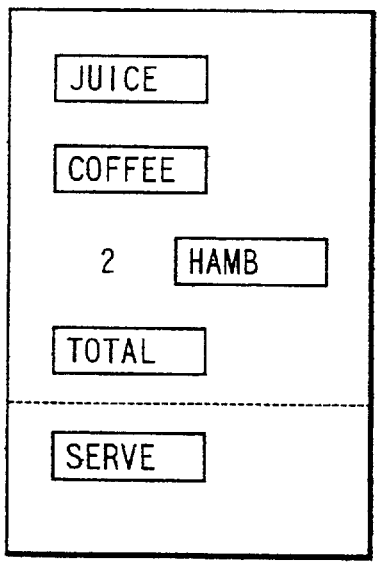

As shown in FIG. 114, the keyboard 21 in the register terminal 11 has a serve key 1140. With reference to FIG. 115(a), during the registration of a customer's order "#101", the keyboard 21 is subjected to a sequence of operation steps corresponding to one "JUICE", one "COFFEE", two "HAMB", and "TOTAL" respectively. When ordered foods and ordered drinks (ordered products) have been given to the customer, the serve key 1140 is actuated. The actuation of the serve key 1140 changes a picture on the display device 13 or 15 from conditions of FIG. 116(a) to conditions of FIG. 116(b). The actuation of the serve key 1140 erases the customer's order "#101" from the picture on the display device 13 or 15.

Figure 115B:
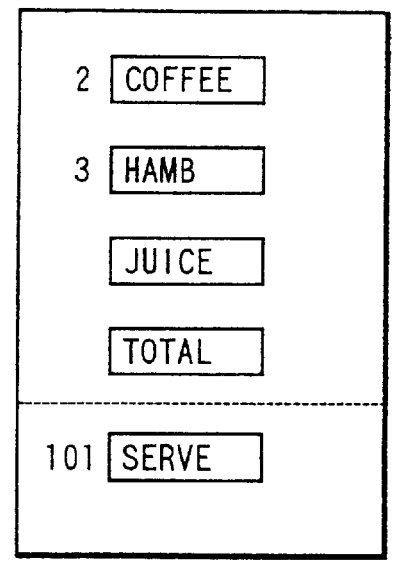

With reference to FIG. 115(b), during the registration of a customer's order "#102" which follows the registration of the customer's order "#101", the keyboard 21 is subjected to a sequence of operation steps corresponding to two "COFFEE", three "HAMB", one "JUICE", and "TOTAL" respectively. Before the registration of the customer's order "#102", the serve key 1140 is actuated. In this case, the actuation of the serve key 1140 operates on the customer's order "#101". Specifically, the actuation of the serve key 1140 changes a picture on the display device 13 or 15 from conditions of FIG. 117(a) to conditions of FIG. 117(b). The actuation of the serve key 1140 erases the customer's order "#101" from the picture on the display device 13 or 15. The indicated position of the customer's order "#102" shift leftward in accordance with the erasion of the customer's order "#101".

FIG. 118 is a flowchart of a program controlling the task processing executed by the kitchen video controller 12. The program is periodically reiterated. With reference to FIG. 118, a first step 1181 of the program decides whether or not a process of communication with the register terminal 11 is required. When the process of communication with the register terminal 11 is required, the program advances from the step 1181 to a step 1182. Otherwise, the program advances from the step 1181 to a block related to the processing responsive to the monitor control switch 14 or 16.

The step 1182 decides whether or not information of a customer's order is received from the register terminal 11. When the information of the customer's order is received, the program advances from the step 1182 to a step 1184. Otherwise, the program advances from the step 1182 to a block 1183 related to a process of receiving the order data.

The step 1184 decides whether or not the reception of the setting data is required. When the reception of the setting data is required, the program advances from the step 1184 to a block 1185 related to a process of receiving the setting data. Otherwise, the program advances from the step 1184 to a step 1186.

The step 1186 decides whether or not an order erasing command (a serve process command) is received. When the order erasing command is received, the program advances from the step 1186 to a step 1187. Otherwise, the program exits from the step 1186, and then the current execution cycle of the program ends. The step 1187 erases the order file corresponding to the received order erasing command. As a result, the corresponding indicated customer's order is deleted from the picture on the display device 13 or 15. In addition, the step 1187 makes the remaining indicated customer's orders into an arrangement starting from the left-hand edge of the display screen without any spaces formed between the indicated customer's orders. After the step 1187, the current execution cycle of the program ends.

Sixteenth Embodiment

A sixteenth embodiment of this invention is similar to one of the first embodiment to the fifteenth embodiment thereof except that the following functions are additionally provided. Regarding an everyday exactly calculating process or a closing process on the register terminal 11, sales data of each item is collected for each day of the week and for each time range over the past several weeks. The collection of the sales data forms a data base. An average sales number of each item is calculated from the data base for each time range and for the day of the week which corresponds to the present day. The calculated average sales numbers are indicated on the display device 13 or 15 as average data. Each time a customer's order is registered via the register terminal 11, data pieces of respective items in the registered customer's order are transmitted to the kitchen video controller 12. Regarding a time range containing the present time and immediately-preceding and immediately-following time ranges, the registered data is indicated on the display device 13 or 15 while being in contradistinction to the average data. One can be selected out of the above-indicated additional functions.

The arithmetic operation controller 22 (see FIG. 2) in the register terminal 11 has a clock function. Also, the arithmetic operation controller 43 (see FIG. 4) in the kitchen video controller 12 has a clock function.

FIG. 119 shows an example of a setting picture related to an indication status and an indication mode of the kitchen video. In FIG. 119, "FIELD 1" denotes a setting area for the kitchen video indication mode, and "FIELD 2" denotes a setting area for the kitchen video indication status. Here, "FIELD 1" of "VIDEO #1 (display device #1)" is designated by operating the keyboard 21, and the keyboard 21 is subjected to operation corresponding to "11" (SBTL). Subsequently, the indication mode related to "KVS #1" is set by operation of the keyboard 21 which corresponds to "indication mode #" (totalization). In the case of the setting of "indication mode #" being "03", the kitchen video controller 12 provides the item comparison indication mode. A picture on the display device 13 or 15 in the item comparison indication mode shows that the average sales number (the previous sales number) of each item is in contradistinction to the today's sales number thereof in the day of the week which corresponds to the present day.

FIG. 120 shows the structure of a PLU item setting file provided in the memory 25 within the register terminal 11. The PLU item setting file has information pieces 1201 of PLU code words, information pieces 1202 of item names, information pieces 1203 of unit prices, destination information pieces 1204 of steer flags, and information pieces 1205 of comparison item statuses.

FIG. 121 is a flowchart of a program for providing the PLU item setting file in FIG. 120. The program in FIG. 121 is similar to the program in FIG. 13 except that steps 1211 and 1212 are additionally provided. With reference to FIG. 121, when the step 138 decides that the setting of destination information is not required, the program advances from the step 138 to the step 1211. The step 1211 decides whether or not the setting of a comparison item is required. When the setting of the comparison item is required, the program advances from the step 1211 to a step 1212. Otherwise, the program jumps from the step 1211 to the step 140. The step 1212 enables the setting of the comparison item in response to operation of the keyboard 21. After the step 1212, the program advances to the step 140.

FIG. 122 shows the structure of a data base file 1220 provided in the register terminal 11. As shown in FIG. 122, the data base file 1220 has storage areas loaded with information pieces of registration numbers of ordered items for each time range and for each of the days of the week over the past four weeks. In FIG. 122, the number of comparison items is equal to 30, and one day is divided into forty-eight time ranges of 30 minutes. FIG. 123 shows the structure of data 1230 in each of the storage areas WK1, WK2, WK3, and WK4 in FIG. 122. With reference to FIGS. 122 and 123, regarding an everyday exactly calculating process or a closing process on the register terminal 11, sales data pieces corresponding to the day of the week which agrees with the present day are shifted rightward as "WK3→WK4, WK2→WK3, WK1→WK2". Then, the registration exact calculation data of the present day is stored into the storage area WK1. In this way, the registration data over the past four weeks is stored while being made into a data base separated according to time ranges.

FIG. 124 shows a data file 1240 of average values of respective comparison items which are calculated from the data base of FIG. 122 regarding the day of the week corresponding to the present day. For example, the average registration number in a time range of 8:00~8:30 in Monday is equal to the sum of the registration numbers in the past four Mondays (WK1 to WK4) which is divided by four. The average value data file 1240 in FIG. 124 is generated by a system opening process on the register terminal 11 which is executed when a related shop is opened. The average value data file 1240 is transmitted to the kitchen video controller 12 before being stored into the memory 46.

FIG. 125 shows the structure of a transmission order file used in the transmission of a registered order from the register terminal 11 to the kitchen video controller 12. As shown in FIG. 125, the transmission order file has an area 1251 for storing information of a display ID number, an area 1252 for storing information of an order ID number, an area 1253 for storing information of ordered items, and an area 1254 for storing information of registration time (a registration moment). Generally, the area 1253 stores information of all items in a customer's order. The area 1254 stores information of the time (the moment) of the registration of the customer's order via the register terminal 11. Each time a customer's order is registered, a corresponding transmission order file is transmitted to the kitchen video controller 12. When the kitchen video controller 12 receives a transmission order file, the kitchen video controller 12 detects information of registration time (a registration moment) from the received transmission order file. For each of items in the customer's order, the registration number in a time range containing the detected registration time is incremented by a value corresponding to the item number.

FIG. 126 shows the structure of an information recording area in the memory 46 within the kitchen video controller 12. As shown in FIG. 126, the memory 46 is provided with a work area 1261, a setting data file 1262, a received order file 1263, a display buffer 1264, and an item comparison file 1265. The work area 1261 is used for the control of the kitchen video controller 12. Setting data for the control of the kitchen video controller 12 is generated by the register terminal 11, and is transmitted from the register terminal 11 to the kitchen video controller 12 via the data communication line 17. The setting data file 1262 stores the transmitted setting data. The received order file 1263 stores order data transmitted from the register terminal 11. The item comparison file 1265 stores comparison item registration data of the present day. In addition, the item comparison file 1265 stores comparison item average value file data of the day of the week corresponding to the present day which is transmitted from the register terminal 11 at the system opening time. The display buffer 1264 is used to enable the item comparison indication responsive to data in the item comparison file 1265. The item comparison file 1265 is divided into an item number area 12651, an area 12652 storing the comparison item average value file data, and an area 12653 storing order data as comparison item registration data of the present day. The order data stored in the area 12653 is transmitted from the register terminal 11 each time a customer's order is registered.

FIG. 127 shows an example of a picture on the display device 13 or 15 which corresponds to the item comparison indication. As shown in FIG. 127, the present time is indicated. Further, regarding the time range containing the present time, the two immediately preceding time ranges, and the two immediately-following time ranges, the average numbers over the past four weeks and the today's registration numbers of the ordered items are indicated in a contradistinctive manner. The today's registration numbers in the time range containing the present time are in blinked or reverse indication for a clearer distinction from the other numbers.

As shown in FIG. 128, the monitor control switch #1 or #2 has a key 1281 for generating a command of return to a previous picture, and a key 1282 for generating a command of advance to a next picture.

FIG. 129 is a flowchart of a program for indicating a picture on the display device 13 or 15 (#1 or #2). As shown in FIG. 129, a first step 1291 of the program reads out information of the present time which is provided by the clock function in the arithmetic operation controller 43. The step 1291 transmits the information of the present time to the display device 13 or 15 (#1 or #2). Regarding the time range containing the present time, the two immediately preceding time ranges, and the two immediately-following time ranges, a step 1292 subsequent to the step 1291 transmits data of the average numbers of ordered items to the display device 13 or 15 (#1 or #2). Regarding the time range containing the present time and the two immediately-preceding time ranges, a step 1293 subsequent to the step 1292 transmits data of the today's registration numbers of the ordered items to the display device 13 or 15 (#1 or #2).

The monitor control switch #1 or #2 may be modified into a version of FIG. 130. The modified monitor control switch #1 or #2 has an array of keys such as a left-hand shift key 51, a right-hand shift key 52, a preparation start key 53, an order erasion key 54, an item comparison key 1301, a key 1302 for generating a command of return to a previous picture, and a key 1303 for generating a command of advance to a next picture. The actuation of the item comparison key 1301 enables a change between an order list indication picture and an item comparison indication picture.

The register terminal 11 may be modified to indicate a comparison item setting picture such as shown in FIG. 131. By referring to the comparison item setting picture, comparison items can be set. The indicated sequence of ordered items subjected to item comparison indication is determined in a way similar to one of the previously-mentioned sequence deciding ways.

The register terminal 11 may be modified to indicate a time range setting picture such as shown in FIG. 132. By referring to the time range setting picture, time ranges can be set. This process enables arbitrarily setting of the time ranges related to the data base file in FIG. 123, the item comparison file in FIG. 126, and the item comparison indication in FIG. 127.

Seventeenth Embodiment

A seventeenth embodiment of this invention is similar to the sixteenth embodiment thereof except that the numbers of members of product materials are handled instead of the item registration numbers. There are provided thirty types of product materials composing PLU items. Each of the PLU items is of a file structure linked to the product material types # and the number (the piece number) of use thereof.

FIG. 133 shows the structure of a product material setting file provided in the memory 25 of the register terminal 11. As shown in FIG. 133, the product material setting file has thirty areas 1331 for storing information pieces of product ID numbers, thirty areas 1332 for storing information pieces of the names of product materials, and thirty areas 1333 for storing information pieces of unit numbers. The unit numbers are conversion coefficients used in converting an indication unit of the item comparison indication into a dozen or a case.

FIG. 134 shows the structure of a PLU item setting file provided in the memory 25 within the register terminal 11. The PLU item setting file has information pieces 1341 of PLU code words, information pieces 1342 of item names, information pieces 1343 of unit prices, destination information pieces 1344 of steer flags, information pieces 1345 of product material ID numbers, and information pieces 1345 of used numbers (piece numbers) thereof.

FIG. 135 shows the structure of a data base file 1350 provided in the register terminal 11. As shown in FIG. 135, the data base file 1350 has storage areas loaded with information pieces of used numbers (piece numbers) of product materials for each time range and for each of the days of the week over the past four weeks. In FIG. 135, the number of the types of the product materials is equal to 30, and one day is divided into forty-eight time ranges of 30 minutes. FIG. 136 shows the structure of data 1360 in each of the storage areas WK1, WK2, WK3, and WK4 in FIG. 135. The data pieces of the used numbers (the piece numbers) of the product materials are stored in respective areas separated according to time ranges.

FIG. 137 shows a data file 1370 of average values of respective product-material used numbers (piece numbers) which are calculated from the data base of FIG. 135 regarding the day of the week corresponding to the present day. The average value data file 1370 in FIG. 137 is generated by a system opening process on the register terminal 11 which is executed when a related shop is opened. The average value data file 1370 is transmitted to the kitchen video controller 12 before being stored into the memory 46.

FIG. 138 shows the structure of a transmission order file used in the transmission of a registered order from the register terminal 11 to the kitchen video controller 12. As shown in FIG. 138, the transmission order file has an area 1381 for storing information of a display ID number, an area 1382 for storing information of an order ID number, an area 1383 for storing product-material data, and an area 1384 for storing information of registration time (a registration moment). The product-material area 1383 is divided into sub areas 13831 for storing information pieces of product-material ID numbers (product-material types) and used numbers (piece numbers) of the product materials linked to the PLU items of the customer's order. The area 1384 stores information of the time (the moment) of the registration of the customer's order via the register terminal 11. Each time a customer's order is registered, a corresponding transmission order file is transmitted to the kitchen video controller 12. When the kitchen video controller 12 receives a transmission order file, the kitchen video controller 12 detects information of registration time (a registration moment) from the received transmission order file. For each of the product-material types (the product-material identification numbers) related to the customer's order, the used number (the piece number) in a time range containing the detected registration time is incremented by a value corresponding to the used number related to the customer's order.

FIG. 139 shows the structure of an information recording area in the memory 46 within the kitchen video controller 12. As shown in FIG. 139, the memory 46 is provided with a work area 1391, a setting data file 1392, a received order file 1393, a display buffer 1394, and an item comparison file 1395. The work area 1391 is used for the control of the kitchen video controller 12. Setting data for the control of the kitchen video controller 12 is generated by the register terminal 11, and is transmitted from the register terminal 11 to the kitchen video controller 12 via the data communication line 17. The setting data file 1392 stores the transmitted setting data. The received order file 1393 stores order data transmitted from the register terminal 11. The item comparison file 1395 stores comparison item registration data of the present day. In addition, the item comparison file 1395 stores comparison item average value file data of the day of the week corresponding to the present day which is transmitted from the register terminal 11 at the system opening time. The display buffer 1394 is used to enable the item comparison indication responsive to data in the item comparison file 1395. The item comparison file 1395 is divided into a production-material ID number area 13951, an area 13952 storing the comparison item (product material) average value file data, and an area 13953 storing product-material data as comparison item registration data of the present day. The product-material data stored in the area 13953 is transmitted from the register terminal 11 each time a customer's order is registered.

FIG. 140 shows an example of a customer's order "#101" having two "3P-CHKN" and one "5P-CHKN" which are sequentially registered. FIGS. 141(a) and 141(b) show the relation between product-material ID numbers and used numbers thereof in connection with the registration of the customer's order "#101" of FIG. 140. As shown in FIG. 134, the product-material ID number "1" (chicken) and the used number "3" are set for "3P-CHKN". The product-material ID number "1" (chicken) and the used number "5" are set for "5P-CHKN". Accordingly, the customer's order "#101" of FIG. 140 corresponds to the product-material ID number "1" and the used number "11" (see FIG. 141(b)). In this way, each of ordered items is converted into a corresponding product-material ID number and a used number thereof. Each time a customer's order is registered, information of product-material ID numbers and used numbers is transmitted from the register terminal 11 to the kitchen video controller 12.

FIG. 142 shows an example of a picture on the display device 13 or 15 which corresponds to the item comparison indication. As shown in FIG. 142, the present time is indicated. Further, regarding the time range containing the present time and the two immediately-preceding time ranges, the average numbers over the past four weeks and the today's used numbers of the product materials are indicated in a contradistinctive manner. The today's used numbers in the time range containing the present time are in blinked or reverse indication for a clearer distinction from the other numbers.

In the item comparison indication picture, the indication units of product materials may correspond to a dozen or a case. As shown in FIG. 133, there are product materials assigned to non-zero unit numbers. Regarding such a product material, the used numbers are divided by the unit number to implement unit conversion, and the used numbers are indicated in unit corresponding to the result of the unit conversion.

Eighteenth Embodiment

An eighteenth embodiment of this invention is similar to the seventh embodiment thereof except for an additional arrangement described later. In the eighteenth embodiment, each of the monitor control switches #1 and #2 has an order recall key, and a picture on the display device #2 can be changed between a first form indicating an order list and a second form indicating orders which have been erased.

As shown in FIG. 143, the monitor control switch #1 or #2 has an array of keys such as a left-hand shift key 51, a right-hand shift key 52, a preparation start key 53, an order erasion key 54, and an order recall key 56. The monitor control switches #1 and #2 except the order recall keys 56 operate on the display devices #1 and #2 respectively. In other words, except for the order recall keys 56, the operation of the monitor control switch #1 on the display device #1 and the operation of the monitor control switch #2 on the display device #2 are independent of each other.

In the case where the tandem operation mode with the 4-segment indication format is selected, the screens of the display devices #1 and #2 are united so that they serve as the screen of a single display device. FIG. 144 shows an example of order list indication pictures on the display devices #1 and #2 which are driven in the tandem operation mode with the 4-segment indication format. When the order recall key 56 on the monitor control switch #1 or #2 is actuated, the order list indication picture on the display device #2 is replaced by a picture (an erased-order recall indication picture) indicating orders which have been erased. FIG. 145 shows an example of the erased-order recall indication picture on the display device #2. During the presence of the erased-order recall indication picture on the display device #2, the order recall key 56 on the monitor control switch #2 remains effective while the other keys thereon are made ineffective. When the order recall key 56 on the monitor control switch #1 or #2 is actuated again, the erased-order recall indication picture on the display device #2 is replaced the order list indication picture in FIG. 144.

During the presence of the erased-order recall indication picture on the display device #2, the left-hand shift key 51, the right-hand shift key 52, the preparation start key 53, the order erasion key 54, and the order recall key 56 on the monitor control switch #1 remain effective. The erased-order recall indication picture on the display device #2 continues regardless of the actuation of the key 51, 52, 53, or 54 on the monitor control switch #1.

FIG. 146 shows the structure of an information recording area in the memory 46 within the kitchen video controller 12. As shown in FIG. 146, the memory 46 is provided with a work area 1461, a setting data file 1462, a received order file 1463, and a display buffer 1464. The work area 1461 is used for the control of the kitchen video controller 12. Setting data for the control of the kitchen video controller 12 is generated by the register terminal 11, and is transmitted from the register terminal 11 to the kitchen video controller 12 via the data communication line 17. The setting data file 1462 stores the transmitted setting data. The received order file 1463 stores order data transmitted from the register terminal 11. The display buffer 1464 is used to enable data pieces in the received order file 1463 to be sequentially indicated by the display device 13 or 15 (#1 or #2). The display buffer 1464 has a set of unit segments 14640 each corresponding to an indication area on the screen of the display device 13 or 15 (#1 or #2). The display buffer 1464 is divided into an order area 14641 storing information which has been erased, an order area 14642 storing information which is currently indicated, and an order area 14643 storing information which will be indicated later. The order area 14641 for the erased information is of the fast-in fast-out structure. The order area 14641 for the erased information serves as a save area for the erased information which is used in recalling the erased information and confirming the erased information. The erased information in the order area 14641 represents a given number of customer's orders which have been erased. When the order recall key 56 on the monitor control switch #1 or #2 is actuated, the information of the erased orders is transmitted from the erased order area 14641 of the memory 46 to the display device #2 so that the erased orders are recalled and indicated again on the display device #2. The order area 14642 for the currently-indicated information is divided into two portions, that is, a first portion having a set of unit display segments for the display device #1 and a second portion having a set of unit display segments for the display device #2.

It is now assumed that, as shown in FIG. 145, the order list indication picture and the erased-order recall indication picture are indicated on the display devices #1 and #2 respectively. These display conditions result from the actuation of the order recall key 56 in the monitor control switch #1 or #2. When the indication of the customer's order "#151" is erased from the order list indication picture on the display device #1 by actuating the order erasion key 54 in the monitor control switch #1, the order list indication picture in FIG. 145 changes to an order list indication picture in FIG. 147. During this change of the order list indication picture, the indicated positions of the customer's orders "#152"~"#154" shift leftward and the customer's order "#155" is newly indicated on the display device #1. On the other hand, the erased-order recall indication picture on the display device #2 remains unchanged as shown in FIGS. 145 and 147. In the case where the order recall key 56 on the monitor control switch #1 or #2 is actuated again, the erased-order recall indication picture on the display device #2 is replaced by an order list indication picture. In this case, as shown in FIG. 148, both the display devices #1 and #2 indicate the order list indication pictures.

As shown in FIG. 145, the erased-order recall indication picture has a message of "RECALL ORDER". In the erased-order recall indication picture, order ID numbers are indicated in a reverse manner. Accordingly, it is easy to discriminate the erased-order recall indication picture from an order list indication picture.

FIG. 149 is a flowchart of a program corresponding to an erased-order recalling process executed by the kitchen video controller 12. The program is periodically reiterated. With reference to FIG. 149, a first step 1491 of the program decides whether or not one of the order recall keys 56 on the monitor control switches #1 and #2 is actuated. When the order recall key 56 is actuated, the program advances from the step 1491 to a step 1492. Otherwise, the program exits from the step 1491, and then the current execution cycle of the program ends. The step 1492 transmits the information of erased orders from the erased order area 14641 of the memory 46 to the display device #2 so that the erased orders are recalled and indicated again on the display device #2. After the step 1492, the current execution cycle of the program ends.

Nineteenth Embodiment

A nineteenth embodiment of this invention is similar to the seventh embodiment thereof except for an additional arrangement described later. In the nineteenth embodiment, each of the monitor control switches #1 and #2 has an order look key, and a picture on the display device #2 can be changed between a first form indicating an order list and a second form indicating orders pending and waiting to be indicated.

As shown in FIG. 150, the monitor control switch #1 or #2 has an array of keys such as a left-hand shift key 51, a right-hand shift key 52, a preparation start key 53, an order erasion key 54, and an order look key 57. The monitor control switches #1 and #2 except the order look keys 57 operate on the display devices #1 and #2 respectively. In other words, except for the order look keys 57, the operation of the monitor control switch #1 on the display device #1 and the operation of the monitor control switch #2 on the display device #2 are independent of each other.

In the case where the tandem operation mode with the 4-segment indication format is selected, the screens of the display devices #1 and #2 are united so that they serve as the screen of a single display device. FIG. 151 shows an example of order list indication pictures on the display devices #1 and #2 which are driven in the tandem operation mode with the 4-segment indication format. When the order look key 57 on the monitor control switch #1 or #2 is actuated, the order list indication picture on the display device #2 is replaced by a picture (a pending-order look indication picture) indicating orders pending and waiting to be indicated. FIG. 152 shows an example of the pending-order look indication picture on the display device #2. During the presence of the pending-order look indication picture on the display device #2, the order look key 57 on the monitor control switch #2 remains effective while the other keys thereon are made ineffective. When the order look key 57 on the monitor control switch #1 or #2 is actuated again, the pending-order look indication picture on the display device #2 is replaced the order list indication picture in FIG. 151.

During the presence of the pending-order look indication picture on the display device #2, the left-hand shift key 51, the right-hand shift key 52, the preparation start key 53, the order erasion key 54, and the order look key 57 on the monitor control switch #1 remain effective. The pending-order look indication picture on the display device #2 continues regardless of the actuation of the key 51, 52, 53, or 54 on the monitor control switch #1.

FIG. 153 shows the structure of an information recording area in the memory 46 within the kitchen video controller 12. As shown in FIG. 153, the memory 46 is provided with a work area 1531, a setting data file 1532, a received order file 1533, and a display buffer 1534. The work area 1531 is used for the control of the kitchen video controller 12. Setting data for the control of the kitchen video controller 12 is generated by the register terminal 11, and is transmitted from the register terminal 11 to the kitchen video controller 12 via the data communication line 17. The setting data file 1532 stores the transmitted setting data. The received order file 1533 stores order data transmitted from the register terminal 11. The display buffer 1534 is used to enable data pieces in the received order file 1533 to be sequentially indicated by the display device 13 or 15 (#1 or #2). The display buffer 1534 has a set of unit segments 15340 each corresponding to an indication area on the screen of the display device 13 or 15 (#1 or #2). The display buffer 1534 is divided into an order area 15341 storing information which has been erased, an order area 15342 storing information which is currently indicated, and an order area 15343 storing information which will be indicated later. The order area 15341 for the erased information is of the fast-in fast-out structure. The order area 15341 for the erased information serves as a save area for the erased information which is used in recalling the erased information and confirming the erased information. The erased information in the order area 15341 represents a given number of customer's orders which have been erased. The later-indicated information in the order area 15343 represents a customer's order or customer's orders (a pending order or pending orders) which overflow from the currently-indicated order area 15342. Thus, the later-indicated information in the order area 15343 represents a customer's order or customer's orders pending and waiting to be indicated. When the order look key 57 on the monitor control switch #1 or #2 is actuated, the information of the pending order or orders is transmitted from the later-indicated order area 15343 of the memory 46 to the display device #2 so that the pending order or orders are now indicated on the display device #2. The order area 15342 for the currently-indicated information is divided into two portions, that is, a first portion having a set of unit display segments for the display device #1 and a second portion having a set of unit display segments for the display device #2.

It is now assumed that, as shown in FIG. 152, the order list indication picture and the pending-order look indication picture are indicated on the display devices #1 and #2 respectively. These display conditions result from the actuation of the order look key 57 in the monitor control switch #1 or #2. When the indication of the customer's order "#151" is erased from the order list indication picture on the display device #1 by actuating the order erasion key 54 in the monitor control switch #1, the order list indication picture in FIG. 152 changes to an order list indication picture in FIG. 154. During this change of the order list indication picture, the indicated positions of the customer's orders "#152"~"#154" shift leftward and the customer's order "#155" is newly indicated on the display device #1. On the other hand, the pending-order look indication picture on the display device #2 remains unchanged as shown in FIGS. 152 and 154. In the case where the order look key 57 on the monitor control switch #1 or #2 is actuated again, the pending-order look indication picture on the display device #2 is replaced by an order list indication picture. In this case, as shown in FIG. 155, both the display devices #1 and #2 indicate the order list indication pictures.

As shown in FIG. 152, the pending-order look indication picture has a message of "ORDER LOOK". In the pending-order look indication picture, order ID numbers are indicated in a reverse manner. Accordingly, it is easy to discriminate the pending-order look indication picture from an order list indication picture.

FIG. 156 is a flowchart of a program corresponding to order look processing executed by the kitchen video controller 12. The program is periodically reiterated. With reference to FIG. 156, a first step 1561 of the program decides whether or not one of the order look keys 57 on the monitor control switches #1 and #2 is actuated. When the order look key 57 is actuated, the program advances from the step 1561 to a step 1562. Otherwise, the program exits from the step 1561, and then the current execution cycle of the program ends. The step 1562 transmits the information of a pending order or pending orders from the later-indicated order area 15343 of the memory 46 to the display device #2 so that the pending order or orders are now indicated on the display device #2. After the step 1562, the current execution cycle of the program ends.

What is claimed is:

1. An electronic register comprising:
    a) a register terminal;
    b) a kitchen video controller having one or more display devices;
    c) data communication means connecting the register terminal and the kitchen video controller for providing data communication between the register terminal and the kitchen video controller; and said register terminal comprising:
    a1) means for receiving setting data of display control functions and indicated picture formats corresponding to the display devices of the kitchen video controller, and for transmitting the setting data to the kitchen video controller to set display control functions provided by the kitchen video controller;
    a2) means for setting destination information related to each product item, and for setting a display number of the kitchen video controller in response to the destination information; and
    a3) means for searching a customer's order, which is registered in the register terminal, for registered product items related to the destination information corresponding to each display number by determining a correspondence among the destination information and the display devices, and for transmitting display data representative of the registered product items to the kitchen video controller;

wherein the kitchen video controller comprises:
    b1) means for enabling the display data transmitted from the register terminal to be sequentially indicated on the display devices in indicated picture formats designated by the setting data;
    b2) monitor control switches corresponding to the display devices respectively:
    b3) means for erasing customer's orders from pictures on the display devices in response to actuation of the monitor control switches; and
    b4) means for selecting the display control function and the indicated picture format in response to the setting data transmitted from the register terminal for each of the display devices wherein the register terminal further comprises a clock; means for selecting an item registered number contradistinction function as a display control function by the kitchen video controller; means for setting specified product items to be indicated by the item registered number contradistinction function; means for setting time range division data for indicating the item registered number contradistinction function in a manner divided into time ranges; means for transmitting setting data representative of the item registered number contradistinction function, the specified product items, and the time range division to the kitchen video controller to set display control functions provided by the kitchen video controller; means for collecting sales data of respective product items for each day of the week and each of the time ranges over past several weeks in an everyday exactly calculating process in the register terminal; means for generating a data base from the collected sales data; means for calculating average sales numbers of respective product items from the data base for the day of the week and for each of the time ranges; means for transmitting information of the calculated average sales numbers to the kitchen video controller; and means for transmitting registered product item data and moments of registration of product items to the kitchen video controller during registration of a customer's order in the register terminal; and wherein the kitchen video controller further comprises a clock; and means for enabling the average sales numbers and one days registered numbers to be indicated in a contradistinctive manner for the specified product items and the time range containing the present time and immediately-preceding and immediately-following time ranges of the day.

2. An electronic register as recited in claim 1, wherein the register terminal further comprises means for setting a segment division number of an indicated picture of a list of plural customer's orders as the indicated picture format in the kitchen video controller; and means for transmitting setting data representative of the segment division number to the kitchen video controller to set display control functions provided by the kitchen video controller; and wherein the kitchen video controller further comprises means for setting display segments of the display devices in response to the setting data of the segment division number transmitted from the register terminal; means for enabling the display data transmitted from the register terminal to be sequentially indicated on the display segments of the display devices; means for deciding whether or not a customer's order is of an overflow type having a quantity exceeding a capacity of one display segment; means for enabling the overflow-type customers order to be indicated over at least two successive display segments; means for indicating a given message on one of the two successive display segments, the given message representing the related customer's order is of the overflow type; and means for allowing an overflow-type customer's order to be erased from pictures on the display devices in response to actuation of the monitor control switches only in cases where the whole of the overflow-type customer's order is indicated.

3. An electronic register according to claim 1, wherein the register terminal further comprises means for designating one of an even segment-division indication format for indicating a list of customer's orders and an uneven segment-division indication format for indicating customer's orders in a condensed manner; and means for transmitting setting data representative of the designated indication format to the kitchen video controller to set display control functions provided by the kitchen video controller; and wherein the kitchen Video controller further comprises means for enabling the display data transmitted from the register terminal to be sequentially indicated on the display device in the designated indication format represented by the setting data.

4. An electronic register according to claim 1, further comprising a keyboard; an order-type inputting key provided on the keyboard; means for designating a type of a, customer's order registered in the register terminal in response to operation of the order-type inputting key, the customer's order type being one of different types including an eat-in type and a take-out type; means for setting a position of an indicated area of a customer's order in the kitchen video controller by the type of the customer's order; means for transmitting setting data representative of the indicated area to the kitchen video controller to set display control functions provided by the kitchen video controller; and means for enabling a customer's order registered in the register terminal to be indicated in an indicated area of the display device of the kitchen video controller which is determined by the type of the customer's order.

5. An electronic register according to claim 1, wherein the register terminal further comprises means for storing information of a preset terminal identification number; means for adding the terminal identification number to a customer's order registered in the register terminal; means for setting a position of an indicated area of a customer's order in the kitchen video controller by the terminal identification number of the customer's order; means for transmitting setting data representative of the indicated area to the kitchen video controller to set display control functions provided by the kitchen video controller; and means for enabling a customer's order registered in the register terminal to be indicated in an indicated area of the display device of the kitchen video controller which is determined by the terminal identification number of the customer's order.

6. An electronic register according to claim 1, wherein the register terminal further comprises an end key; means for selecting and designating a timing of transmission of a registered customer's order to the kitchen video controller from among a corresponding transmission timing upon registration of each item in the customer's order, and a timing corresponding to operation of the end key; means for transmitting setting data representative of the transmission timing to the kitchen video controller to set display control functions provided by the kitchen video controller; and means for transmitting untransmitted order data to the kitchen video controller in response to key operation corresponding to each transmission timing by referring to the transmission timing setting data in cases where registration of each item occurs and operation of the end key is done in the register terminal; whereby a transmission timing of a registered customers order to the kitchen video controller is selected and designated from among a timing corresponding to transmission upon registration of each item in the customer's order and a timing corresponding to operation of the end key.

7. An electronic register according to claim 1, wherein the register terminal further comprises means for setting a tandem mode as a display control function provided by the kitchen video controller, the tandem being designed to unite pictures on the display devices; means for transmitting setting data representative of the tandem mode to the kitchen video controller to set display control functions provided by the kitchen video controller; and means for sewing destination information and a display identification number with respect to each product item, the display identification number corresponding to the tandem mode of the kitchen video controller and responding to the destination information; and wherein the kitchen video controller further comprises means for, in cases where a picture on one of the display devices is fully filled with display data during indication of display data transmitted from register terminal in the tandem mode, enabling remaining display data to be indicated on another of the display devices; and means for erasing customer's orders from pictures on display devices in response to operation of the monitor control switches; whereby pictures on the display devices are united to serve as an enlarged picture on a single display device.

8. An electronic register according to claim 1, further comprising means for separating a picture on each display device into an order list indication picture for indicating a list of customer's orders and a summary item indication picture for indicating numbers of specified product items in all customer's orders which have been received from the register terminal; means provided in the register terminal for setting the specified product items; means provided in the register terminal for transmitting setting data representative of the specified product items to the kitchen video controller to set a summary item indicating a function provided by the kitchen video controller; means provided in the kitchen video controller for enabling the display data transmitted from the register terminal to be sequentially indicated in a summary item indication picture on the display device; means for counting and calculating numbers of the specified product items in all customer's orders which have been informed by the register terminal; means for enabling a summary item indication picture on the display device to indicate the calculated numbers of the specified product items in an alphabetic sequence; means for decrementing the indicated numbers of the specified product items when a customer's order is erased from the picture on the display device in response to operation of the monitor control switch; and means for incrementing the indicated numbers of the specified product items when a new customer's order is transmitted from the register terminal.

9. An electronic register according to claim 1, further comprising means for separating a picture on each display device into an order list indication picture for indicating a list of customer's orders and a summary item indication picture for indicating numbers of specified product items in all customer's orders which have been informed by the register terminal; means provided in the register terminal for setting the specified product items and an indication sequence of the specified product items; means provided in the register terminal transmitting setting data representative of the specified product items and the indicator sequence to the kitchen video controller to set a summary item indicating function provided by the kitchen video controller; means provided in the kitchen video controller for enabling the display data transmitted from the register terminal to be sequentially indicated in a summary item indication picture on the display device; means for counting and calculating numbers of the specified product items in all customer's orders which have been received by the register terminal; means for enabling a summary item indication picture on the display device to indicate the calculated numbers of the specified product items in the indication sequence represented by the setting data; means for decrementing the indicated numbers of the specified product items when a customer's order is erased from the picture on the display device in response to operation of the monitor control switch; and means for incrementing the indicated nu members of the specified product items when a new customer's order is transmitted from the register terminal.

10. An electronic register according to claim 1, wherein the monitor control switch of the kitchen video controller comprises a picture change switch; wherein the register terminal further comprises means for setting specified product items to be indicated in a summary item indication picture in the kitchen video controller; and means for transmitting setting data representative of the specified product items to the kitchen video controller to set a summary item indicating function provided by the kitchen video controller; wherein the kitchen video controller further comprises means for enabling the display data transmitted from the register terminal to be sequentially indicated in a summary item indication picture on the display device; means for counting and calculating numbers of the specified product items in all customer's orders which have been informed by the register terminal in response to operation of the picture change key; means for enabling a summary item indication picture on the display device to indicate the calculated numbers of the specified product items in an alphabetical sequence or a given indication sequence in response to operation of the picture change key; and means for replacing the summary item indication picture on the display device by the order item indication picture in response to next operation of the picture change key.

11. An electronic register as recited in claim 1, wherein the monitor control switch of the kitchen video controller comprises a picture change switch; wherein the register terminal further comprises means for setting specified product items to be indicated in a summary item indication picture in the kitchen video controller; and means for transmitting setting data representative of the specified product items to the kitchen video controller to set a summary item indicating function provided by the kitchen video controller; wherein the kitchen video controller further comprises means for enabling the display data transmitted from the register terminal to be sequentially indicated in a summary item indication picture on the display device; means for counting and calculating numbers of the specified product items in all customer's orders which have been informed by the register terminal in response to operation of the picture change key; means for enabling a summary item indication picture on one of the display devices to indicate the calculated numbers of the specified product items in an alphabetical sequence or a given indication sequence in response to operation of the picture change key; means for replacing the summary item indication picture on the display device by the order item indication picture in response to a subsequent operation of the picture change key; means for decrementing the indicated numbers of the specified product items when a customer's order is erased from the picture on the display device in response to operation of the monitor control switch; and means for incrementing the indicated numbers of the specified product items when a new customer's order is transmitted from the register terminal.

12. An electronic register according to claim 8, wherein the kitchen video controller further comprises means for inhibiting a specified product item having a calculated number of 0 from being indicated while providing an indicating area therefor; means for allowing names and calculated numbers of specified product items having calculated numbers different from 0 to be indicated in the alphabetical sequence or the given indication sequence; and means for providing a blinked indication or a reverse indication of one of a name a calculated number of a specified product item which changes in calculated number or increases from 0 in calculated number in response to erasion of a customer's order from the indication or transmission of a new customer's order from the register terminal.

13. An electronic register according to claim 8, wherein the kitchen video controller further includes means for inhibiting a specified product item having a calculated number of 0 from being indicated; means for allowing names and calculated numbers of specified product items having calculated numbers different from 0 to be indicated in the alphabetical sequence or the given indication sequence without spaces provided therebetween; means for providing a blinking indication or a reverse indication of a name and a calculated number of a specified product item which changes in calculated number, or decreases to 0 in calculated number, in response to erasure of a customer's order from the indication or transmission of a new customer's order from the register terminal; means for indicating a name and a calculated number of a specified product item which increases from 0 in calculated number in a display area following display areas of currently indicated specified product items; and means for providing a blinked indication or a reverse indication of one of a name and a calculated number of a specified product item which increases from 0 in calculated number in response to erasion of a customer's order from the indication or transmission of a new customer's order from the register terminal.

14. An electronic register according claim 1, wherein the kitchen video controller further comprises confirmation sound generators corresponding to the display devices respectively; wherein the register terminal further comprises means for setting a present, and an absence of a confirmation sound related to reception of a customer's order from the register terminal as a control function provided by the kitchen video controller; means for transmitting setting data representative of the confirmation sound generation to the kitchen video controller to set control functions provided by the kitchen video controller; and wherein the kitchen video controller further comprises means for, upon reception of each customer's order from the register terminal, setting the display device to indicate the customer's order in cases where the presence of the confirmation sound is set; and means for enabling the confirmation sound generator to generate the confirmation sound upon reception of each customer's order.

15. An electronic register according to claim 1, wherein the register terminal further comprises means for selecting and designating a presence and an absence of indication of a total price of a customer's order as an indicated picture format in the kitchen video controller for each of the display devices; means for transmitting setting data representative of the total price indication to the kitchen video controller to set display control functions provided by the kitchen video controller; means for searching a customer's order, which is registered in the register terminal, for registered product items related to the destination information corresponding to each display number by a relationship between the destination information and the display devices, and means for adding information of a total price of a customer's order to the registered product items and transmitting display data representative of the order total price and the registered product items to the kitchen video controller; wherein the kitchen video controller further comprises means for enabling the display data transmitted from the register terminal to be indicated on the display device; means for enabling designated the product items and the order total price to be indicated on the display device; and means for enabling the product items to be indicated on the display device and inhibiting the order total price from being indicated on the display device for which the absence of an indication of the order total price is designated.

16. An electronic register according to claim 1, wherein the register terminal further comprises means for selecting and designating a presence and an absence of an indication of information of a person in charge of registration of a customer's order together with an indication of the customer's order; means for transmitting setting data representative of the person-in-charge indication to the kitchen video controller to set display control functions provided by the kitchen video controller; means for searching a customer's order, which is registered in the register terminal, for registered product items related to the destination information corresponding to each display number from a relationship between the destination information and the display devices, and means for adding person-in-charge information to the registered product items and transmitting display data representative of the person-in-charge information and the registered product items to the kitchen video controller; wherein the kitchen video controller further comprises means for enabling the display data transmitted from the register terminal to be indicated on the display device; and means for enabling the product items and the person-in-charge information to be indicated on the display device for which the presence of indication of the person-in-charge information is designated.

17. An electronic register according to claim 1, wherein the register terminal further comprises means for selecting and designating an indication sequence of product items in a customer's order in an indication format of each customer's order in pictures on the display devices of the kitchen video controller from among an indication sequence corresponding to a sequence of reception of the product items and an indication sequence determined by indication priority numbers transmitted together with the product items; means for transmitting setting data representative of the indication sequence to the kitchen video controller to set display control functions provided by the kitchen video controller; means for setting display priority numbers, destination information, and display identification numbers corresponding to the destination information for each product item, the display priority numbers controlling an item indication sequence in each customer's order in pictures in the kitchen video controller; means for searching a customer's order, which is registered in the register terminal, for registered product items related to the destination information corresponding to each display number by referring a correspondence relation among the destination information and the display devices, and means for adding information of the display priority numbers to the registered product items; means for transmitting display data representative of the priority information and the registered product items to the kitchen video controller; wherein the kitchen video controller further comprises means for rearranging product items In a customer's order into an item indication sequence based on the priority information regarding display data transmitted from the register terminal; and means for enabling product items in a customer's order to be indicated on the display device in the priority-based item indication sequence.

18. An electronic register according to claim 1, further comprising a keyboard provided in the register terminal; a serve key provided on the keyboard; and means for erasing a customer's order from a picture on the display device in response to operation of the serve key.

* * * * *